(12) United States Patent
Binder et al.

(10) Patent No.: US 12,401,721 B1
(45) Date of Patent: *Aug. 26, 2025

(54) SYSTEM AND METHOD FOR SERVER BASED CONTROL

(71) Applicant: May Patents Ltd., Hod Hasharon (IL)

(72) Inventors: Yehuda Binder, Ramat Gan (IL); Benjamin Maytal, Mevasseret Zion (IL)

(73) Assignee: May Patents Ltd., Hod-Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/201,954

(22) Filed: May 8, 2025

Related U.S. Application Data

(63) Continuation of application No. 18/675,220, filed on May 28, 2024, now Pat. No. 12,316,706, which is a
(Continued)

(51) Int. Cl.
*G06F 15/16* (2006.01)
*G07C 3/02* (2006.01)
(Continued)

(52) U.S. Cl.
CPC ............... *H04L 67/12* (2013.01); *G07C 3/02* (2013.01); *B60K 31/00* (2013.01); *B60K 31/18* (2013.01);
(Continued)

(58) Field of Classification Search
CPC ......... H04L 67/12; B60K 31/00; B60K 31/18; B60Y 2200/11; B60Y 2200/12;
(Continued)

(56) References Cited

U.S. PATENT DOCUMENTS 3,184,842 A 5/1965 Maropis
3,213,010 A 10/1965 Saunders et al.
(Continued)

FOREIGN PATENT DOCUMENTS

WO 2011051022 A1 5/2011

OTHER PUBLICATIONS

ITU-T G.9960 entitled: "Unified high-speed wireline-based home networking transceivers—System architecture and physical layer specification", Dec. 2011 (160 pages).
(Continued)

*Primary Examiner* — Moustafa M Meky
(74) *Attorney, Agent, or Firm* — May Patents Ltd. c/o Dorit Shem-Tov

(57) ABSTRACT

A system and method in a building or vehicle for an actuator operation in response to a sensor according to a control logic, the system comprising a router or a gateway communicating with a device associated with the sensor and a device associated with the actuator over in-building or in-vehicle networks, and an external Internet-connected control server associated with the control logic implementing a PID closed linear control loop and communicating with the router over external network for controlling the in-building or in-vehicle phenomenon. The sensor May be a microphone or a camera, and the system may include voice or image processing as part of the control logic. A redundancy is used by using multiple sensors or actuators, or by using multiple data paths over the building or vehicle internal or external communication. The networks may be wired or wireless, and may be BAN, PAN, LAN, WAN, or home networks.

33 Claims, 60 Drawing Sheets

Related U.S. Application Data continuation of application No. 17/408,549, filed on Aug. 23, 2021, now Pat. No. 12,010,174, which is a continuation of application No. 15/657,163, filed on Jul. 23, 2017, now Pat. No. 11,128,710, which is a continuation of application No. 13/733,634, filed on Jan. 3, 2013, now abandoned.

(60) Provisional application No. 61/647,034, filed on May 15, 2012, provisional application No. 61/637,030, filed on Apr. 23, 2012, provisional application No. 61/620,129, filed on Apr. 4, 2012, provisional application No. 61/584,500, filed on Jan. 9, 2012.

(51) Int. Cl.
*H04L 67/12* (2022.01)
*B60K 31/00* (2006.01)
*B60K 31/18* (2006.01)
*G07C 5/00* (2006.01)
*G08G 1/00* (2006.01)

(52) U.S. Cl.
CPC ....... *B60Y 2200/11* (2013.01); *B60Y 2200/12* (2013.01); *B60Y 2200/126* (2013.01); *B60Y 2200/13* (2013.01); *B60Y 2200/30* (2013.01); *B60Y 2200/40* (2013.01); *B60Y 2200/50* (2013.01); *B60Y 2200/90* (2013.01); *G06Q 2240/00* (2013.01); *G07C 5/008* (2013.01); *G08G 1/00* (2013.01); *Y04S 40/18* (2018.05)

(58) Field of Classification Search
CPC ............ B60Y 2200/13; B60Y 2200/30; B60Y 2200/40; B60Y 2200/50; B60Y 2200/90; B60Y 2200/126
USPC ......................................................... 709/203
See application file for complete search history.

(56) References Cited

U.S. PATENT DOCUMENTS

| | | |
|---|---|---|
| 3,433,981 A | 3/1969 | Bollee |
| 3,436,630 A | 4/1969 | Bollee |
| 3,820,110 A | 6/1974 | Henrich et al. |
| 4,019,073 A | 4/1977 | Vishnevsky et al. |
| 4,047,187 A | 9/1977 | Mashimo et al. |
| 4,210,837 A | 7/1980 | Vasiliev et al. |
| 4,243,631 A | 1/1981 | Ryerson |
| 4,248,123 A | 2/1981 | Bunger et al. |
| 4,317,991 A | 3/1982 | Stauffer |
| 4,351,192 A | 9/1982 | Toda et al. |
| 4,367,027 A | 1/1983 | Stauffer |
| RE31,370 E | 9/1983 | Mashimo et al. |
| 4,414,537 A | 11/1983 | Grimes |
| 4,434,451 A | 2/1984 | Delatorre |
| 4,472,656 A | 9/1984 | Franx |
| 4,496,149 A | 1/1985 | Schwartzberg |
| 4,516,260 A | 5/1985 | Breedlove et al. |
| 4,594,898 A | 6/1986 | Kirman et al. |
| 4,638,364 A | 1/1987 | Hiramatsu |
| 4,759,220 A | 7/1988 | Burdess et al. |
| 4,796,891 A | 1/1989 | Milner |
| 4,840,602 A | 6/1989 | Rose |
| 4,853,884 A | 8/1989 | Brown et al. |
| 4,857,273 A | 8/1989 | Stewart |
| 4,873,481 A | 10/1989 | Nelson et al. |
| 4,905,176 A | 2/1990 | Schulz |
| 4,968,255 A | 11/1990 | Lee et al. |
| 5,001,453 A | 3/1991 | Ikejiri et al. |
| 5,010,399 A | 4/1991 | Goodman et al. |
| RE33,682 E | 9/1991 | Hiramatsu |
| 5,046,022 A | 9/1991 | Conway et al. |
| 5,047,952 A | 9/1991 | Kramer et al. |
| 5,077,512 A | 12/1991 | Weber |
| 5,105,087 A | 4/1992 | Jagielinski |
| 5,134,887 A | 8/1992 | Bell |
| 5,138,459 A | 8/1992 | Roberts et al. |
| 5,274,631 A | 12/1993 | Bhardwaj |
| 5,291,234 A | 3/1994 | Shindo et al. |
| 5,349,129 A | 9/1994 | Wisniewski et al. |
| 5,386,103 A | 1/1995 | DeBan et al. |
| 5,402,170 A | 3/1995 | Parulski et al. |
| 5,454,043 A | 9/1995 | Freeman |
| 5,488,429 A | 1/1996 | Kojima et al. |
| 5,510,765 A | 4/1996 | Madau |
| 5,511,547 A | 4/1996 | Markle et al. |
| 5,552,654 A | 9/1996 | Konno et al. |
| 5,555,498 A | 9/1996 | Berra |
| 5,578,755 A | 11/1996 | Offenberg |
| 5,578,877 A | 11/1996 | Tiemann |
| 5,604,595 A | 2/1997 | Schoen |
| 5,621,455 A | 4/1997 | Rogers et al. |
| 5,638,136 A | 6/1997 | Kojima et al. |
| 5,642,431 A | 6/1997 | Poggio et al. |
| 5,652,849 A | 7/1997 | Conway et al. |
| 5,666,159 A | 9/1997 | Parulski et al. |
| 5,696,879 A | 12/1997 | Cline |
| 5,710,833 A | 1/1998 | Moghaddam et al. |
| 5,724,456 A | 3/1998 | Boyack et al. |
| 5,781,650 A | 7/1998 | Lobo et al. |
| 5,812,193 A | 9/1998 | Tomitaka et al. |
| 5,817,943 A | 10/1998 | Welles, II et al. |
| 5,818,975 A | 10/1998 | Goodwin et al. |
| 5,835,616 A | 11/1998 | Lobo et al. |
| 5,844,146 A | 12/1998 | Murray et al. |
| 5,870,138 A | 2/1999 | Smith et al. |
| 5,896,443 A | 4/1999 | Dichter |
| 5,930,201 A | 7/1999 | Cray |
| 5,948,965 A | 9/1999 | Upchurch et al. |
| 5,962,786 A | 10/1999 | Le Traon et al. |
| 5,965,968 A | 10/1999 | Robert et al. |
| 5,978,519 A | 11/1999 | Bollman et al. |
| 5,987,154 A | 11/1999 | Gibbon et al. |
| 5,991,456 A | 11/1999 | Rahman et al. |
| 6,069,899 A | 5/2000 | Foley |
| 6,097,470 A | 8/2000 | Buhr et al. |
| 6,101,271 A | 8/2000 | Yamashita et al. |
| 6,108,331 A | 8/2000 | Thompson |
| 6,128,397 A | 10/2000 | Baluja et al. |
| 6,132,281 A | 10/2000 | Klitsner et al. |
| 6,148,092 A | 11/2000 | Qian |
| 6,151,073 A | 11/2000 | Steinberg et al. |
| 6,188,777 B1 | 2/2001 | Darrell et al. |
| 6,192,149 B1 | 2/2001 | Eschbach et al. |
| 6,216,160 B1 | 4/2001 | Dichter |
| 6,243,571 B1 | 6/2001 | Bullock et al. |
| 6,249,315 B1 | 6/2001 | Holm |
| 6,263,113 B1 | 7/2001 | Abdel-Mottaleb et al. |
| 6,268,939 B1 | 7/2001 | Klassen et al. |
| 6,282,317 B1 | 8/2001 | Luc et al. |
| 6,285,761 B1 | 9/2001 | Patel et al. |
| 6,301,370 B1 | 10/2001 | Steffens et al. |
| 6,329,160 B1 | 12/2001 | Schneider et al. |
| 6,332,033 B1 | 12/2001 | Qian |
| 6,393,148 B1 | 5/2002 | Bhaskar |
| 6,404,900 B1 | 6/2002 | Qian et al. |
| 6,407,777 B1 | 6/2002 | DeLuca |
| 6,421,468 B1 | 7/2002 | Ratnakar et al. |
| 6,437,578 B1 | 8/2002 | Gumm |
| 6,438,264 B1 | 8/2002 | Gallagher et al. |
| 6,452,499 B1 | 9/2002 | Runge et al. |
| 6,456,732 B1 | 9/2002 | Kimbell et al. |
| 6,459,436 B1 | 10/2002 | Kumada et al. |
| 6,473,199 B1 | 10/2002 | Gilman et al. |
| 6,473,608 B1 | 10/2002 | Lehr et al. |
| 6,473,609 B1 | 10/2002 | Schwartz et al. |
| 6,474,138 B1 | 11/2002 | Chang et al. |
| 6,476,372 B2 | 11/2002 | Merrill et al. |
| 6,501,857 B1 | 12/2002 | Gotsman et al. |
| 6,504,942 B1 | 1/2003 | Hong et al. |
| 6,504,951 B1 | 1/2003 | Luo et al. |
| 6,516,154 B1 | 2/2003 | Parulski et al. |

(56) References Cited

U.S. PATENT DOCUMENTS

| | | |
|---|---|---|
| 6,526,161 B1 | 2/2003 | Yan |
| 6,527,611 B2 | 3/2003 | Cummings |
| 6,535,243 B1 | 3/2003 | Tullis |
| 6,542,819 B1 | 4/2003 | Kovacs et al. |
| 6,546,297 B1 | 4/2003 | Gaston |
| 6,549,234 B1 | 4/2003 | Lee |
| 6,549,616 B1 | 4/2003 | Binder |
| 6,552,743 B1 | 4/2003 | Rissman |
| 6,606,911 B2 | 8/2003 | Akiyama et al. |
| 6,670,212 B2 | 12/2003 | McNie et al. |
| 6,694,316 B1 | 2/2004 | Langseth et al. |
| 6,714,021 B2 | 3/2004 | Williams |
| 6,735,630 B1 | 5/2004 | Gelvin et al. |
| 6,747,258 B2 | 6/2004 | Benz et al. |
| 6,777,856 B2 | 8/2004 | Brechbühl et al. |
| 6,788,332 B1 | 9/2004 | Cook |
| 6,806,722 B2 | 10/2004 | Shon et al. |
| 6,813,221 B1 | 11/2004 | Barr |
| 6,820,225 B1 | 11/2004 | Johnson et al. |
| 6,826,607 B1 | 11/2004 | Gelvin et al. |
| 6,832,251 B1 | 12/2004 | Gelvin et al. |
| 6,840,103 B2 | 1/2005 | Lee et al. |
| 6,844,897 B1 | 1/2005 | Andersson |
| 6,859,831 B1 | 2/2005 | Gelvin et al. |
| 6,862,353 B2 | 3/2005 | Rabenko et al. |
| 6,865,953 B2 | 3/2005 | Tsukada et al. |
| 6,895,803 B2 | 5/2005 | Seakins et al. |
| 6,931,596 B2 | 8/2005 | Gutta et al. |
| 6,934,426 B2 | 8/2005 | Rich et al. |
| 6,940,545 B1 | 9/2005 | Ray et al. |
| 6,957,133 B1 | 10/2005 | Hunt |
| 6,967,565 B2 | 11/2005 | Lingemann |
| 7,010,050 B2 | 3/2006 | Maryanka |
| 7,019,646 B1 | 3/2006 | Woodard |
| 7,020,701 B1 | 3/2006 | Gelvin et al. |
| 7,027,418 B2 | 4/2006 | Gan et al. |
| 7,035,898 B1 | 4/2006 | Baker |
| 7,047,196 B2 | 5/2006 | Calderone et al. |
| 7,047,826 B2 | 5/2006 | Peshkin |
| 7,062,073 B1 | 6/2006 | Tumey et al. |
| 7,103,460 B1 | 9/2006 | Breed |
| 7,110,575 B2 | 9/2006 | Chen et al. |
| 7,124,157 B2 | 10/2006 | Ikake |
| 7,136,482 B2 | 11/2006 | Wille |
| 7,145,933 B1 | 12/2006 | Szajnowski |
| 7,213,061 B1 | 5/2007 | Hite et al. |
| 7,219,536 B2 | 5/2007 | Liu et al. |
| 7,239,577 B2 | 7/2007 | Tenghamn et al. |
| 7,256,466 B2 | 8/2007 | Lieber et al. |
| 7,289,645 B2 | 10/2007 | Yamamoto et al. |
| 7,315,630 B2 | 1/2008 | Steinberg et al. |
| 7,317,815 B2 | 1/2008 | Steinberg et al. |
| 7,326,866 B2 | 2/2008 | Kelley, Jr. et al. |
| 7,327,385 B2 | 2/2008 | Yamaguchi |
| 7,334,001 B2 | 2/2008 | Eichstaedt et al. |
| 7,342,212 B2 | 3/2008 | Mentzer et al. |
| 7,343,427 B2 * | 3/2008 | Davies .................... H04L 67/12 |
| | | 719/321 |
| 7,414,186 B2 | 8/2008 | Scarpa et al. |
| 7,432,952 B2 | 10/2008 | Fukuoka |
| 7,466,844 B2 | 12/2008 | Ramaswamy et al. |
| 7,466,866 B2 | 12/2008 | Steinberg |
| 7,482,732 B2 | 1/2009 | Kalantar-Zadeh |
| 7,499,239 B2 | 3/2009 | Chang |
| 7,508,961 B2 | 3/2009 | Chen et al. |
| 7,512,845 B2 | 3/2009 | Pitz et al. |
| 7,557,689 B2 | 7/2009 | Seddigh et al. |
| 7,598,942 B2 | 10/2009 | Underkoffler et al. |
| 7,614,305 B2 | 11/2009 | Yoshioka et al. |
| 7,617,729 B2 | 11/2009 | Axelrod et al. |
| 7,653,573 B2 | 1/2010 | Hayes, Jr. et al. |
| 7,683,776 B2 | 3/2010 | Glenn et al. |
| 7,688,036 B2 | 3/2010 | Yarger et al. |
| 7,692,320 B2 | 4/2010 | Lemieux |
| 7,693,720 B2 | 4/2010 | Kennewick et al. |
| 7,702,130 B2 | 4/2010 | Im et al. |
| 7,716,985 B2 | 5/2010 | Zhang et al. |
| 7,750,223 B2 | 7/2010 | Ohshima et al. |
| 7,774,155 B2 | 8/2010 | Sato et al. |
| 7,797,367 B1 | 9/2010 | Gelvin et al. |
| 7,818,176 B2 | 10/2010 | Freeman et al. |
| 7,821,541 B2 | 10/2010 | Delean |
| 7,843,336 B2 | 11/2010 | Kucharyson |
| 7,843,903 B2 * | 11/2010 | Bakke .................... H04L 67/52 |
| | | 370/352 |
| 7,844,687 B1 | 11/2010 | Gelvin et al. |
| 7,847,421 B2 | 12/2010 | Gardner et al. |
| 7,892,876 B2 | 2/2011 | Mehregany |
| 7,898,147 B2 | 3/2011 | Grabinger et al. |
| 7,904,219 B1 | 3/2011 | Lowrey |
| 7,917,285 B2 | 3/2011 | Rothschild |
| 7,952,485 B2 | 5/2011 | Schechter et al. |
| 8,015,006 B2 | 9/2011 | Kennewick et al. |
| 8,016,205 B2 | 9/2011 | Drew |
| 8,073,681 B2 | 12/2011 | Baldwin et al. |
| 8,115,646 B2 | 2/2012 | Tanielian et al. |
| 8,140,658 B1 | 3/2012 | Gelvin et al. |
| 8,180,492 B2 | 5/2012 | Steinberg |
| 8,195,468 B2 | 6/2012 | Weider et al. |
| 8,199,886 B2 * | 6/2012 | Calahan ................ H04M 7/006 |
| | | 379/265.06 |
| 8,214,070 B2 | 7/2012 | Grossmann et al. |
| 8,244,405 B2 | 8/2012 | Kao |
| 8,248,252 B2 | 8/2012 | Schechter et al. |
| 8,301,158 B1 | 10/2012 | Thomas |
| 8,438,285 B2 * | 5/2013 | Brown ............... H04N 21/2405 |
| | | 709/224 |
| 8,547,226 B2 | 10/2013 | Schechter et al. |
| 8,615,374 B1 | 12/2013 | Discenzo |
| 8,627,075 B2 * | 1/2014 | Ikeda .................. H04L 12/2812 |
| | | 713/168 |
| 8,676,224 B2 | 3/2014 | Louch |
| 8,855,295 B1 | 10/2014 | Chhetri et al. |
| 8,886,482 B2 | 11/2014 | Higgins et al. |
| 8,909,370 B2 | 12/2014 | Stiehl et al. |
| 8,949,075 B2 | 2/2015 | Higgins et al. |
| 9,020,432 B2 * | 4/2015 | Matsushita ............. H04W 4/80 |
| | | 455/41.3 |
| 9,031,583 B2 | 5/2015 | Pereira et al. |
| 9,047,857 B2 | 6/2015 | Barton |
| 9,100,728 B2 | 8/2015 | Higgins et al. |
| 9,143,933 B2 * | 9/2015 | Ikeda ................. H04N 1/00342 |
| 9,165,320 B1 | 10/2015 | Belvin |
| 9,263,039 B2 | 2/2016 | Di Cristo et al. |
| 9,298,407 B2 * | 3/2016 | Chang ................ H04L 63/0428 |
| 9,369,839 B2 | 6/2016 | Manges |
| 9,396,450 B2 | 7/2016 | Gazdzinski et al. |
| 9,401,140 B1 | 7/2016 | Weber et al. |
| 9,424,840 B1 | 8/2016 | Hart et al. |
| 9,541,454 B2 | 1/2017 | Schechter et al. |
| 9,626,703 B2 | 4/2017 | Kennewick, Sr. |
| 9,689,960 B1 | 6/2017 | Barton et al. |
| 9,698,999 B2 | 7/2017 | Mutagi |
| 9,712,359 B2 | 7/2017 | Snyder et al. |
| 9,754,591 B1 | 9/2017 | Kumar et al. |
| 9,786,294 B1 | 10/2017 | Bezos et al. |
| 9,821,344 B2 | 11/2017 | Zsigmond |
| 9,857,234 B1 | 1/2018 | Schechter et al. |
| 9,908,153 B2 | 3/2018 | Zsigmond |
| 9,947,333 B1 | 4/2018 | David |
| 10,026,116 B2 | 7/2018 | Zohar |
| 10,026,401 B1 | 7/2018 | Mutagi et al. |
| 10,031,722 B1 | 7/2018 | Mutagi et al. |
| 10,213,810 B2 | 2/2019 | Zsigmond |
| 10,232,408 B2 | 3/2019 | Zsigmond |
| 10,239,094 B2 | 3/2019 | Zsigmond |
| 11,128,710 B2 * | 9/2021 | Binder .................... H04L 67/12 |
| 12,010,174 B2 | 6/2024 | Binder .................... G07C 3/02 |
| 12,316,706 B2 * | 5/2025 | Binder .................... G07C 3/02 |
| 2001/0024163 A1 | 9/2001 | Petite |
| 2001/0025349 A1 | 9/2001 | Sharood |
| 2001/0041982 A1 | 11/2001 | Kawasaki |
| 2001/0049248 A1 | 12/2001 | Choi |
| 2002/0000092 A1 | 1/2002 | Sharood et al. |

(56) References Cited

U.S. PATENT DOCUMENTS

| | | |
|---|---|---|
| 2002/0019966 A1 | 2/2002 | Yagil et al. |
| 2002/0039388 A1 | 4/2002 | Smart et al. |
| 2002/0060617 A1 | 5/2002 | Walbeck et al. |
| 2002/0103576 A1 | 8/2002 | Takamura et al. |
| 2002/0112726 A1 | 8/2002 | Schmidt |
| 2002/0166124 A1 | 11/2002 | Gurantz et al. |
| 2002/0194383 A1 | 12/2002 | Cohen et al. |
| 2002/0198626 A1 | 12/2002 | Imai |
| 2003/0009271 A1 | 1/2003 | Akiyama |
| 2003/0038017 A1 | 2/2003 | Boyer et al. |
| 2003/0059020 A1* | 3/2003 | Meyerson ............ H04M 1/2535 348/E7.081 |
| 2003/0062990 A1 | 4/2003 | Schaeffer, et al. |
| 2003/0093199 A1 | 5/2003 | Mavreas |
| 2003/0099228 A1 | 5/2003 | Alcock |
| 2003/0105389 A1 | 6/2003 | Noonan |
| 2003/0112965 A1 | 6/2003 | McNamara et al. |
| 2003/0130774 A1 | 7/2003 | Tripathi |
| 2003/0139151 A1 | 7/2003 | Lifshitz et al. |
| 2004/0032902 A1 | 2/2004 | Koffman et al. |
| 2004/0093219 A1 | 5/2004 | Shin et al. |
| 2004/0129693 A1 | 7/2004 | Hook |
| 2004/0151305 A1 | 8/2004 | Binder et al. |
| 2004/0182167 A1 | 9/2004 | Orth et al. |
| 2004/0217857 A1 | 11/2004 | Lennartz |
| 2004/0267385 A1 | 12/2004 | Lingemann |
| 2005/0004752 A1 | 1/2005 | Choi et al. |
| 2005/0010954 A1 | 1/2005 | Binder |
| 2005/0044119 A1 | 2/2005 | Langin-Hooper et al. |
| 2005/0125083 A1 | 6/2005 | Kiko |
| 2005/0146458 A1 | 7/2005 | Carmichael |
| 2005/0154494 A1 | 7/2005 | Ahmed |
| 2005/0180561 A1 | 8/2005 | Hazani et al. |
| 2005/0216121 A1 | 9/2005 | Sawada |
| 2005/0216302 A1 | 9/2005 | Raji et al. |
| 2005/0226201 A1 | 10/2005 | McMillin |
| 2005/0247573 A1 | 11/2005 | Nakamura et al. |
| 2005/0273505 A1 | 12/2005 | Kim |
| 2005/0289124 A1 | 12/2005 | Kaiser et al. |
| 2006/0025897 A1 | 2/2006 | Shostak |
| 2006/0097574 A1 | 5/2006 | Gidge et al. |
| 2006/0111825 A1 | 5/2006 | Okada |
| 2006/0164208 A1 | 7/2006 | Schaffzin et al. |
| 2006/0176823 A1 | 8/2006 | Barajas |
| 2006/0187034 A1 | 8/2006 | Styers et al. |
| 2006/0206155 A1 | 9/2006 | Ben-David |
| 2006/0212194 A1 | 9/2006 | Breed |
| 2006/0217840 A1 | 9/2006 | Uehigashi |
| 2006/0220830 A1 | 10/2006 | Bennett |
| 2006/0230841 A1 | 10/2006 | Shrikrishna |
| 2006/0237427 A1 | 10/2006 | Logan |
| 2006/0265195 A1 | 11/2006 | Woodard |
| 2007/0004449 A1 | 1/2007 | Sham |
| 2007/0016328 A1 | 1/2007 | Ziegler et al. |
| 2007/0021847 A1 | 1/2007 | Hyodo |
| 2007/0038461 A1 | 2/2007 | Abbott |
| 2007/0069947 A1 | 3/2007 | Banet |
| 2007/0076593 A1 | 4/2007 | Sakurai et al. |
| 2007/0096565 A1 | 5/2007 | Breed et al. |
| 2007/0112939 A1 | 5/2007 | Wilson et al. |
| 2007/0132725 A1 | 6/2007 | Kitaura |
| 2007/0164865 A1 | 7/2007 | Giasson et al. |
| 2007/0169080 A1 | 7/2007 | Friedman |
| 2007/0173202 A1 | 7/2007 | Binder et al. |
| 2007/0176740 A1 | 8/2007 | Aubertin et al. |
| 2007/0198144 A1 | 8/2007 | Norris |
| 2007/0208390 A1 | 9/2007 | Von Arx |
| 2007/0210580 A1 | 9/2007 | Roberts et al. |
| 2007/0214095 A1 | 9/2007 | Adams et al. |
| 2007/0220907 A1 | 9/2007 | Ehlers |
| 2007/0225873 A1 | 9/2007 | Toya et al. |
| 2007/0249063 A1 | 10/2007 | Deshong et al. |
| 2007/0256337 A1 | 11/2007 | Segan |
| 2007/0262847 A1 | 11/2007 | Grabinger |
| 2007/0264623 A1 | 11/2007 | Wang et al. |
| 2007/0283005 A1 | 12/2007 | Beliles |
| 2008/0031139 A1 | 2/2008 | Muro |
| 2008/0068156 A1 | 3/2008 | Shimokawa et al. |
| 2008/0077425 A1 | 3/2008 | Johnson et al. |
| 2008/0100428 A1 | 5/2008 | Price |
| 2008/0122288 A1 | 5/2008 | Plante |
| 2008/0129475 A1 | 6/2008 | Breed et al. |
| 2008/0130520 A1 | 6/2008 | Ebrom |
| 2008/0136670 A1 | 6/2008 | Tengler et al. |
| 2008/0154535 A1 | 6/2008 | Sparks et al. |
| 2008/0215336 A1 | 9/2008 | Oesterling |
| 2008/0215391 A1 | 9/2008 | Dowling |
| 2008/0221715 A1 | 9/2008 | Krzyzanowski |
| 2008/0257050 A1 | 10/2008 | Watanabe |
| 2008/0258913 A1 | 10/2008 | Busey |
| 2008/0263117 A1 | 10/2008 | Rose et al. |
| 2008/0291036 A1 | 11/2008 | Richmond |
| 2008/0307075 A1 | 12/2008 | Urano et al. |
| 2009/0005720 A1 | 1/2009 | Ludin |
| 2009/0024759 A1 | 1/2009 | McKibben et al. |
| 2009/0033522 A1 | 2/2009 | Skillman |
| 2009/0042533 A1 | 2/2009 | Lontka |
| 2009/0046715 A1 | 2/2009 | Mccoy |
| 2009/0051551 A1 | 2/2009 | Pham |
| 2009/0055019 A1 | 2/2009 | Stiehl |
| 2009/0076827 A1 | 3/2009 | Bulitta |
| 2009/0089065 A1 | 4/2009 | Buck et al. |
| 2009/0105605 A1 | 4/2009 | Abreu |
| 2009/0138136 A1 | 5/2009 | Natsume |
| 2009/0183729 A1 | 7/2009 | Barkhouse |
| 2009/0189981 A1 | 7/2009 | Siann |
| 2009/0198380 A1 | 8/2009 | Friedman |
| 2009/0224906 A1 | 9/2009 | Balgard |
| 2009/0236538 A1 | 9/2009 | Frank |
| 2009/0271002 A1 | 10/2009 | Asofsky |
| 2009/0272193 A1 | 11/2009 | Okaguchi et al. |
| 2009/0294141 A1 | 12/2009 | Rouse et al. |
| 2010/0004857 A1 | 1/2010 | Pereira et al. |
| 2010/0023198 A1 | 1/2010 | Hamilton |
| 2010/0030421 A1 | 2/2010 | Yoshimura |
| 2010/0037276 A1* | 2/2010 | Hong ................ H04N 21/4147 725/110 |
| 2010/0039253 A1 | 2/2010 | Zang |
| 2010/0071053 A1 | 3/2010 | Ansari |
| 2010/0100004 A1 | 4/2010 | van Someren |
| 2010/0100327 A1 | 4/2010 | Jensen |
| 2010/0127880 A1 | 5/2010 | Schechter et al. |
| 2010/0148940 A1 | 6/2010 | Gelvin et al. |
| 2010/0162815 A1 | 7/2010 | Lee |
| 2010/0187832 A1 | 7/2010 | Holland |
| 2010/0188251 A1 | 7/2010 | Panuce |
| 2010/0195601 A1 | 8/2010 | Zhang |
| 2010/0201516 A1 | 8/2010 | Gelvin et al. |
| 2010/0201531 A1 | 8/2010 | Pakravan et al. |
| 2010/0207754 A1 | 8/2010 | Shostak et al. |
| 2010/0211258 A1 | 8/2010 | Sakurai |
| 2010/0211359 A1 | 8/2010 | Mehta |
| 2010/0211918 A1 | 8/2010 | Lang et al. |
| 2010/0242611 A1 | 9/2010 | Terazawa |
| 2010/0265800 A1 | 10/2010 | Eatwell |
| 2010/0281884 A1 | 11/2010 | Rawski |
| 2010/0295782 A1 | 11/2010 | Binder |
| 2010/0298957 A1 | 11/2010 | Sanchez Rocha |
| 2010/0305807 A1 | 12/2010 | Basir |
| 2010/0328023 A1 | 12/2010 | Thomson |
| 2011/0032952 A1 | 2/2011 | Rochon et al. |
| 2011/0034912 A1 | 2/2011 | de Graff |
| 2011/0035491 A1 | 2/2011 | Gelvin et al. |
| 2011/0041604 A1 | 2/2011 | Kano et al. |
| 2011/0045523 A1 | 2/2011 | Strano et al. |
| 2011/0047874 A1 | 3/2011 | Lowder |
| 2011/0050216 A1 | 3/2011 | Stone |
| 2011/0055292 A1 | 3/2011 | Madau et al. |
| 2011/0061460 A1 | 3/2011 | Seeger et al. |
| 2011/0067059 A1 | 3/2011 | Johnston et al. |
| 2011/0082599 A1 | 4/2011 | Shinde |
| 2011/0084651 A1 | 4/2011 | Caskey et al. |
| 2011/0118888 A1 | 5/2011 | White, II |
| 2011/0118934 A1 | 5/2011 | Lowrey |

(56) References Cited

U.S. PATENT DOCUMENTS

| | | |
|---|---|---|
| 2011/0121656 A1 | 5/2011 | Hicks et al. |
| 2011/0130163 A1 | 6/2011 | Saban et al. |
| 2011/0148651 A1 | 6/2011 | Hendrickson |
| 2011/0153149 A1 | 6/2011 | Jeon |
| 2011/0156879 A1* | 6/2011 | Matsushita ............ H04L 63/08 340/10.1 |
| 2011/0170377 A1 | 7/2011 | Legaspi |
| 2011/0219873 A1 | 9/2011 | Ohta et al. |
| 2011/0222726 A1 | 9/2011 | Ruan |
| 2011/0251807 A1 | 10/2011 | Rada |
| 2011/0254697 A1 | 10/2011 | Casey et al. |
| 2011/0265572 A1 | 11/2011 | Hoenes |
| 2011/0275544 A1 | 11/2011 | Zhou et al. |
| 2011/0282168 A1 | 11/2011 | Weiss |
| 2011/0298301 A1 | 12/2011 | Wong |
| 2011/0304475 A1 | 12/2011 | Higgins et al. |
| 2011/0307203 A1 | 12/2011 | Higgins et al. |
| 2011/0307221 A1 | 12/2011 | Higgins et al. |
| 2011/0312278 A1* | 12/2011 | Matsushita ............ H04W 4/80 455/66.1 |
| 2012/0016678 A1 | 1/2012 | Gruber et al. |
| 2012/0034904 A1 | 2/2012 | LeBeau |
| 2012/0079149 A1 | 3/2012 | Gelvin |
| 2012/0093132 A1 | 4/2012 | Rofougaran |
| 2012/0112538 A1 | 5/2012 | Kesler et al. |
| 2012/0112970 A1 | 5/2012 | Caballero |
| 2012/0130203 A1 | 5/2012 | Stergiou |
| 2012/0179067 A1 | 7/2012 | Wekell |
| 2012/0190292 A1 | 7/2012 | Skrepcinski |
| 2012/0212341 A1 | 8/2012 | Siber |
| 2012/0228952 A1 | 9/2012 | Hall |
| 2012/0229283 A1 | 9/2012 | Mckenna |
| 2012/0236748 A1 | 9/2012 | Brownrigg |
| 2012/0253480 A1 | 10/2012 | Abe |
| 2012/0265026 A1 | 10/2012 | Shenasa |
| 2012/0268373 A1 | 10/2012 | Grzesiak |
| 2012/0283894 A1 | 11/2012 | Naboulsi |
| 2012/0286969 A1 | 11/2012 | Schechter et al. |
| 2012/0303150 A1 | 11/2012 | Krishnaswamy |
| 2012/0303216 A1 | 11/2012 | Yoshimura et al. |
| 2012/0325197 A1 | 12/2012 | Legaspi |
| 2013/0026947 A1 | 1/2013 | Economy et al. |
| 2013/0048319 A1 | 2/2013 | Glaub |
| 2013/0091254 A1 | 4/2013 | Haddad et al. |
| 2013/0091279 A1 | 4/2013 | Haddad |
| 2013/0101141 A1 | 4/2013 | McElveen |
| 2013/0110565 A1* | 5/2013 | Means, Jr. ............ G06Q 10/06 705/7.11 |
| 2013/0121239 A1 | 5/2013 | Hicks |
| 2013/0139440 A1 | 6/2013 | Wechs |
| 2013/0151200 A1 | 6/2013 | Hui |
| 2013/0211858 A1 | 8/2013 | Ohnemus |
| 2013/0235197 A1 | 9/2013 | Ebrom |
| 2013/0308581 A1 | 11/2013 | Rofougaran |
| 2014/0170275 A1 | 6/2014 | Bordin |
| 2014/0188343 A1 | 7/2014 | Yoshimura et al. |
| 2014/0215491 A1 | 7/2014 | Addepalli |
| 2014/0223230 A1 | 8/2014 | Schechter et al. |
| 2014/0236384 A1 | 8/2014 | Yoshimura et al. |
| 2014/0286348 A1 | 9/2014 | Haddad et al. |
| 2015/0046582 A1 | 2/2015 | Gelvin |
| 2015/0138333 A1 | 5/2015 | DeVaul |
| 2015/0222852 A1 | 8/2015 | Carter |
| 2015/0226439 A1 | 8/2015 | Mikulec |
| 2015/0295788 A1 | 10/2015 | Witzman et al. |
| 2015/0324706 A1 | 11/2015 | Warren |
| 2015/0362954 A1 | 12/2015 | Zohar |
| 2015/0365792 A1 | 12/2015 | Manges |
| 2016/0037295 A1 | 2/2016 | Pereira et al. |
| 2016/0062330 A1 | 3/2016 | Abe |
| 2016/0218884 A1 | 7/2016 | Ebrom |
| 2016/0344745 A1 | 11/2016 | Johnson |
| 2016/0359651 A1 | 12/2016 | Snyder et al. |
| 2017/0082498 A1 | 3/2017 | Schechter et al. |
| 2017/0111158 A1 | 4/2017 | Nagrath |
| 2017/0272316 A1 | 9/2017 | Johnson et al. |
| 2018/0066996 A1 | 3/2018 | Schechter et al. |
| 2018/0137462 A1 | 5/2018 | Zohar |
| 2018/0242859 A1 | 8/2018 | LeBoeuf |
| 2018/0253069 A1 | 9/2018 | Raji |

OTHER PUBLICATIONS

ITU-T G.989.1 entitled: "Phoneline networking transceivers—Foundation", Feb. 2001 (19 pages).

RFC 5389 entitled: "Session Traversal Utilities for NAT (STUN)", Oct. 2008 51 pages).

RFC 4098 entitled: "Terminology for Benchmarking BGP Device Convergence in the Control Plane", Jun. 2005 (37 pages).

RFC 3550 entitled: "RTP: A Transport Protocol for Real-Time Applications", Jul. 2003 (89 pages).

RFC 3315 entitled: "Dynamic Host Configuration Protocol for IPv6 (DHCPv6)", Jul. 2003 (102 pages).

RFC 3261 entitled: "SIP: Session Initiation Protocol", Jun. 2002 (269 pages).

RFC 2460 entitled: "Internet Protocol, Version 6 (IPv6) Specification", Dec. 1998 (40 pages).

RFC 2131 entitled: "Dynamic Host Configuration Protocol", Mar. 1997 (46 pages).

RFC 1349 entitled: "Type of Service In the Internet Protocol Suite", Jul. 1992 (29 pages).

RFC 1034 entitled: "Domain Names—Concepts and Facilities", Nov. 1987 (56 pages).

RFC 1035 entitled: "Domain Names—Implementation and Specification", Nov. 1987 (56 pages).

RFC 791 entitled: "Internet Protocol", Sep. 1981 (52 pages).

ECMA-352 entitled: "Near Field Communication—Interface and Protocol—2 (NFCIP-2)", by ECMA International, 2nd Edition/Jun. 2010 (12 pages).

ECMA-340 entitled: "Near Field Communication—Interface and Protocol (NFCIP-1)", by ECMA International, 2nd Edition/Dec. 2004 (65 pages).

IEEE Std 802.16.4™-2011, "IEEE Standard for Local and metropolitan area networks—Part 15.4: Low-Rate Wireless Personal Area Networks (LR-WPANs)", Approved Jun. 16, 2011 (334 pages).

IEEE Std 802.15.3c™-2009, "IEEE Standard for Information technology—Part 15.3: Wireless Medium Access Control (MAC) and Physical Layer (PHY) Specifications for High Rate Wireless Personal Area Networks (WPANs)", Published by IEEE on Oct. 12, 2009 (203 pages).

"Universal Serial Bus 3.0 Specification", Revision 1.0, Jun. 6, 2011, downloaded from www.usb.org (531 pages).

"RockeIO™ Transceiver User Guide", UG024 (v3.0), Feb. 22, 2007 (156 pages).

Suckow E.H., "Basics of High-Performance SerDes Design: Part I", Fairchild Semiconductor International, downloaded Oct. 2011 (8 pages).

"Hard-Disk Basics" compiled from pcguide.com by Mehedl Hasan, Feb. 12, 2005 (738 pages).

Publication No. 1-587005-001-3 by Cisco Systems, Inc. (Jun. 1999) entitled: "Internetworking Technologies Handbook", Chapter 5: "Routing Basics", pp. 5-1 to 5-10 (10 pages).

Publication No. 1-587005-001-3 by Cisco Systems, Inc. (Jun. 1999) entitled: "Internetworking Technologies Handbook", Chapter 30: "Open System Interconnection Protocols" pp. 30-31 to 30-10 (10 pages).

Publication No. 1-587005-001-3 by Cisco Systems, Inc. (Jun. 1999) entitled: "Internetworking Technologies Handbook", Chapter 32: "IPv6" pp. 32-1 to 32-6 (6 pages).

Publication No. 1-587005-001-3 by Cisco Systems, Inc. (Jun. 1999) entitled: "Internetworking Technologies Handbook", Chapter 45: "Open System Interconnection Routing Protocol", pp. 45-1 to 45-8 (8 pages).

Publication No. 1-587005-001-3 by Cisco Systems, Inc. (Jun. 1999) entitled: "Internetworking Technologies Handbook", Chapter 51: "Security Technologies" pp. 51-1 to 51-12 (12 pages).

(56) References Cited

OTHER PUBLICATIONS

IBM Corporation, International Technical Support Organization Redbook Documents No. SG24-4756-00 entitled: "Local Area Network Concepts and Products: LAN Operation Systems and management", 1st Edition May 1996 (216 pages).
IBM Corporation, International Technical Support Organization Redbook Document No. GG24-4338-00 entitled: "Introduction to Networking Technologies", 1st Edition Apr. 1994 (220 pages).
IBM Corporation, International Technical Support Organization, Redbook Document No. SG24-2580-01 "IP Network Design Guide", 2nd Edition Jun. 1999 (324 pages).
IBM Corporation, International Technical Support Organization, Redbook Document No. GG24-3376-07 "TCP/IP Tutorial and Technical Overview", ISBN 0738494682 8th Edition Dec. 2006 (1004 pages).
A slide-show by W. Steven Conner, Intel Corp et al. entitled: "IEEE 802.11s Tutorial" presented at the IEEE 802 Plenary, Dallas on Nov. 13, 2006 (93 pages).
A slide-show by Eugen Borcoci of University Politehnica Bucharest, entitled: "Wireless Mesh Networks Technologies: Architectures, Protocols, Resource Management and Applications", presented in INFOWARE Conference on Aug. 22-29, 2009 in Cannes, France (212 pages).
An IEEE Communication magazine paper by Joseph D. Camp and Edward W. Knightly of Electrical and Computer Engineering, Rice University, Houston, TX, USA, entitled: "The IEEE 802.11s Extended Service Set Mesh Networking Standard" (6 pages).
"IEEE 802.11g Offers Higher Data Rates and Longer Range" to Jim Zyren et al. by Intersil.
"Home Network with Cloud Computing for Home Management", by Katsuya Suzuki and Masahiro Inoue, IEEE 15th International Symposium on Consumer Electronics, 2011, pp. 421-425 (5 pages).
Publication by Cisco Systems, Inc. (Jun. 1999) entitled: "Internetworking Technologies Overview", Chapter 18: "Multiservice Access Technologies", pp. 18-1 to 18-10 (18 pages).
Publication No. 1-587005-001-3 by Cisco Systems, Inc. (Jun. 1999) entitled: "Internetworking Technologies Handbook", Chapter 19: "Voice / Data Integration Technologies", pp. 19-1 to 19-30 (30 pages).
Home Gateway Initiative (HGI) document entitled: "Home Gateway Technical Requirements: Release 1", Version 1.0, Jul. 1, 2006 (112 pages).
Home Gateway Initiative (HGI) document entitled: "HGI guideline Paper—Remote Access", Version 1.01, May 18, 2008 (19 pages).
HGI document entitled: "Requirements for an energy efficient home gateway" HGI-RD009-R3, Oct. 14, 2010 (66 pages).
The book entitled: "Practical Design Techniques for Sensor Signal Conditioning", by Analog Devices, Inc., 1999 (ISBN-0-916550-20-6) (366 pages).
"AN39—Current measurement application handbook", by Zetex Semiconductors PLC 2008, Issue 5, Jan. 2008 (42 pages).
Data-sheet LIS302DL STMicroelectronics, 'MEMS motion sensor 3-axis-+2g/+8g smart digital output "piccolo" accelerometer', Rev. 4, Oct. 2008 (42 pages).
SignalQuest, Inc., 'Datasheet SQ-SEN-200 Omnidirectional Tilt and Vibration Sensor', Updated Aug. 3, 2009 (6 pages).
The book entitled: "Sensors and Control Systems in manufacturing", Second Edition 2010, by Sabrie Soloman, The McGraw-Hill Companies, ISBN: 978-0-07-160573-1 (625 pages).
The book entitled: "Fundamentals of Industrial Instrumentation and Process Control", by William C. Dunn, 2005, The McGraw-Hill Companies, ISBN: 0-07-145735-6 (337 pages).
The book entitled: "Sensor technology Handbook", Edited by Jon Wilson, by Newnes-Elsevier 2005, ISBN:0-7506-7729-5 (700 pages).
The book entitled: "Development in Speech Synthesis", by Mark Tatham and Katherine Morton, published 2005 by John Wiley & Sons, Ltd., ISBN: 0-470-85538-X (357 pages).
The book entitled: "Speech Synthesis and Recognition" by John Holmes and Wendy Holmes, 2nd Edition, published 2001 ISBN: 0-7484-0856-8, 2001 (371 pages).

Holtek HT3834 CMOS VLSI Integrated Circuit (IC), '36 Melody Music Generator' available from Holtek Semiconductor Inc., Rev. 1.00, Nov. 2, 2006 (16 pages).
A data sheet PF226-04, EPSON 7910 series 'Multi-Melody IC' available from Seiko-Epson Corporation, 1998 (5 pages).
SAE J1962, Surface Vehicle Standard entitled: "Diagnostic Connector Equivalent to ISO/DIS 15031-3:Dec. 14, 2001", Issued: Jun. 1992; Revised: Apr. 2002 (20 pages).
Magnevation SpeakJe, 'Natural Speech & Complex Sound Synthesizer', User's Manual Revision 1.0 Jul. 27, 2004 (17 pages).
Data sheet "NLP-5x Natural Language Processor with Motor, Sensor and Display Control", P/N 80-0317-K, published 2010 by Sensory, Inc. of Santa-Clara, California, U.S.A. (164 pages).
OPTi 820931, 'Plug and Play Integrated Audio Controller', Data Book 912-3000-035 Revision: 2.1, Aug. 1, 1997 (64 pages).
YMF721 OPL4-ML2 FM + Wavetable Synthesizer LSI, available from Yamaha Corporation described in YMF721 Catalog No. LSI-4MF721A20, Jul. 10, 1997 (41 pages).
White Paper "All You Need To Know About Power over Ethernet (PoE) and the IEEE 802.3af Standard", by PowerDsine Ltd., 06-0002-082 May 20, 2004 (24 pages).
IEEE Std. 802.3af-2003, "Part 3: Carrier sense Multiple Access with Collision Detection (CSMA/CD) Access Method and Physical Layer Specifications, Amendment: Data Terminal Equipment (DTE) Power via Media Dependent Interface (MDI)", 2003 (133 pages).
IEEE Std. 802.3at-2009, "Part 3: Carrier sense Multiple Access with Collision Detection (CSMA/CD) Access Method and Physical Layer Specifications, Amendment 3: Data Terminal Equipment (DTE) Power via Media Dependent Interface (MDI) Enhancements", 2009 (141 pages).
Ben-Gurion University Publication entitled: "Chapter 9—Feedforward Control" (pp. 221-240) downloaded from http://www.bgu.ac.il/chem_eng/pages/Courses/oren%20courses/Chapter_9.pdf (20 pages).
"PID Control System Analysis, Design, and Technology" by Kiam Heong Ang, Gregory Chong, and Yun Li, published IEEE Transaction on Control System Technology, vol. 13 No. 4, Jul. 2005 (pp. 559-576) (18 pages).
A data sheet 'True Random Number Generation IC RPG100 / RPG100B' publication No. HM-RAE001-0509, by FDK Corporation, last update Sep. 2005 (4 pages).
The Publication entitled: "Introduction to Fuzzy Control" by Marcelo Godoy Simoes (5 pages).
The publication entitled: "Fuzzy Logic in Embedded Microcomputers and Control Systems" by Walter Banks and Gordon Hayward, published by the Byte Craft Limited, Oct. 2002 (75 pages).
SAE J1939-01 Surface Vehicle Standard entitled: "Recommended Practice for Control and Communication Network for On-Highway Equipment", Issued: Sep. 2000 (7 pages).
SAE J1939 Surface Vehicle Recommended Practice entitled: "Recommended Practice for a Serial Control and Communication Vehicle Network", Issued: Apr. 2000; Revised: Jan. 2005 (257 pages).
The book entitled: "The Image Processing Handbook", Sixth Edition, by John C. Russ, from CRC Press ISBN: 978-1-4398-4063-4, 2011 (858 pages).
The book entitled: "Handbook of Image & Video Processing", edited by Al Bovik, by Academic Press ISBN: 0-12-119790-5, 2000 (974 pages).
The Brown University publication CS-99-11 entitled: "A survey of hand Posture and Gesture Recognition Techniques and Technology", by Joseph J. LaViola Jr., Jun. 1999 (80 pages).
Cisco Validated Design document entitled: "Building Automation System over IP (BAS/IP) Design and Implementation Guide" by Cisco Systems and Johnson Controls, Aug. 15, 2008, v8.1 (107 pages).
The article entitled:"Smart Homes for Older People: Positive Aging in a Digital World", by Quynh Le, Hoang Bol Nguyen and Tony Barnett, published in Future Internet 2012, 4, 607-617; doi: 10.3390/fi4020607 (11 pages).
TP-Link User Guide TL-POE10R, PoE Splitter, Rev. 3.0.0 Document No. 7106503409, (Published 2010) (10 pages).
Publication "Security Guidance for Critical Areas of Focus in Cloud Computing V2.1", Prepared by the Cloud Security Alliance, Dec. 2009 (76 pages).

(56) References Cited

OTHER PUBLICATIONS

Cisco Systems, Inc. Publication No. 1-587005-001-3 (Jun. 1999), "Internetworking Technologies Handbook", Chapter 7: "Ethernet Technologies", pp. 7-1 to 7-38 (38 pages).
The Standard Microsystems Corporation (SMSC) data-sheet "LAN91C111 10/100 Non-PCI Ethernet Single Chip MAC + PHY" Data-Sheet, Rev. 15 (Feb. 20, 2004) (127 pages).
A data sheet 'Physical Random number generator RPG100. RPG100B' Rev. 08 publication No. HM-RAE106-0812, by FDK Corporation (13 pages).
Home Gateway Initiative (HGI) document entitled: "Home Gateway Technical Requirements: Residential Profile", Version 1.0, Apr. 29, 2008 (125 pages).
Paper entitled: "Home Gateway" by Satish Gupta, Wipro Technologies, 2002 (20 pages).
The standard "HID Usage Tables", by the USB Implementers' Forum, Version 1.12 (Oct. 28, 2004) (168 pages).
Publication No. 1-587005-001-3 by Cisco Systems, Inc. (Jun. 1999) entitled: "Internetworking Technologies Handbook", Chapter 20: "Wireless Technologies" pp. 20-21 to 20-42 (42 pages).
The white paper entitled: "WiGig White Paper—Defining the Future of Multi-Gigabit Wireless Communications", published by WiGig Alliance, Jul. 2010 (5 pages).
"WirelessHD Specifications Version 1.1 Overview", published by the WirelessHD consortium, May 2010 (95 pages).
The technical overview entitled: "Enabling Wireless uncompressed HDTV Connectivity with a Unique Video-Modem Approach" by Meir Feder, published by the Amimon Ltd. (10 pages).
The article 'IEEE 802.22: An Introduction to the First Wireless Standard based on Cognitive Radios', by Carios Cordeiro, Kiran Challapali, Dagnachew Birru, and Sai Shankar, published in the Journal of Communication, vol. 1, No. 1, Apr. 2006 (10 pages).
The presentation 'IEEE 802.22 Wireless Regional Area Networks—Enabling Rural Broadband Wireless Access Using Cognitive Radio Technology', by Apruva N. Mody and Gerald Chouinard, Doc. # IEEE 802.22-10/0073r03, Jun. 2010 (16 pages).
The document entitled: 'Dynamic Spectrum Access In IEEE 802.22-Based Cognitive Wireless Networks: A Game Theoretic Model for Competitive Spectrum Bidding and Pricing', by Dusit Niyato, Ekram Hossain and Zhu Han, p. 16-25, published IEEE Wireless Communication Apr. 2009 (8 pages).
ECMA International white paper Ecma/TC32-TG19/2005/012 entitled: "Near Field Communication—White paper" (supersedes 2004/001) (12 pages).
Rohde&Schwarz White Paper 1MA182_4e entitled: "Near Field Communication (NFC) Technology and Measurements White Paper" (26 pages).
The Texas Instrument Application Report No. SLOA101A entitled: "Introduction to the Controller Area Network (CAN)", Aug. 2002—Revised Jul. 2008 (15 pages).
Jan Kremer Consulting Services (JKCS) white paper entitled: "NFC—Near Field Communication— White paper" (44 pages).
RFC 2544 entitled: "Benchmarking Methodology for Network Interconnect Devices", Mar. 1999 (32 pages).
ITU-T Y.1564 entitled: "Ethernet Service Activation Test Methodology", Mar. 2011 (38 pages).
ISO 11992-1 International Standard, "Part 1: Physical layer and data-link layer", Second edition, Apr. 15, 2003 (28 pages).
"LIN Specification Package—Revision 2.2A" by the LIN Consortium, Dec. 31, 2010 (194 pages).
The presentation entitled:"Introduction to On Board Diagnostics (II)" downloaded on Nov. 2012 from: http://groups.engin.umd.umich.edu/vi/w2_workshops/OBD_ganesan_w2.pdf (148 pages).
The Society of Automotive Engineers (SAE) J1962 standard, Jun. 1992 (8 pages).
SAE J1850, Implementing the J1850 Protocol, D. John Oliver, Intel Corporation (15 pages).
SAE J1979, International Surface Vehicle Standard entitled: "E/E Diagnostic Test Modes—Equivalent to ISO/DIS 15031-5:Apr. 30, 2002", Issued: Dec. 1991; Revised: Apr. 2002 (159 pages).
The ISO 15765-1 standard entitled: "Road vehicles—Diagnostics on Controller Area Networks (CAN)—Part 1: General information", First Edition, Mar. 15, 2004 (8 pages).
The ISO 15765-3 standard entitled: "Road vehicles—Diagnostics on Controller Area Networks (CAN)—Part 3: Implementation of unified diagnostic services (UDS on CAN)", First Edition, Oct. 15, 2004 (100 pages).
J1939-11 Surface Vehicle Recommended Practice entitled: "Physical Layer, 250K bits/s, Twisted Shielded Pair", Issued: Dec. 1994; Revised: Oct. 1999 (31 pages).
J1939-15 Surface Vehicle Recommended Practice entitled: "Reduced Physical Layer, 250K bits/s, Un-Shielded Twisted Pair (UTP)", Issued: Nov. 2003 (19 pages).
J1939-21 Surface Vehicle Recommended Practice entitled: "Data Link Layer", Issued: Jul. 1994; Revised: Apr. 2001 (47 pages).
J1939-31 Surface Vehicle Recommended Practice entitled: "Network Layer", Issued: Dec. 1994; Revised: Apr. 2004 (27 pages).
J1939-81 Surface Vehicle Recommended Practice entitled: "Network Management", Issued: Jul. 1997; Revised: May 2003 (39 pages).
J1939-71 Surface Vehicle Recommended Practice entitled: "Vehicle Application Layer (through Dec. 2004)", Issued: Aug. 1994; Revised: Jun. 2006 (686 pages).
J1939-73 Surface Vehicle Recommended Practice entitled: "Application Layer—Diagnostics", Issued: Feb. 1996; Revised: Sep. 2006 (158 pages).
J1939-74 Surface Vehicle Recommended Practice entitled: "Application—Configurable Messaging", Issued: Sep. 2004 (36 pages).
J1939-75 Surface Vehicle Recommended Practice entitled: "Application Layer—Generator Sets and industrial", Issued: Dec. 2002 (37 pages).
"EDBO/OBDII to RS-232 gateway OE90C4000", by Ozen Elekronik (25 pages).
SAE J2411 Surface Vehicle Recommended Practice entitled: "Single Wire CAN Network for Vehicle Applications", Issued: Feb. 2000 (33 pages).
ISO 11898-2, International Standard, "Road vehicles—Controller area network (CAN)—Part 2: High-speed medium access unit", First edition, Dec. 1, 2003 (26 pages).
ISO 11898-4, International Standard, "Road vehicles—Controller area network (CAN)—Part 4: Time-triggered communication", First edition, Aug. 1, 2004 (40 pages).
Publication by Cisco Systems, Inc. (Jun. 1999) entitled: "Internetworking Technologies Overview", Chapter 5: "Routing Basics", pp. 5-1 to 5.8 (8 pages).
Publication by Cisco Systems, Inc. (Jun. 1999) entitled: "Internetworking Technologies Overview", Chapter 30: "Internet Protocols" pp. 30-31 to 30-16 (16 pages).
IEEE Std 802.11a-1999(R2003), "Supplement to IEEE Standard for Information technology—Part 11: Wireless LAN Medium Access Control (MAC) and Physical Layer (PHY) specifications High-speed Physical Layer in the 5 GHz Band", Reaffirmation Jun. 12, 2003 (91 pages).
IEEE Std 802.11b-1999 (R2003), "Supplement to IEEE Standard for Information technology—Part 11: Wireless LAN Medium Access Control (MAC) and Physical Layer (PHY) specifications: Higher-Speed Physical Layer Extension in the 2.4 GHz Band", Approved Sep. 16, 1999, Reaffirmation Jun. 12, 2003 (96 pages).
IEEE Std 802.11g™-2003, "IEEE Standard for Information technology—Part 11: Wireless LAN Medium Access Control (MAC) and Physical Layer (PHY) specifications Amendment 4: Further Higher Data Rate Extension in the 2.4 GHz Band" Published by IEEE on Jun. 27, 2003 (78 pages).
IEEE Std 802.16.3TM-2003, "IEEE Standard for Information technology—Part 15.3: Wireless Medium Access Control (MAC) and Physical Layer (PHY) Specifications for High Rate Wireless Personal Area Networks (WPANs)", Published by IEEE on Sep. 29, 2003 (324 pages).
ITU-T H.323 entitled: "Packet-based multimedia communications systems", Dec. 2009 (320 pages).
ITU-T H.264 entitled: "Advanced video coding for generic audio-visual services", Jan. 2012 (680 pages).

(56) References Cited

OTHER PUBLICATIONS

ITU-T G.9961 entitled: "Unified high-speed wire-line based home networking transceivers—Data link layer specification", Jun. 2010 (220 pages).

* cited by examiner

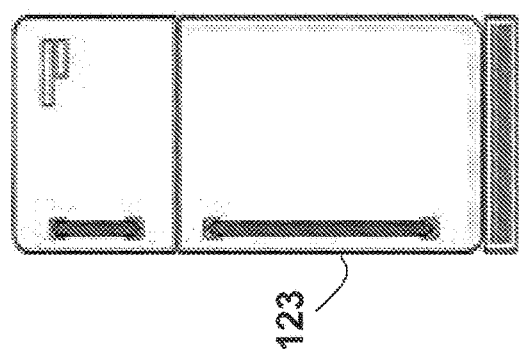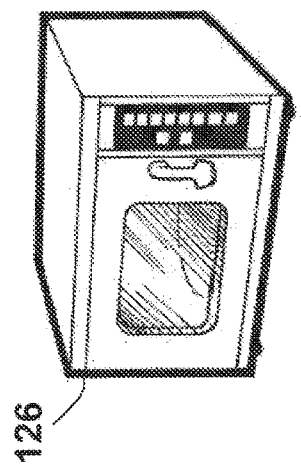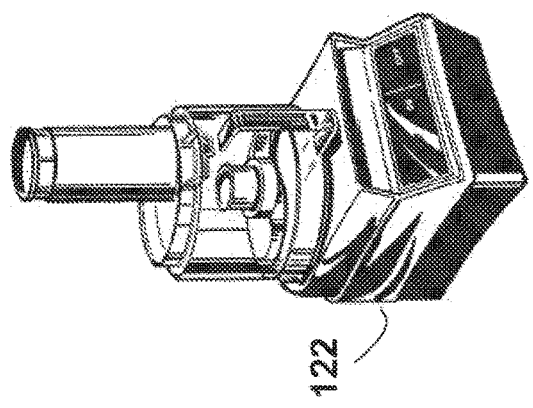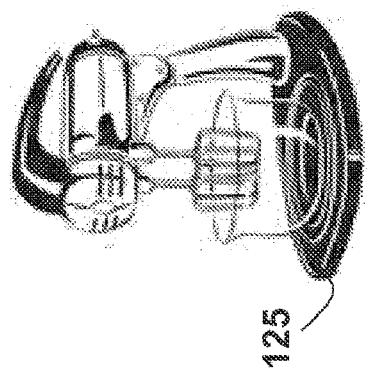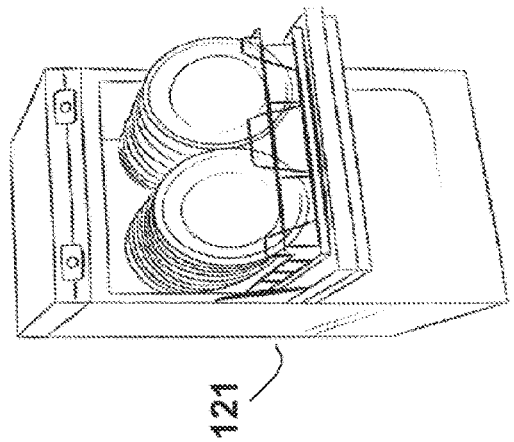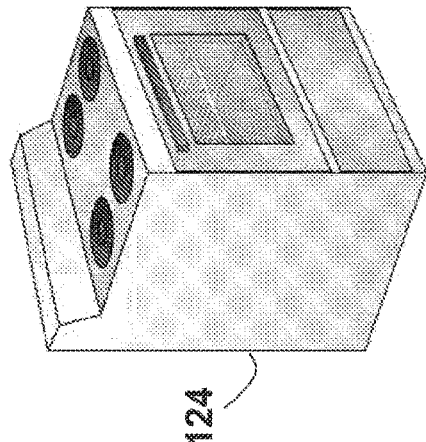
FIG. 12

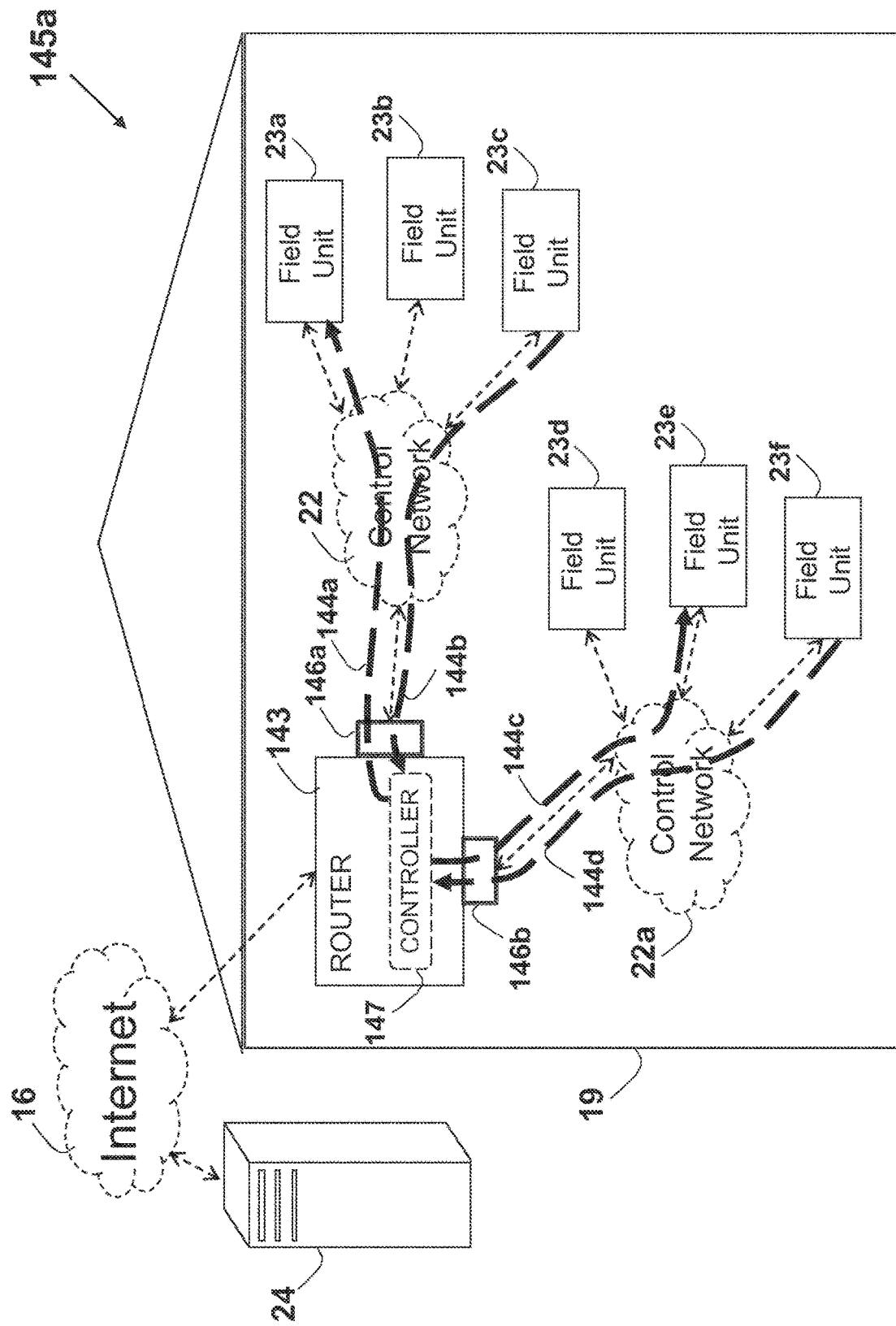

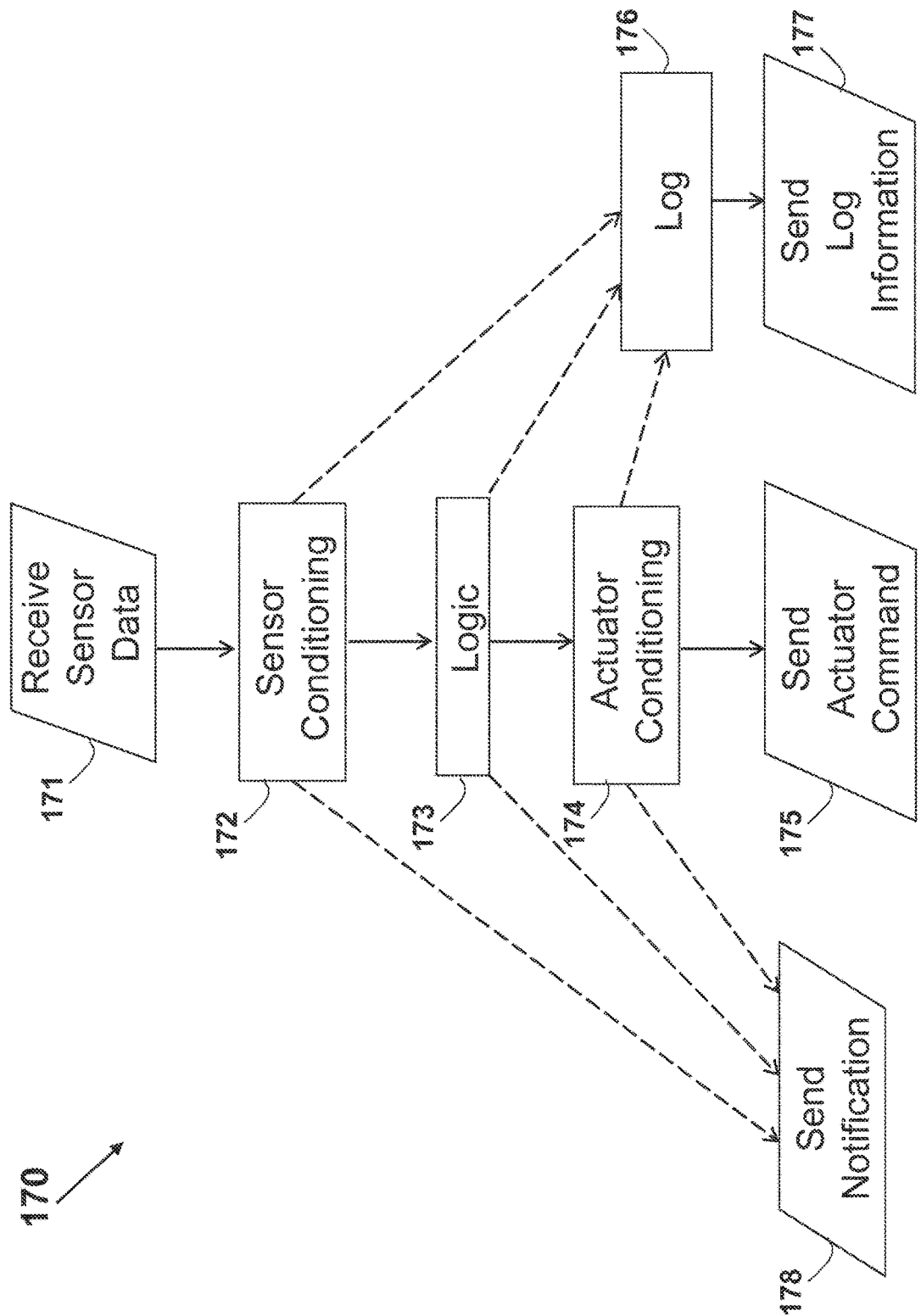

SYSTEM AND METHOD FOR SERVER BASED CONTROL

TECHNICAL FIELD

This disclosure relates generally to an apparatus and method for control such as in a building or in a vehicle using a server implementing gateway or control functionalities.

BACKGROUND

The Internet is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers in the Internet. These data routes are hosted by commercial, government, academic and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

The Internet Protocol (IP) is the principal communications protocol used for relaying datagrams (packets) across a network using the Internet Protocol Suite. Responsible for routing packets across network boundaries, it is the primary protocol that establishes the Internet. IP is the primary protocol in the Internet Layer of the Internet Protocol Suite and has the task of delivering datagrams from the source host to the destination host based on their addresses. For this purpose, IP defines addressing methods and structures for datagram encapsulation. Internet Protocol Version 4 (IPv4) is the dominant protocol of the Internet. IPV4 is described in Internet Engineering Task Force (IETF) Request for Comments (RFC) 791 and RFC 1349, and the successor, Internet Protocol Version 6 (IPv6), is currently active and in growing deployment worldwide. IPv4 uses 32-bit addresses (providing 4 billion: $4.3 \times 10^9$ addresses), while IPv6 uses 128-bit addresses (providing 340 undecillion or $3.4 \times 10^{38}$ addresses), as described in RFC 2460.

The Internet Protocol is responsible for addressing hosts and routing datagrams (packets) from a source host to the destination host across one or more IP networks. For this purpose the Internet Protocol defines an addressing system that has two functions. Addresses identify hosts and provide a logical location service. Each packet is tagged with a header that contains the meta-data for the purpose of delivery. This process of tagging is also called encapsulation. IP is a connectionless protocol for use in a packet-switched Link Layer network, and does not need circuit setup prior to transmission. The aspects of delivery guaranteeing, proper sequencing, avoidance of duplicate delivery, and data integrity are addressed by an upper transport layer protocol (e.g., TCP-Transmission Control Protocol and UDP-User Datagram Protocol).

The main aspects of the IP technology are IP addressing and routing. Addressing refers to how end hosts become assigned IP addresses and how sub-networks of IP host addresses are divided and grouped together. IP routing is performed by all hosts, but most importantly by internetwork routers, which typically use either Interior Gateway Protocols (IGPs) or External Gateway Protocols (EGPs) to help make IP datagram forwarding decisions across IP connected networks. Core routers serving in the Internet backbone commonly use the Border Gateway Protocol (BGP) as per RFC 4098 or Multi-Protocol Label Switching (M PLS). Other prior art publications relating to Internet related protocols and routing include the following chapters of the publication number 1-587005-001-3 by Cisco Systems, Inc. (7/99) entitled: "Internetworking Technologies Handbook", which are all incorporated in their entirety for all purposes as if fully set forth herein: Chapter 5: "Routing Basics" (pages 5-1 to 5-10), Chapter 30: "Internet Protocols" (pages 30-1 to 30-16), Chapter 32: "IPv6" (pages 32-1 to 32-6), Chapter 45: "OSI Routing" (pages 45-1 to 45-8) and Chapter 51: "Security" (pages 51-1 to 51-12), as well as IBM Corporation, International Technical Support Organization Redbook Documents No. GG24-4756-00 entitled: "Local area Network Concepts and Products: LAN Operation Systems and management", 1st Edition May 1996, Redbook Document No. GG24-4338-00 entitled: "Introduction to Networking Technologies", $1^{st}$ Edition April 1994, Redbook Document No. GG24-2580-01 "IP Network Design Guide", $2^{nd}$ Edition June 1999, and Redbook Document No. GG24-3376-07 "TCP/IP Tutorial and Technical Overview", ISBN 0738494682 $8^{th}$ Edition Dec. 2006, which are incorporated in their entirety for all purposes as if fully set forth herein.

A Wireless Mesh Network (WMN) and Wireless Distribution Systems (WDS) are known in the art to be a communication network made up of clients, mesh routers and gateways organized in a mesh topology and connected using radio. Such wireless networks may be based on DSR as the routing protocol. WMNs are standardized in IEEE 802.11s and described in a slide-show by W. Steven Conner, Intel Corp. et al. entitled: "IEEE 802.11s Tutorial" presented at the IEEE 802 Plenary, Dallas on Nov. 13, 2006, in a slide-show by Eugen Borcoci of University Politehnica Bucharest, entitled: "Wireless Mesh Networks Technologies: Architectures, Protocols, Resource Management and Applications", presented in INFOWARE Conference on August 22-$29^{th}$ 2009 in Cannes, France, and in an IEEE Communication magazine paper by Joseph D. Camp and Edward W. K nightly of Electrical and Computer Engineering, Rice University, Houston, TX, USA, entitled: "The IEEE 802.11s Extended Service Set Mesh Networking Standard", which are incorporated in their entirety for all purposes as if fully set forth herein. The arrangement described herein can be equally applied to such wireless networks, wherein two clients exchange information using different paths by using mesh routers as intermediate and relay servers. Commonly in wireless networks, the routing is based on MAC addresses. Hence, the above discussion relating to IP addresses applies in such networks to using the MAC addresses for identifying the client originating the message, the mesh routers (or gateways) serving as the relay servers, and the client serving as the ultimate destination computer.

The Internet architecture employs a client-server model, among other arrangements. The terms 'server' or 'server computer' relates herein to a device or computer (or a plurality of computers) connected to the Internet and is used for providing facilities or services to other computers or other devices (referred to in this context as 'clients') connected to the Internet. A server is commonly a host that has an IP address and executes a 'server program', and typically operates as a socket listener. M any servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' herein refers to a program or to a device or a computer (or a series of computers) executing this program, which accesses a server over the Internet for a service or a resource. Clients commonly initiate connections that a server may accept. For non-limiting example, web browsers are clients that connect to web servers for retrieving web pages, and email clients connect to mail storage servers for retrieving mails.

Software as a Service (SaaS) is a Software Application (SA) supplied by a service provider, namely, a SaaS Vendor. The service is supplied and consumed over the internet, thus eliminating requirements to install and run applications locally on a site of a customer as well as simplifying maintenance and support. Particularly it is advantageous in massive business applications. Licensing is a common form of billing for the service and it is paid periodically. SaaS is becoming ever more common as a form of SA delivery over the Internet and is being facilitated in a technology infrastructure called "Cloud Computing". In this form of SA delivery, where the SA is controlled by a service provider, a customer may experience stability and data security issues. In many cases the customer is a business organization that is using the SaaS for business purposes such as business software, hence, stability and data security are primary requirements.

The term "Cloud computing" as used herein is defined as a technology infrastructure facilitating supplement, consumption and delivery of IT services. The IT services are internet based and may involve elastic provisioning of dynamically scalable and time virtualized resources. The term "Software as a Service (Saas)" as used herein in this application, is defined as a model of software deployment whereby a provider licenses an SA to customers for use as a service on demand. The term "customer" as used herein in this application, is defined as a business entity that is served by an SA, provided on the SaaS platform. A customer may be a person or an organization and may be represented by a user that responsible for the administration of the application in aspects of permissions configuration, user related configuration, and data security policy.

The term "SaaS Platform" as used herein in this application is defined as a computer program that acts as a host to SAs that reside on it. Essentially, a SaaS platform can be considered as a type of specialized SA server. The platform manages underlying computer hardware and software resources and uses these resources to provide hosted SAs with multi-tenancy and on-demand capabilities, commonly found in SaaS applications. Generally, the hosted SA s are compatible with SaaS platform and support a single group of users. The platform holds the responsibility for distributing the SA as a service to multiple groups of users over the internet. The SaaS Platform can be considered as a layer of abstraction above the traditional application server, creating a computing platform that parallels the value offered by the traditional operating system, only in a web-centric fashion. The SaaS platform responds to requirements of software developers. The requirements are to reduce time and difficulty involved in developing highly available SAs, and on-demand enterprise grade business SAs.

ZigBee is a specification for a suite of high level communication protocols using small, low-power digital radios based on an IEEE 802 standard for personal area networks. Applications include wireless light switches, electrical meters with in-home-displays, and other consumer and industrial equipment that require short-range wireless transfer of data at relatively low rates. The technology defined by the ZigBee specification is intended to be simpler and less expensive than other WPANs, such as Bluetooth. ZigBee is targeted at radio-frequency (RF) applications that require a low data rate, long battery life, and secure networking. ZigBee has a defined rate of 250 kbps suited for periodic or intermittent data or a single signal transmission from a sensor or input device.

ZigBee builds upon the physical layer and medium access control defined in IEEE standard 802.15.4 (2003 version) for low-rate WPANs. The specification goes on to complete the standard by adding four main components: network layer, application layer, ZigBee Device Objects (ZDOs) and manufacturer-defined application objects which allow for customization and favor total integration. Besides adding two high-level network layers to the underlying structure, the most significant improvement is the introduction of ZDOs. These are responsible for a number of tasks, which include keeping of device roles, management of requests to join a network, device discovery and security. Because ZigBee nodes can go from sleep to active mode in 30 ms or less, the latency can be low and devices can be responsive, particularly compared to Bluetooth wake-up delays, which are typically around three seconds. ZigBee nodes can sleep most of the time, thus average power consumption can be lower, resulting in longer battery life.

There are three different types of ZigBee devices: ZigBee coordinator (ZC), which are the most capable device, the coordinator forms the root of the network tree and might bridge to other networks. There is exactly one ZigBee coordinator in each network since it is the device that started the network originally. It is able to store information about the network, including acting as the Trust Center & repository for security keys. ZigBee Router (ZR) may be running an application function as well as can acting as an intermediate router, passing on data from other devices. ZigBee End Device (ZED) contains functionality to talk to the parent node (either the coordinator or a router). This relationship allows the node to be asleep a significant amount of the time thereby giving long battery life. A ZED requires the least amount of memory, and therefore can be less expensive to manufacture than a ZR or ZC.

The protocols build on recent algorithmic research (Ad-hoc On-demand Distance Vector, neuR Fon) to automatically construct a low-speed ad-hoc network of nodes. In most large network instances, the network will be a cluster of clusters. It can also form a mesh or a single cluster. The current ZigBee protocols support beacon and non-beacon enabled networks. In non-beacon-enabled networks, an unslotted CSM A/CA channel access mechanism is used. In this type of network, ZigBee Routers typically have their receivers continuously active, requiring a more robust power supply. However, this allows for heterogeneous networks in which some devices receive continuously, while others only transmit when an external stimulus is detected.

In beacon-enabled networks, the special network nodes called ZigBee Routers transmit periodic beacons to confirm their presence to other network nodes. Nodes may sleep between the beacons, thus lowering their duty cycle and extending their battery life. Beacon intervals depend on the data rate; they may range from 15.36 milliseconds to 251.65824 seconds at 250 K bit/s, from 24 milliseconds to 393.216 seconds at 40 K bit/s and from 48 milliseconds to 786.432 seconds at 20 K bit/s. In general, the ZigBee protocols minimize the time the radio is on, so as to reduce power use. In beaconing networks, nodes only need to be active while a beacon is being transmitted. In non-beacon-enabled networks, power consumption is decidedly asymmetrical: some devices are always active, while others spend most of their time sleeping.

Except for the Smart Energy Profile 2.0, current ZigBee devices conform to the IEEE 802.15.4-2003 Low-Rate Wireless Personal Area Network (LR-WPAN) standard. The standard specifies the lower protocol layers—the PHYsical layer (PHY), and the Media Access Control (MAC) portion of the Data Link Layer (DLL). The basic channel access mode is "Carrier Sense, Multiple Access/Collision Avoidance" (CSMA/CA). That is, the nodes talk in the same way that people converse; they briefly check to see that no one is talking before they start. There are three notable exceptions to the use of CSM A. Beacons are sent on a fixed timing schedule, and do not use CSMA. Message acknowledgments also do not use CSM A. Finally, devices in Beacon Oriented networks that have low latency real-time requirements may also use Guaranteed Time Slots (GTS), which by definition do not use CSM A.

Z-Wave is a wireless communications protocol by the Z-Wave Alliance (http://www.z-wave.com) designed for home automation, specifically for remote control applications in residential and light commercial environments. The technology uses a low-power RF radio embedded or retro-fitted into home electronics devices and systems, such as lighting, home access control, entertainment systems and household appliances. Z-Wave communicates using a low-power wireless technology designed specifically for remote control applications. Z-Wave operates in the sub-gigahertz frequency range, around 900 MHz. This band competes with some cordless telephones and other consumer electronics devices, but avoids interference with WiFi and other systems that operate on the crowded 2.4 GHz band. Z-Wave is designed to be easily embedded in consumer electronics products, including battery operated devices such as remote controls, smoke alarms and security sensors.

Z-Wave is a mesh networking technology where each node or device on the network is capable of sending and receiving control commands through walls or floors and use intermediate nodes to route around household obstacles or radio dead spots that might occur in the home. Z-Wave devices can work individually or in groups, and can be programmed into scenes or events that trigger multiple devices, either automatically or via remote control. The Z-wave radio specifications include bandwidth of 9,600 bit/s or 40 Kbit/s, fully interoperable, GFSK modulation, and a range of approximately 100 feet (or 30 meters) assuming "open air" conditions, with reduced range indoors depending on building materials, etc. The Z-Wave radio uses the 900 MHz ISM band: 908.42 MHz (United States); 868.42 MHz (Europe); 919.82 MHz (Hong Kong); 921.42 MHz (Australia/New Zealand).

Z-Wave uses a source-routed mesh network topology and has one or more master controllers that control routing and security. The devices can communicate to another by using intermediate nodes to actively route around and circumvent household obstacles or radio dead spots that might occur. A message from node A to node C can be successfully delivered even if the two nodes are not within range, providing that a third node B can communicate with nodes A and C. If the preferred route is unavailable, the message originator will attempt other routes until a path is found to the "C" node. Therefore a Z-Wave network can span much farther than the radio range of a single unit; however with several of these hops a delay may be introduced between the control command and the desired result. In order for Z-Wave units to be able to route unsolicited messages, they cannot be in sleep mode. Therefore, most battery-operated devices are not designed as repeater units. A Z-Wave network can consist of up to 232 devices with the option of bridging networks if more devices are required.

Most existing offices and some of the newly built buildings facilitate the network structure based on dedicated wiring. However, implementing such a network in existing buildings typically requires installation of new wiring infrastructure. Such installation of new wiring may be impractical, expensive and problematic. As a result, many technologies (referred to as "no new wires" technologies) have been proposed in order to facilitate a LAN in a building without adding new wiring. Some of these techniques use existing utility wiring installed primarily for other purposes such as telephone, electricity, cable television (CATV), and so forth. Such approach offers the advantage of being able to install such systems and networks without the additional and often substantial cost of installing separate wiring within the building.

The technical aspect for allowing the wiring to carry both the service (such as telephony, electricity and CATV) and the data communication signals commonly involves using an FDM technique (Frequency Division Multiplexing). In such configuration, the service signal and the data communication signals are carried across the respective utility wiring each using a distinct frequency spectrum band. The concept of FDM is known in the art, and provides means of splitting the bandwidth carried by a medium such as wiring. In the case of a telephone wiring carrying both telephony and data communication signals, the frequency spectrum is split into a low-frequency band capable of carrying an analog telephony signal and a high-frequency band capable of carrying data communication or other signals.

A network in a house based on using powerline-based home network is also known in the art. The medium for networking is the in-house power lines, which is used for carrying both the A C power (mains) power and the data communication signals. A PLC (Power Line Carrier) modem converts a data communication signal (such as Ethernet IEEE802.3) to a signal which can be carried over the power lines, without affecting and being affected by the power signal available over those wires. A consortium named HomePlug (www.homeplug.org) is active in standardizing powerline technologies. A powerline communication system is described in U.S. Pat. No. 6,243,571 to Bullock et al., which also provides a comprehensive list of prior art publications referring to powerline technology and applications. A non-limiting example for such PLC modem housed as a snap-on module is HomePlug1.0 based Ethernet-to-Powerline Bridge model DHP-100 from D-Link® Systems, Inc. of Irvine, California, USA. Outlets with built in PLC modems for use with combined data and power using powerlines are described in U.S. Patent Application Publication 2003/0062990 to Schaeffer et al. entitled 'Powerline Bridge Apparatus'. Such power outlets are available as part of PlugLAN™ by Asoka USA Corporation of San Carlos, CA, USA.

Similarly, carrying data over existing in home CATV coaxial cabling is also known in the art, for example in U.S.

Patent Application Publication No. 2002/0166124 to Gurantz et al. A non-limiting example of home networking over CATV coaxial cables using outlets is described in U.S. Patent Application Publication No. 2002/0194383 to Cohen et al. Such outlets are available as part of HomeRAN™ system from TMT Ltd. of Jerusalem, Israel.

The term "telephony" herein denotes in general any kind of telephone service, including analog and digital service, such as Integrated Services Digital Network (ISDN). Analog telephony, popularly known as "Plain Old Telephone Service" ("POTS") has been in existence for over 100 years, and is suited for the transmission and switching of voice signals in the 300-3400 Hz portion (or "voice band" or "telephone band") of the audio spectrum. The familiar POTS network supports real-time, low-latency, high-reliability, moderate-fidelity voice telephony, and is capable of establishing a session between two end-points, each using an analog telephone set.

The terms "telephone", "telephone set", and "telephone device" herein denote any apparatus, without limitation, which can connect to a Public Switch Telephone Network ("PSTN"), including apparatus for both analog and digital telephony, non-limiting examples of which are analog telephones, digital telephones, facsimile ("fax") machines, automatic telephone answering machines, voice modems, and data modems. In-home telephone service usually employs two or four wires, to which telephone sets are connected via telephone outlets.

Similarly to the powerlines and CATV cabling described above, it is often desirable to use existing telephone wiring simultaneously for both telephony and data networking. In this way, establishing a new local area network in a home or other building is simplified, because there is no need to install additional wiring. Using FDM technique to carry video over active residential telephone wiring is disclosed by U.S. Pat. No. 5,010,399 to Goodman et al. entitled: "Video Transmission and Control System Utilizing Internal Telephone Lines", and U.S. Pat. No. 5,621,455 to Rogers et al. entitled: "Video Modem for Transmitting Video Data over Ordinary Telephone Wires", which are both incorporated in their entirety for all purposes as if fully set forth herein.

Existing products for carrying data digitally over residential telephone wiring concurrently with active telephone service by using FDM commonly uses a technology known as HomePNA (Home Phoneline Networking Alliance) (www.homepna.org). This phoneline interface has been standardized as ITU-T (ITU Telecommunication Standardization Sector) recommendation G.989.1. The HomePNA technology is described in U.S. Pat. No. 6,069,899 to Foley, U.S. Pat. No. 5,896,443 to Dichter, U.S. Patent Application No. 2002/0019966 to Y agil et al., U.S. Patent Application Publication No. 2003/0139151 to Lifshitz et al., and others. The available bandwidth over the wiring is split into a low-frequency band capable of carrying an analog telephony signal (POTS), and a high-frequency band is allocated for carrying data communication signals. In such FDM based configuration, telephony is not affected, while a data communication capability is provided over existing telephone wiring within a home.

Prior art technologies for using the in-place telephone wiring for data networking are based on single carrier modulation techniques, such as AM (Amplitude Modulation), FM (Frequency Modulation) and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, and in particular in WLAN networks. As explained in the document entitled "IEEE 802.11g Offers Higher Data Rates and Longer Range" to Jim Zyren et al. by Intersil which is hereby incorporated by reference, multi-carrier modulation (such as OFDM) is employed in such systems in order to overcome the signal impairment due to multipath.

A popular approach to home networking (as well as office and enterprise environments) is communication via radio frequency (RF) distribution system that transports RF signals throughout a building to and from data devices. Commonly referred to as Wireless Local Area Network (WLAN), such communication makes use of the Industrial, Scientific and Medical (ISM) frequency spectrum. In the US, three of the bands within the ISM spectrum are the A band, 902-928 MHz; the B band, 2.4-2.484 GHz (a.k.a. 2.4 GHz); and the C band, 5.725-5.875 GHz (a.k.a. 5 GHZ). Overlapping and/or similar bands are used in different regions such as Europe and Japan.

In order to allow interoperability between equipment manufactured by different vendors, few WLAN standards have evolved, as part of the IEEE 802.11 standard group, branded as WiFi (www.wi-fi.org). IEEE 802.11b describes a communication using the 2.4 GHz frequency band and supporting communication rate of 11 Mb/s, IEEE 802.11a uses the 5 GHz frequency band to carry 54M B/s and IEEE 802.11g uses the 2.4 GHz band to support 54M b/s.

A node/client with a WLAN interface is commonly referred to as STA (Wireless Station/Wireless client). The STA functionality may be embedded as part of the data unit, or alternatively be a dedicated unit, referred to as bridge, coupled to the data unit. While ST As may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit.

Bandwidth allocation for IEEE 802.11g wireless in the U.S. allows multiple communication sessions to take place simultaneously, where eleven overlapping channels are defined spaced 5MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22MHz, symmetrically (+/−11 MHz) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF) and placed in the center frequency of required channel, and transmitted to the air via the antenna. Similarly, the receiving path comprises a received channel in the RF spectrum, down converted to the baseband (IF) wherein the data is then extracted.

FIG. 1 shows an arrangement 10 according to the prior art including a residence 19 which may be connected via the Internet 16 to many multiple servers, such as a server 17. In the premises 19 there may be multiple internal networks, such as home network 14a connecting the desktop computer 18a and a home device 15a, and other connected equipment may as well be connected. Similarly, home network 14b is shown connecting desktop computer 18b and a home device 15b, and other connected equipment may as well be connected. A sensor network 12 may further be used, connecting sensor units 13a, 13b and 13c The sensor network 12 may be based on ZigBee protocol or another public or proprietary commercially accepted protocol, or any suitable protocol now known or becoming known to those skilled in the art in the present context. A gateway 11 is connected, via suitable ports, to the various networks in the residence 19, and allows communication between devices in a specific network, between networks in the residence 19, and further provides external connection to the Internet 16, typically via a WAN network. While three internal networks 12, 14a and 14b are shown in arrangement 10, one, two, four, or any number of such internal networks may be equally deployed. Further, the various networks inside the premises 19 may be the same, similar or different. For example, the same or different network mediums may be used, such as wired or wireless networks, and the same or different network protocols may be used. Further, each of the networks may be a LAN (Local Area Network), WLAN (Wireless LAN), PAN (Personal Area Network), or WPAN (Wireless PAN). The gateway 11 is typically a dedicated hardware and software integrated device, and is based on a firmware and a processor. A prior-art architecture involving moving limited management functions of a home gateway onto network cloud is described in the paper entitled: "Home Network with Cloud Computing for Home Management", by Katsuya Suzuki and Masahiro Inoue, IEEE 15$^{th}$ International Symposium on Consumer Electronics, 2011, pages 421-425, which is incorporated in its entirety for all purposes as if fully set forth herein. The gateway 11 is known in the art and is sometimes referred to as Residential Gateway (RG) or Home Gateway, and serves to connect devices in the home (commonly via a home network) to the Internet or other WAN. Such RG may include a broadband modem (such as DSL or cable modem), a firewall, a router, a packet-switch, and a Wireless Access Point (WAP). The RG is typically manageable and support auto-configuration, and may support various type services, as well as Quality-of-Service (QOS). All the interconnections described herein may be achieved by direct connection of components or by indirect coupling through a suitable connector, interface or other hardware and/or software components enabling the exchange of signals between the coupled components.

There is a growing widespread use of the Internet for carrying multimedia, such as video and audio. Various audio services include Internet-radio stations and VoIP (Voice-over-IP). Video services over the Internet include video conferencing and IPTV (IP Television). In most cases, the multimedia service is a real-time (or near real-time) application, and thus sensitive to delays over the Internet. In particular, two-way services such a VoIP or other telephony services and video-conferencing are delay sensitive. In some cases, the delays induced by the encryption process, as well as the hardware/software costs associated with the encryption, render encryption as non-practical. Therefore, it is not easy to secure enough capacity of the Internet accessible by users to endure real-time communication applications such as Internet games, chatting, VoIP, MoIP (Multimedia-over-IP), etc. In this case, there may be a data loss, delay or severe jitter in the course of communication due to the property of an Internet protocol, thereby causing inappropriate real-time video communication. The following chapters of the publication number 1-587005-001-3 by Cisco Systems, Inc. (7/99) entitled: "Internetworking Technologies Handbook", relate to multimedia carried over the Internet, and are all incorporated in their entirety for all purposes as if fully set forth herein: Chapter 18: "Multiservice Access Technologies" (pages 18-1 to 18-10), and Chapter 19: "Voice/Data Integration Technologies" (pages 19-1 to 19-30).

VoIP systems in widespread use today fall into three groups: systems using the ITU-T H.323 protocol, systems using the SIP protocol, and systems that use proprietary protocols. H.323 is a standard for teleconferencing that was developed by the International Telecommunications Union (ITU). It supports full multimedia audio, video and data transmission between groups of two or more participants, and it is designed to support large networks. H.323 is network-independent: it can be used over networks using transport protocols other than TCP/IP. H.323 is still a very important protocol, but it has fallen out of use for consumer VoIP products due to the fact that it is difficult to make it work through firewalls that are designed to protect computers running many different applications. It is a system best suited to large organizations that possess the technical skills to overcome these problems.

SIP (for Session Initiation Protocol) is an Internet Engineering Task Force (IETF) standard signaling protocol for teleconferencing, telephony, presence and event notification and instant messaging. It provides a mechanism for setting up and managing connections, but not for transporting the audio or video data. It is probably now the most widely used protocol for managing Internet telephony. Like the IETF protocols, SIP is defined in a number of RFCs, principally RFC 3261. A SIP-based VoIP implementation may send the encoded voice data over the network in a number of ways. Most implementations use Real-time Transport Protocol (RTP), which is defined in RFC 3550. Both SIP and RTP are implemented on UDP, which, as a connectionless protocol, can cause difficulties with certain types of routers and firewalls. Usable SIP phones therefore also need to use STUN (for Simple Traversal of UDP over NAT), a protocol defined in RFC 3489 that allows a client behind a NAT router to find out its external IP address and the type of NAT device.

The connection of peripherals and memories to a processor may be via a bus. A communication link (such as Ethernet, or any other LAN, PAN or WAN communication link) may also be regarded as bus herein. A bus may be an internal bus (a.k.a. local bus), primarily designed to connect a processor or CPU to peripherals inside a computer system enclosure, such as connecting components over the motherboard or backplane. Alternatively, a bus may be an external bus, primarily intended for connecting the processor or the motherboard to devices and peripherals external to the computer system enclosure. Some buses may be doubly used as internal or as external buses. A bus may be of parallel type, where each word (address or data) is carried in parallel over multiple electrical conductors or wires; or alternatively, may be bit-serial, where bits are carried sequentially, such as one bit at a time. A bus may support multiple serial links or lanes, aggregated or bonded for higher bit-rate transport. Non-limiting examples of internal parallel buses include ISA (Industry Standard architecture); EISA (Extended ISA); NuBus (IEEE 1196); PATA-Parallel ATA (Advanced Technology Attachment) variants such as IDE, EIDE, ATAPI, SBus (IEEE 1496), VESA Local Bus (VLB), PCI and PC/104 variants (PC/104, PC/104 Plus, and PC/104 Express). Non-limiting examples of internal serial buses include PCIe (PCI Express), Serial ATA (SATA), SM Bus, and Serial Peripheral Bus (SPI) bus. Non-limiting examples of external parallel buses include HIPPI (High Performance Parallel Interface), IEEE-1284 ('Centronix'), IEEE-488 (a.k.a. GPIB—General Purpose Interface Bus) and PC Card/PCM CIA. Non-limiting examples of external serial buses include USB (Universal Serial Bus), eSATA and IEEE 1394 (a.k.a. Firewire). Non-limiting examples of buses that can be internal or external are Futurebus, InfiniBand, SCSI (Small Computer System Interface), and SAS (Serial Attached SCSI). The bus medium may be based on electrical conductors, commonly copper wires based cable (may be arranged as twisted-pairs) or a fiber-optic cable. The bus topology may use point-to-point, multi-drop (electrical parallel) and daisy-chain, and may further be based on hubs or switches. A point-to-point bus may be full-duplex, providing simultaneous, two-way transmission (and sometimes independent) in both directions, or alternatively a bus may be half-duplex, where the transmission can be in either direction, but only in one direction at a time. Buses are further commonly characterized by their throughput (data bit-rate), signaling rate, medium length, connectors and medium types, latency, scalability, quality-of-service, devices per connection or channel, and supported bus-width. A configuration of a bus for a specific environment may be automatic (hardware or software based, or both), or may involve user or installer activities such as software settings or jumpers. Recent buses are self-repairable, where spare connection (net) is provided which is used in the event of malfunction in a connection. Some buses support hot-plugging (sometimes known as hot swapping), where a connection or a replacement can be made, without significant interruption to the system or without the need to shut-off any power. A well-known example of this functionality is the Universal Serial Bus (USB) that allows users to add or remove peripheral components such as a mouse, keyboard, or printer. A bus may be defined to carry a power signal, either in separate dedicated cable (using separate and dedicated connectors), or commonly over the same cable carrying the digital data (using the same connector). Typically dedicated wires in the cable are used for carrying a low-level DC power level, such as 3.3V DC, 5V DC, 12V DC and any combination thereof. A bus may support master/slave configuration, where one connected node is typically a bus master (e.g., the processor or the processor-side), and other nodes (or node) are bussed slaves. A slave may not connect or transmit to the bus until given permission by the bus master. A bus timing, strobing, synchronization, or clocking information may be carried as a separate signal (e.g., clock signal) over a dedicated channel, such as separate and dedicated wired in a cable, or alternatively may use embedded clocking (a.k.a. self-clocking), where the timing information is encoded with the data signal, commonly used in line codes such as Manchester code, where the clock information occurs at the transition points. Any bus or connection herein may use proprietary specifications, or preferably be similar to, based on, substantially according to, or fully compliant with, an industry standard (or any variant thereof) such as those referred to as PCI Express, SAS, SATA, SCSI, PATA, InfiniBand, USB, PCI, PCI-X, AGP, Thunderbolt, IEEE 1394, FireWire and Fibre Channel.

In consideration of the foregoing, it would be an advancement in the art to provide an improved networking or gateway functionality method and system that is simple, secure, cost-effective, reliable, easy to use or sanitize, has a minimum part count, minimum hardware, and/or uses existing and available components, protocols, programs and applications for providing better security and additional functionalities, and provides a better user experience.

SUMMARY

Environment control networks are networks of sensors and controller which provide an optimized solution for an environment control. The environment can be a house, agricultural farm, city traffic systems etc. The sensors will provide information on the environmental conditions and events. The controller will allow automatic control or control by the user via the Internet. Presently, a dedicated hardware gateway is required to control the wireless network in each environment. The disclosure describes how the dedicated gateway can be replaced by a cloud server, offering much better cost, reliability and level of service.

Any communication or connection herein, such as the connection of peripherals in general, and memories in particular to a processor, may use a bus. A communication link (such as Ethernet, or any other LAN, PAN or WAN communication links may also be regarded as buses herein. A bus may be an internal bus, an external bus or both. A bus may be a parallel or a bit-serial bus. A bus may be based on a single or on multiple serial links or lanes. The bus medium may electrical conductors based such as wires or cables, or may be based on a fiber-optic cable. The bus topology may use point-to-point, multi-drop (electrical parallel) and daisy-chain, and may be based on hubs or switches. A point-to-point bus may be full-duplex, or half-duplex. Further, a bus may use proprietary specifications, or may be based on, similar to, substantially or fully compliant to an industry standard (or any variant thereof), and may be hot-pluggable. A bus may be defined to carry only digital data signals, or may also defined to carry a power signal (commonly DC voltages), either in separated and dedicated cables and connectors, or may carry the power and digital data together over the same cable. A bus may support master/slave configuration. A bus may carry a separated and dedicated timing signal or may use self-clocking line-code.

A sensor unit may include one or more sensors, each providing an electrical output signal (such as voltage or current), or changing a characteristic (such as resistance or impedance) in response to a measured or detected phenomenon. The sensors may be identical, similar or different from each other, and may measure or detect the same or different phenomena. Two or more sensors may be connected in series or in parallel. In the case of a changing characteristic sensor or in the case of an active sensor, the unit may include an excitation or measuring circuits (such as a bridge) to generate the sensor electrical signal. The sensor output signal may be conditioned by a signal conditioning circuit. The signal conditioner may involve time, frequency, or magnitude related manipulations. The signal conditioner may be linear or non-linear, and may include an operation or an instrument amplifier, a multiplexer, a frequency converter, a frequency-to-voltage converter, a voltage-to-frequency converter, a current-to-voltage converter, a current loop converter, a charge converter, an attenuator, a sample-and-hold circuit, a peak-detector, a voltage or current limiter, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. In the case of analog sensor, an analog to digital (A/D) converter may be used to convert the conditioned sensor output signal to a digital sensor data. The unit may include a computer for controlling and managing the unit operation, processing the digital sensor data and handling the unit communication. The unit may include a modem or transceiver coupled to a network port (such as a connector or antenna), for interfacing and communicating over a network.

The sensor may be a CCD or CM OS based image sensor, for capturing still or video images. The image capturing hardware integrated with the unit may contain a photographic lens (through a lens opening) focusing the required image onto an image sensor. The image may be converted into a digital format by an image sensor AFE (Analog Front End) and an image processor. An image or video compressor for compression of the image information may be used for reducing the memory size and reducing the data rate required for the transmission over the communication medium. Similarly, the sensor may be a voice sensor such as a microphone, and may similarly include a voice processor or a voice compressor (or both). The image or voice compression may be standard or proprietary, may be based on intraframe or interframe compression, and may be lossy or non-lossy compression.

An actuator unit may include one or more actuators, each affecting or generating a physical phenomenon in response to an electrical command, which can be an electrical signal (such as voltage or current), or by changing a characteristic (such as resistance or impedance) of a device. The actuators may be identical, similar or different from each other, and may affect or generate the same or different phenomena. Two or more actuators may be connected in series or in parallel. The actuator command signal may be conditioned by a signal conditioning circuit. The signal conditioner may involve time, frequency, or magnitude related manipulations. The signal conditioner may be linear or non-linear, and may include an amplifier, a voltage or current limiter, an attenuator, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. In the case of analog actuator, a digital to analog (D/A) converter may be used to convert the digital command data to analog signals for controlling the actuators. The unit may include a computer for controlling and managing the unit operation, processing the actuators commands and handling the unit communication. The unit may include a modem or transceiver coupled to a communication port (such as a connector or antenna), for interfacing and communicating over a network.

A sensor/actuator unit is a device integrating a part or whole of a sensor unit with part or whole of an actuator unit. For a non-limiting example, such hardware integration may relate to housing in the same enclosure, sharing the same connector (power, communication or any other connector), sharing the same power source or power supply, sharing PCB or other mechanical support, sharing the same processor or computer, sharing the same modem or transceiver, or sharing the same communication port. A sensor actuator unit may include one or more sensors, each with its associated signal conditioner and A/D (if required), and one or more actuators, each with its associated signal conditioner and D/A, if required. A sensor unit, an actuator unit, and a sensor/actuator unit are collectively referred to as 'field units'.

A field unit may be powered in part or in whole from AC or DC power source. A local powering scheme may be used, where the power source may be integrated with field unit, such as within the same enclosure, or a remote powering scheme may be used, where the power source may be external to the field unit enclosure, and connected via a power connector in the field unit. The power source may power feed a power supply, which supplies the DC (and/or AC) voltages required by the field units sensors. A sensor may be power fed from the same power source or power supply powering the field unit circuits, or may use a dedicated power source or power supply, which may be internal or external to the field unit enclosure. An actuator may be power fed from the same power source or power supply powering the field unit circuits, or may use a dedicated power source or power supply, which may be internal or external to the field unit enclosure. The same element may serve as both a power source and as a sensor, such as solar cell, a Peltier-effect based device, and motion-based generators.

The power source may be a primary or rechargeable battery, and the field unit may include a battery compartment for holding the battery, and a connector for connecting to a battery charger. Alternatively or in addition, the power source may be based internal electrical power generator, such as a solar or photovoltaic cell, or may use an electromechanical generator (e.g., a dynamo or an alternator) harvesting kinetic energy, such as from the field unit motion. The power source may be the mains AC power, and the power supply may include AC/DC converter. The same element may double as a sensor and as a power source. For example, a solar or photovoltaic cell may be used as a light sensor, simultaneously with serving as a power source, and an electromechanical generator, for example based on harvesting mechanical vibrations energy, may at the same time be used to measure the mechanical vibrations (e.g., frequency or magnitude).

A field unit may be remotely powered, in part or in whole, from a power source via a cable simultaneously carrying another signal. For example, the same cable may carry digital data used for communication (e.g., with a router, a gateway, or another field unit), and the same connector may be used for digital data communication and for receiving power from a power source. The powering via a connection (such as a connector) may use a dedicated cable, where the cable may have power-dedicated wires or conductors, or by using power and data carried over the same wires such as by using FDM or phantom scheme. In the case of using FDM, the field unit may include circuits for splitting the power signal and the data signal, and may include filters, transformers or a center-tap transformer. A field unit (or any part thereof) may be used to supply power from a power source to a device connected to it, such as a sensor, an actuator, a router, a gateway or another field unit. Such powering may be via a connection that use a dedicated cable, or by using the same cable and having power-dedicated wires or conductors, or by using power and data carried over the same wires such as by using FDM or phantom scheme. A powering scheme may be based on the PoE standard.

A field unit (sensor, actuator, or sensor/actuator unit) may be integrated, partially or in whole, with the router or gateway. A router, a gateway, a sensor, an actuator, or a field unit may be integrated, in whole or in part, in an electrically powered home, commercial, or industrial appliance. The home appliance may be major or small appliance, and its main function may be food storage or preparation, cleaning (such as clothes cleaning), or temperature control (environmental, food or water) such as heating or cooling. Examples of appliances are water heaters, HVAC systems, air conditioner, heaters, washing machines, clothes dryers, vacuum cleaner, microwave oven, electric mixers, stoves, ovens, refrigerators, freezers, food processors, dishwashers, food blenders, beverage makers such as coffeemakers and iced-tea makers, answering machines, telephone sets, home cinema systems, HiFi systems, CD and DVD players, induction cookers, electric furnaces, trash compactors, and dehumidifiers. The field unit may consist of, or be integrated with, a battery-operated portable electronic device such as a notebook/laptop computer, a media player (e.g., MP3 based or video player), a cellular phone, a Personal Digital Assistant (PDA), an image processing device (e.g., a digital camera or a video recorder), and/or any other handheld computing devices, or a combination of any of these devices. Alternatively or in addition, a router, a gateway, a sensor, an actuator, or a field unit may be integrated, in whole or in part, in furniture or clothes.

In one example, a sensor, an actuator, one or more field units, or the router may be integrated with, or may be part of, an outlet or a plug-in module. The outlet may be telephone, LAN (such as Structured Wiring based on Category 5, 6 or 7 wiring), AC power or CATV outlet. The field unit or the router may communicate over the in-wall wiring connected to the outlet, such as telephone, A C power, LAN or CATV wiring. The outlet associated sensor, actuator, one or more field units, or router may be powered from a power signal carried over the in-wall wiring, and may communicate using the in-wall wiring as a network medium.

The router (or gateway) may include a communication port and a modem (or transceiver) for connecting to the control server via the Internet. The router may include one or more communication ports, each associated with a modem (or transceiver), for communicating with field units in the building (or vehicle). A routing core may be connected to all modems (or transceivers) for routing the digital data therebetween.

In one aspect, a control server may be used as part of system implementing a control loop. The system may include one or multiple field units in a building or in a vehicle. One or more networks in the building (or vehicle) may be used for the communication between two or more field units, and for allowing the field units to communicate with a router (which may include some, or whole of, gateway functionalities) in the building (or vehicle). Each of the networks may be a wireless or wired network, and may be a control network, a home network, a PAN, a WPAN, a LAN, a WLAN, or a WAN. The router (or gateway) may communicate with a data units (such as PC) over a network in the building (or vehicle). The router (or the gateway) may serve as an intermediary device in a control loop, and may communicate with the control server over the Internet via an ISP using a network which may be wireless or wired network, which may be a PAN, a WPAN, a LAN, a WLAN, a WAN, or a cellular network.

The system may implement a control loop, which may be arranged to control one or more physical phenomena, such as regulating the phenomena to or at a setpoint (target value) or any other reference value. One or more field units may transmit sensor (or sensors) data to a controller via one or more networks. The controller functionality may receive the sensors data, may condition or process the received sensors data, and according to a control logic determines the actuator (or actuators) commands. The actuators commands may be sent via one or more networks to the target actuators in the field units. The setpoint may be fixed, set by a user, or may be time dependent. The setpoint may be dependent upon an additional sensor that is responsive to another phenomenon distinct from the controlled phenomenon, and the additional sensor is part of, or is coupled to, the system.

The controller may implement open loop (such as feed-forward control). Alternatively or in addition, a closed loop may be implemented, which may be based on proportional-only, PI, Bistable, hysteretic, PID, bang-bang, or fuzzy control based on fuzzy logic. The controller may use sequential control, may be a PLC, or may include PLC functionalities. The controller functionalities may be implemented, in part or in full, in the control server, in the router, in a computer in the building (or vehicle), or divided in any combination thereof.

The system operation or the control logic may involve randomness, and may be based on a random number generated by a random number generator. The random number generator may be based on a physical process (such as thermal noise, shot noise, nuclear decaying radiation, photoelectric effect or other quantum phenomena), or on an algorithm for generating pseudo-random numbers, and may be integrated (in part or entirely) as part of one or more of the field units, the router or gateway, or in the control server.

In one aspect, one of the sensors is an image sensor, for capturing an image (still or video). The controller responds to characteristics or events extracted by image processing of the captured image or video. For example, the image processing may be face detection, face recognition, gesture recognition, compression or de-compression, or motion sensing. The image processing functionality may be in the field unit, in the router (or gateway), in the control server, in a computer in the building (or vehicle), or any combination thereof. In another aspect, one of the sensors may be a microphone for capturing a human voice. The controller responds to characteristics or events extracted by voice processing of the captured audio. The voice processing functionality may include compression or de-compression, and may be in the field unit, in the router (or gateway), in the control server, in a computer in the building (or vehicle), or any combination thereof.

Any element capable of measuring or responding to a physical phenomenon may be used as a sensor. An appropriate sensor may be adapted for a specific physical phenomenon, such as a sensor responsive to temperature, humidity, pressure, audio, vibration, light, motion, sound, proximity, flow rate, electrical voltage, and electrical current.

A sensor may be an analog sensor having an analog signal output such as analog voltage or current, or may have continuously variable impedance. Alternatively on in addition, a sensor may have a digital signal output. A sensor may serve as a detector, notifying only the presence of a phenomenon, such as by a switch, and may use a fixed or settable threshold level. A sensor may measure time-dependent or space-dependent parameters of a phenomenon. A sensor may measure time-dependencies or a phenomenon such as the rate of change, time-integrated or time-average, duty-cycle, frequency or time period between events. A sensor may be a passive sensor, or an active sensor requiring an external source of excitation. The sensor may be semi-conductor-based, and may be based on MEM S technology.

A sensor may measure the amount of a property or of a physical quantity or the magnitude relating to a physical phenomenon, body or substance. Alternatively or in addition, a sensor may be used to measure the time derivative thereof, such as the rate of change of the amount, the quantity or the magnitude. In the case of space related quantity or magnitude, a sensor may measure the linear density, surface density, or volume density, relating to the amount of property per volume. Alternatively or in addition, a sensor may measure the flux (or flow) of a property through a cross-section or surface boundary, the flux density, or the current. In the case of a scalar field, a sensor may measure the quantity gradient. A sensor may measure the amount of property per unit mass or per mole of substance. A single sensor may be used to measure two or more phenomena.

The sensor may be thermoelectric sensor, for measuring, sensing or detecting the temperature (or the temperature gradient) of an object, which may be solid, liquid or gas. Such sensor may be a thermistor (either PTC or NTC), a thermocouple, a quartz thermometer, or an RTD. The sensor may be based on a Geiger counter for detecting and measuring radioactivity or any other nuclear radiation. Light, photons, or other optical phenomena may be measured or detected by a photosensor or photodetector, used for measuring the intensity of visible or invisible light (such as infrared, ultraviolet, X-ray or gamma rays). A photosensor may be based on the photoelectric or the photovoltaic effect, such as a photodiode, a phototransistor, solar cell or a photomultiplier tube. A photosensor may be a photoresistor based on photoconductivity, or a CCD where a charge is affected by the light. The sensor may be an electrochemical sensor used to measure, sense or detect a matter structure, properties, composition, and reactions, such as pH meters, gas detector, or gas sensor. Using semiconductors, oxidation, catalytic, infrared or other sensing or detection mechanisms, gas detector may be used to detect the presence of a gas (or gases) such as hydrogen, oxygen or CO. The sensor may be a smoke detector for detecting smoke or fire, typically by an optical detection (photoelectric) or by a physical process (ionization).

The sensor may be a physiological sensor for measuring, sensing or detecting parameters of a live body, such as animal or human body. Such a sensor may involve measuring of body electrical signals such as an EEG or ECG sensor, a gas saturation sensor such as oxygen saturation sensor, mechanical or physical parameter sensors such as a blood pressure meter. A sensor (or sensors) may be external to the sensed body, implanted inside the body, or may be wearable. The sensor may be an electracoustic sensor for measuring, sensing or detecting sound, such as a microphone. Typically microphones are based on converting audible or inaudible (or both) incident sound to an electrical signal by measuring the vibration of a diaphragm or a ribbon. The microphone may be a condenser microphone, an electret microphone, a dynamic microphone, a ribbon microphone, a carbon microphone, or a piezoelectric microphone.

A sensor may be an image sensor for providing digital camera functionality, allowing an image (either as still images or as a video) to be captured, stored, manipulated and displayed. The image capturing hardware integrated with the sensor unit may contain a photographic lens (through a lens opening) focusing the required image onto a photosensitive image sensor array disposed approximately at an image focal point plane of the optical lens, for capturing the image and producing electronic image information representing the image. The image sensor may be based on Charge-Coupled Devices (CCD) or Complementary Metal-Oxide Semiconductor (CM OS). The image may be converted into a digital format by an image sensor AFE (Analog Front End) and an image processor, commonly including an analog to digital (A/D) converter coupled to the image sensor for generating a digital data representation of the image. The unit may contain a video compressor, coupled between the analog to digital (A/D) converter and the transmitter for compressing the digital data video before transmission to the communication medium. The compressor may be used for lossy or non-lossy compression of the image information, for reducing the memory size and reducing the data rate required for the transmission over the communication medium. The compression may be based on a standard compression algorithm such as JPEG (Joint Photographic Experts Group) and M PEG (Moving Picture Experts Group), ITU-T H.261, ITU-T H.263, ITU-T H.264, or ITU-T CCIR 601.

The digital data video signal carrying a digital data video according to a digital video format, and a transmitter coupled between the port and the image processor for transmitting the digital data video signal to the communication medium. The digital video format may be based on one out of: TIFF (Tagged Image File Format), RAW format, AVI (Audio Video Interleaved), DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards.

A sensor may be an electrical sensor used to measure electrical quantities or electrical properties. The electrical sensor may be conductively connected to the measured element. Alternatively or in addition, the electrical sensor may use non-conductive or non-contact coupling to the measured element, such as measuring a phenomenon associated with the measured quantity or property. The electric sensor may be a current sensor or an ampmeter (a.k.a. ampermeter) for measuring DC or AC (or any other waveform) electric current passing through a conductor or wire. The current sensor may be connected such that part or entire of the measured electric current may be passing through the ampermeter, such as a galvanometer or a hot-wire ampermeter. A n ampermeter may be a current clamp or current probe, and may use the 'Hall effect' or a current transformer concept for non-contact or non-conductive current measurement. The electrical sensor may be a voltmeter for measuring the DC or AC (or any other waveform) voltage, or any potential difference between two points. The voltmeter may be based on the current passing a resistor using the Ohm's law, may be based on a potentiometer, or may be based on a bridge circuit.

A sensor may be a wattmeter measuring the magnitude of the active A C or DC power (or the supply rate of electrical energy). The wattmeter may be a bolometer, used for measuring the power of incident electromagnetic radiation via the heating of a material with a temperature-dependent electrical resistance. A sensor may be an electricity A C (single or multi-phase) or DC type meter (or electrical energy meter), that measures the amount of electrical energy consumed by a load. The electricity meter may be based on a wattmeter which accumulate or average the readings, may be based on induction, or may be based on multiplying measured voltage and current.

An electrical sensor may be an ohmmeter for measuring the electrical resistance (or conductance), and may be a megohmmeter or a microohmeter. The ohmmeter may use the Ohm's law to derive the resistance from voltage and current measurements, or may use a bridge such as a Wheatstone bridge. A sensor may be a capacitance meter for measuring capacitance. A sensor may be an inductance meter for measuring inductance. A sensor may be an impedance meter for measuring an impedance of a device or a circuit. A sensor may be an LCR meter, used to measure inductance (L), capacitance (C), and resistance (R). A meter may use sourcing a DC or an AC voltage, and use the ratio of the measured voltage and current (and their phase difference) through the tested device according to Ohm's law to calculate the resistance, the capacitance, the inductance, or the impedance (R=V/I). Alternatively or in addition, a meter may use a bridge circuit (such as Wheatstone bridge), where variable calibrated elements are adjusted to detect a null. The measurement may be using DC, using a single frequency or over a range of frequencies.

The sensor may be a Time-Domain Reflectometer (TDR) used to characterize and locate faults in transmission-lines such as conductive or metallic lines, based on checking the reflection of a transmitted short rise time pulse. Similarly, an optical TDR may be used to test optical fiber cables.

A sensor may be a scalar or a vector magnetometer for measuring an H or B magnetic fields. The magnetometer may be based on a Hall effect sensor, magneto-diode, magneto-transistor, AM R magnetometer, GMR magnetometer, magnetic tunnel junction magnetometer, magneto-optical sensor, Lorentz force based MEMS sensor, Electron Tunneling based MEMS sensor, MEMS compass, Nuclear precession magnetic field sensor (a.k.a. Nuclear Magnetic Resonance-NM R), optically pumped magnetic field sensor, fluxgate magnetometer, search coil magnetic field sensor, or Superconducting Quantum Interference Device (SQUID) magnetometer.

A sensor may be a strain gauge, used to measure the strain, or any other deformation, of an object. The sensor may be based on deforming a metallic foil, semiconductor strain gauge (such as piezoresistors), measuring the strain along an optical fiber, capacitive strain gauge, and vibrating or resonating of a tensioned wire. A sensor may be a tactile sensor, being sensitive to force or pressure, or being sensitive to a touch by an object, typically a human touch. A tactile sensor may be based on a conductive rubber, a lead zirconate titanate (PZT) material, a polyvinylidene fluoride (PVDF) material, a metallic capacitive element, or any combination thereof. A tactile sensor may be a tactile switch, which may be based on the human body conductance, using measurement of conductance or capacitance.

A sensor may be a piezoelectric sensor, where the piezoelectric effect is used to measure pressure, acceleration, strain or force, and may use transverse, longitudinal, or shear effect mode. A thin membrane may be used to transfer and measure pressure, while mass may be used for acceleration measurement. A piezoelectric sensor element material may be a piezoelectric ceramics (such as PZT ceramic) or a single crystal material. A single crystal material may be gallium phosphate, quartz, tourmaline, or Lead Magnesium Niobate-Lead Titanate (PM N-PT).

A sensor may be a motion sensor, and may include one or more accelerometers, which measures the absolute acceleration or the acceleration relative to freefall. The accelerometer may be piezoelectric, piezoresistive, capacitive, MEMS or electromechanical switch accelerometer, measuring the magnitude and the direction the device acceleration in a single-axis, 2-axis or 3-axis (omnidirectional). Alternatively or in addition, the motion sensor may be based on electrical tilt and vibration switch or any other electromechanical switch.

A sensor may be a force sensor, a load cell, or a force gauge (a.k.a. force gage), used to measure a force magnitude and/or direction, and may be based on a spring extension, a strain gauge deformation, a piezoelectric effect, or a vibrating wire. A sensor may be a driving or passive dynamometer, used to measure torque or any moment of force.

A sensor may be a pressure sensor (a.k.a. pressure transducer or pressure transmitter/sender) for measuring a pressure of gases or liquids, and for indirectly measuring other parameters such as fluid/gas flow, speed, water-level, and altitude. A pressure sensor may be a pressure switch. A pressure sensor may be an absolute pressure sensor, a gauge pressure sensor, a vacuum pressure sensor, a differential pressure sensor, or a sealed pressure sensor. The changes in pressure relative to altitude may be used for an altimeter, and the Venturi effect may be used to measure flow by a pressure sensor. Similarly, the depth of a submerged body or the fluid level on contents in a tank may be measured by a pressure sensor.

A pressure sensor may be of a force collector type, where a force collector (such a diaphragm, piston, bourdon tube, or bellows) is used to measure strain (or deflection) due to applied force (pressure) over an area. Such sensor may be a based on the piezoelectric effect (a piezoresistive strain gauge), may be of a capacitive or of an electromagnetic type. A pressure sensor may be based on a potentiometer, or may be based on using the changes in resonant frequency or the thermal conductivity of a gas, or may use the changes in the flow of charged gas particles (ions).

A sensor may be a position sensor for measuring linear or angular position (or motion). A position sensor may be an absolute position sensor, or may be a displacement (relative or incremental) sensor, measuring a relative position, and may be an electromechanical sensor. A position sensor may be mechanically attached to the measured object, or alternatively may use a non-contact measurement.

A position sensor may be an angular position sensor, for measuring involving an angular position (or the rotation or motion) of a shaft, an axle, or a disk. Absolute angular position sensor output indicates the current position (angle) of the shaft, while incremental or displacement sensor provides information about the change, the angular speed or the motion of the shaft. An angular position sensor may be of optical type, using reflective or interruption schemes, or may be of magnetic type, such as based on variable-reluctance (VR), Eddy-current killed oscillator (ECKO), Wiegand sensing, or Hall-effect sensing, or may be based on a rotary potentiometer. An angular position sensor may be transformer based such as a RVDT, a resolver or a synchro. An angular position sensor may be based on an absolute or incremental rotary encoder, and may be a mechanical or optical rotary encoder, using binary or gray encoding schemes.

A sensor may be an angular rate sensor, used to measure the angular rate, or the rotation speed, of a shaft, an axle or a disc, and may be electromechanical (such as centrifugal switch), MEM S based, Laser based (such as Ring Laser Gyroscope-RLG), or a gyroscope (such as fiber-optic gyro) based. Some gyroscopes use the measurement of the Coriolis acceleration to determine the angular rate. An angular rate sensor may be a tachometer, which may be based on measuring the centrifugal force, or based on optical, electric, or magnetic sensing a slotted disk.

A position sensor may be a linear position sensor, for measuring a linear displacement or position typically in a straight line, and may use a transformer principle such as such as LVDT, or may be based on a resistive element such as linear potentiometer. A linear position sensor may be an incremental or absolute linear encoder, and may employ optical, magnetic, capacitive, inductive, or eddy-current principles.

A sensor may be a mechanical or electrical motion detector (or an occupancy sensor), for discrete (on/off) or magnitude-based motion detection. A motion detector may be based on sound (acoustic sensors), opacity (optical and infrared sensors and video image processors), geomagnetism (magnetic sensors, magnetometers), reflection of transmitted energy (infrared laser radar, ultrasonic sensors, and microwave radar sensors), electromagnetic induction (inductive-loop detectors), or vibration (triboelectric, seismic, and inertia-switch sensors). Acoustic sensors may use electric effect, inductive coupling, capacitive coupling, triboelectric effect, piezoelectric effect, fiber optic transmission, or radar intrusion sensing. An occupancy sensor is typically a motion detector that may be integrated with hardware or software-based timing device.

A motion sensor may be a mechanically-actuated switch or trigger, or may use passive or active electronic sensors, such as passive infrared sensors, ultrasonic sensors, microwave sensor or tomographic detector. Alternatively or in addition, motion can be electronically identified using infrared (PIR) or laser optical detection or acoustical detection, or may use a combination of the technologies disclosed herein.

A sensor may be a humidity sensor, such as a hygrometer or a humidistat, and may respond to an absolute, relative, or specific humidity. The measurement may be based on optically detecting condensation, or may be based on changing the capacitance, resistance, or thermal conductivity of materials subjected to the measured humidity.

A sensor may be a clinometer for measuring angle (such as pitch or roll) of an object, typically with respect to a plane such as the earth ground plane. A clinometer may be based on an accelerometer, a pendulum, or on a gas bubble in liquid, or may be a tilt switch such as a mercury tilt switch for detecting inclination or declination with respect to a determined tilt angle.

A sensor may be a gas or liquid flow sensor, for measuring the volumetric or mass flow rate via a defined area or a surface. A liquid flow sensor typically involves measuring the flow in a pipe or in an open conduit. A flow measurement may be based on a mechanical flow meter, such as a turbine flow meter, a Woltmann meter, a single jet meter, or a paddle wheel meter. Pressure-based meters may be based on measuring a pressure or a pressure differential based on Bernoulli's principle, such as a Venturi meter. The sensor may be an optical flow meter or be based on the Doppler-effect.

A flow sensor may be an air flow sensor, for measuring the air or gas flow, such as through a surface (e.g., through a tube) or a volume, by actually measuring the air volume passing, or by measuring the actual speed or air flow. In some cases, a pressure, typically differential pressure, may be measured as an indicator for the air flow measurements. An anemometer is an air flow sensor primarily for measuring wind speed, and may be cup anemometer, a windmill anemometer, hot-wire anemometer such as CCA (Constant-Current A nemometer), CVA (Constant-Voltage A nemometer) and CTA (Constant-Temperature A nemometer). Sonic anemometers use ultrasonic sound waves to measure wind velocity. Air flow may be measured by a pressure anemometer that may be a plate or tube class.

A sensor may be a gyroscope, for measuring orientation in space, such as the conventional mechanical type, a MEM S gyroscope, a piezoelectric gyroscope, a FOG, or a VSG type. A sensor may be a nanosensor, a solid-state, or an ultrasonic based sensor. A sensor may be an eddy-current sensor, where the measurement may be based on producing and/or measuring eddy-currents. Sensor may be a proximity sensor, such as metal detector. A sensor may be a bulk or surface acoustic sensor, or may be an atmospheric sensor.

In one example, multiple sensors may be used arranged as a sensor array (such as linear sensor array), for improving the sensitivity, accuracy, resolution, and other parameters of the sensed phenomenon. The sensor array may be directional, and better measure the parameters of the impinging signal to the array, such as the number, magnitudes, frequencies, Direction-Of-Arrival (DOA), distances, and speeds of the signals. The processing of the entire sensor array outputs, such as to obtain a single measurement or a single parameter, may be performed by a dedicated processor, which may be part of the sensor array assembly, may be performed in the processor of the field unit, may be performed by the processor in the router, may be performed as part of the controller functionality (e.g., in the control server), or any combination thereof. The same component may serve both as a sensor and as actuator, such as during different times, and may be associated with the same or different phenomenon. A sensor operation may be based on an external or integral mechanism for generating a stimulus or an excitation to generate influence or create a phenomenon. The mechanism may be controlled as an actuator or as part of the sensor.

Any element designed for or capable of directly or indirectly affecting, changing, producing, or creating a physical phenomenon under an electric signal control may be used as an actuator. An appropriate actuator may be adapted for a specific physical phenomenon, such as an actuator responsive to temperature, humidity, pressure, audio, vibration, light, motion, sound, proximity, flow rate, electrical voltage, and electrical current. Typically a sensor may be used to measure a phenomenon affected by an actuator.

An actuator may be an analog actuator having an analog signal input such as analog voltage or current, or may have continuously variable impedance. Alternatively on in addition, an actuator may have a digital signal input. An actuator may affect time-dependent or space-dependent parameters of a phenomenon. An actuator may affect time-dependencies or a phenomenon such as the rate of change, time-integrated or time-average, duty-cycle, frequency or time period between events. The actuator may be semiconductor-based, and may be based on MEM S technology.

An actuator may affect the amount of a property or of a physical quantity or the magnitude relating to a physical phenomenon, body or substance. Alternatively or in addition, an actuator may be used to affect the time derivative thereof, such as the rate of change of the amount, the quantity or the magnitude. In the case of space related quantity or magnitude, an actuator may affect the linear density, surface density, or volume density, relating to the amount of property per volume. Alternatively or in addition, an actuator may affect the flux (or flow) of a property through a cross-section or surface boundary, the flux density, or the current. In the case of a scalar field, an actuator may affect the quantity gradient. An actuator may affect the amount of property per unit mass or per mole of substance. A single actuator may be used to measure two or more phenomena.

An actuator may be a light source used to emit light by converting electrical energy into light, and where the luminous intensity may be fixed or may be controlled, commonly for illumination or indication purposes. A n actuator may be used to activate or control the light emitted by a light source, being based on converting electrical energy or another energy to a light. The light emitted may be a visible light, or invisible light such as infrared, ultraviolet, X-ray or gamma rays. A shade, reflector, enclosing globe, housing, lens, and other accessories may be used, typically as part of a light fixture, in order to control the illumination intensity, shape or direction. Electrical sources of illumination commonly use a gas, a plasma (such as in arc and fluorescent lamps), an electrical filament, or Solid-State Lighting (SSL), where semiconductors are used. An SSL may be a Light-Emitting Diode (LED), an Organic LED (OLED), Polymer LED (PLED), or a laser diode.

A light source may consists of, or comprises, a lamp which may be an arc lamp, a fluorescent lamp, a gas-discharge lamp (such as a fluorescent lamp), or an incandescent light (such as a halogen lamp). An arc lamp is the general term for a class of lamps that produce light by an electric arc voltaic arc. Such a lamp consists of two electrodes, first made from carbon but typically made today of tungsten, which are separated by a noble gas.

A motion actuator may be a rotary actuator that produces a rotary motion or torque, commonly to a shaft or axle. The motion produced by a rotary motion actuator may be either continuous rotation, such as in common electric motors, or movement to a fixed angular position as for servos and stepper motors. A motion actuator may be a linear actuator that creates motion in a straight line. A linear actuator may be based on an intrinsically rotary actuator, by converting from a rotary motion created by a rotary actuator, using a screw, a wheel and axle, or a cam. A screw actuator may be a leadscrew, a screw jack, a ball screw or roller screw. A wheel-and-axle actuator operates on the principle of the wheel and axle, and may be hoist, winch, rack and pinion, chain drive, belt drive, rigid chain, or rigid belt actuator. Similarly, a rotary actuator may be based on an intrinsically linear actuator, by converting from a linear motion to a rotary motion, using the above or other mechanisms. Motion actuators may include a wide variety of mechanical elements and/or prime movers to change the nature of the motion such as provided by the actuating/transducing elements, such as levers, ramps, screws, cams, crankshafts, gears, pulleys, constant-velocity joints, or ratchets. A motion actuator may be part of a servomotor system.

A motion actuator may be a pneumatic actuator that converts compressed air into rotary or linear motion, and may comprises a piston, a cylinder, valves or ports. Motion actuators are commonly controlled by an input pressure to a control valve, and may be based on moving a piston in a cylinder. A motion actuator may a hydraulic actuator using a pressure of the liquid in a hydraulic cylinder to provide force or motion. A hydraulic actuator may be a hydraulic pump, such as a vane pump, a gear pump, or a piston pump. A motion actuator may be an electric actuator where electrical energy may be converted into motion, such as an electric motor. A motion actuator may be a vacuum actuator producing a motion based on vacuum pressure.

An electric motor may be a DC motor, which may be a brushed, brushless, or uncommutated type. An electric motor may be a stepper motor, and may be a Permanent Magnet (PM) motor, a Variable reluctance (VR) motor, or a hybrid synchronous stepper. An electric motor may be an AC motor, which may be an induction motor, a synchronous motor, or an eddy current motors. An AC motor may be a two-phase A C servo motor, a three-phase A C synchronous motor, or a single-phase AC induction motor, such as a split-phase motor, a capacitor start motor, or a Permanent-Split Capacitor (PSC) motor. Alternatively or in addition, an electric motor may be an electrostatic motor, and may be MEM S based.

A rotary actuator may be a fluid power actuator, and a linear actuator may be a linear hydraulic actuator or a pneumatic actuator. A linear actuator may be a piezoelectric actuator, based on the piezoelectric effect, may be a wax motor, or may be a linear electrical motor, which may be a DC brush, a DC brushless, a stepper, or an induction motor type. A linear actuator may be a telescoping linear actuator. A linear actuator may be a linear electric motor, such as a linear induction motor (LIM), or a Linear Synchronous Motor (LSM).

A motion actuator may be a linear or rotary piezoelectric motor based on acoustic or ultrasonic vibrations. A piezoelectric motor may use piezoelectric ceramics such as Inchworm or PiezoWalk motors, may use Surface Acoustic Waves (SAW) to generate the linear or the rotary motion, or may be a Squiggle motor. Alternatively or in addition, an electric motor may be an ultrasonic motor. A linear actuator may be a micro- or nanometer comb-drive capacitive actuator. Alternatively or in addition, a motion actuator may be a Dielectric or Ionic based Electroactive Polymers (EAPs) actuator. A motion actuator may also be a solenoid, thermal bimorph, or a piezoelectric unimorph actuator.

An actuator may be a pump, typically used to move (or compress) fluids or liquids, gasses, or slurries, commonly by pressure or suction actions, and the activating mechanism is often reciprocating or rotary. A pump may be a direct lift, impulse, displacement, valveless, velocity, centrifugal, vacuum pump, or gravity pump. A pump may be a positive displacement pump, such as a rotary-type positive displacement type such as internal gear, screw, shuttle block, flexible vane or sliding vane, circumferential piston, helical twisted roots or liquid ring vacuum pumps, a reciprocating-type positive displacement type, such as piston or diaphragm pumps, and a linear-type positive displacement type, such as rope pumps and chain pumps, a rotary lobe pump, a progressive cavity pump, a rotary gear pump, a piston pump, a diaphragm pump, a screw pump, a gear pump, a hydraulic pump, and a vane pump. A rotary positive displacement pumps may be a gear pump, a screw pump, or a rotary vane pumps. Reciprocating positive displacement pumps may be plunger pumps type, diaphragm pumps type, diaphragm valves type, or radial piston pumps type.

A pump may be an impulse pump such as hydraulic ram pumps type, pulser pumps type, or airlift pumps type. A pump may be a rotodynamic pump such as a velocity pump or a centrifugal pump. A centrifugal pump may be a radial flow pump type, an axial flow pump type, or a mixed flow pump.

An actuator may be an electrochemical or chemical actuator, used to produce, change, or otherwise affect a matter structure, properties, composition, process, or reactions, such as oxidation/reduction or an electrolysis process.

An actuator may be a sounder which converts electrical energy to sound waves transmitted through the air, an elastic solid material, or a liquid, usually by means of a vibrating or moving ribbon or diaphragm. The sound may be audible or inaudible (or both), and may be omnidirectional, unidirectional, bidirectional, or provide other directionality or polar patterns. A sounder may be an electromagnetic loudspeaker, a piezoelectric speaker, an electrostatic loudspeaker (ESL), a ribbon or planar magnetic loudspeaker, or a bending wave loudspeaker.

A sounder may an electromechanical type, such as an electric bell, a buzzer (or beeper), a chime, a whistle or a ringer and may be either electromechanical or ceramic-based piezoelectric sounders. The sounder may emit a single or multiple tones, and can be in continuous or intermittent operation.

The system may use the sounder to play digital audio content, either stored in, or received by, the sounder, the actuator unit, the router, the control server, or any combination thereof. The audio content stored may be either pre-recorded or using a synthesizer. Few digital audio files may be stored, selected by the control logic. Alternatively or in addition, the source of the digital audio may a microphone serving as a sensor. In another example, the system uses the sounder for simulating the voice of a human being or generates music. The music produced can emulate the sounds of a conventional acoustical music instrument, such as a piano, tuba, harp, violin, flute, guitar and so forth. A talking human voice may be played by the sounder, either pre-recorded or using human voice synthesizer, and the sound may be a syllable, a word, a phrase, a sentence, a short story or a long story, and can be based on speech synthesis or pre-recorded, using male or female voice.

A human speech may be produced using a hardware, software (or both) speech synthesizer, which may be Text-To-Speech (TTS) based. The speech synthesizer may be a concatenative type, using unit selection, diphone synthesis, or domain-specific synthesis. Alternatively or in addition, the speech synthesizer may be a formant type, and may be based on articulatory synthesis or hidden Markov models (HM M) based.

An actuator may be used to generate an electric or magnetic field, and may be an electromagnetic coil or an electromagnet.

An actuator may be a display for presentation of visual data or information, commonly on a screen, and may consist of an array (e.g., matrix) of light emitters or light reflectors, and may present text, graphics, image or video. A display may be a monochrome, gray-scale, or color type, and may be a video display. The display may be a projector (commonly by using multiple reflectors), or alternatively (or in addition) have the screen integrated. A projector may be based on an Eidophor, Liquid Crystal on Silicon (LCoS or LCOS), or LCD, or may use Digital Light Processing (DLP™) technology, and may be MEM S based or be a virtual retinal display. A video display may support Standard-Definition (SD) or High-Definition (HD) standards, and may support 3D. The display may present the information as scrolling, static, bold or flashing. The display may be an analog display, such as having NTSC, PAL or SECAM formats. Similarly, analog RGB, VGA (Video Graphics Array), SVGA (Super Video Graphics Array), SCART or S-video interface, or may be a digital display, such as having IEEE 1394 interface (a.k.a. FireWire™), may be used. Other digital interfaces that can be used are USB, SDI (Serial Digital Interface), HDMI (High-Definition Multimedia Interface), DVI (Digital Visual Interface), UDI (Unified Display Interface), DisplayPort, Digital Component Video or DV B (Digital Video Broadcast) interface. Various user controls may include an on/off switch, a reset button and others. Other exemplary controls involve display associated settings such as contrast, brightness and zoom.

A display may be a Cathode-Ray Tube (CRT) display, or a Liquid Crystal Display (LCD) display. The LCD display may be passive (such as CSTN or DSTN based) or active matrix, and may be Thin Film Transistor (TFT) or LED-backlit LCD display. A display may be a Field Emission Display (FED), Electroluminescent Display (ELD), Vacuum Fluorescent Display (VFD), or may be an Organic Light-Emitting Diode (OLED) display, based on passive-matrix (PM OLED) or active-matrix OLEDs (AMOLED).

A display may be based on an Electronic Paper Display (EPD), and be based on Gyricon technology, Electro-Wetting Display (EWD), or Electrofluidic display technology. A display may be a laser video display or a laser video projector, and may be based on a Vertical-External-Cavity Surface-Emitting-Laser (VECSEL) or a Vertical-Cavity Surface-Emitting Laser (VCSEL).

A display may be a segment display, such as a numerical or an alphanumerical display that can show only digits or alphanumeric characters, words, characters, arrows, symbols, ASCII and non-ASCII characters. Examples are Seven-segment display (digits only), Fourteen-segment display, and Sixteen-segment display, and a dot matrix display.

An actuator may be a thermoelectric actuator such as a cooler or a heater for changing the temperature of a solid, liquid or gas object, and may use conduction, convection, thermal radiation, or by the transfer of energy by phase changes. A heater may be a radiator using radiative heating, a convector using convection, or a forced convection heater. A thermoelectric actuator may be a heating or cooling heat pump, and may be electrically powered, compression-based cooler using an electric motor to drive a refrigeration cycle. A thermoelectric actuator may be an electric heater, converting electrical energy into heat, using resistance, or a dielectric heater. A thermoelectric actuator may be a solid-state active heat pump device based on the Peltier effect. A thermoelectric actuator may be an air cooler, using a compressor-based refrigeration cycle of a heat pump. An electric heater may be an induction heater.

An actuator unit may include a signal generator serving as an actuator for providing an electrical signal (such as a voltage or current), or may be coupled between the processor and the actuator for controlling the actuator. A signal generator an analog or digital signal generator, and may be based on software (or firmware) or may be a separated circuit or component. A signal may generate repeating or non-repeating electronic signals, and may include a digital to analog converter (DA C) to produce an analog output. Common waveforms are a sine wave, a saw-tooth, a step (pulse), a square, and a triangular waveforms. The generator may include some sort of modulation functionality such as Amplitude Modulation (AM), Frequency Modulation (FM), or Phase Modulation (PM). A signal generator may be an Arbitrary Waveform Generators (AWGs) or a logic signal generator.

An actuator unit may include an electrical switch (or multiple switches) coupled between the processor and the actuator for activating the actuator. Two or more switches may be used, connected in series or in parallel. The switch may be integrated with the actuator (if separated from the actuator unit), with the actuator unit, or any combination thereof. In the above examples, a controller can affect the actuator (or load) activation by sending the actuator unit a message to activate the actuator by powering it, or to deactivate the actuator operation by breaking the current floe thereto, or shifting the actuator between states. A switch is typically designed to open (breaking, interrupting), close (making), or change one or more electric circuits under some type of external control, and may be an electromechanical device with one or more sets of electrical contacts having two or more states. The switch may be a 'normally open', 'normally closed' type, or a changeover switch, that may be either a 'make-before-break' or 'break-before-make' type. The switch contacts may have one or more poles and one or more throws, such as Single-Pole-Single-Throw (SPST), Single-Pole-Double-Throw (SPDT), Double-Pole-Double-Throw (DPDT), Double-Pole-Single-Throw (DPST), and Single-Pole-Changeover (SPCO). The switch may be an electrically operated switch such as an electromagnetic relay, which may be a non-latching or a latching type. The relay may be a reed relay, or a solid-state or semiconductor based relay, such as a Solid State Relay (SSR). A switch may be implemented using an electrical circuit, such as an open collector or open drain based circuit, a thyristor, a TRIAC or an opto-isolator.

The image processing may include video enhancement such as video denoising, image stabilization, unsharp masking, and super-resolution. The image processing may include a Video Content Analysis (VCA), such as Video Motion Detection (VMD), video tracking, and egomotion estimation, as well as identification, behavior analysis and other forms of situation awareness, dynamic masking, motion detection, object detection, face recognition, automatic number plate recognition, tamper detection, video tracking, and pattern recognition.

The image processing may be used for non-verbal human control of the system, such as by hand posture or gesture recognition. The recognized hand posture or gesture may be used as input by the control logic in the controller, and thus enables humans to interface with the machine in ways sometimes described as Man-Machine Interfaces (MMI) or Human-Machine Interfaces (HMI) and interact naturally without any mechanical devices, and thus to impact the system operation and the actuators commands and operation. An image-based recognition may use a single camera or 3-D camera. A gesture recognition may be based on 3-D information of key elements of the body parts or may be 2-D appearance-based. A 3-D model approach can use volumetric or skeletal models, or a combination of the two.

A redundancy may be used in order to improve the accuracy, reliability, or availability. The redundancy may be implemented where two or more components may be used for the same functionality. The components may be similar, substantially or fully the same, identical, different, substantially different, or distinct from each other, or any combination thereof. The redundant components may be concurrently operated, allowing for improved robustness and allowing for overcoming a single point of failure (SPOF), or alternatively one or more of the components serves as a backup. The redundancy may be a standby redundancy, which may be 'Cold Standby' and 'Hot Standby'. In the case three redundant components are used, Triple Modular Redundancy (TMR) may be used, and Quadruple Modular Redundancy (QMR) may be used in the case of four components. A 1:N Redundancy logic may be used for three or more components.

A sensor redundancy involves using two or more sensors sensing the same phenomenon. One of the two may be used, or all the sensors may be used together such as for averaging measurements for improved accuracy. Two or more data path may be available in the system between the system elements, where one of the may be only used, or alternatively all the data paths may be used together such as for improving the available bandwidth, throughput and delay.

In one example two or more sensor may be used for sensing the same (or substantially the same) phenomenon. The two (or more) sensors may be part of, associated with, or connected to the same field unit. Alternatively or in addition, each sensor may be connected to, or be part of, a distinct field unit. Similarly, two or more actuators may be used for generating or affecting the same (or substantially the same) phenomenon. The two (or more) actuators may be part of, associated with, or connected to the same field unit. Alternatively or in addition, each actuator may be connected to, or be part of, a distinct field unit.

The field units and the router may be located in the same building (or vehicle), in different buildings (or vehicles) or external (adjacent or remote) to the building (or vehicle) or the user premises. A field unit may communicate (such as send sensor info or receive actuator commands) with the router (or gateway) or the control server using the same or different W A N s used by the router, and may be associated by the controller and its control logic by communication with the router or the control server.

The memory may be a random-accessed or a sequential-accessed memory, and may be location-based, randomly-accessed, and can be written multiple times. The memory may be volatile and based on semiconductor storage medium, such as: RAM, SRAM, DRAM, TTRAM and Z-RAM. The memory may be non-volatile and based on semiconductor storage medium, such as ROM, PROM, EPROM or EEROM, and may be Flash-based, such as SSD drive or USB 'Thumb' drive. The memory may be based on non-volatile magnetic storage medium, such as HDD. The memory may be based on an optical storage medium that is recordable and removable, and may include an optical disk drive. The storage medium may be: CD-RW, DVD-RW, DVD+RW, DVD-RAM BD-RE, CD-ROM, BD-ROM or DVD-ROM. The memory form factor may be an IC, a PCB on which one or more ICs are mounted, or a box-shaped enclosure.

The communication may be based on a PAN, a LAN or a WAN communication link, may use private or public networks, and may be packet-based or circuit-switched. The first bus or the second bus (or both) may each be based on Ethernet and may be substantially compliant with IEEE 802.3 standard, and be based on one out of: 100BaseT/TX, 1000BaseT/TX, 10 gigabit Ethernet substantially (or in full) according to IEEE Std 802.3ae-2002 as standard, 40 Gigabit Ethernet, and 100 Gigabit Ethernet substantially according to IEEE P802.3ba standard. The first bus or the second bus (or both) may each be based on a multi-drop, a daisy-chain topology, or a point-to-point connection, use half-duplex or full-duplex, and may employs a master/slave scheme. The first bus or the second bus (or both) may each be a wired-based, point-to-point, and bit-serial bus, where a timing, clocking or strobing signal is carried over dedicated wires, or using a self-clocking scheme. Each of the buses (or both) may use a fiber-optic cable as the bus medium, and the adapter may comprise a fiber-optic connector for connecting to the fiber-optic cable.

The communication between two devices in the building (or vehicle), external to the building (or vehicle), or between a device in the building (or vehicle) to a device external to the building (or vehicle), such as the communication between field units, between routers, between home devices, between field unit and a router, between field unit and a server, or between a router and a server, may use multiple communication routes over the same or different networks, which may be used separately as redundant data paths or cooperatively such as aggregated communication links. A device in the system may include multiple network interfaces for communicating the multiple data routes or for communication over the multiple networks. A network interface may include a transceiver or modem and a communication port for coupling to the network, such as a connector for connecting to a wired or conductive network and an antenna for coupling to a wireless network. A physical, software, or logical (or a combination thereof) based interface selector in the device receives the packet to be sent and under a dedicated or general computer or processor control directs it to one or more of the network interfaces, to be sent over the multiple networks or data routes. A packet to be sent may be received by the interface selector, and when the interfaces that are available for transmission of the received packet are identified, and then an interface to be used (or multiple interfaces) may be selected out of the available interfaces, and the packet may be directed and sent to the selected interface for being transmitted over the associated network.

The network interfaces may be (in part or in whole) similar, identical or different from each other. The networks or the data paths may be similar, identical or different from each other, and may use different, similar or same medium, protocol, or connections. The networks may be wired (or otherwise conductive) and may be using coaxial cable, twisted-pair, power lines (powerlines) or telephone lines, or wireless (or otherwise using non-conductive propagation), using over the air or guided Radio Frequency (RF), light or sound propagation, and the network interfaces may include antennas, fiber-optics connectors, light emitters or light detectors, or speakers and microphones, or any combination thereof.

The networks or the data paths may be similar, identical or different geographical scale or coverage types and data rates, such as NFCs, PANS, LANS, MANS, or WANs, or any combination thereof. The networks or the data paths may be similar, identical or different types of modulation, such as Amplitude Modulation (AM), a Frequency Modulation (FM), or a Phase Modulation (PM), or any combination thereof. The networks or the data paths may be similar, identical or different types of duplexing such half- or full-duplex, or any combination thereof. The networks or the data paths may be based on similar, identical or different types of switching such as circuit-switched or packet-switched, or any combination thereof. The networks or the data paths may have similar, identical or different ownership or operation, such as private or public networks, or any combination thereof.

Two or more network interfaces may communicate over the same network or connected to same network medium simultaneously or at different times, and may use FDM technique, where filters passing different, same, or overlapping frequency bands may be connected between the modems and the respective communication ports. Alternatively or in addition, distinct modulation or coding schemes may be used in order to carry two or more signals over the same medium or over the same frequency band. Two or more network interfaces may share the same network port such as the same antenna or the same connector.

A packet may be sent via one, part of, or all of the available interfaces. A packet may be sent via one of the available interfaces, selected by using a cyclic assigning mechanism, or may otherwise form an aggregated stream such as by using a Time-Division Multiplexing (TDM) scheme. A packet may be sent via randomly selected one of the available interfaces, or using a priority that may be assigned to each network interface. The priorities may be pre-set, fixed or adaptive and changing in time. The selection of the interface to be used, or the priorities assigned to the network interfaces, may be based on the available networks attributes or history, such as cost of network usage, quality of the communication via the interface or network, available bandwidth or throughput, communication errors or packets loss, number of hops to destination, last receive packet, or transfer delay time.

The selection of the interface to be used, or the priorities assigned to the network interfaces, may be based on routing tables (fixed or dynamic) associating the network interfaces to the attributes of the packet, such as destination or source address, or may be based on the type of information carried in the packet.

The field units and the router may be located in the same building (or vehicle), in different buildings (or vehicles) or external (adjacent or remote) to the building (or vehicle) or the user premises. A field unit may communicate (such as send sensor info or receive actuator commands) with the router (or gateway) or the control server using the same or different WANs used by the router, and may be associated by the controller and its control logic by communication with the router or the control server.

The system may include computers, routers, and field units including, or connected to, sensors and actuators, in a vehicle, and may be communicating via a router or routers to a server external to the vehicle. The vehicle may communicate with other vehicles, or with the server, via other vehicle or via (or to) a roadside unit or other stationary devices. The vehicle may be designed for use on land, on or in fluids, or be airborne, such as bicycle, car, automobile, motorcycle, train, ship, boat, submarine, airplane, scooter, bus, subway, train, or spacecraft. The sensors may sense a phenomenon in the vehicle or external to the vehicle. The actuators may affect the vehicle speed, direction, or route, or may be affecting the in-vehicle systems or environment. The system may be used for improving safety, traffic management, driver assisting, pricing management, and navigation. The in-vehicle networks may be based on standard or vehicle specific buses, such as CAN or LIN.

Any device in the system, such as a router, a field unit, a home computer, a server, or any other device or computer, may be addressable in any of the system, networks (such as the in-building or in-vehicle network, or any external network such as the the Internet) using a digital address which may be stored in a volatile or non-volatile memory. The same address or different addresses may be used when communicating over the various networks in the system, and the address may be or locally administered addresses universally administered addresses, where the address is uniquely assigned to a device by its manufacturer (such as programmed during manufacturing) or by its installer or user. The address may be a permanent and globally unique identification, and may be software-based or hardware-based. The address may be layer 2 address such as MAC address (e.g., MAC-48, EUI-48, or EUI-64), or alternatively (or in addition) may be IP address such as IPV4 or IPv6. The address may be static or dynamic IP address. The address may be assigned by another device in the network via a communication port or interface over the network, and may use DHCP. For example, the control server, the home computer, or the router may assign addresses to the router or to the field units. A device may be associated with, or be identified, by multiple addresses, which may relate to different OSI model layers (such as M A C and IP address), or to be used by different networks, such as multiple addressable network interfaces. The sensors and the actuators in the systems, or their respective connections or ports, may be individually addressable added to the related field unit other addresses, and may serve for source or destination addresses in the system. The sensors or actuators addresses, or the related connections or ports, may be uniquely assigned to during manufacturing, or may be assigned by the associated field unit, or a device communicating with the associated field unit.

In one aspect, a vehicle control system is disclosed such as for commanding an actuator operation according to a control logic, in response to a sensor response associated with a phenomenon, for example for use with one or more in-vehicle networks for communication in a vehicle, and an external network for communicating with an Internet-connected control server via another vehicle or a roadside unit external to the vehicle. The system may comprise a router in the vehicle, connected to the one or more in-vehicle networks and to the external network, and may be operative to pass digital data between the in-vehicle and one or more external networks; a first device in the vehicle that may comprise of, or connectable to, a sensor that responds to the phenomenon, the first device may be operative to transmit a sensor digital data corresponding to the phenomenon to the router over the one or more in-vehicle networks; a second device in the vehicle that may comprise of, or connectable to, an actuator that affects the phenomenon, the second device may be operative to execute actuator commands received from the router over the one or more in-vehicle networks; and an Internet-connected control server external to the vehicle storing the control logic, and communicatively coupled to the router over the Internet via the one or more external networks. The control server may be operative to receive the sensor digital data from the router, may produce actuator commands in response to the received sensor digital data according to the control logic, and may transmit the actuator commands to the second device via the router.

One of the external networks may be a vehicle-to-vehicle network for communicating with the Internet-connected control server via another vehicle, or may be communicating with a stationary device that may be a roadside unit. The router, the first device, or the second device may be mechanical attached to the vehicle that may be adapted for travelling on land, water, or may be airborne. The vehicle may be a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane. The sensor may be operative to sense a phenomenon in the vehicle, external to the vehicle, or in the surroundings around the vehicle, and the actuator may be operative to affect a phenomenon in the vehicle, external to the vehicle, or in the surroundings around the vehicle. The system may be coupled to monitor or control the Engine Control Unit (ECU), the Transmission Control Unit (TCU), the Anti-Lock Braking System (ABS), or the Body Control Modules (BCM), and may be integrated with or being part of a vehicular communication system used to improved safety, traffic flow control, traffic reporting, traffic management, parking help, cruise control, lane keeping, road sign recognition, surveillance, speed limit warning, restricted entries, pull-over commands, travel information, cooperative adaptive cruise control, cooperative forward collision warning, intersection collision avoidance, approaching emergency vehicle warning, vehicle safety inspection, transit or emergency vehicle signal priority, electronic parking payments, commercial vehicle clearance and safety inspections, in-vehicle signing, rollover warning, probe data collection, highway-rail intersection warning, or electronic toll collection.

One or more of the in-vehicle networks may be according to, or based on, SAE J 1962, SAE J 1850, SAE J 1979, ISO 15765, or ISO 9141 standard, or may be a vehicle bus that may be according to, or based on, Control Area Network (CAN) or Local Interconnect Network (LIN), and may use the vehicle DC power lines as a communication medium. The system may be coupled to or integrated with the vehicle On-Board Diagnostics (OBD) system that may be according to, or based on, OBD-II or EOBD (European On-Board Diagnostics) standards. The router, the first device, or the second device may be coupled to the OB D diagnostics connector, and may be at least in part powered via the OBD diagnostics connector. The router may be operative to communicate to the control server information regarding fuel and air metering, ignition system, misfire, auxiliary emission control, vehicle speed and idle control, transmission, on-board computer, fuel level, relative throttle position, ambient air temperature, accelerator pedal position, air flow rate, fuel type, oxygen level, fuel rail pressure, engine oil temperature, fuel injection timing, engine torque, engine coolant temperature, intake air temperature, exhaust gas temperature, fuel pressure, injection pressure, turbocharger pressure, boost pressure, exhaust pressure, exhaust gas temperature, engine run time, NOx sensor, manifold surface temperature, or the Vehicle Identification Number (VIN).

In one aspect, a control system is disclosed, for example for commanding an actuator operation according to a control logic, in response to processing of an image, such as for use with one or more in-building (or in-vehicle) networks for communication in the building (or vehicle), and an external network at least in part external to the building (or vehicle). The system may comprise a router in the building (or vehicle), connected to the one or more in-building (or in-vehicle) networks and to the external network, and may be operative to pass digital data between the in-building (or in-vehicle) and external networks; a first device in the building (or vehicle) comprising an image sensor for capturing still or video image, the first device may be operative to transmit a digital data corresponding to the captured still or video image to the router over the one or more in-building (or in vehicle) network; a second device in the building (or vehicle) comprising an actuator that affects the phenomenon, the second device may be operative to execute actuator commands received from the router over the one or more in-building (or in-vehicle) networks; an Internet-connected control server (referred herein also as 'cloud server' and 'gateway server') external to the building (or vehicle) storing the control logic, and communicatively coupled to the router over the Internet via the external network; and an image processor having an output for processing the captured still or video image; and the control server may be operative to produce actuator commands in response to the image processor output according to the control logic, and may be operative to transmit the actuator commands to the second device via the router, and the image processor may be entirely or in part in the first device, the router, the control server, or any combination thereof.

In one aspect, a control system is disclosed such as for commanding an actuator operation according to a control logic, in response to processing of a voice, for example for use with one or more in-building (or in-vehicle) networks for communication in the building (or vehicle), and an external network at least in part external to the building (or vehicle). The system may comprise a router in the building (or vehicle), connected to the one or more in-building (or in-vehicle) networks and to the external network, and may be operative to pass digital data between the in-building (or in-vehicle) and external networks; a first device in the building (or vehicle) comprising a microphone for sensing voice, the first device may be operative to transmit a digital data corresponding to the sensed voice to the router over the one or more in-building (or in vehicle) network; a second device in the building (or vehicle) comprising an actuator that affects the phenomenon, the second device may be operative to execute actuator commands received from the router over the one or more in-building (or in-vehicle) networks; an Internet-connected control server external to the building (or vehicle) storing the control logic, and communicatively coupled to the router over the Internet via the external network; and a voice processor having an output for processing the voice. The control server may be operative to produce actuator commands in response to the voice processor output according to the control logic, and may be operative to transmit the actuator commands to the second device via the router, and the voice processor may be entirely or in part in the first device, the router, the control server, or any combination thereof.

In one aspect, a control system is disclosed, for example for use with, or including, one or more in-building (or in-vehicle) networks for communication in the building (or vehicle), and for example for use with, or including, an external network at least in part external to the building (or vehicle), and may be used for commanding an actuator operation according to a control logic in response to a sensor response associated with a phenomenon. The system may comprise a router in the building (or vehicle), connected to the one or more in-building (or in-vehicle) networks and to the external network, and may be operative to pass digital data between the in-building (or in-vehicle) and external networks; a first device in the building (or vehicle) comprising of, or connectable to, a sensor that responds to the phenomenon, the first device may be operative to transmit a sensor digital data corresponding to the phenomenon to the router over the one or more in-building (or in-vehicle) networks; a second device in the building (or vehicle) comprising of, or connectable to, an actuator that affects the phenomenon, the second device may be operative to execute actuator commands received from the router over the one or more in-building (or in-vehicle) networks; and an Internet-connected control server external to the building (or vehicle) storing the control logic, and communicatively coupled to the router over the Internet via the external network. The control server may be operative to receive the sensor digital data from the router, to produce actuator commands in response to the received sensor digital data according to the control logic, and to transmit the actuator commands to the second device via the router. The router may be a gateway or may comprise one or more gateway functionalities. The phenomenon may be associated with an object, and the object may be gas, air, liquid or solid.

The sensor may provide a digital output, and the sensor output may include an electrical switch, and the electrical switch state may be responsive to the phenomenon magnitude measured versus a threshold, which may be set by the actuator. The sensor may provide an analog output, and the first device may comprise an analog to digital converter coupled to the analog output, for converting the sensor output to a digital data. The first device may comprise a signal conditioning circuit coupled to the sensor output, and the signal conditioning circuit may comprise an amplifier, a voltage or current limiter, an attenuator, a delay line or circuit, a level translator, a galvanic isolator, an impedance transformer, a linearization circuit, a calibrator, a passive filter, an active filter, an adaptive filter, an integrator, a deviator, an equalizer, a spectrum analyzer, a compressor or a de-compressor, a coder, a decoder, a modulator, a demodulator, a pattern recognizer, a smoother, a noise remover, an average circuit, or an RM S circuit. The sensor may be operative to sense time-dependent characteristic of the sensed phenomenon, and may be operative to respond to a time-integrated, an average, an RM S (Root Mean Square) value, a frequency, a period, a duty-cycle, a time-integrated, or a time-derivative, of the sensed phenomenon. The first device, the router, or the control server may be operative to calculate or provide a time-dependent characteristic such as time-integrated, an average, an RM S (Root M ean Square) value, a frequency, a period, a duty-cycle, a time-integrated, or a time-derivative, of the sensed phenomenon. The sensor may be operative to sense space-dependent characteristic of the sensed phenomenon, such as to a pattern, a linear density, a surface density, a volume density, a flux density, a current, a direction, a rate of change in a direction, or a flow, of the sensed phenomenon. The first device, the router, or the control server may be operative to calculate or provide a space-dependent characteristic of the sensed phenomenon, such as a pattern, a linear density, a surface density, a volume density, a flux density, a current, a direction, a rate of change in a direction, or a flow, of the sensed phenomenon.

The actuator may affect, create, or change a phenomenon associated with an object, and the object may be gas, air, liquid, or solid. The actuator may be controlled by a digital input, and may be electrical actuator powered by an electrical energy. The actuator may be controlled by an analog input, and the second device may comprise a digital to analog converter coupled to the analog input, for converting a digital data to an actuator input signal. The second device may comprise a signal conditioning circuit coupled to the actuator input, the signal conditioning circuit may comprise an amplifier, a voltage or current limiter, an attenuator, a delay line or circuit, a level translator, a galvanic isolator, an impedance transformer, a linearization circuit, a calibrator, a passive filter, an active filter, an adaptive filter, an integrator, a deviator, an equalizer, a spectrum analyzer, a compressor or a de-compressor, a coder, a decoder, a modulator, a demodulator, a pattern recognizer, a smoother, a noise remover, an average circuit, or an RMS circuit. The actuator may be operative to affect time-dependent characteristic such as a time-integrated, an average, an RM S (Root Mean Square) value, a frequency, a period, a duty-cycle, a time-integrated, or a time-derivative, of the sensed phenomenon. The actuator may be operative to affect or change space-dependent characteristic of the phenomenon, such as a pattern, a linear density, a surface density, a volume density, a flux density, a current, a direction, a rate of change in a direction, or a flow, of the sensed phenomenon. The second device, the router, or the control server may be operative to affect a space-dependent characteristic such as a pattern, a linear density, a surface density, a volume density, a flux density, a current, a direction, a rate of change in a direction, or a flow, of the phenomenon.

The system may comprise a third device external to the building (or vehicle) comprising an additional sensor that responds to a distinct or same phenomenon, the third device may be operative to transmit an additional sensor digital data corresponding to the distinct phenomenon to the control server, and the control server may be operative to receive the additional sensor digital data, to produce actuator commands in response to the received additional sensor digital data according to the control logic. The third device may communicate with the control server over the external network, over a network distinct from the external network, or both.

Alternatively or in addition, the system may comprise a fourth device external to the building (or vehicle) comprising an additional actuator that responds to received additional actuator commands, the fourth device may be operative to receive an additional actuator commands from the control server, and the control server may be operative to transmit the additional actuator commands to the fourth device. The fourth device may communicate with the control server over the external network, over a network distinct from the external network, or both.

The control loop may involve randomness, and the system may comprise a random number generator for generating random numbers. The random number generator may be hardware based, and may based on thermal noise, shot noise, nuclear decaying radiation, photoelectric effect, or quantum phenomena. Alternatively or in addition, the random number generator may be software based, and the system may execute an algorithm for generating pseudo-random numbers.

The sensor, the actuator, the first device, the second device, or the router may comprise, or may be integrated with, an outlet or an outlet plug-in module for connecting to in-wall wiring. The outlet may be a telephone, LAN, AC power, or CATV outlet, and the in-wall wiring may be a telephone wire pair, a LAN cable, an AC power cable, or a CATV coaxial cable. The in-wall wiring may be carrying a power signal to power part or whole of the sensor, the actuator, the first device, the second device, or the router. The in-wall wiring may serve as the in-building (or in-vehicle) network medium for communication associated with the first device, the second device, or the router.

The system may comprise multiple sensors arranged as a directional sensor array, and the system may be operative to estimate the number, magnitude, frequency, Direction-Of-Arrival (DOA), distance, or speed of the signal impinging the sensor array. The control logic may include processing of the sensor array outputs. A single component may consist of, or may be part of, the sensor and the actuator. The sensor may be a piezoelectric sensor that uses the transverse, longitudinal, or shear effect mode of the piezoelectric effect. Alternatively or in addition, the sensor may be based on ultrasonic-waves propagation, sensing eddy-currents, based on proximity sensor. The sensor may be a bulk or surface acoustic sensor, or may be an atmospheric or an environmental sensor.

The sensor may be a thermoelectric sensor that senses or responds to a temperature or a temperature gradient of an object using conduction, convection, or radiation, and may consist of, or comprise, a Positive Temperature Coefficient (PTC) thermistor, a Negative Temperature Coefficient (NTC) thermistor, a thermocouple, a quartz crystal, or a Resistance Temperature Detector (RTD). A radiation-based sensor may respond to radioactivity, nuclear radiation, alpha particles, beta particles, or gamma rays, and may be based on gas ionization.

The sensor may be a photoelectric sensor that responds to a visible or an invisible light or both, such as infrared, ultraviolet, X-rays, or gamma rays. The photoelectric sensor may be based on the photoelectric or photovoltaic effect, and consists of, or comprises, a semiconductor component such as a photodiode, a phototransistor, or a solar cell. The photoelectric sensor may be based on Charge-Coupled Device (CCD) or a Complementary Metal-Oxide Semiconductor (CM OS) element. The sensor may be a photosensitive image sensor array comprising multiple photoelectric sensors, and may be operative for capturing an image and producing an electronic image information representing the image, and may comprise one or more optical lens for focusing the received light and mechanically oriented to guide the image, and the image sensor may be disposed approximately at an image focal point plane of the one or more optical lens for properly capturing the image. An image processor may be coupled to the image sensor for providing a digital data video signal according to a digital video format, the digital video signal carrying digital data video based on the captured images, and the digital video format may be according to, or based on, one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format) and DPOF (Digital Print Order Format) standards. A video compressor may be coupled to the image sensor for lossy or non-lossy compressing of the digital data video, and may be based on a standard compression algorithm such as JPEG (Joint Photographic Experts Group) and MPEG (Moving Picture Experts Group), ITU-T H.261, ITU-T H.263, ITU-T H.264, or ITU-T CCIR 601.

The sensor may be an electrochemical sensor and may respond to an object chemical structure, properties, composition, or reactions. The electrochemical sensor may be a pH meter or may be a gas sensor responding to the presence of radon, hydrogen, oxygen, or Carbon-Monoxide (CO). The electrochemical sensor may be a smoke, a flame, or a fire detector, and may be based on optical detection or on ionization for responding to combustible, flammable, or toxic gas.

The sensor may be a physiological sensor and may respond to parameters associated with a live body, and may be external to the sensed body, implanted inside the sensed body, attached to the sensed body, or wearable on the sensed body. The physiological sensor may be responding to body electrical signals such as an EEG Electroencephalography (EEG) or an Electrocardiogra sensor, or may be responding to oxygen saturation, gas saturation, or blood pressure.

The sensor may be an electroacoustic sensor and may respond to a sound, such as inaudible or audible audio. The electroacoustic sensor may be a an omnidirectional, unidirectional, or bidirectional microphone, may be based on the sensing the incident sound based motion of a diaphragm or a ribbon, and may consist of, or comprise, a condenser, an electret, a dynamic, a ribbon, a carbon, or a piezoelectric microphone.

The sensor may be an electric sensor and may respond to or measure an electrical characteristics or electrical phenomenon quantity, and may be conductively, non-conductively, or non-contact couplable to the sensed element. The electrical sensor may be responsive to Alternating Current (AC) or Direct Current (DC), and may be an ampermeter and respond to an electrical current passing through a conductor or wire. The ampermeter may consist of, or comprises, a galvanometer, a hot-wire ampermeter, a current clamp, or a current probe. Alternatively or in addition, the electrical sensor may be a voltmeter and may respond to or measure an electrical voltage. The voltmeter may consist of, or comprise, an electrometer, a resistor, a potentiometer, or a bridge circuit. The electrical sensor may be a wattmeter such as an electricity meter that responds to electrical energy, and may measure or respond to active electrical power. The wattmeter may be based on induction, or may be based on multiplying measured voltage and current.

The electrical sensor may be an impedance meter and may respond to the impedance of the sensed element such as bridge circuit or an ohmmeter, and may be based on supplying a current or a voltage and respectively measuring a voltage or a current. The impedance meter may be a capacitance or an inductance meter (or both) and may respond to the capacitance or the inductance of the sensed element, being measuring in a single frequency or in multiple frequencies. The electrical sensor may be a Time-Domain Reflectometer (TDR) and may respond to the impedance changes along a conductive transmission line, such as an optical TDR that may respond to the changes along an optical transmission line.

The sensor may be a magnetic sensor and may respond to an H or B magnetic field, and may consists of, or may be based on, a Hall effect sensor, a MEM S, a magneto-diode, a magneto-transistor, an A M R magnetometer, a GM R magnetometer, a magnetic tunnel junction magnetometer, a Nuclear precession magnetic field sensor, an optically pumped magnetic field sensor, a fluxgate magnetometer, a search coil magnetic field sensor, or a Superconducting Quantum Interference Device (SQUID) magnetometer. The magnetic sensor may be MEM S based, and may be a Lorentz force based MEM S sensor or may be an Electron Tunneling based MEM S.

The sensor may be a tactile sensor and may respond to a human body touch, and may be based on a conductive rubber, a lead zirconate titanate (PZT) material, a polyvinylidene fluoride (PV DF) material, a metallic capacitive element, or any combination thereof.

The sensor may be a single-axis, 2-axis, or 3-axis motion sensor and may respond to the magnitude, direction, or both, of the sensor motion. The motion sensor may be a piezoelectric, a piezoresistive, a capacitive, or a MEM S accelerometer and may respond to the absolute acceleration or the acceleration relative to freefall. The motion sensor may be an electromechanical switch and may consist of, or comprises, an electrical tilt, or a vibration switch.

The sensor may be a force sensor and may respond to the magnitude, direction, or both, of a force, and may be based on a spring extension, a strain gauge deformation, a piezoelectric effect, or a vibrating wire. The force sensor may be a dynamometer that responds to a torque or to a moment of the force.

The sensor may be a pressure sensor and may respond to a pressure of a gas or a liquid, and may consist of, or comprise, an absolute pressure sensor, a gauge pressure sensor, a vacuum pressure sensor, a differential pressure sensor, or a sealed pressure sensor. The pressure sensor may be based on a force collector, the piezoelectric effect, a capacitive sensor, an electromagnetic sensor, or a frequency resonator sensor.

The sensor may be an absolute, a relative displacement, or an incremental position sensor, and may respond to a linear or angular position, or motion, of a sensed element. The position sensor may be an optical type or a magnetic type angular position sensor, and may respond to an angular position or the rotation of a shaft, an axle, or a disk. The angular position sensor may be based on a variable-reluctance (VR), an Eddy-current killed oscillator (ECKO), a Wiegand sensing, or a Hall-effect sensing, and may be transformer based such as an RVDT, a resolver or a synchro. The angular position sensor may be an electromechanical type such as an absolute or an incremental, mechanical or optical, rotary encoder. The angular position sensor may be an angular rate sensor and may respond to the angular rate, or the rotation speed, of a shaft, an axle, or a disc, and may consist of, or comprise, a gyroscope, a tachometer, a centrifugal switch, a Ring Laser Gyroscope (RLG), or a fiber-optic gyro. The position sensor may be a linear position sensor and may respond to a linear displacement or position along a line, and may consist of, or comprise, a transformer, an LV DT, a linear potentiometer, or an incremental or absolute linear encoder.

The sensor may be a motion detector and may respond to a motion of an element, and may based on sound, geomagnetism, reflection of a transmitted energy, electromagnetic induction, or vibration. The motion detector may consist of, or comprise, a mechanically-actuated switch.

The sensor may be a strain gauge and may respond to the deformation of an object, and may be based on a metallic foil, a semiconductor, an optical fiber, vibrating or resonating of a tensioned wire, or a capacitance meter. The sensor may be a hygrometer and may respond to an absolute, relative, or specific humidity, and may be based on optically detecting condensation, or based on changing the capacitance, resistance, or thermal conductivity of materials subjected to the measured humidity. The sensor may be a clinometer and may respond to inclination or declination, and may be based on an accelerometer, a pendulum, a gas bubble in liquid, or a tilt switch.

The sensor may be a flow sensor and may measure the volumetric or mass flow rate via a defined area, volume or surface. The flow sensor may be a liquid flow sensor and may be measuring the liquid flow in a pipe or in an open conduit. The liquid flow sensor may be a mechanical flow meter and may consist of, or comprise, a turbine flow meter, a Woltmann meter, a single jet meter, or a paddle wheel meter. The liquid flow sensor may be a pressure flow meter based on measuring an absolute pressure or a pressure differential. The flow sensor may be a gas or an air flow sensor such as anemometer for measuring wind or air speed, and may measure the flow through a surface, a tube, or a volume, and may be based on measuring the air volume passing in a time period. The anemometer may consist of, or comprise, cup anemometer, a windmill anemometer, a pressure anemometer, a hot-wire anemometer, or a sonic anemometer.

The sensor may be a gyroscope for measuring orientation in space, and may consist of, or comprise, a MEM S, a piezoelectric, a FOG, or a VSG gyroscope, and may be based on a conventional mechanical type, a nanosensor, a crystal, or a semiconductor.

The sensor may be an image sensor for capturing an image or video, and the system may include an image processor for recognition of a pattern, and the control logic may be operative to respond to the recognized pattern such as appearance-based analysis of hand posture or gesture recognition. The system may comprise an additional image sensor, and the control logic may be operative to respond to the additional image sensor such as to cooperatively capture a 3-D image and for identifying the gesture recognition from the 3-D image, based on volumetric or skeletal models, or a combination thereof.

The sensor may be an image sensor for capturing still or video image, and the sensor or the system may comprise an image processor having an output for processing the captured image (still or video). The image processor (hardware or software based, or a hardware/software combination) may be encased entirely or in part in the first device, the router, the control server, or any combination thereof, and the control logic may respond to the image processor output. The image sensor may be a digital video sensor for capturing digital video content, and the image processor may be operative for enhancing the video content such as by image stabilization, unsharp masking, or super-resolution, or for Video Content Analysis (VCA) such as Video Motion Detection (VMD), video tracking, egomotion estimation, identification, behavior analysis, situation awareness, dynamic masking, motion detection, object detection, face recognition, automatic number plate recognition, tamper detection, video tracking, or pattern recognition. The image processor may be operative for detecting a location of an element, and may be operative for detecting and counting the number of elements in the captured image, such as a human body parts (such as human face or a human hand) in the captured image. An example of image processing for counting people is described in U.S. Pat. No. 7,466,844 to Arun Ramaswamy et al., entitled: "Methods and Apparatus to Count People Appearing in an Image", which is incorporated in its entirety for all purposes as if fully set forth herein.

The actuator may be a light source that emits visible or non-visible light (infrared, ultraviolet, X-rays, or gamma rays) such as for illumination or indication. The actuator may comprise a shade, a reflector, an enclosing globe, or a lens, for manipulating the emitted light. The light source may be an electric light source for converting electrical energy into light, and may consist of, or comprise, a lamp, such as an incandescent, a fluorescent, or a gas discharge lamp. The electric light source may be based on Solid-State Lighting (SSL) such as a Light Emitting Diode (LED) which may be Organic LED (OLED), a polymer LED (PLED), or a laser diode. The actuator may be a chemical or electro-chemical actuator, and may be operative for producing, changing, or affecting a matter structure, properties, composition, process, or reactions, such as producing, changing, or affecting an oxidation/reduction or an electrolysis reaction.

The actuator may be a motion actuator and may cause linear or rotary motion or may comprise a conversion mechanism (may be based on a screw, a wheel and axle, or a cam) for converting to rotary or linear motion. The conversion mechanism may be based on a screw, and the system may include a leadscrew, a screw jack, a ball screw or a roller screw, or may be based on a wheel and axle, and the system may include a hoist, a winch, a rack and pinion, a chain drive, a belt drive, a rigid chain, or a rigid belt. The motion actuator may comprise a lever, a ramp, a screw, a cam, a crankshaft, a gear, a pulley, a constant-velocity joint, or a ratchet, for affecting the produced motion. The motion actuator may be a pneumatic actuator, a hydraulic actuator, or an electrical actuator. The motion actuator may be an electrical motor such as brushed, a brushless, or an uncommutated DC motor, or a Permanent Magnet (PM) motor, a Variable reluctance (VR) motor, or a hybrid synchronous stepper DC motor. The electrical motor may be an induction motor, a synchronous motor, or an eddy current AC motor. The AC motor may be a single-phase A C induction motor, a two-phase A C servo motor, or a three-phase A C synchronous motor, and may be a split-phase motor, a capacitor-start motor, or a Permanent-Split Capacitor (PSC) motor. The electrical motor may be an electrostatic motor, a piezoelectric actuator, or a MEM S-based motor.

The motion actuator may be a linear hydraulic actuator, a linear pneumatic actuator, or a linear electric motor such as linear induction motor (LIM) or a Linear Synchronous Motor (LSM). The motion actuator may be a piezoelectric motor, a Surface Acoustic Wave (SAW) motor, a Squiggle motor, an ultrasonic motor, or a micro- or nanometer comb-drive capacitive actuator, a Dielectric or Ionic based Electroactive Polymers (EA Ps) actuator, a solenoid, a thermal bimorph, or a piezoelectric unimorph actuator.

The actuator may be operative to move, force, or compress liquid, gas or slurry, and may be a compressor or a pump. The pump may be a direct lift, an impulse, a displacement, a valveless, a velocity, a centrifugal, a vacuum, or a gravity pump. The pump may be a positive displacement pump such as a rotary lobe, a progressive cavity, a rotary gear, a piston, a diaphragm, a screw, a gear, a hydraulic, or a vane pump. The positive displacement pump may be a rotary-type positive displacement pump such as an internal gear, a screw, a shuttle block, a flexible vane, a sliding vane, a rotary vane, a circumferential piston, a helical twisted roots, or a liquid ring vacuum pump. The positive displacement pump may be a reciprocating-type positive displacement type such as a piston, a diaphragm, a plunger, a diaphragm valve, or a radial piston pump. The positive displacement pump may be a linear-type positive displacement type such as rope-and-chain pump. The pump may be an impulse pump such as a hydraulic ram, a pulser, or an airlift pump. The pump may be a rotodynamic pump, such as a velocity pump or a centrifugal pump, that may be a radial flow, an axial flow, or a mixed flow pump.

The actuator may be a sounder for converting an electrical energy to emitted audible or inaudible sound waves, emitted as omnidirectional, unidirectional, or bidirectional pattern. The sound may be audible, and the sounder may be an electromagnetic loudspeaker, a piezoelectric speaker, an electrostatic loudspeaker (ESL), a ribbon or a planar magnetic loudspeaker, or a bending wave loudspeaker. The sounder may be electromechanical or ceramic based, and may be operative to emit a single or multiple tones, and may be operative to continuous or intermittent operation. The sounder may be an electric bell, a buzzer (or beeper), a chime, a whistle or a ringer. The sounder may be a loudspeaker, and the system may be operative to play one or more digital audio content files (which may include a pre-recorded audio) stored entirely or in part in the second device, the router, or the control server. The system may comprise a synthesizer for producing the digital audio content. The sensor may be a microphone for capturing the digital audio content to play by the sounder. The control logic or the system may be operative to select one of the digital audio content files, and may be operative for playing the selected file by the sounder. The digital audio content may be music, and may include the sound of an acoustical musical instrument such as a piano, a tuba, a harp, a violin, a flute, or a guitar. The digital audio content may be a male or female human voice saying a syllable, a word, a phrase, a sentence, a short story or a long story. The system may comprise a speech synthesizer (such as a Text-To-Speech (TTS) based) for producing a human speech, being part of the second device, the router, the control server, or any combination thereof. The speech synthesizer may be a concatenative type, and may use unit selection, diphone synthesis, or domain-specific synthesis. Alternatively or in addition, the speech synthesizer may be a formant type, articulatory synthesis based, or hidden Markov models (HM M) based.

The actuator may be a monochrome, grayscale or color display for visually presenting information, and may consist of an array of light emitters or light reflectors. Alternatively or in addition, the display may be a visual retinal display or a projector based on an Eidophor, Liquid Crystal on Silicon (LCoS or LCOS), LCD, MEMS or Digital Light Processing (DL PTM) technology. The display may be a video display that may support Standard-Definition (SD) or High-Definition (HD) standards, and may be 3D video display. The display may be capable of scrolling, static, bold or flashing the presented information. The display may be an analog display having an analog input interface such as NTSC, PAL or SECAM formats, or analog input interface such as RGB, VGA (Video Graphics Array), SVGA (Super Video Graphics Array), SCART or S-video interface. Alternatively or in addition, the display may be a digital display having a digital input interface such as IEEE1394, FireWire™, USB, SDI (Serial Digital Interface), HDMI (High-Definition Multimedia Interface), DVI (Digital Visual Interface), UDI (Unified Display Interface), DisplayPort, Digital Component Video, or DVB (Digital Video Broadcast) interface. The display may be a Liquid Crystal Display (LCD) display, a Thin Film Transistor (TFT), or an LED-backlit LCD display, and may be based on a passive or an active matrix. The display may be a Cathode-Ray Tube (CRT), a Field Emission Display (FED), Electronic Paper Display (EPD) display (based on Gyricon technology, Electro-Wetting Display (EWD), or Electrofluidic display technology), a laser video display (based on a Vertical-External-Cavity Surface-Emitting-Laser (VECSEL) or a Vertical-Cavity Surface-Emitting Laser (VCSEL)), an Electroluminescent Display (ELD), a Vacuum Fluorescent Display (VFD), or a passive-matrix (PMOLED) or active-matrix OLEDs (AMOLED) Organic Light-Emitting Diode (OLED) display. The display may be a segment display (such as Seven-segment display, a fourteen-segment display, a sixteen-segment display, or a dot matrix display), and may be operative to only display digits, alphanumeric characters, words, characters, arrows, symbols, ASCII, non-ASCII characters, or any combination thereof.

The actuator may be a thermoelectric actuator (such as an electric thermoelectric actuator) and may be a heater or a cooler, and may be operative for affecting or changing the temperature of a solid, a liquid, or a gas object. The thermoelectric actuator may be coupled to the object by conduction, convection, force convention, thermal radiation, or by the transfer of energy by phase changes. The thermoelectric actuator may include a heat pump, or may be a cooler based on an electric motor based compressor for driving a refrigeration cycle. The thermoelectric actuator may be an induction heater, may be an electric heater such as a resistance heater or a dielectric heater, or may be solid-state based such as an active heat pump device based on the Peltier effect. The actuator may be an electromagnetic coil or an electromagnet and may be operative for generating magnetic or electric field.

The second device may comprise a signal generator that may signals, and may output or provide repeating or non-repeating electrical signal or signals. The actuator may consist of the signal generator. Alternatively or in addition, the signal generator may be coupled to control the actuator. The signal generator may be an analog signal generator and the analog signal generator output may be an analog voltage or an analog current, such as a sine wave, a sawtooth, a step (pulse), a square, or a triangular waveform. The analog signal generator output may be an Amplitude Modulation (AM), a Frequency Modulation (FM), or a Phase Modulation (PM) signal. The signal generator may be an Arbitrary Waveform Generator (AWG) or a logic signal generator. The signal generator may have a digital output for providing a digital pattern signal.

The system may implement redundancy, and the system may include one or more additional identical, similar, or different sensors that respond to or measure the phenomenon, one or more additional identical, similar, or different actuators that affect the phenomenon, one or more redundant identical to, similar to, or different from each other additional data paths, or any combination thereof. The redundancy may be based on Dual Modula redundancy (DMR), Triple Modular Redundancy (TMR), Quadruple Modular Redundancy (QMR), 1:N Redundancy, 'Cold Standby', or 'Hot Standby'. The system may include an additional sensor that respond to the phenomenon, and the control server may be operative to receive the additional sensor data, and to produce actuator commands in response to the received additional sensor digital data, and the control logic may at one time produce actuator commands in response only to the received additional sensor digital data. The system may include a fifth device in the building (or vehicle) comprising the additional sensor that responds to the same phenomenon, and the fifth device may be operative to transmit the additional sensor digital data to the router over one or more of the in-building (or in-vehicle) networks in the building (or vehicle). The system may include an additional actuator that affects the phenomenon, and the control server may be operative to transmit the additional actuator commands to the additional actuator. The control server may at one time be operative to transmit the additional actuator commands only to the additional actuator. The system may include a seventh device in the building (or vehicle) comprising the additional actuator that affects the phenomenon, the seventh device may be operative to receive and execute the additional actuator commands received from the router.

The system may comprise an eighth device that comprises a sensor that responds to a second phenomenon, the eighth device may be operative to transmit a sensor digital data corresponding to the second phenomenon to the router over the one or more in-building (or in-vehicle) networks. The second phenomenon may be of the same, or distinct from, the phenomenon above. The sensor of the eighth device may be of the same type, or distinct type, of the sensor of the first device. The eighth device may communicate with the router over the same, or distinct from, the in-building (or in-vehicle) network used by the first device.

The system may comprise a ninth device that comprises an actuator that affects a third phenomenon; the ninth device may be operative to receive actuator commands corresponding to the third phenomenon from the router over the one or more in-building (or in vehicle) networks. The third phenomenon may be of the same, or distinct from, the phenomenon above. The actuator of the ninth device may be of the same type, or distinct type, of the sensor of the second device. The ninth device may communicate with the router over the same, or distinct from, the in-building (or in-vehicle) network used by the second device.

The router, the first device, or the second device may be connectable to be powered from a power source, and may comprise a power supply couplable to the power source, such as a DC or AC power source. The power source may be external to, or housed with, the enclosure of the router, the first device, or the second device, and may be a primary or rechargeable battery, an electrical power generator for generating power from the phenomenon or from a distinct another phenomenon, an electromechanical generator for harvesting kinetic energy, a solar cell, or a Peltier-effect based thermoelectric device. The AC power source may be mains AC power, and the respective device may comprise an AC power connector connectable to an AC power outlet.

One or more of the in-building (or in-vehicle) networks may be a wired network having a cable carrying a communication signal, and the router, the first device, or the second device may comprise a connector for coupling to the cable. The cable may be connectable to simultaneously carry a DC or AC power signal, and the router, the first device, or the second device may be operative to supply at least in part of the power signal, or at least in part be powered from the power signal. The power signal may be carried over dedicated wires in the cable, and the wires may be distinct from the wires in the cable carrying the communication signal. Alternatively or in addition, the power signal and the communication signal may be carried over the same wires in the cable, and the connected device or devices may comprise a power/data splitter arrangement having first, second and third ports, and only the digital data signal may be passed between the first and second ports, and only power signal may be passed between the first and third ports, and the first port may be coupled to the connector. The power and digital data signals may be carried using Frequency Division/Domain Multiplexing (FDM), where the communication signal may be carried over a frequency band above and distinct from the power signal frequency or frequency band, and the power/data splitter may be comprising an HPF between the first and second ports and a LPF between the first and third ports. Alternatively or in addition, the power/data splitter may comprise a transformer and a capacitor connected to the transformer windings. The power and digital data signals may be carried using a phantom scheme, and the power/data splitter may comprise at least two transformers having a center-tap connection. The power and digital data signals may be carried substantially according to IEEE 802.3af-2003 or IEEE 802.3at-2009 standards.

Two devices out of the router, the first device, the second device, and the Internet-connected control server may be operative for communicating with each other using two, three or more multiple data paths. Two, three or more multiple data paths may be in part or fully distinct from each other, or of the same type. The multiple data paths may be using multiple networks, and at least two out of the multiple networks may be similar, identical, or different from each other. At least two out of the multiple networks may use similar, identical, or different network mediums, and at least two out of the multiple networks may use similar, identical, or different protocols, or at least two out of the multiple networks may be coupled to using similar, identical, or different physical layers. In one example, one network may be a wired network and at least one other network may be a wireless network. In one example, one network may be based on conductive medium and at least one other network may be based on non-conductive medium. The conductive medium may be coaxial cable, twisted-pair, powerlines, or telephone lines, and the non-conductive medium may be using RF, light or sound guided or over-the-air propagation. Two networks may be of different types selected from NFC, PAN, LAN, MAN, and WAN. Two networks may use different modulation schemes selected from AM, FM, and PM. Two networks may use different duplexing schemes selected from half-duplex, full-duplex, and unidirectional. Two networks may use different line codes or provide different data-rates. One network may be packet-based and at least one other network may be circuit-switched. One network may be a private network and at least one network may be public.

The router, the first device, the second device, or the Internet-connected control server, may be operative for communicating with another device in the system over multiple data paths. The router, the first device, the second device, or the Internet-connected control server, may comprise multiple network interfaces each associated with a respective data path and an associated data path network coupled to the network interface, and each of the network interface may comprise a transceiver or a modem for transmitting digital data to, and receiving digital data from, the respective network, and a network port for coupling to the respective network. Two or all out of the network interfaces may be of the same type, two or all out of the network interfaces may use similar, identical, or different transceivers or modems, and two or all out of the network interfaces may use similar, identical, or different network ports or connectors. Each of the connectors may be a coaxial connector, a twisted-pair connector, an AC power connector, a telephone connector.

One or more out of the data path networks may be based on a non-conductive medium, and each of the respective network ports may be non-conductive coupler such as an antenna, a light emitter, a light detector, a microphone, a speaker, and a fiber-optics connector. One or more of the data path networks may be based on a conductive medium, and each of the respective network port may be a connector, and one out of the data path networks may be based on a non-conductive medium, and the respective network port may be a non-conductive coupler. Two or more out of the modems may be of different scales such as NFC, PAN, LAN, MAN or WAN modems, may use different modulation schemes such as AM, FM, or PM, or may use different duplexing schemes such as half-duplex, full-duplex, or unidirectional. One of the modems may be packet-based and at least other one may be circuit-switched. One (or more) network port may be used by two distinct network interfaces, designated as first and second network interfaces, and the first and second network interfaces may be operative to communicate over the same network using FDM, where a first network interface may be using a first frequency band and the second network interface may be using a second frequency band, and the first and second frequency bands may be distinct from each other or in part or in whole overlapping over each other. The first and second network interfaces may comprise a first and a second filters for substantially passing only signals in the first and second frequency bands respectively.

The router, the first device, the second device, or the Internet-connected control server, may be operative to send a packet to another device via the one or more the network interfaces to be carried over the one or more data paths, the packet comprising a source address, a destination address, an information type, and an information content. The same packet may be sent via two or more, or via all of the network interfaces. The packet may be sent via one of the network interfaces selected by a fixed, adaptive, or dynamic selection mechanism, which may use, or be based on, distinct number that may be assigned to each of the network interfaces. The selection mechanism may be based on a cyclic selection, the network interfaces may be randomly selected, or the network interfaces may be selected based on the packet source or destination address. Alternatively or in addition, the assigned numbers may represent priority levels associated with the network interfaces, and the network interface having the highest priority level may be selected. The assigned numbers may be based on the associated networks types or attributes or the performance history, or on the current or past associated networks data rates, transfer delays, networks mediums or networks mediums types, qualities, duplexing schemes, line codes using, modulation schemes, switching mechanisms, throughputs, or usages. The one or more network interfaces may be selected based on the packet information type or based on the packet information content The second device may comprise a first electrically actuated switch coupled for connecting an electric signal to the actuator, and the electrically actuated switch may be actuated in response to the control commands. The electric signal may be a power signal from a power source, and the first electrically actuated switch ('normally open' type, 'normally closed' type, or a changeover type) may be coupled between the power source and the actuator. The first electrically actuated switch may be 'make-before-break' or 'break-before-make' type, may have two or more poles or two or more throws, and the switch contacts may be arranged as a Single-Pole-Double-Throw (SPDT), Double-Pole-Double-Throw (DPDT), Double-Pole-Single-Throw (DPST), or Single-Pole-Changeover (SPCO). The first electrically actuated switch may be a latching or non-latching type, solenoid-based electromagnetic relay such as a reed relay. The relay may be solid-state or semiconductor based, such as Solid State Relay (SSR), or may be based on an electrical circuit such as an open collector transistor, an open drain transistor, a thyristor, a TRIAC or an opto-isolator. The second device may comprise a second electrically actuated switch which may be connected in parallel or in series with the first electrically actuated switch.

The first device, the second device, or the router, may be integrated in part or entirely in an appliance. The appliance primary function may be associated with food storage, handling, or preparation, such as microwave oven, an electric mixer, a stove, an oven, or an induction cooker for heating food, or the appliance may be a refrigerator, a freezer, a food processor, a dishwashers, a food blender, a beverage maker, a coffeemaker, or a iced-tea maker. The appliance primary function may be associated with environmental control such as temperature control, and the appliance may consist of, or may be part of, an HVAC system, an air conditioner or a heater. The appliance primary function may be associated with cleaning, such as washing machine or clothes dryer for clothes cleaning, or a vacuum cleaner. The appliance primary function may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, mounting onto the same surface. The first device or the second device may be integrated with the router, such as being enclosed in the router housing.

One or more of the in-building (or in-vehicle) networks may be a Body Area Network (BAN) according to, or based on, IEEE 802.15.6 standard, and the router, the first device, or the second device may comprise a BAN interface that may include a BAN port and a BAN transceiver. The BAN may be a Wireless BAN (WBAN), and the BAN port may be an antenna and the BAN transceiver may be a WBAN modem. Alternatively or in addition, the external network or one or more of the in-building (or in-vehicle) networks may be a Personal Area Network (PAN) according to, or based on, Bluetooth™ or IEEE 802.15.1-2005 standards, and the router, the first device, or the second device may comprise a PAN interface, and the PAN interface may include a PAN port and a PAN transceiver. The PAN may be a Wireless PAN (WPAN), and the PAN port may be an antenna and the PAN transceiver may be a WPAN modem. The WPAN may be a wireless control network according to, or based on, Zigbee™ or Z-Wave™ standards, such as IEEE 802.15.4-2003.

The external network or one or more of the in-building (or in-vehicle) networks may be a Local Area Network (LAN), and the router, the first device, or the second device may comprise a LAN interface, and the LAN interface may include a LAN port and a LAN transceiver. The LAN may be an Ethernet-based wired LAN such as according to, or based on, IEEE 802.3-2008 standard, and the LAN port may be a LAN connector and the LAN transceiver may be a LAN modem. The wired LAN medium may be based on twisted-pair copper cables, and the LAN interface may be according to, or based on, 10Base-T, 100Base-T, 100Base-TX, 100Base-T2, 100Base-T 4, 1000Base-T, 1000Base-TX, 10G Base-CX 4, or 10GBase-T, and the LAN connector may be according to, or based on, RJ-45 type. The wired LAN medium may be based on an optical fiber, and the LAN interface may be according to, or based on, 10Base-FX, 100Base-SX, 100Base-BX, 100Base-LX 10, 1000Base-CX, 1000Base-SX, 1000Base-LX, 1000Base-LX 10, 1000Base-ZX, 1000Base-B X 10, 10G Base-SR, 10G Base-LR, 10GBase-LRM, 10 GBase-ER, 10GBase-ZR, or 10G Base-LX 4, and the LAN connector may be according to, or based on, a fiber-optic connector. The LAN may be a Wireless LAN (WLAN) such as according to, or base on, IEEE 802.11-2012, and the WLAN port may be a WLAN antenna and the WLAN transceiver may be a WLAN modem. The WLAN may be according to, or base on, IEEE 802.11a, IEEE 802.11b, IEEE 802.11g, IEEE 802.11n, or IEEE 802.11ac.

The external network or one or more of the in-building (or in-vehicle) networks may be a Home Network (HN), and the router, the first device, or the second device may comprise a HN interface that may includes a HN port and a HN transceiver. The HN may be a wired HN using a wired HN medium, and the HN port may be an HN connector, and the HN transceiver may be an HN modem. The wired HN medium may comprise a wiring primarily installed for carrying a service signal, and the wiring may be an in-wall wiring connected to by a wiring connector at a service outlet. The HN may be according to, or based on, a standard such as ITU-T Recommendation G.9954, ITU-T Recommendation G.9960, ITU-T Recommendation G.9970, IEEE 1901-2010, ITU-T Recommendation G.9961, or ITU-T Recommendation G.9972. The wiring may be a telephone wire pair, the service signal may be an analog telephone signal (POTS), the wiring connector may be a telephone connector, and the HN may be according to, or based on, HomePNA standard. Alternatively or in addition, the wiring may be a coaxial cable, the service signal may be a Cable Television (CATV) signal, the wiring connector may be a coaxial connector, and the HN may be according to, or based on, Multimedia over Coax Alliance (MoCA) standard. The wiring may be an AC power wires, the service signal may be an AC power signal, the wiring connector may be an A C power connector, and the HN may be according to, or based on, HomePlug™, HD-PLC, or Universal Powerline Association (UPA) standards.

The external network or one or more of the in-building (or in-vehicle) networks may be a Wide Area Network (WAN), and the router, the first device, or the second device may comprise a WAN interface that may include a WAN port and a WAN transceiver. The WAN may be a wired WAN, the WAN port may be a WAN connector, and the WAN transceiver may be a WAN modem. The wired WAN medium may comprise a wiring primarily installed for carrying a service signal to or within the building or vehicle. The wired WAN medium may comprise one or more telephone wire pairs primarily designed for carrying an analog telephone signal, and the external network or one or more of the in-building (or in-vehicle) networks may be based on Digital Subscriber Line/Loop (DSL) technology, such as A symmetric Digital Subscriber Line (ADSL) that may be according to, or based on, ANSI T1.413, ITU-T Recommendation G.992.1, or ITU-T Recommendation G.992.2, or ADSL2 that may be according to, or based on, ITU-T Recommendation G.992.3 or ITU-T Recommendation G.992.4. The external network or one or more of the in-building (or in-vehicle) networks may be based on Digital Subscriber Line/Loop (DSL) technology, such as ADSL2+that may be according to, or based on, ITU-T Recommendation G.992.5, or Very-high-bit-rate Digital Subscriber Line (V DSL) that may be according to, or based on, ITU-T Recommendation G.993.1 or ITU-T Recommendation G.993.2.

The wired WAN medium may comprise AC power wires primarily designed for carrying an AC power signal to, or within, the building (or vehicle), and the external network or one or more of the in-building (or in-vehicle) networks may be using Broadband over Power Lines (BPL) that may be according to, or based on, IEEE 1675-2008 or IEEE 1901-2010. The wired WAN medium may comprise coaxial cable primarily designed for carrying a CATV to, or within, the building (or vehicle), and the network may be using Data-Over-Cable Service Interface Specification (DOCSIS), that may be according to, or based on, ITU-T Recommendation J.112, ITU-T Recommendation J.122, or ITU-T Recommendation J.222. The wired WAN medium may comprise an optical fiber, and the WAN connector may be a fiber-optic connector, and the WAN may be based on Fiber-To-The-Home (FTTH), Fiber-To-The-Building (FTTB), Fiber-To-The-Premises (FTTP), Fiber-To-The-Curb (FTTC), or Fiber-To-The-Node (FTTN).

The WAN may be a wireless broadband network, and the WAN port may be an antenna and the WAN transceiver may be a wireless modem. The wireless network may be a satellite network, the antenna may be a satellite antenna, and the wireless modem may be a satellite modem. The wireless network may be a WiMAX network such as according to, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network and may use UMTS W-CDMA, UMTS HSPA, UMTS TDD, CDMA 2000 1×RTT, CDMA 2000 EV-DO, or GSM EDGE-Evolution. The cellular telephone network may be a Fourth Generation (4G) network and may use HSPA+, Mobile WiMAX, LTE, LTE-Advanced, M BWA, or may be based on IEEE 802.20-2008.

The external network or one or more of the in-building (or in-vehicle) networks may be a wireless network and may use a licensed or an unlicensed radio frequency band, such as the Industrial, Scientific and Medical (ISM) radio band. The external network or one or more of the in-building (or in-vehicle) networks may use unlicensed radio frequency band that may be about 60 GHZ, may be used for in-room (or in-vehicle) communication, may be based on beamforming, and may supports a data rate of above 7 Gb/s, and may be according to, or based on, WiGig™, IEEE 802.11ad, WirelessH DTM or IEEE 80215.3c-2009, may be operative to carry uncompressed video data, and may be according to, or based on, WHDI™. The wireless network may use a white space spectrum that may be an analog television channel consisting of a 6MHz, 7MHz or 8MHz frequency band, and allocated in the 54-806 MHz band. The wireless network may be operative for channel bonding, and may use two or more analog television channels, and may be based on Wireless Regional Area Network (WRAN) standard, and the wireless communication may couple a Base Station (BS) and one or more CPEs, and the wireless communication may be based on OFDMA modulation. The router, the first device, the second device, or the external server may serve as BS. Alternatively or in addition, the router, the first device, the second device, or the external server may serve as a CPE. The wireless communication may be based on geographically-based cognitive radio, and may be according to, or based on, IEEE 802.22 or IEEE 802.11af standards.

The wireless network may be based on, or according to, Near Field Communication (NFC) using passive or active communication mode, may use the 13.56 MHz frequency band, and data rate may be 106Kb/s, 212Kb/s, or 424 Kb/s, and the modulation may be Amplitude-Shift-Keying (ASK). The communication may be based on an NFC standard, and the wireless communication may couple an initiator and a target, and the router may serve as an initiator, and the first or second device may serve as a target or transponder. Alternatively or in addition, the first or second device, or the external server may serve as initiator or as a target or both, and the wireless communication may be according to, or based on, ISO/IEC 18092, ECMA-340, ISO/IEC 21481, or ECMA-352. The external network or one or more of the in-building networks may be packet-based or circuit switched network.

The router, the first device, the second device, the router, the control server, the sensor, the actuator, or any combination thereof, or any network interface, port, or any component or sub-system of the devices, may be addressable in a digital data network, such as the in-building (or in-vehicle) network, one or more of the external networks, a WAN, a LAN, a PAN, a BAN, a home network, or the Internet. The devices may be addressable using a digital address stored in a volatile or non-volatile memory in the respective device, uniquely identifying in the digital data network. The digital address may be a MAC layer address such as MAC-48, EUI-48, or EUI-64, or may be a layer 3 address such as static or dynamic IP address such as Pv4 or IPV6 type address. The digital address may be locally administered addresses or a universally administered address that is assigned during manufacturing. The digital address may be autonomously assigned by the addressed device or the address may be assigned by another device (e.g., using DHCP mechanism) via a communication interface over the in-building (or in-vehicle) networks or the external networks. The router, the first device, or the second device may addressable in one or more digital data networks using multiple digital addresses, each associated with a respective network interface.

The control logic may be affecting a control loop for controlling the phenomenon. The control loop may be a closed control loop, and the sensor data may serve as a feedback to command the actuator. The control loop may be a linear closed control loop and may be using proportional, integral, or derivative (or Proportional, Integral, and Derivative (PID)) of the loop deviation from a set-point or a reference. The control loop may use feed-forward, Bistable, fuzzy, Bang-Bang, or Hysteretic control, or may use fuzzy control based on fuzzy logic.

In one aspect, an apparatus for coupling between an internal network extending substantially within an enclosed environment (such as a building or a vehicle) and an external network, coupled to the Internet for communication with a control server and extending substantially outside the enclosed environment is disclosed. The apparatus may be used with (or include) a sensor disposed in the enclosed environment that senses a first condition in the enclosed environment and provides sensor data corresponding to the condition, and may be used with (or include) an actuator disposed to affect the first condition in the enclosed environment in response to received actuator commands. The apparatus may comprise in a single enclosure a first port for coupling to the internal network; a first modem coupled to the first port for communication over the internal network; a second port for coupling to the external network; a second modem coupled to the second port for communication over the external network; and a router coupled between the first and second modems so as to pass information between the internal and external networks, the router may be configured to deliver the sensor data from the internal network to the control server over the external networks and to deliver the actuator commands from the control server to the actuator over the internal network.

The apparatus may be a gateway, or may be operative for IP routing, NAT, DHCP, firewalling, parental control, rate converting, fault isolating, protocol converting or translating, or proxy serving. The apparatus may comprise in the single enclosure an additional sensor that senses a second condition that may be distinct from, or same as, the first condition, and may provide additional sensor data corresponding to the second condition, and the apparatus may transmit the additional sensor data to the control server over the external network, or over a network distinct from the external network. The apparatus may comprise in the single enclosure an additional actuator that affects a second condition that may be distinct from, or same as, the first condition, in response to received additional actuator commands, and the apparatus may receive the additional actuator commands from the control server over the external network or over a network distinct from the external network.

The apparatus may produce actuator commands in response to the sensor data according to control logic, and may deliver the actuator commands to the actuator over the internal network. The control logic may affect a control loop for controlling the condition, and the control loop may be a closed linear control loop where the sensor data serve as a feedback to command the actuator based on the loop deviation from a setpoint or a reference value that may be fixed, set by a user, or may be time dependent. The closed control loop may be a proportional-based, an integral-based, a derivative-based, or a Proportional, Integral, and Derivative (PID) based control loop, and the control loop may use feed-forward, Bistable, Bang-Bang, Hysteretic, or fuzzy logic based control. The control loop may be based on, or associated with, randomness based on random numbers; and the apparatus may comprise a random number generator for generating random numbers that may be hardware-based using thermal noise, shot noise, nuclear decaying radiation, photoelectric effect, or quantum phenomena. Alternatively or in addition, the random number generator may be software-based and may execute an algorithm for generating pseudo-random numbers. The apparatus may couple to, or comprise in the single enclosure, an additional sensor responsive to a third condition distinct from the first or second conditions, and the setpoint may be dependent upon the output of the additional sensor.

The apparatus may communicate over an outlet connected in-wall wiring used by the internal or the external network as a network medium. The single enclosure may consist of, comprise, or may be integrated with, the outlet or a plug-in module pluggable to the outlet. The outlet may be a telephone, LAN, AC power, or CATV outlet, and the in-wall wiring may respectively be a telephone wire pair, a LAN cable, an AC power cable, or a CATV coaxial cable, and the first or second modem may be operative to respectively communicate over the telephone wire pair, the LAN cable, the AC power cable, or the CATV coaxial cable. The in-wall wiring may carry a power signal, and the apparatus may at least in part be powered from the power signal.

The sensor may be a photosensitive image sensor array comprising multiple photoelectric sensors, for capturing an image and producing electronic image information representing the image, and the apparatus may comprise an image processor coupled to the image sensor for providing a digital video data signal that may carry digital video data based on the captured images, and may use a digital video format that may be based on one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. The apparatus may comprise an intraframe or interframe compression based video compressor coupled to the image sensor for lossy or non-lossy compressing the digital video data, and the compression may be based on a standard compression algorithm which may be JPEG (Joint Photographic Experts Group) and M PEG (Moving Picture Experts Group), ITU-T H.261, ITU-T H.263, ITU-T H.264, or ITU-T CCIR 601. The apparatus may calculate or provide a space-dependent characteristic of the sensed condition, such as a pattern, a linear density, a surface density, a volume density, a flux density, a current, a direction, a rate of change in a direction, or a flow, of the condition.

The internal or external network may use a cable carrying a communication signal, and the first or second port may consist of a connector for connecting to the cable, and the cable may be connectable to simultaneously carry a DC or AC power signal and the communication signal. The apparatus may supply at least in part of the power signal or may be at least in part powered from the power signal. The power signal may be carried over dedicated wires in the cable, and the wires may distinct from the wires in the cable carrying the communication signal. Alternatively or in addition, the power signal and the communication signal may be concurrently carried over the same wires in the cable, and the apparatus may comprise a power/data splitter arrangement having first, second and third ports, where only the communication signal may be passed between the first and second ports, and only the power signal may be passed between the first and third ports, and the first port may be coupled to the connector. The power and communication signals may be carried using Frequency Division Multiplexing (FDM), where the power signal may be carried over a power signal frequency or a power frequency band, and the communication signal may be carried over a frequency band above and distinct from the power signal frequency or the power frequency band, and the power/data splitter may consist or comprise an HPF between the first and second ports and a LPF between the first and third ports. Alternatively or in addition, the power/data splitter may comprise a transformer and a capacitor connected to the transformer windings. Alternatively or in addition, the power and digital data signals may be carried using a phantom scheme and the power/data splitter may comprise at least two transformers having a center-tap connection. Alternatively or in addition, the power and digital data signals may be carried substantially or entirely according to IEEE 802.3af-2003 or IEEE 802.3at-2009 standards.

The second port and the second modem may consist of (or be part of) a first network interface, for use with an additional external network and for communicating with the control server over multiple data paths. The apparatus may comprise a second network interface consisting of a third port for coupling to the additional external network, and a third modem coupled to the third port for communication over the additional external network. The first and second network interfaces may be of a same type, the external network interface may be based on a conductive medium, and the second port may be a connector that may be a coaxial connector, a twisted-pair connector, an AC power connector, or a telephone connector. Alternatively or in addition, the external network may use a non-conductive medium, and the second port may be a non-conductive coupler that may be an antenna, a light emitter, a light detector, a microphone, a speaker, or a fiber-optics connector. Alternatively or in addition, the external network may be based on conductive medium, the second port may be a connector, the additional external network may be based on a non-conductive medium, and the third port may be a non-conductive coupler. The second and third modems may be of different scales such as NFC, PAN, LAN, MAN or WAN modems, the second and third modems may use different modulation schemes such as AM, FM, or PM, the second and third modems may use different duplexing schemes such as half-duplex, full-duplex, or unidirectional, the second modem may be packet-based and the third modem may be circuit-switched, or the second port and the third port may be the same port used by both the first and second network interfaces. Alternatively or in addition, the first and second network interfaces may be operative to communicate over a same network using FDM, where the first network interface may be using a first frequency band and the second network interface may be using a second frequency band, that may be overlapping or non-overlapping with the first frequency band.

The first port and the first modem may consist of (or be part of) a third network interface, for use with an additional internal network and for communicating with the control server over multiple data paths. The apparatus may comprise a fourth network interface consisting of a fourth port for coupling to the additional external network, and a fourth modem coupled to the fourth port for communication over the additional internal network. The third and fourth network interfaces may be of a same type, the external network interface may be based on a conductive medium, and the second port may be a connector that may be a coaxial connector, a twisted-pair connector, an AC power connector, or a telephone connector. Alternatively or in addition, the external network may use a non-conductive medium, and the second port may be a non-conductive coupler that may be an antenna, a light emitter, a light detector, a microphone, a speaker, or a fiber-optics connector. Alternatively or in addition, the internal network may be based on conductive medium, the first port may be a connector, the additional internal network may be based on a non-conductive medium, and the fourth port may be a non-conductive coupler. The first and fourth modems may be NFC, PAN, LAN, MAN or WAN modems, the first and fourth modems may use different modulation schemes such as AM, FM, or PM, the first and fourth modems may use different duplexing schemes such as half-duplex, full-duplex, or unidirectional, the first modem may be packet-based and the fourth modem may be circuit-switched, or the first port and the fourth port may be the same port used by both the third and fourth network interfaces. Alternatively or in addition, the third and fourth network interfaces may be operative to communicate over a same network using FDM, where the third network interface may be using a first frequency band and the fourth network interface may be using a second frequency band, that may be overlapping or non-overlapping with the first frequency band.

The apparatus may send a packet to the control server via the network interfaces carried over two distinct data paths. The packet may comprise a source address, a destination address, an information type, and information content. The packet may be sent via the network interfaces (or both) selected by a fixed, adaptive, or dynamic selection mechanism. A distinct number may be assigned to each of the network interfaces, and the selection mechanism may use, or be based on, the assigned numbers that may represent priority levels associated with the network interfaces, and the network interface having the highest priority level may be selected. The network interfaces may be alternately or randomly selected. The assigned numbers may be based on the associated network types, attributes, or their performance history. Alternatively or in addition, the assigned numbers may be based on the current or past associated network data rates, transfer delays, networks mediums or network medium types, qualities, duplexing schemes, line codes, modulation schemes, switching mechanisms, throughputs, or usages. Alternatively or in addition, a network interface may be selected based on the packet source address, based on the packet destination address, based on the packet information type, or based on the packet information content.

The sensor transfer function may be characterized as S(s), the actuator transfer function may be characterized as C(s), the actuator command may be characterized as A(s), and the sensor data may be characterized as F(s). The apparatus may analyze the sensor data versus the actuator commands, such as calculating of F(s)/[S(s)*A(s)*C(s)], and may use the analysis to estimate or to determine a condition characteristic or parameter. The apparatus may periodically initiate and transmit actuator commands, and analyzes the sensor data versus the transmitted actuator commands. The apparatus may be integrated in part or entirely in an appliance.

The internal network may be a Body Area Network (BAN), a Personal Area Network (PAN), or a Local Area Network (LAN), the first port may respectively be a BAN, PAN, or LAN port, and the first modem may respectively be a BAN, PAN, or LAN modem. The LAN may be a wired LAN using a wired LAN medium; the LAN port may be a LAN connector; and the LAN transceiver may be a LAN modem. The LAN may be Ethernet based; and the wired LAN may be according to, or based on, IEEE 802.3-2008 standard. The external network may be a packet-based or a circuit-switched-based Wide Area Network (WAN), the second port may be a WAN port, and the second modem may be a WAN transceiver.

The enclosed environment may be a vehicle and the single enclosure may be attachable to the vehicle body. The apparatus may communicate with another vehicle or with a roadside unit external to the vehicle over the external network, and the condition may be in the vehicle, external to the vehicle, or associated with surroundings around the vehicle. The vehicle may be a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane. The apparatus may be coupled to monitor or control an Engine Control Unit (ECU), a Transmission Control Unit (TCU), an Anti-Lock Braking System (ABS), or Body Control Modules (BCM) of an automobile. The internal network may be a vehicle bus that may be according to, or based on, Control Area Network (CAN) or Local Interconnect Network (LIN). The vehicle may comprise an On-Board Diagnostics (OBD) system, and the apparatus may be coupled to or integrated with the OBD system, and may communicate to the control server an information regarding fuel and air metering, ignition system, misfire, auxiliary emission control, vehicle speed and idle control, transmission, on-board computer, fuel level, relative throttle position, ambient air temperature, accelerator pedal position, air flow rate, fuel type, oxygen level, fuel rail pressure, engine oil temperature, fuel injection timing, engine torque, engine coolant temperature, intake air temperature, exhaust gas temperature, fuel pressure, injection pressure, turbocharger pressure, boost pressure, exhaust pressure, exhaust gas temperature, engine run time, NOx sensor, manifold surface temperature, or a Vehicle Identification Number (VIN).

The system may be used to measure, sense, or analyze the changes over time of an environment, a phenomenon, or any controlled item. The measured item may be characterized by a transfer function P(s) impacted by an actuator (characterized as C(s)) and sensed by a sensor S(s). By generating or excitation of an actuator command A(s) and measuring the resulting sensor output F(s), the control logic or the system in general may measure, sense, estimate, or analyze the behavior or characteristic by analyzing or calculating P(s) =F(s)/[S(s)*A(s)*C(s)]. The calculation may be used to sense or measure a phenomenon that is not (or cannot be) directly measured or sensed by using a dedicated corresponding sensor, or as a sensor data for other control loops in the system, for setpoint adjustment of other control loop, or used for user notification. The control logic may initiate such measurement cycle periodically, upon power up, upon a user control (for example via a user device), or as part of a regular control.

In one aspect, a control system is disclosed, comprising a sensor disposed in an enclosed environment such as a building or a vehicle, that senses a condition in the enclosed environment and provides sensor response signals corresponding to the condition; an internal network extending substantially within the enclosed environment; an external network, coupled to the Internet, extending substantially outside the enclosed environment; a control server, disposed outside the enclosed environment, coupled to the Internet, the server receiving sensor data corresponding to the sensor response signals and executing control logic therein so as to generate actuator commands responsive to the received sensor data; a router coupled to the internal and external networks so as to pass information between the internal and external networks, and configured to deliver the sensor data from the internal to the external networks and to deliver the actuator commands from the external to the internal networks; and an actuator disposed within the enclosed environment, receiving the actuator commands from the router, the actuator operative to affect the condition in the enclosed environment.

The sensor transfer function may be characterized as S(s), the actuator transfer function may be characterized as C(s), the actuator command may be characterized as A(s), and the sensor data may be characterized as F(s). The control server is operative to analyze the sensor data versus the transmitted actuator commands, such as the calculating of F(s)/[S(s)*A(s)*C(s)]. The analysis may be used to estimate or determine a phenomenon characteristics or parameter, and may be used as an additional sensor data by the system or the control logic. The control logic may be operative for periodically initiating actuator commands and analyzing the sensor data versus the transmitted actuator commands.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments of the invention and are not therefore to be considered limiting in scope:

FIG. 12 depicts schematically a few food-related home appliances;

FIG. 14a illustrates the data paths and a schematic electrical diagram of a controller integrated with a router;

FIG. 17 illustrates a schematic flow-chart diagram of a general controller;

DETAILED DESCRIPTION

Figure 1:
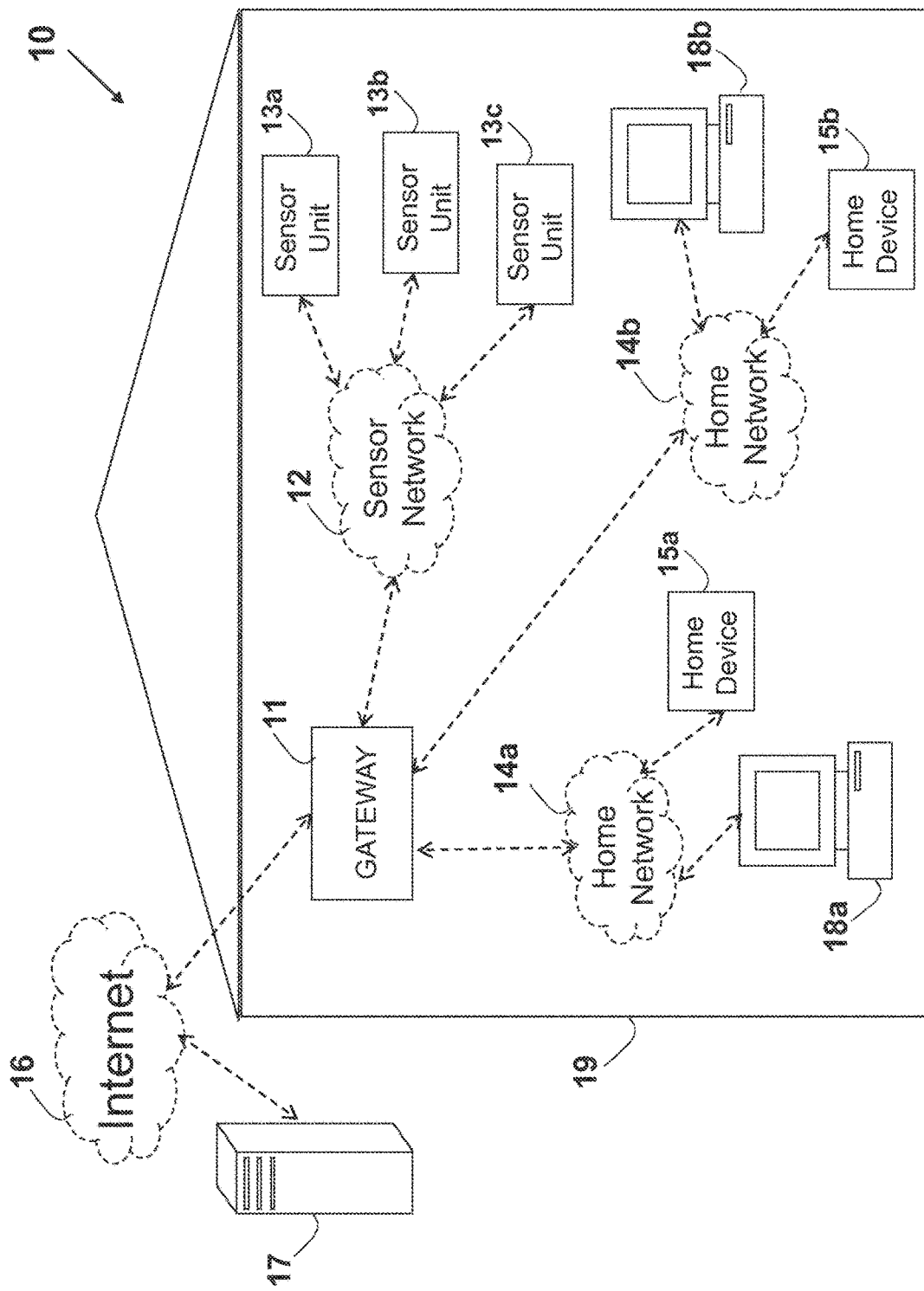
FIG. 1 illustrates a schematic electrical diagram of a home network system with a dedicated hardware-based gateway.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar, or having similar functionality. It will be readily understood that the components of the present invention, as generally described and illustrated in the figures herein, could be arranged and designed in a wide variety of different configurations.

Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a," "an," and "the" herein include plural referents unless the context clearly dictates otherwise. Thus, for example, reference to "a component surface" includes reference to one or more of such surfaces. By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Environment control networks are networks of sensors and controller which provide an optimized solution for an environment control. The environment can be a house, agricultural farm, city traffic systems etc. The sensors will provide information on the environmental conditions and events. The controller will allow automatic control or control by the user via the Internet. The system can allow automatic control upon detection of certain conditions or events. The lights can be turned on when a motion is detected in a room. The electricity may be turned off upon a fire and the water off upon a flood. The heating may be adjusted based on internet information on the weather or information on neighbor behavior. Users may be warned of problems in neighboring homes. The motion sensors can be adjusted to be more sensitive upon a detection of a security problem in a home nearby.

For an agricultural farm there can be a field network and cattle handling network. In the field, there can be a temperature sensor, ground humidity sensor. The irrigation system may be adjusted accordingly. It can also be impacted by cloud server information of last week rainfall and weather forecast. The cattle feeding system can use measurements of the cow weight, food left and cloud server information on weather forecast and cattle diseases. For the system, a network can be used for the transportation system of traffic lights and road sign.

Figure 2:
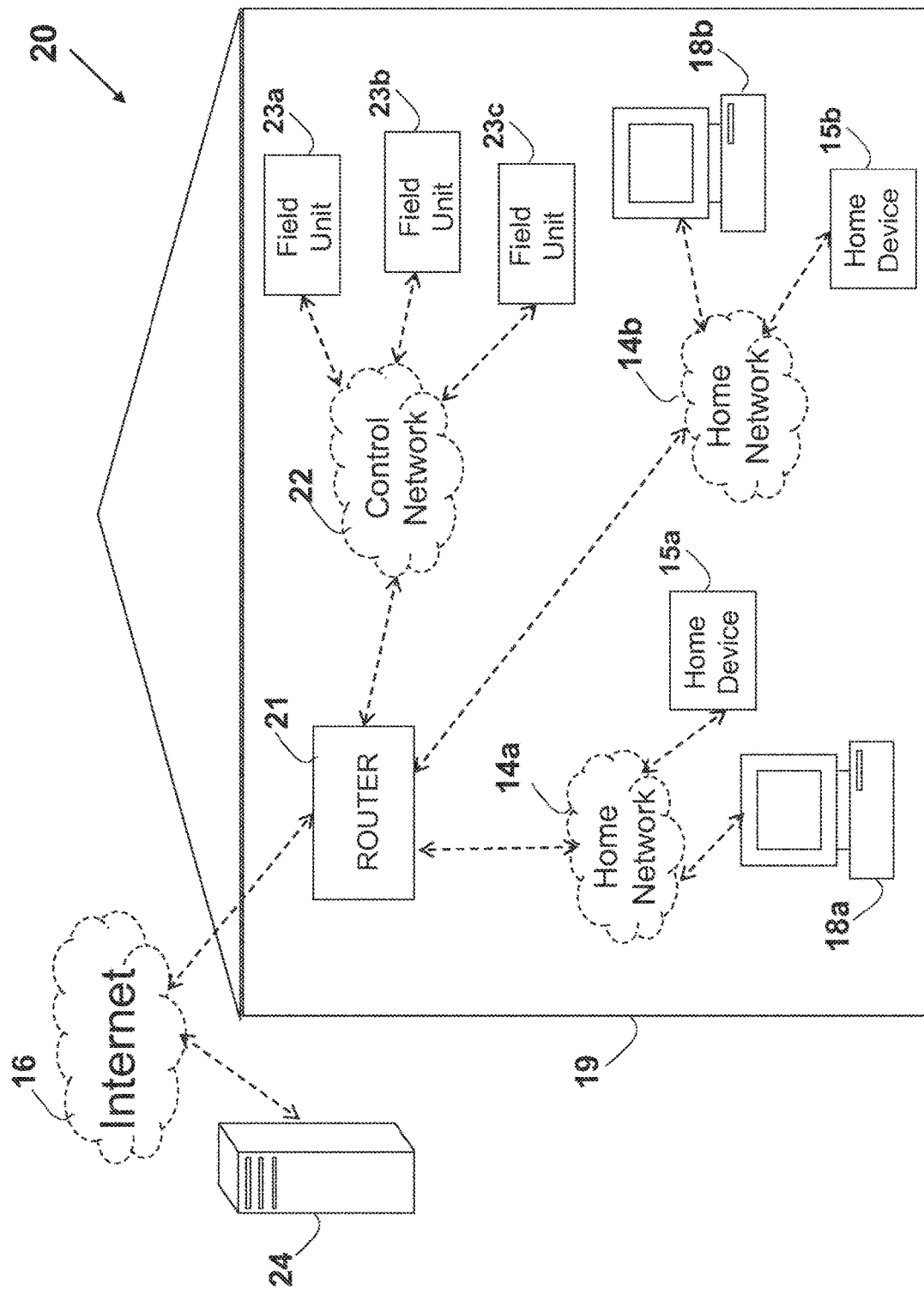
FIG. 2 illustrates a schematic electrical diagram of a system with a cloud based gateway.

FIG. 2 shows an arrangement 20 including a residence 19 which may be connected via the Internet 16 to many multiple servers. For non-limiting example, the gateway server 24 (corresponding to gateway server 48 described below) may be associated with a specific premises 19. In the premises 19 there may be multiple internal networks, such as home network 14a connecting the desktop computer 18a and a home device 15a, and other connected equipment may as well be connected. Similarly, home network 14b is shown connecting desktop computer 18b and a home device 15b, and other connected equipment may as well be connected. A control network 22 may be used, connecting field units 23a, 23b and 23c Each of the field units 23 may correspond to a sensor unit 50, actuator unit 60, or a sensor/actuator unit 70 described below. The control network may be a ZigBee based sensor network. A router 21, corresponding with router 49 described below, is connected, via suitable ports, to the various networks in the residence 19, and allows communication between devices in one or all of the networks, between the networks in the residence 19, and provides external connection to the Internet 16, typically via a WAN network. While three internal networks 22 14a and 14bare shown in arrangement 20, one, two, four, or any number of such internal networks may be equally deployed. The various networks inside the premises 19 may be the same, similar or different. For non-limiting example, the same or different network mediums may be used, such as wired or wireless networks, and the same or different network protocols may be used. Further, each of the networks may be a LAN (Local Area Network), a WLAN (Wireless LAN), a PAN (Personal Area Network), or a WPAN (Wireless PAN).

Figure 3:
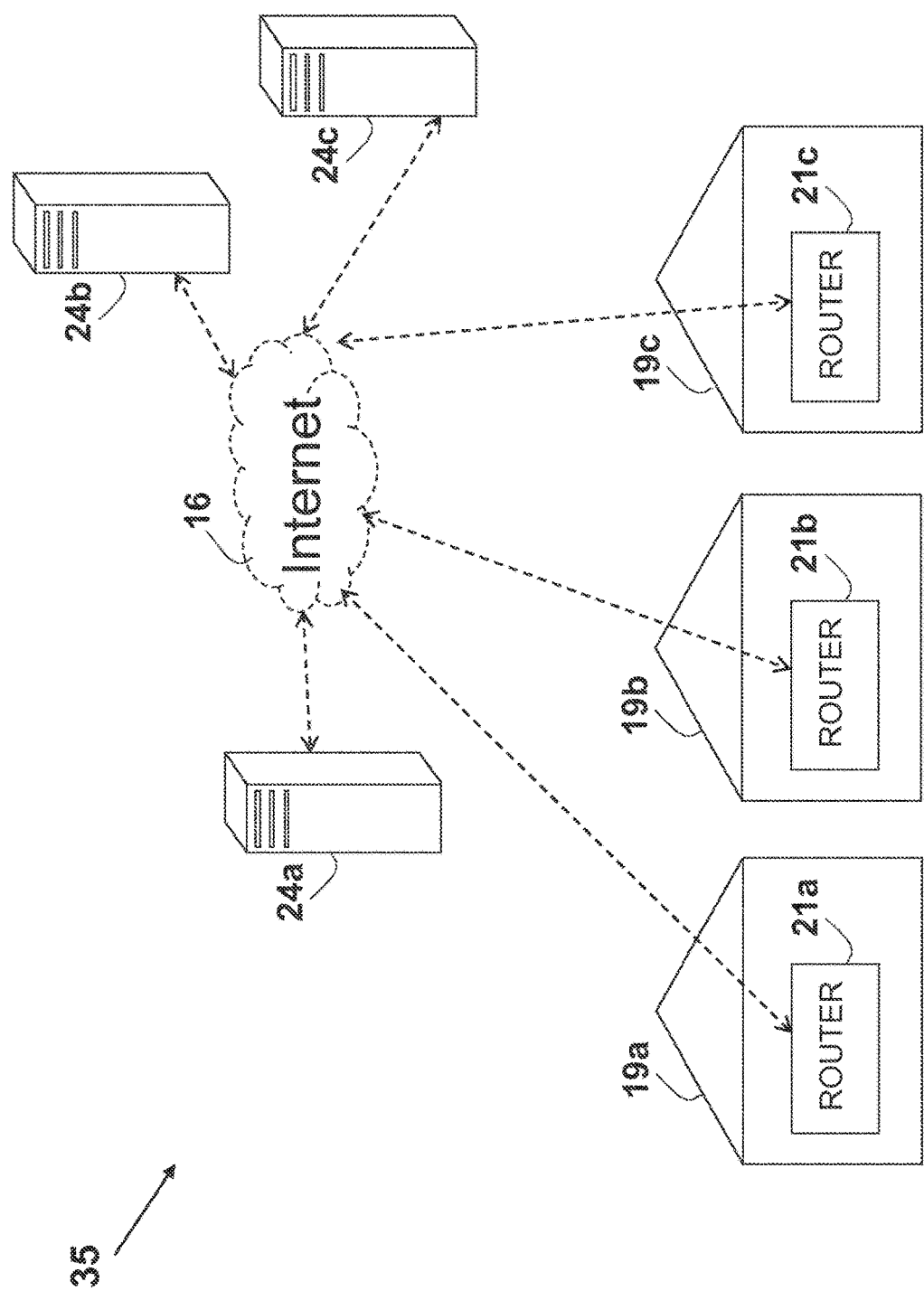
FIG. 3 illustrates a schematic electrical diagram of multiple cloud gateways serving several houses.
Figure 3A:
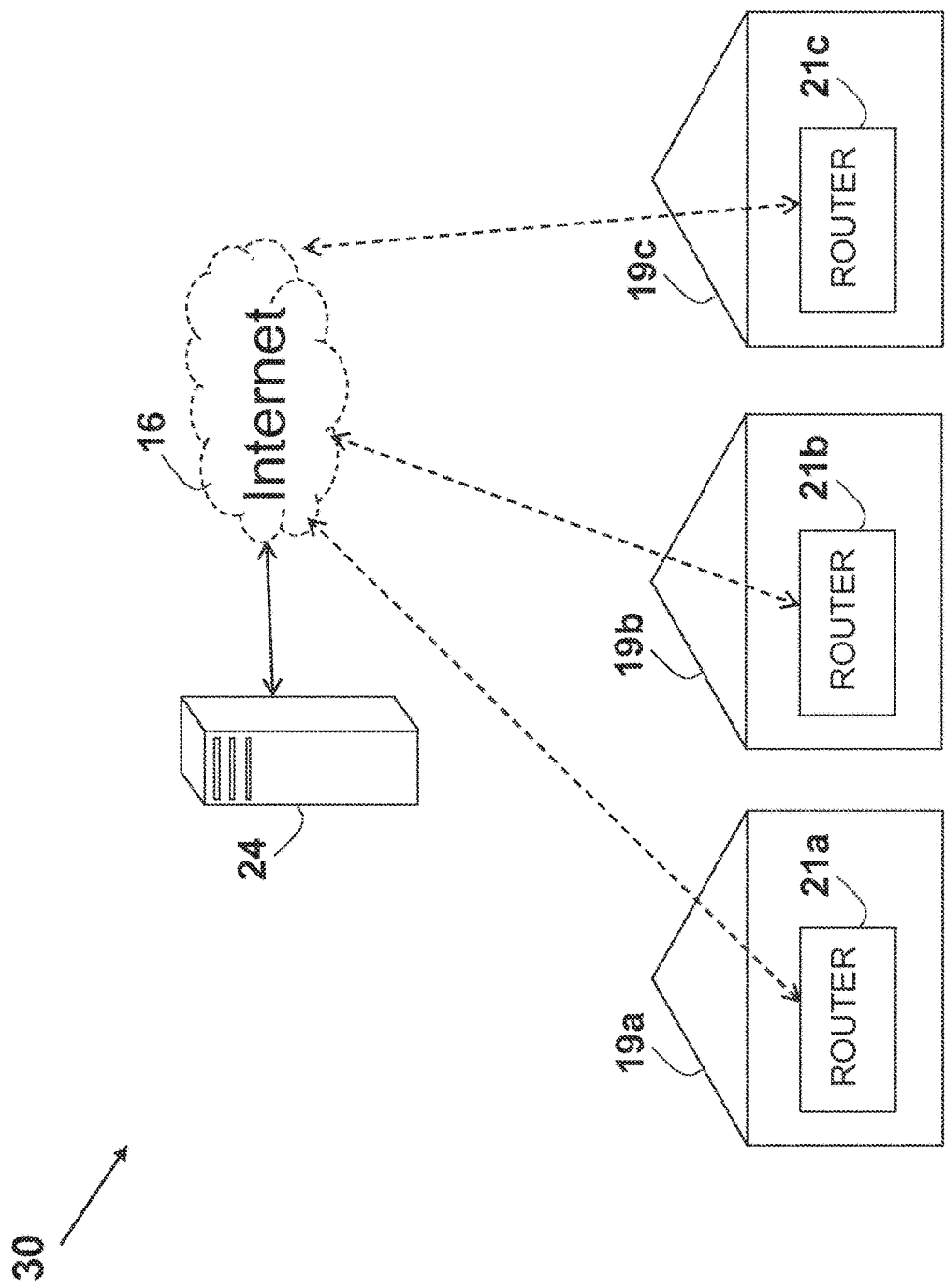
FIG. 3a illustrates a schematic electrical diagram of a single cloud gateway serving several houses.

In one non-limiting example, where multiple premises 19 are involved, each of the premises 19 is associated with a single and dedicated gateway server 24 (referred herein also as 'cloud server' and 'control server'). Such scenario is exampled in an arrangement 35 shown in FIG. 3. Three premises 19a, 19b, and 19c, each respectively having routers 21a, 21b, and 21c, are connected via the Internet 16 to be served by three respective gateway servers 24a, 24b, and 24c While three houses 19 are exampled in FIG. 3, any number of premises 19 may be equally employed. Alternatively or in addition, two, three or more premises 19 may share a single gateway server 24, as exampled in arrangement 30 in FIG. 3a, where three premises 19a, 19b, and 19c, each respectively having routers 21a, 21b, and 21c, are connected via the Internet 16 to a single gateway server 24.

Part or the entire of gateway functionalities in general, or part or the entire of Residential Gateway (RG) (a.k.a. home gateway) functionalities in particular, may be implemented in the router 21, serving as gateway 11 above, for example the gateway and the functionalities described in U.S. Patent Application No. 2007/0112939 to Wilson et al., entitled: "System and Method for Home Automation", and in U.S. Pat. No. 7,213,061 to Hite et al., entitled: "Internet Control System and Method", which are both incorporated in their entirety for all purposes as if fully set forth herein. Alternatively or in addition, part or the entire of the gateway functionalities may be moved onto the gateway server 24. Further, part or the entire of the gateway functionalities may be implemented by another entity in the building, such as the PC 18a, home device 15b, or a field unit 23 Furthermore, the gateway functionalities may be distributed and implemented by a combination of the gateway server 24, router 21 PC 18a, home device 15b, or a field unit 23, where each of the devices implements none, one, or a subset of the gateway functionalities, such as IP routing, VoIP, NAT, DHCP, firewall, parental control, rate converter, fault isolation, protocol conversion/translation/mapping, or proxy server. The router 21 may further be according to, or based on, the white paper entitled: "Home Gateway" by Wipro Technologies, or may be according to, or based on, the Home Gateway Initiative (HGI) documents entitled: "Home Gateway Technical Requirements: Residential Profile", Version 1.0, HGI guideline paper entitled: "Remote Access" Version 1.01, and HGI document entitled: "Requirements for an energy efficient home gateway" HGI-RD 009-R3, which are all incorporated in their entirety for all purposes as if fully set forth herein.

Figure 4:
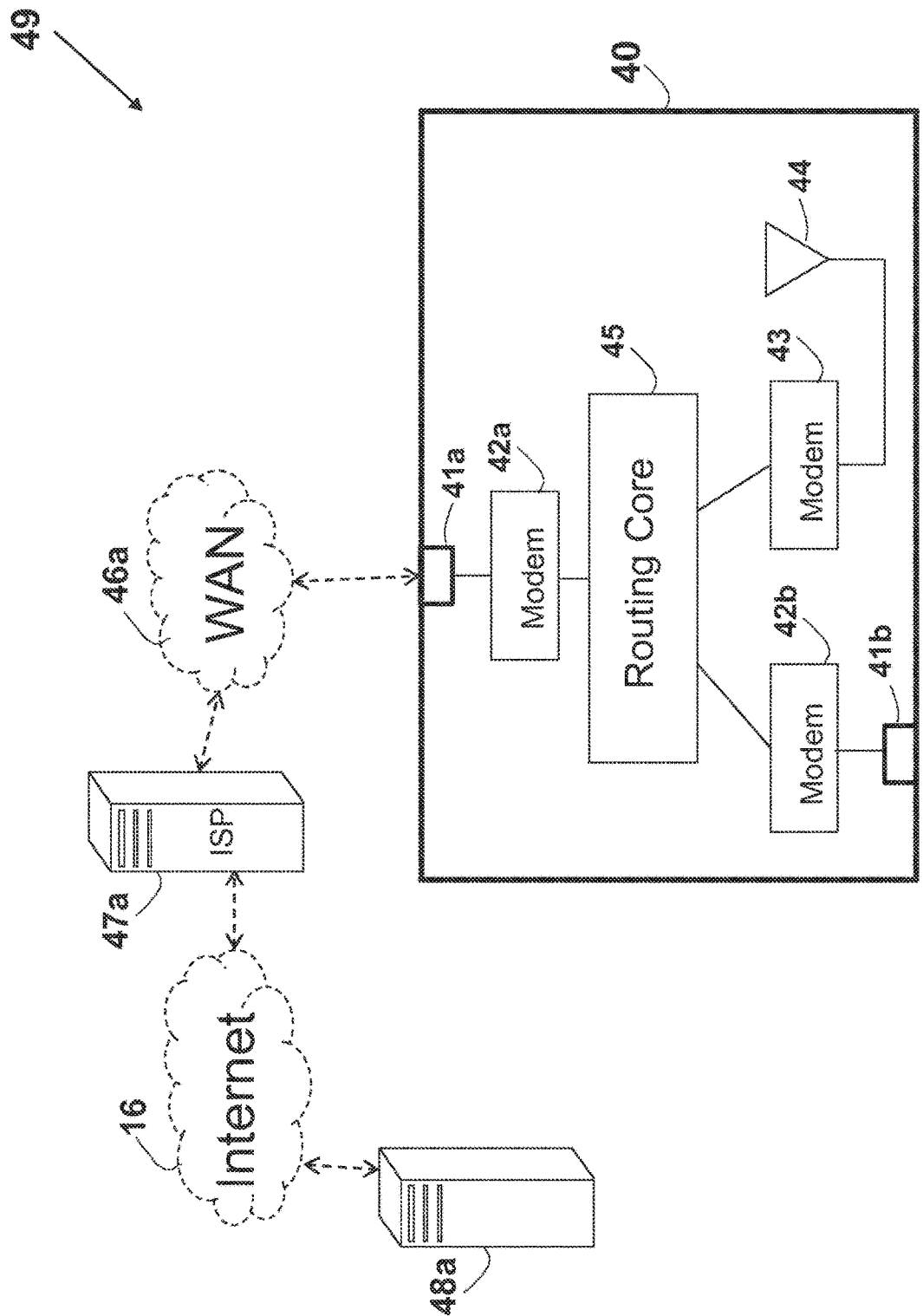
FIG. 4 illustrates a schematic electrical diagram of a router connected to a cloud-based gateway.

FIG. 4 illustrates a schematic block diagram of an arrangement 49 including a router 40. The router 40 serves an intermediary device for allowing communication between the various in home networks, such as wireless sensor network and a home network, and between the in-home devices and one (or more) server via the Internet 16 Coupling to each network commonly involves a port and a transceiver (which may be a modem) adapted for communication over the network medium. The connection to the Internet or to any other network external to the premises may include one or more WAN interfaces. A wired connection to the Internet may include a connector 41a connected to a wired modem 42a In case of a wireless interface, the connector 41a is substituted with an antenna and the wired modem 42a is substituted with a suitable wireless modem (or a transceiver). Similarly, each connection to any premises internal network includes one or more interfaces. A wired connection to an internal network (e.g., wired home network) may include a connector 41b connected to a wired modem 42b. A wireless connection to an internal network (e.g., wireless sensor network) may include an antenna 44 connected to a wireless modem 43.

The router 40 commonly includes a microprocessor executing a firmware embedded in the device. However, a router may include whole or part of a computer such as the computer 130 shown in FIG. 13 below. The router 40 may include part or all of the functionalities associated with a conventional router in general, and home router in particular. The basic functionality of a packet router is the act of moving information across an internetwork from a source to a destination, based on the addresses embedded in the packets, performed by the routing core 45. Commonly a router supports OSI Layer 3 (the Network Layer), but may also support bridging functionality at OSI Layer 2 (the Link Layer). The router commonly uses headers and forwarding tables to determine the best path for forwarding the data packets, and they also use protocols such as ICM P to communicate with each other and configure the best route between any two hosts. The router may also support NAT (Network Address Translation), allowing multiple devices to share a single IP address on the Internet. Internet connection sharing routers may also support an SPI firewall and may serve as a DHCP Server. The wireless router may also provide features relevant to wireless security such as WiFi Protected Access (WPA) and wireless MAC address filtering. Additionally, the wireless router may be configured for "invisible mode" so that the internal wireless network cannot be scanned by outside wireless clients. However, the router 40 may support also part of, or whole of a gateway related functionalities, and in particular a home gateway ('residential gateway') typical functionalities. The router 40 may convert between different protocols of the interconnected networks, and typically directs the packets between networks based on a routing table or routing policy, which are built to offer the preferred routes.

FIG. 4 further shows a typical connection of premises to a gateway server 48a via the Internet 16 The router 40 connects via a WAN port, such as the connector 41a to a WAN (Wide Area Network) 46a, to an ISP (Internet Service Provider) 47a The ISP 47a connects to the gateway server 48a via the Internet 16

The ISP 47a is commonly a company that provides Internet services, including personal and business access to the Internet. For a monthly fee, the service provider usually provides a software package, username, password and access phone number. Access ISPs directly connect clients to the Internet using copper wires, wireless or fiber-optic connections. Hosting ISPs lease server space for small businesses and other people (collocation). Hosting ISPs routinely provide email, FTP, and web-hosting services. Other services include virtual machines, clouds, or entire physical servers where customers can run their own custom software. Transit ISPs provide large amounts of bandwidth for connecting hosting ISPs to access ISPs.

Figure 4A:
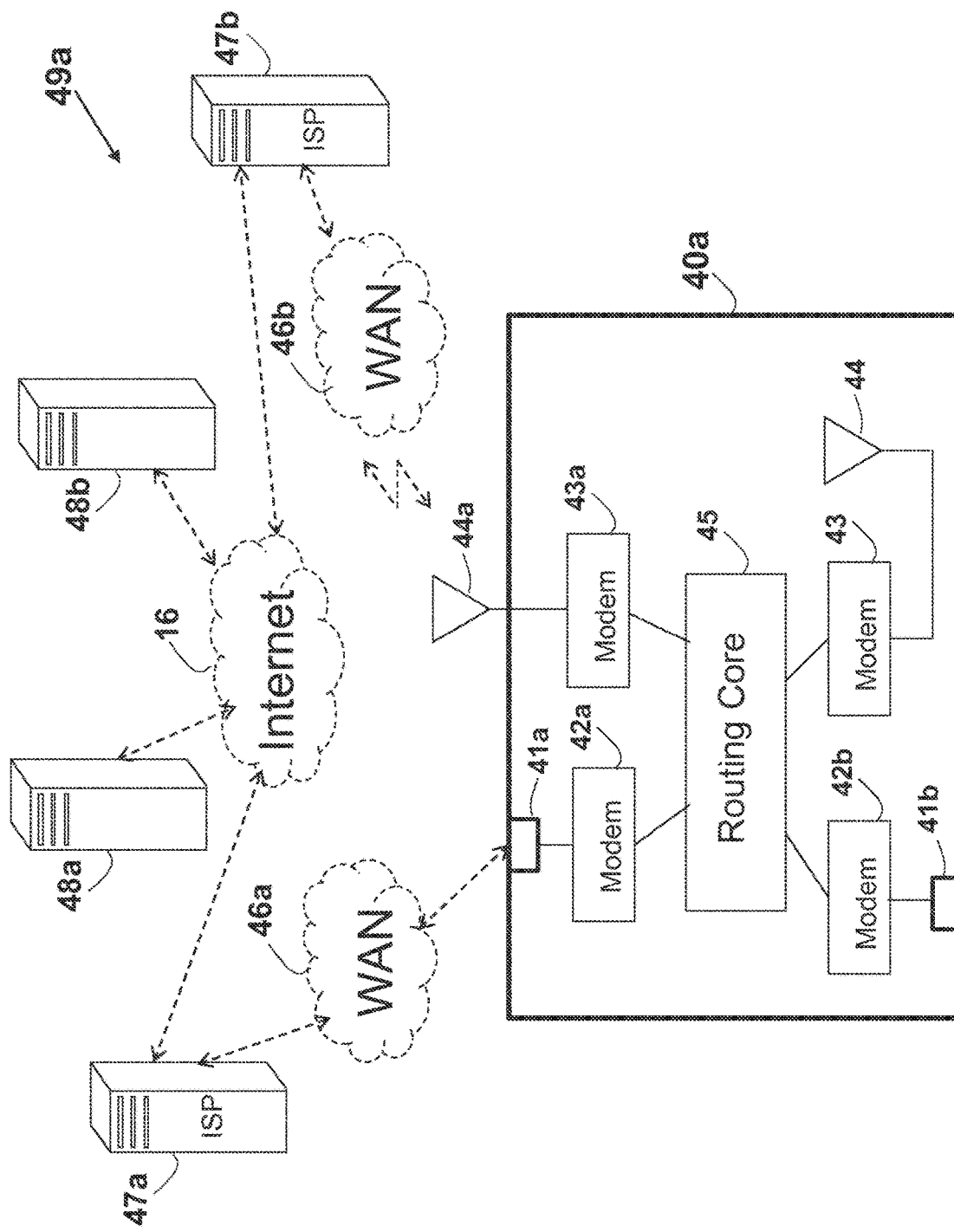
FIG. 4a illustrates a schematic electrical diagram of a router connected to multiple cloud-based gateways.
Figure 4B:
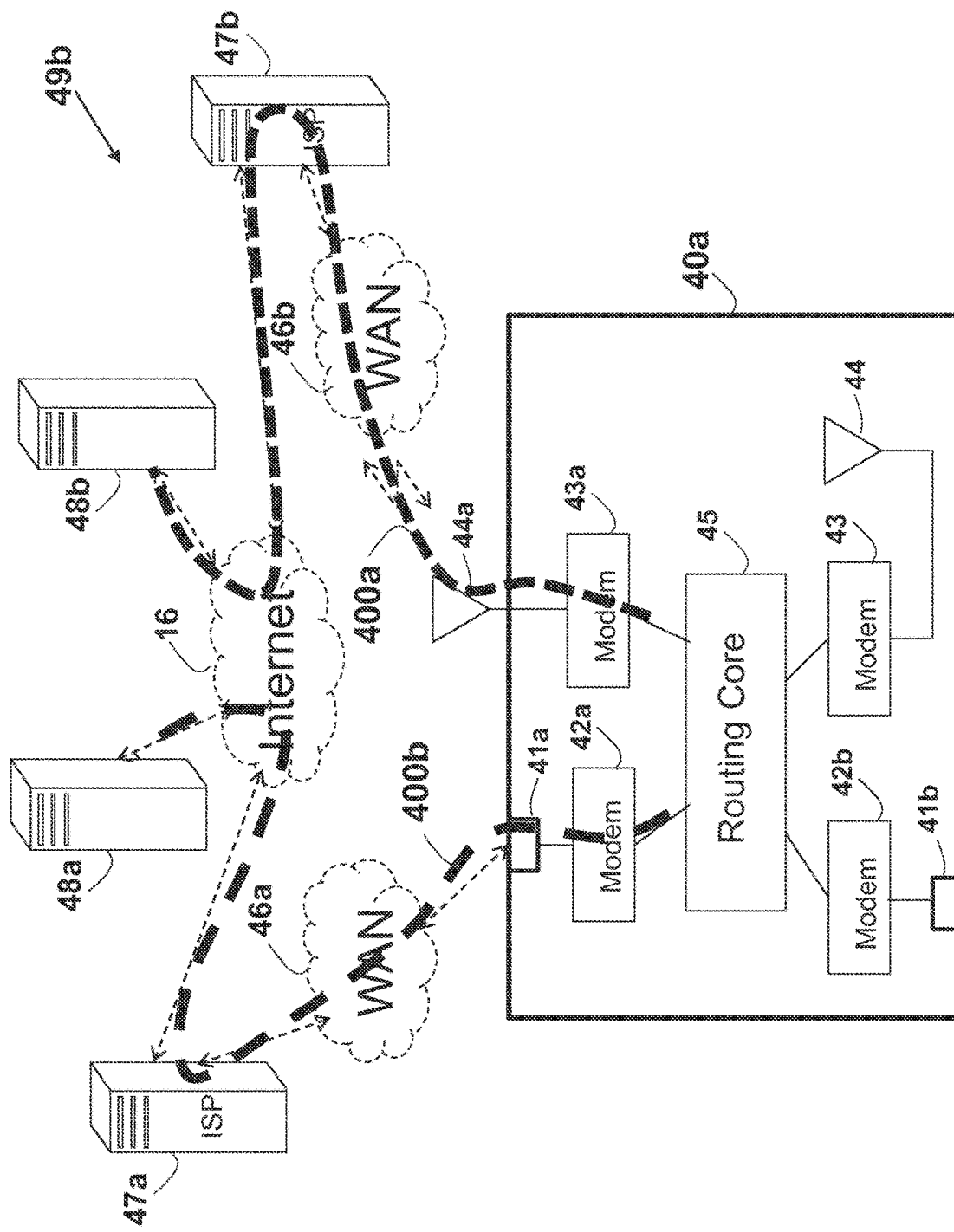
FIG. 4b illustrates the data paths and a schematic electrical diagram of a router connected to multiple cloud-based gateways.

In order to increase reliability and availability of the external system involving the connection of the premises to the gateway server, a redundancy may be used, relating to the duplication of critical components or functions of a system with the intention of increasing reliability of the system, usually in the case of a backup or fail-safe. A non-limiting example of implementation of such redundancy is shown as arrangement 49a in FIG. 4a. In addition to the router 40a connection to the gateway server 48a via the ISP 47a and the WAN 46a, the router 40a is also connected to another ISP 47b (or different systems of the same ISP) via WAN 46b, connected via a wireless modem 43a and antenna 44a The ISP 47b in turn connects to the gateway server 48b via the Internet 16 In one non-limiting example, the hardware and software (or firmware), as well as the communication medium, associated with the communication route relating to the connection to the gateway server 48a are distinct and different from the hardware, software (or firmware), and the communication medium of the communication route used for connecting the router 40a to the gateway server 48b. The two formed routes, designated as routes 400a and 400b in arrangement 49b shown in FIG. 4b, are thus independent, hence in the case of any failure in one of the communication routes, the other route may still provide the required connection and the system functionality is preserved, thus a single point of failure (SPOF) therein renders the system fully functional. While two independent routes are shown in FIG. 4a, three or more routes may be equally used, further enhancing the reliability and availability of the system. For each additional route, preferably a port and associated modem is added to the router 40a, for communication with a gateway server via additional WAN and additional ISP.

While router 40 awas exampled in FIG. 4a to include one wired WAN connection (connector 41a and wired modem 42a) and one wireless WAN connection (antenna 44a and wireless modem 43a), any two (or more) WAN connections may be used, and the WAN connections may be identical, similar or different from each other. Further, one or more of the WANs 46a and 46b may be replaced with a LAN, WLAN, or any other network allowing for connection to a gateway server 48 over the Internet 16, or over any other network.

Figure 4C:
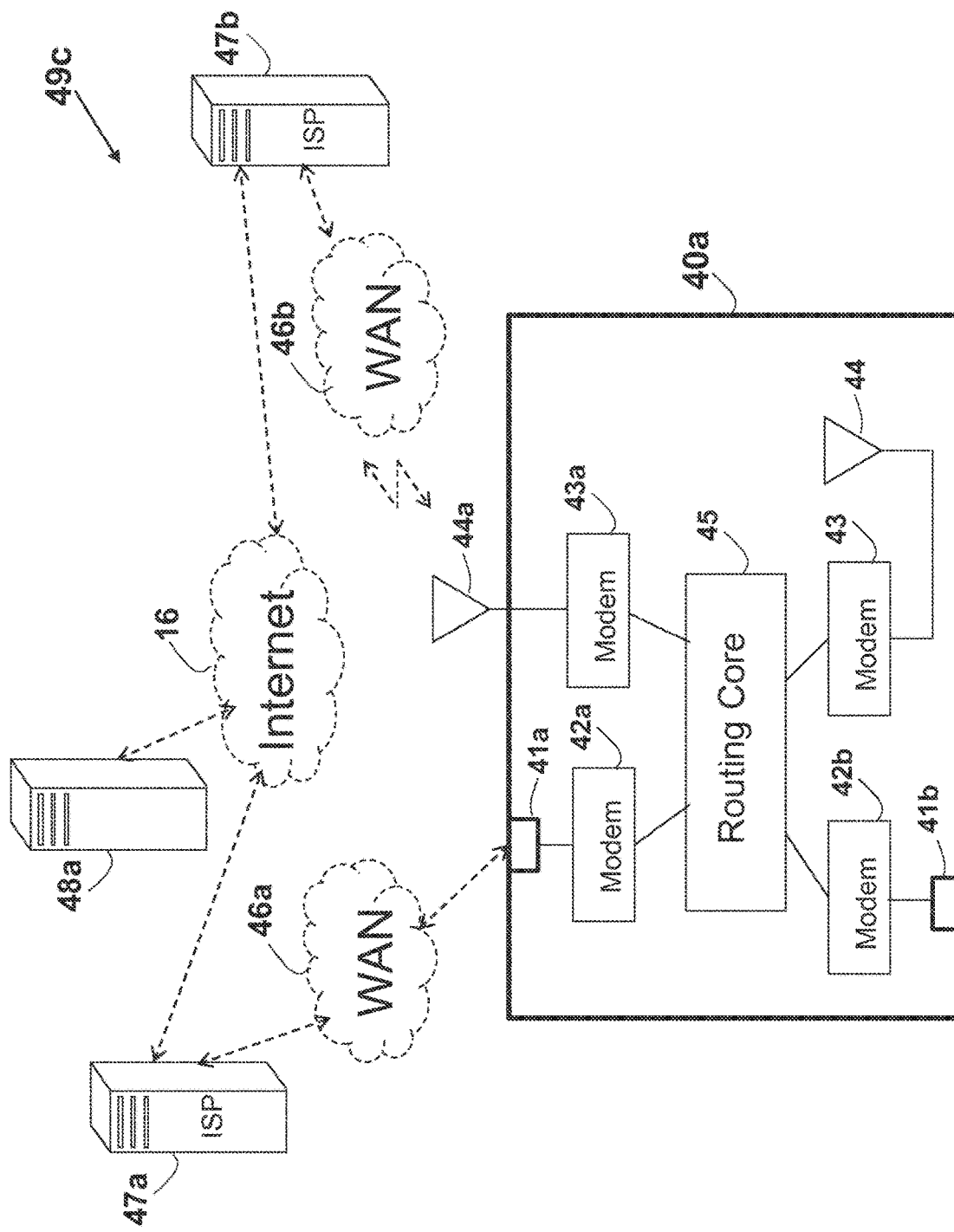
FIG. 4c illustrates a schematic electrical diagram of a router connected to a cloud-based gateway via multiple ISPs.
Figure 4D:
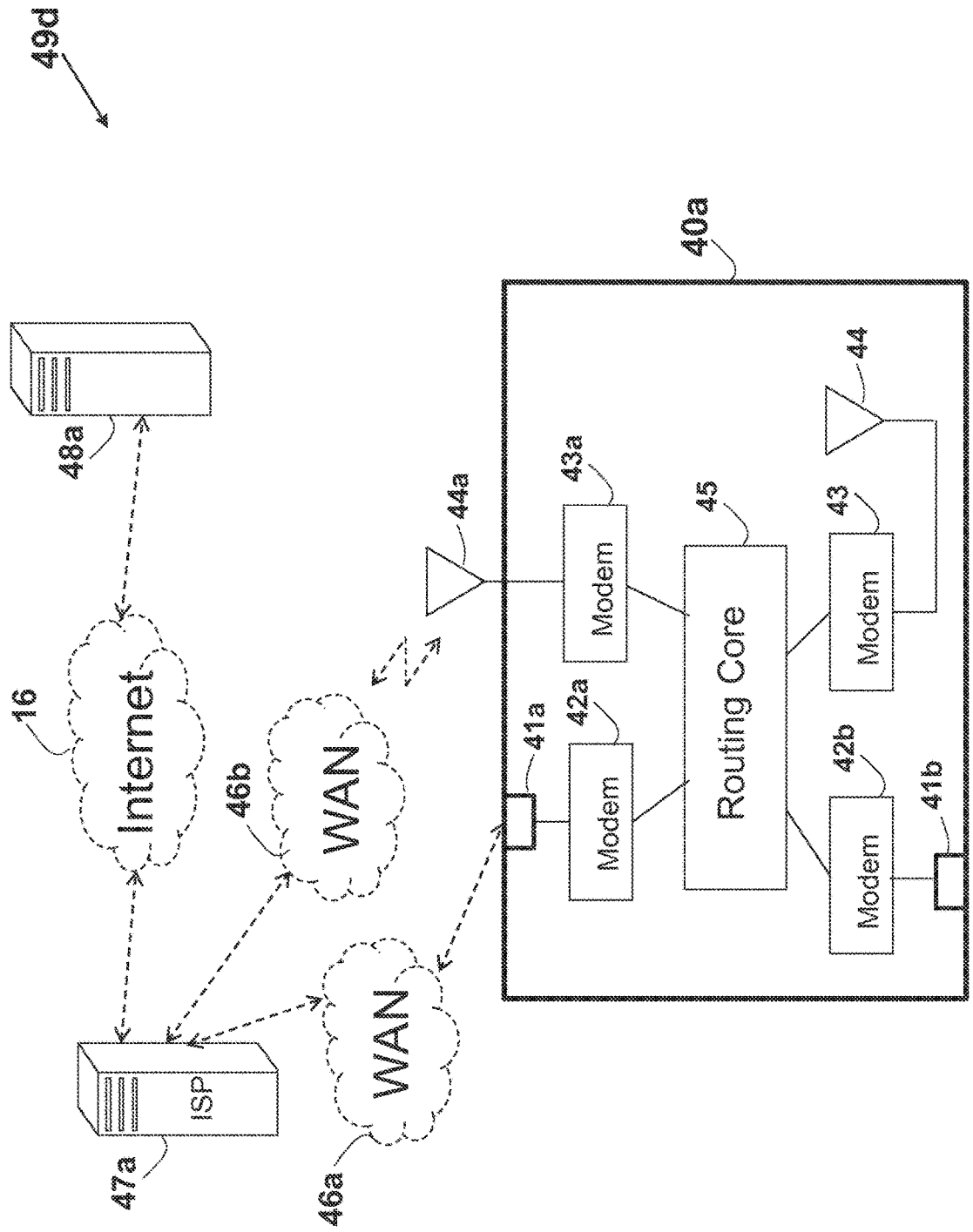
FIG. 4d illustrates a schematic electrical diagram of a router connected to a cloud-based gateway via an ISP.

In one non-limiting example, only part of the communication routes and the associated hardware and/or software (such as routes 400a and 400b) are redundant, and part of the route is not redundant, allowing for more economical solution, where the reliability is increased only for part of the system. In one non-limiting example shown as arrangement 49c in FIG. 4c, a single gateway server 48a is used, connected to the router 40 avia two independent communication routes. In another non-limiting example shown as arrangement 49d in FIG. 4d, a single gateway server 48a connected via a single ISP 47a are used. The ISP 47a is connected to the router 40a via two independent communication routes.

Figure 4E:
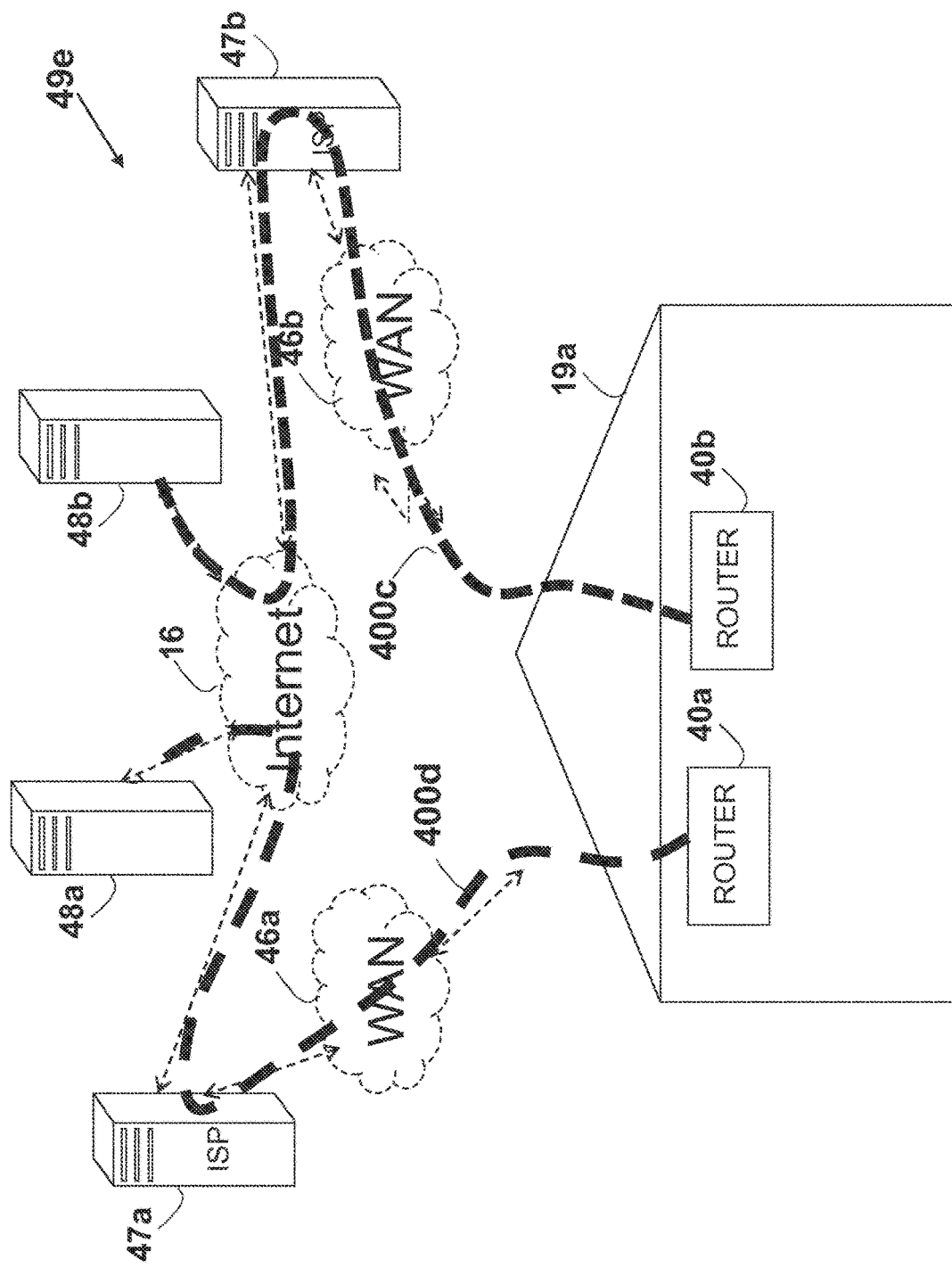
FIG. 4e illustrates the data paths and a schematic electrical diagram of multiple routers connected to multiple cloud-based gateways via multiple data paths.

In one non-limiting example, two routers 40 are redundantly used for improving reliability and availability. Such an arrangement 49e in shown in FIG. 4e, showing a premises 19a including two separated and independent routers 40a and 40b, each connected via independent communication route. The router 40a is connected via communication route 400d, corresponding to route 400b in arrangement 49b shown in FIG. 4b, while the router 40b is connected via communication route 400c, corresponding to route 400a in arrangement 49b shown in FIG. 4b. In the case of malfunction of one of the routers 40a and 40b, the other router is still available through its route. Alternatively or in addition, a single gateway server 48a may be used, similar to the arrangement 49c shown in FIG. 4c, the two routers 40a and 40b may be connected via a dedicated communication link (either wired or wireless), or may be interconnected via one of the networks in the premises 19a Preferably, each of the routers 40a and 40b is able to communicate with all internal networks and end-units in the premises. Alternatively or in addition, each router is connected to separate networks. Alternatively or in addition, some networks (and associated end-units) may be connected to both routers 40a and 40b, while other networks connect only to one of the routers. In the case of an internal mesh network, each of the routers 40a and 40b may be connected to a different point in the mesh, such as communicating with different devices forming the mesh network.

The operation of the redundant communication routes may be based on standby redundancy, (a.k.a. Backup Redundancy), where one of the data paths or the associated hardware is considered as a primary unit, and the other data path (or the associated hardware) is considered as the secondary unit, serving as back up to the primary unit. The secondary unit typically does not monitor the system, but is there just as a spare. The standby unit is not usually kept in sync with the primary unit, so it must reconcile its input and output signals on the takeover of the communication. This approach does lend itself to give a "bump" on transfer, meaning the secondary operation may not be in sync with the last system state of the primary unit. Such mechanism may require a watchdog, which monitors the system to decide when a switchover condition is met, and command the system to switch control to the standby unit. Standby redundancy configurations commonly employ two basic types, namely 'Cold Standby' and 'Hot Standby'.

In cold standby, the secondary unit is either powered off or otherwise non-active in the system operation, thus preserving the reliability of the unit. The draw back of this design is that the downtime is greater than in hot standby, because the standby unit needs to be powered up or activated, and brought online into a known state.

In hot standby, the secondary unit is powered up or otherwise kept operational, and can optionally monitor the system. The secondary unit may serve as the watchdog and/or voter to decide when to switch over, thus eliminating the need for an additional hardware for this job. This design does not preserve the reliability of the standby unit as well as the cold standby design. However, it shortens the downtime, which in turn increases the availability of the system. Some flavors of Hot Standby are similar to Dual Modular Redundancy (DMR) or Parallel Redundancy. The main difference between Hot Standby and DMR is how tightly the primary and the secondary are synchronized. DMR completely synchronizes the primary and secondary units.

While a redundancy of two was exampled above, where two data paths and two hardware devices were used, a redundancy involving three or more data paths or systems may be equally used. The term 'N' Modular Redundancy, (a.k.a. Parallel Redundancy) refers to the approach of having multiply units or data paths running in parallel. All units are highly synchronized and receive the same input information at the same time. Their output values are then compared and a voter decides which output values should be used. This model easily provides bumpless switchovers. This model typically has faster switchover times than Hot Standby models, thus the system availability is very high, but because all the units are powered up and actively engaged with the system operation, the system is at more risk of encountering a common mode failure across all the units.

Deciding which unit is correct can be challenging if only two units are used. If more than two units are used, the problem is simpler, usually the majority wins or the two that agree win. In N Modular Redundancy, there are three main typologies: Dual Modular Redundancy, Triple Modular Redundancy, and Quadruple Redundancy. Quadruple Modular Redundancy (QMR) is fundamentally similar to TMR but using four units instead of three to increase the reliability. The obvious drawback is the 4× increase in system cost.

Dual Modular Redundancy (DMR) uses two functional equivalent units, thus either can control or support the system operation. The most challenging aspect of DMR is determining when to switch over to the secondary unit. Because both units are monitoring the application, a mechanism is needed to decide what to do if they disagree. Either a tiebreaker vote or simply the secondary unit may be designated as the default winner, assuming it is more trustworthy than the primary unit. Triple Modular Redundancy (TMR) uses three functionally equivalent units to provide a redundant backup. This approach is very common in aerospace applications where the cost of failure is extremely high. TMR is more reliable than DMR due to two main aspects. The most obvious reason is that two "standby" units are used instead of just one. The other reason is that in a technique called diversity platforms or diversity programming may be applied. In this technique, different software or hardware platforms are used on the redundant systems to prevent common mode failure. The voter decides which unit will actively control the application. With TMR, the decision of which system to trust is made democratically and the majority rules. If three different answers are obtained, the voter must decide which system to trust or shut down the entire system, thus the switchover decision is straightforward and fast.

Another redundancy topology is 1: N Redundancy, where a single backup is used for multiple systems, and this backup is able to function in the place of any single one of the active systems. This technique offers redundancy at a much lower cost than the other models by using one standby unit for several primary units. This approach only works well when the primary units all have very similar functions, thus allowing the standby to back up any of the primary units if one of them fails.

While the redundant data paths have been exampled with regard to the added reliability and availability, redundant data paths may as well be used in order to provide higher aggregated data rate, allowing for faster response and faster transfer of data over the multiple data paths.

Figure 5:
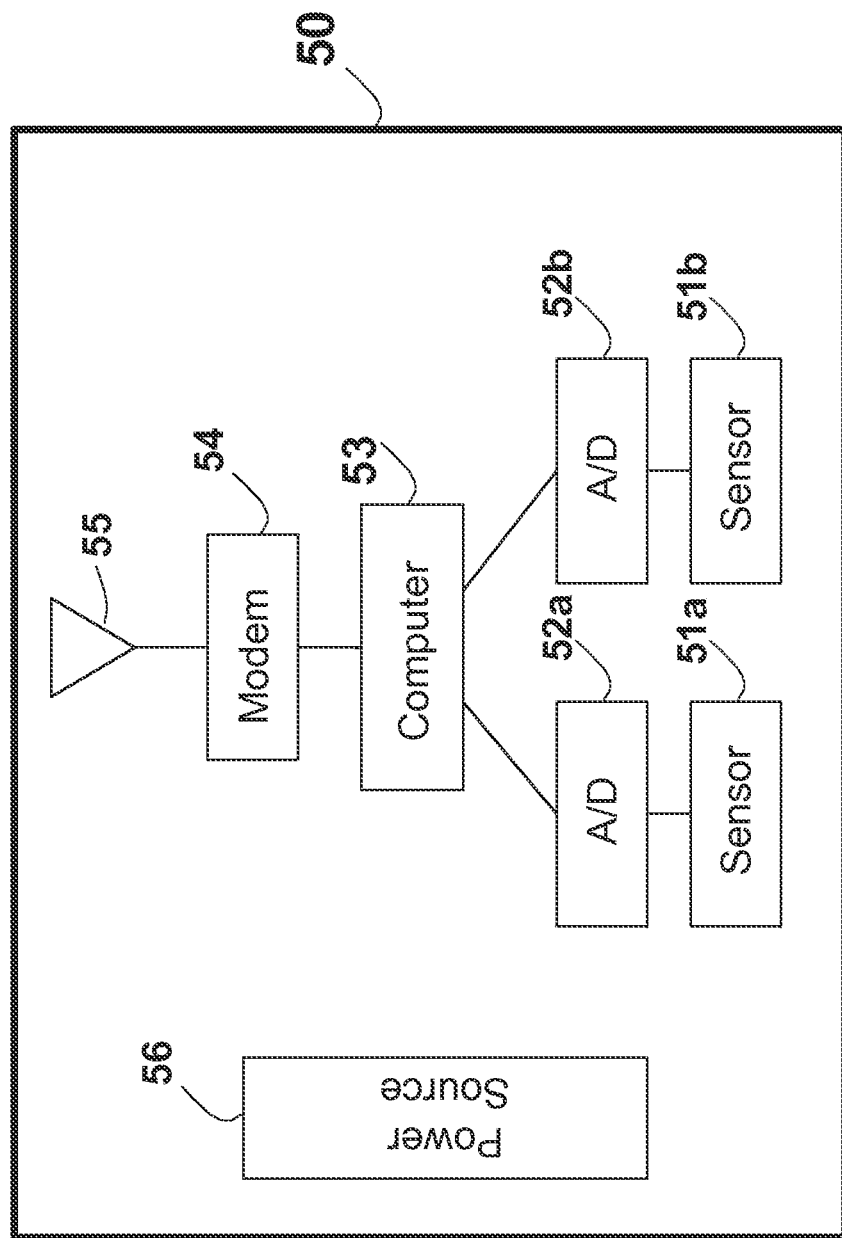
FIG. 5 illustrates a schematic electrical diagram of a sensor unit.

Referring now to FIG. 5 where a non-limiting example of a sensor unit 50 is shown. The sensor unit 50 includes two sensor elements 51*a* and 51*b*. In the case of analog sensors having an analog signal output, such as analog voltage, analog current or continuously changing impedance, an analog to digital (A/D) is disposed to the sensor element 51 output, which converts continuous signals to discrete digital numbers, for converting the analog output to a digital signal. The sensor 51*a* output is connected to the input of A/D 52*a*, and the sensor 51*b* output is connected to the input of A/D 52*b*. While two sensors 51*a* and 51*b* are shown, a sensor unit may equally include a single sensor or any number of sensors, where A/D may be connected to each analog sensor output. A computer 53, commonly a small size microprocessor, is connected to the A/D 52*a* and 52*b*, and receives the values representing the sensed condition by the sensors 51*a* and 51*b*. The computer 53 further control and manage the operation of the sensor unit 50. The sensor unit wirelessly communicates via the antenna 55, connected to the wireless modem 54 (or a wireless transceiver). The computer 53 may thus communicate with any gateway, router, or other sensor unit via the wireless communication. While exampled using wireless such as over-the-air communication, the sensor unit 50 may equally use wired communication such as using wires or a cable, where the modem 54 is replaced with a wired modem (or a transceiver) and the antenna 55 is replaced with a connector for connecting to the cable or wires. The sensor elements may be identical, similar or different from each other. For non-limiting example, some sensors may be analog while others are digital sensors. In another example, different sensors may relate to different physical phenomena.

The sensor 51 provides an electrical output signal in response to a physical, chemical, biological or any other phenomenon, serving as a stimulus to the sensor. The sensor may serve as, or be, a detector, for detecting the presence of the phenomenon. Alternatively or in addition, a sensor may measure (or respond to) a parameter of a phenomenon or a magnitude of the physical quantity thereof. For example, the sensor 51 may be a thermistor or a platinum resistance temperature detector, a light sensor, a pH probe, a microphone for audio receiving, or a piezoelectric bridge. Similarly, the sensor 51 may be used to measure pressure, flow, force or other mechanical quantities. The sensor output may be amplified by an amplifier connected to the sensor output. Other signal conditioning may also be applied in order to improve the handling of the sensor output or adapting it to the next stage or manipulating, such as attenuation, delay, current or voltage limiting, level translation, galvanic isolation, impedance transformation, linearization, calibration, filtering, amplifying, digitizing, integration, derivation, and any other signal manipulation. Some sensors conditioning involves connecting them in a bridge circuit. In the case of conditioning, the conditioning circuit may added to manipulate the sensor output, such as filter or equalizer for frequency related manipulation such as filtering, spectrum analysis or noise removal, smoothing or de-blurring in case of image enhancement, a compressor (or de-compressor) or coder (or decoder) in the case of a compression or a coding/decoding schemes, modulator or demodulator in case of modulation, and extractor for extracting or detecting a feature or parameter such as pattern recognition or correlation analysis. In case of filtering, passive, active or adaptive (such as Wiener or Kalman) filters may be used. The conditioning circuits may apply linear or non-linear manipulations. Further, the manipulation may be time-related such as analog or digital delay-lines, integrators, or rate-based manipulation. A sensor 51 may have analog output, requiring an A/D 52 to be connected thereto, or may have digital output. Further, the conditioning may be based on the book entitled: "Practical Design Techniques for Sensor Signal Conditioning", by Analog Devices, Inc., 1999 (ISBN-0-916550-20-6), which is incorporated in its entirety for all purposes as if fully set forth herein.

The sensor may directly or indirectly measure the rate of change of the physical quantity (gradient) versus the direction around a particular location, or between different locations. For example, a temperature gradient may describe the differences in the temperature between different locations. Further, a sensor may measure time-dependent or time-manipulated values of the phenomenon, such as time-integrated, average or Root Mean Square (RM S or rms), relating to the square root of the mean of the squares of a series of discrete values (or the equivalent square root of the integral in a continuously varying value). Further, a parameter relating to the time dependency of a repeating phenomenon may be measured, such as the duty-cycle, the frequency (commonly measured in Hertz-Hz) or the period. A sensor may be based on the Micro Electro-Mechanical Systems-MEM S (a.k.a. Micro-mechanical electrical systems) technology. A sensor may respond to environmental conditions such as temperature, humidity, noise, vibration, fumes, odors, toxic conditions, dust, and ventilation.

A sensor may be an active sensor, requiring an external source of excitation. For example, resistor-based sensors such as thermistors and strain gages are active sensors, requiring a current to pass through them in order to determine the resistance value, corresponding to the measured phenomenon. Similarly, a bridge circuit based sensors are active sensors depending or external electrical circuit for their operation. A sensor may be a passive sensor, generating an electrical output without requiring any external circuit or any external voltage or current. Thermocouples and photodiodes are examples or passive sensors.

A sensor may measure the amount of a property or of a physical quantity or the magnitude relating to a physical phenomenon, body or substance. Alternatively or in addition, a sensor may be used to measure the time derivative thereof, such as the rate of change of the amount, the quantity or the magnitude. In the case of space related quantity or magnitude, a sensor may measure the linear density, relating to the amount of property per length, a sensor may measure the surface density, relating to the amount of property per area, or a sensor may measure the volume density, relating to the amount of property per volume. Alternatively or in addition, a sensor may measure the amount of property per unit mass or per mole of substance. In the case of a scalar field, a sensor may further measure the quantity gradient, relating to the rate of change of property with respect to position. Alternatively or in addition, a sensor may measure the flux (or flow) of a property through a cross-section or surface boundary. Alternatively or in addition, a sensor may measure the flux density, relating to the flow of property through a cross-section per unit of the cross-section, or through a surface boundary per unit of the surface area. Alternatively or in addition, a sensor may measure the current, relating to the rate of flow of property through a cross-section or a surface boundary, or the current density, relating to the rate of flow of property per unit through a cross-section or a surface boundary. A sensor may include or consists of a transducer, defined herein as a device for converting energy from one form to another for the purpose of measurement of a physical quantity or for information transfer. Further, a single sensor may be used to measure two or more phenomena. For example, two characteristics of the same element may be measured, each characteristic corresponding to a different phenomenon.

A sensor output may have multiple states, where the sensor state is depending upon the measured parameter of the sensed phenomenon. A sensor may be based on a two state output (such as '0' or '1', or 'true' and 'false'), such as an electric switch having two contacts, where the contacts can be in one of two states: either "closed" meaning the contacts are touching and electricity can flow between them, or "open", meaning the contacts are separated and the switch is non-conducting. The sensor may be a threshold switch, where the switch changes its state upon sensing that the magnitude of the measured parameter of a phenomenon exceeds a certain threshold. For example, a sensor may be a thermostat is a temperature-operated switch used to control a heating process. Another example is a voice operated switch (a.k.a. VOX), which is a switch that operates when sound over a certain threshold is detected. It is usually used to turn on a transmitter or recorder when someone speaks and turn it off when they stop speaking. Another example is a mercury switch (also known as a mercury tilt switch), which is a switch whose purpose is to allow or interrupt the flow of electric current in an electrical circuit in a manner that is dependent on the switch's physical position or alignment relative to the direction of the "pull" of earth's gravity, or other inertia. The threshold of a threshold based switch may be fixed or settable. Further, an actuator may be used in order to locally or remotely set the threshold level.

In some cases, a sensor operation is based on generating a stimulus or an excitation to generate influence or create a phenomenon. The entire or part of the generating or stimulating mechanism may be in this case an integral part of the sensor, or may be regarded as independent actuators, and thus may be controlled by the controller. Further, a sensor and an actuator, independent or integrated, may be cooperatively operating as a set, for improving the sensing or the actuating functionality. For example, a light source, treated as an independent actuator, may be used to illuminate a location, in order to allow an image sensor to faithfully and properly capture an image of that location. In another example, where a bridge is used to measure impedance, the excitation voltage of the bridge may be supplied from a power supply treated and acting as an actuator.

A sensor may respond to chemical process or may be involved in fluid handling, such as measuring flow or velocity. A sensor may be responsive to the location or motion such as navigational instrument, or be used to detect or measure position, angle, displacement, distance, speed or acceleration. A sensor may be responsive to mechanical phenomenon such as pressure, force, density or level. The environmental related sensor may respond to humidity, air pressure, and air temperature. Similarly, any sensor used to detect or measure a measurable attribute and converts it into an electrical signal may be used. Further, a sensor may be a metal detector, which detects metallic objects by detecting their conductivity.

In one example, the sensor is used to measure, sense or detect the temperature of an object, that may be solid, liquid or gas (such as the air temperature), in a location. Such sensor may be based on a thermistor, which is a type of resistor whose resistance varies significantly with temperature, and is commonly made of ceramic or polymer material. A thermistor may be a PTC (Positive Temperature Coefficient) type, where the resistance increases with increasing temperatures, or may be an NTC (Negative Temperature Coefficient) type, where the resistance decreases with increasing temperatures. Alternatively (or in addition), a thermoelectric sensor may be based on a thermocouple, consisting of two different conductors (usually metal alloys), that produce a voltage proportional to a temperature difference. For higher accuracy and stability, an RTD (Resistance Temperature Detector) may be used, typically consisting of a length of fine wire-wound or coiled wire wrapped around a ceramic or glass core. The RTD is made of a pure material whose resistance at various temperatures is known (R vs. T). A common material used may be platinum, copper, or nickel. A quartz thermometer may be used as well for high-precision and high-accuracy temperature measurement, based on the frequency of a quartz crystal oscillator. The temperature may be measured using conduction, convection, thermal radiation, or by the transfer of energy by phase changes. The temperature may be measured in degrees Celsius (° C.) (a.k.a. Centigrade), Fahrenheit (° F.), or Kelvin (° K). In one example, the temperature sensor (or its output) is used to measure a temperature gradi ent, providing in which direction and at what rate the temperature changes the most rapidly around a particular location. The temperature gradient is a dimensional quantity expressed in units of degrees (on a particular temperature scale) per unit length, such as the SI (International System of Units) unit Kelvin per meter (K/m).

A radioactivity may be measured using a sensor based on a Geiger counter, measuring ionizing radiation. The emission of alpha particles, beta particles or gamma rays are detected and counted by the ionization produced in a low-pressure gas ion a Geiger-Muller tube. The SI unit of radioactive activity is the Becquerel (Bq).

In one example, a photoelectric sensor is used to measure, sense or detect light or the luminous intensity, such as a photosensor or a photodetector. The light sensed may be a visible light, or invisible light such as infrared, ultraviolet, X-ray or gamma rays. Such sensors may be based on the quantum mechanical effects of light on electronic materials, typically semiconductors such as silicon, germanium, and Indium gallium arsenide. A photoelectric sensor may be based on the photoelectric or photovoltaic effect, such as a photodiode, phototransistor and a photomultiplier tube. The photodiode typically uses a reverse biased p-n junction or PIN structure diode, and a phototransistor is in essence a bipolar transistor enclosed in a transparent case so that light can reach the base-collector junction, and the electrons that are generated by photons in the base-collector junction are injected into the base, and this photodiode current is amplified by the transistor's current gain $\beta$ (or hfe). A reverse-biased LED (Light Emitting Diode) may also act as a photodiode. Alternatively or in addition, a photosensor may be based on photoconductivity, where the radiation or light absorption changes the conductivity of a photoconductive material, such as selenium, lead sulfide, cadmium sulfide, or polyvinylcarbazole. In such a case, the sensor may be based on photoresistor or LDR (Light Dependent Resistor), which is a resistor whose resistance decreases with increasing incident light intensity. In one example, Charge-Coupled Devices (CCD) and CMOS (Complementary Metal-Oxide Semiconductor) may be used as the light-sensitive elements, where incoming photons are converted into electron charges at the semiconductor-oxide interface. The sensor may be based an Active Pixel Sensor (APS), for example as an element in an image sensor, and may be according to, or based on, the sensor described in U.S. Pat. No. 6,549,234 to Lee, entitled: "Pixel Structure of Active Pixel Sensor (APS) with Electronic Shutter Function", in U.S. Pat. No. 6,844,897 to Andersson, entitled: "Active Pixel Sensor (APS) Readout Structure with Amplification", in U.S. Pat. No. 7,342,212 to Mentzer et al., entitled: "Analog Vertical Sub-Sampling in an Active Pixel Sensor (APS) Image Sensor", or in U.S. Pat. No. 6,476,372 to Merrill et al., entitled: "CMOS Active Pixel Sensor Using Native Transistors", which are all incorporated in their entirety for all purposes as if fully set forth herein.

In one example, an electrochemical sensor is used to measure, sense or detect a matter structure, properties, composition, and reactions. In one example, the sensor is a pH meter for measuring the pH (acidity or alkalinity) of a liquid. Commonly such pH meter comprises a pH probe which measures pH as the activity of the hydrogen cations at the tip of a thin-walled glass bulb. In one example, the electrochemical sensor is a gas detector, which detects the presence or various gases within an area, usually as part of a safety system, such as for detecting gas leak. Commonly gas detectors are used to detect combustible, flammable, or toxic gases, as well as oxygen depletion, using semiconductors, oxidation, catalytic, infrared or other detection mechanisms, and capable to detect a single gas or several gases. Further, an electrochemical sensor may be an electrochemical gas sensor, used to measure the concentration of a target gas, typically by oxidation or reducing the target gas at an electrode, and measuring the resulting current. The gas sensor may be a hydrogen sensor for measuring or detecting the presence of hydrogen, commonly based on palladium based electrodes, or a Carbon-Monoxide detector (CO Detector) used to detect the presence of carbon-monoxide, commonly in order to prevent carbon monoxide poisoning. A Carbon-Monoxide detector may be according to, or based on, the sensor described in U.S. Pat. No. 8,016,205 to Drew, entitled: "Thermostat with Replaceable Carbon Monoxide Sensor Module", in U.S. Patent Application Publication No. 2010/0201531 to Pakravan et al., entitled: "Carbon Monoxide Detector", in U.S. Pat. No. 6,474,138 to Chang et al., entitled: "Adsorption Based Carbon Monoxide sensor and Method", or in U.S. Pat. No. 5,948,965 to Upchurch, entitled: "Solid State Carbon Monoxide Sensor", which are all incorporated in their entirety for all purposes as if fully set forth herein. The gas sensor may be an oxygen sensor (a.k.a. lambda sensor) for measuring the proportion of oxygen ($O_2$) in a gas or liquid.

In one example, one or more of the sensors is a smoke detector, for detecting smoke which is typically an indication of fire. The smoke detectors work either by optical detection (photoelectric) or by physical process (ionization), while some use both detection methods to increase sensitivity to smoke. An optical based smoke detector is based on a light sensor, and includes a light source (incandescent bulb or infrared LED), a lens to collimate the light into a beam, and a photodiode or other photoelectric sensor at an angle to the beam as a light detector. In the absence of smoke, the light passes in front of the detector in a straight line. When smoke enters the optical chamber across the path of the light beam, some light is scattered by the smoke particles, directing it at the sensor and thus triggering the alarm. An ionization type smoke detector can detect particles of smoke that are too small to be visible, and use a radioactive element such as americium-241 (241 Am). The radiation passes through an ionization chamber, an air-filled space between two electrodes, and permits a small, constant current between the electrodes. Any smoke that enters the chamber absorbs the alpha particles, which reduces the ionization and interrupts this current, setting off the alarm. Some smoke alarms use a carbon-dioxide sensor or carbon-monoxide sensor to detect extremely dangerous products of combustion.

A sensor may include a physiological sensor, for monitoring a live body such as a human body, for example as part of the telemedicine concept. The sensors may be used to sense, log and monitor vital signs, such as of patients suffering from chronic diseases such as diabetes, asthma, and heart attack. The sensor may be ECG (Electrocardiogramvolving interpretation of the electrical activity of the heart over a period of time, as detected by electrodes attached to the outer surface of the skin. The sensor may be used to measure oxygen saturation (SO2), involving the measuring the percentage of hemoglobin binding sites in the bloodstream occupied by oxygen. A pulse oximeter relies on the light absorption characteristics of saturated hemoglobin to give an indication of oxygen saturation. Venous oxygen saturation (SvO2) is measured to see how much oxygen the body consumes, tissue oxygen saturation (StO2) can be measured by near infrared spectroscopy, and Saturation of peripheral oxygen (SpO2) is an estimation of the oxygen saturation level usually measured with a pulse oximeter device. Other sensors may be a blood pressure sensor, for measuring is the pressure exerted by circulating blood upon the walls of blood vessels, which is one of the principal vital signs, and may be based on a sphygmomanometer measuring the arterial pressure. An EEG (Electroencephalography) sensor may be used for the monitoring of electrical activity along the scalp. EEG measures voltage fluctuations resulting from ionic current flows within the neurons of the brain. The sensors (or the sensor units) may be a small bio-sensor implanted inside the human body, or may be worn at the human body, or as wearable, near, on or around a live body. Non-human applications may involve the monitoring of crops and animals. Such networks involving biological sensors may be part of a Body Area Network (BAN) or Body Sensor Network (BSN), and may be in accordance to, or based on, IEEE 802.15.6. The sensor may be a biosensor, and may be according to, or based on, the sensor described in U.S. Pat. No. 6,329,160 to Schneider et al., entitled: "Biosensors", in U.S. Patent Application Publication No. 2005/0247573 to Nakamura et al., entitled: "Biosensors", in U.S. Patent Application Publication No. 2007/0249063 to Deshong et al., entitled: "Biosensors", or in U.S. Pat. No. 4,857,273 to Stewart, entitled: "Biosensors", which are all incorporated in their entirety for all purposes as if fully set forth herein.

The sensor may be an electroacoustic sensor that responds to sound waves (which are essentially vibrations transmitted through an elastic solid or a liquid or gas), such as a microphone, which converts sound into electrical energy, usually by means of a ribbon or diaphragm set into motion by the sound waves. The sound may be audio or audible, having frequencies in the approximate range of 20 to 20,000 hertz, capable of being detected by human organs of hearing. Alternatively or in addition, the microphone may be used to sense inaudible frequencies, such as ultrasonic (a.k.a. ultrasound) acoustic frequencies that are above the range audible to the human ear, or above approximately 20,000 Hz. A microphone may be a condenser microphone (a.k.a. capacitor or electrostatic microphone) where the diaphragm acts as one plate of a two plates capacitor, and the vibrations changes the distance between plates, hence changing the capacitance. An electret microphone is a capacitor microphone based on a permanent charge of an electret or a polarized ferroelectric material. A dynamic microphone is based on electromagnetic induction, using a diaphragm attached to a small movable induction coil that is positioned in a magnetic field of a permanent magnet. The incident sound waves cause the diaphragm to vibrate, and the coil to move in the magnetic field, producing a current. Similarly, a ribbon microphone uses a thin, usually corrugated metal ribbon suspended in a magnetic field, and its vibration within the magnetic field generates the electrical signal. A loudspeaker is commonly constructed similar to a dynamic microphone, and thus may be used as a microphone as well. In a carbon microphone, the diaphragm vibrations apply varying pressure to a carbon, thus changing its electrical resistance. A piezoelectric microphone (a.k.a. crystal or piezo microphone) is based on the phenomenon of piezoelectricity in piezoelectric crystals such as potassium sodium tartrate. A microphone may be omnidirectional, unidirectional, bidirectional, or provide other directionality or polar patterns.

A sensor may be used to measure electrical quantities. An electrical sensor may be conductively connected to measure the electrical parameter, or may be non-conductively coupled to measure an electric-related phenomenon, such as magnetic field or heat. Further, the average or RM S value may be measured. An ampermeter (a.k.a. ammeter) is a current sensor that measures the magnitude of the electric current in a circuit or in a conductor such as a wire. Electric current is commonly measured in Amperes, milliampers, microamperes, or kiloampers. The sensor may be an integrating ammeter (a.k.a. watt-hour meter) where the current is summed over time, providing a current/time product, which is proportional to the energy transferred. The measured electric current may be an Alternating Current (AC) such as a sinewave, a Direct Current (DC), or an arbitrary waveform. A galvanometer is a type of ampermeter for detecting or measuring low current, typically by producing a rotary deflection of a coil in a magnetic field. Some ampermeters use a resistor (shunt), whose voltage is directly proportional to the current flowing through, requiring the current to pass through the meter. A hot-wire ampermeter involves passing the current through a wire which expands as it heats, and the expansion is measured. A non-conductive or non-contact current sensor may be based on 'Hall effect' magnetic field sensor, measuring the magnetic field generated by the current to be measured. Other non-conductive current sensors involve a current clamp or current probe, which has two jaws which open to allow clamping around an electrical conductor, allowing for measuring of the electric current properties (commonly AC), without making a physical contact or disconnecting the circuit. Such current clamp commonly comprises a wire coil wounded around a split ferrite ring, acting as the secondary winding of a current transformer, with the current-carrying conductor acting as the primary winding. Other current sensors and related circuits are described in Zetex Semiconductors PLC application note "AN 39-Current measurement application handbook" Issue 5, January 2008, which is incorporated in its entirety for all purposes as if fully set forth herein.

A sensor may be a voltmeter, commonly used for measuring the magnitude of the electric potential difference between two points. Electric voltage is commonly measured in volts, millivolts, microvolts, or kilovolts. The measured electric voltage may be an Alternating Current (AC) such as a sinewave, a Direct Current (DC), or an arbitrary waveform. Similarly, an electrometer may be used for measuring electric charge (commonly in Coulomb units-C) or electrical potential difference, with very low leakage current. The voltmeter commonly works by measuring the current through a fixed resistor, which, according to Ohm's Law, is proportional to the voltage across the resistor. A potentiometer-based voltmeter works by balancing the unknown voltage against a known voltage in a bridge circuit. A multimeter (a.k.a. VOM-Volt-Ohm-M illiameter) as well as Digital MultiM eter (DMM), typically includes a voltmeter, an ampermeter and an ohmmeter.

A sensor may be a wattmeter measuring the magnitude of the active power (or the supply rate of electrical energy), commonly using watts (W), milliwatts, kilowatts, or megawatts units. A wattmeter may be based on measuring the voltage and the current, and multiplying to calculate the power P=VI. In AC measurement, the true power is P=VIcos ($\phi$) The wattmeter may be a bolometer, used for measuring the power of incident electromagnetic radiation via the heating of a material with a temperature-dependent electrical resistance. A sensor may be an electricity meter (or electrical energy meter) that measures the amount of electrical energy consumed by a load. Commonly, an electricity meter is used to measure the energy consumed by a single load, an appliance, a residence, a business, or any electrically powered device, and may provide or be the basis for the electricity cost or billing. The electricity meter may be an AC (single or multi-phase) or DC type, and the common unit of measurement is kilowatt-hour, however any energy related unit may be used such as Joules. Some electricity meters are based on wattmeters which accumulate or average the readings, or may be based on induction.

A sensor may be an ohmmeter measuring the electrical resistance, commonly measured in ohms ($\Omega$), milliohms, kiloohms or megohms, or conductance measured in Siemens (S) units. Low-resistance measurements commonly use micro-ohmmeter, while megohmmeter (a.k.a. M egger) measures large value of resistance. Common ohmmeter passes a constant known current through the measured unknown resistance (or conductance), while measuring the voltage across the resistance, and deriving the resistance (or conductance) value from Ohm's law (R=V/I). A Wheatstone bridge may also be used as a resistance sensor, by balancing two legs of a bridge circuit, where one leg includes the unknown resistance (or conductance) component. Variations of Wheatstone bridge may be used to measure capacitance, inductance, impedance and other electrical or non-electrical quantities.

A sensor may be a capacitance meter for measuring capacitance, commonly using units of picofarads, nanofarads, microfarads, and Farads (F). A sensor may be an inductance meter for measuring inductance, commonly using SI units of Henry (H), such as microHenry, milliHenry, and Henry. Further, a sensor may be an impedance meter for measuring an impedance of a device or a circuit. A sensor may be an LCR meter, used to measure inductance (L), capacitance (C), and resistance (R). A meter may use sourcing an AC voltage, and use the ratio of the measured voltage and current (and their phase difference) through the tested device according to Ohm's law to calculate the impedance. Alternatively or in addition, a meter may use a bridge circuit (Similar to Wheatstone bridge concept), where variable calibrated elements are adjusted to detect a null. The measurement may be in a single frequency or over a range of frequencies.

The sensor may be a Time-Domain Reflectometer (TDR) used to characterize and locate faults in transmission-lines, typically conductive or metallic lines, such as twisted wire pairs and coaxial cables. Optical TDR is used to test optical fiber cables. Typically, a TDR transmits a short rise time pulse along the checked medium. If the medium is a uniformly impedance medium and properly terminated, the entire transmitted pulse will be absorbed in the far-end terminal and no signal will be reflected toward the TDR. Any impedance discontinuities will cause some of the incident signal to be sent back towards the source. Increases in the impedance create a reflection that reinforces the original pulse whilst decreases in the impedance create a reflection that opposes the original pulse. The resulting reflected pulse that is measured at the output/input to the TDR is measured as a function of time and, because the speed of signal propagation is almost constant for a given transmission medium, can be read as a function of cable length. A TDR may be used to verify cable impedance characteristics, splice and connector locations and associated losses, and estimate cable lengths. The TDR may be according to, or based on, the TDR described in U.S. Pat. No. 6,437,578 to Gumm, entitled: "Cable Loss Correction of Distance to Fault and Time Domain Reflectometer Measurements", in U.S. Pat. No. 6,714,021 to Williams, entitled: "Integrated Time Domain Reflectometry (TDR) Tester", or in U.S. Pat. No. 6,820,225 to Johnson et al., entitled: "Network Test Instrument", which are all incorporated in their entirety for all purposes as if fully set forth herein.

A sensor may be a magnetometer for measuring a local H or B magnetic fields. The B-field (a.k.a. magnetic flux density or magnetic induction) is measured in Tesla (T) in SI units and Gauss in cgs units, and magnetic flux is measured in Weber (Wb) units. The H-field (a.k.a. magnetic field intensity or magnetic field strength) is measured in ampere-turn per meter (A/m) in SI units, and in Oersteds (Oe) in cgs units. Many Smartphones contain magnetometers serving as compasses. A magnetometer may be a scalar magnetometer, measuring the total strength, or may be a vector magnetometer, providing both magnitude and direction (relative to the spatial orientation) of the magnetic field. Common magnetometers include Hall effect sensor, magneto-diode, magneto-transistor, AMR magnetometer, GMR magnetometer, magnetic tunnel junction magnetometer, magneto-optical sensor, Lorentz force based MEM S sensor (a.k.a. Nuclear Magnetic Resonance-NMR), Electron Tunneling based MEM S sensor, MEM S compasses, Nuclear precession magnetic field sensor, optically pumped magnetic field sensor, fluxgate magnetometer, search coil magnetic field sensor, and Superconducting Quantum Interference Device (SQUID) magnetometer. 'Hall effect' magnetometers are based on Hall probe, which contains an indium compound semiconductor crystal such as indium antimonide, mounted on an aluminum backing plate, and provides a voltage a voltage in response to the measured B-field. A fluxgate magnetometer makes use of the non-linear magnetic characteristics of a probe or sensing element that has a ferromagnetic core. NMR and Proton Precession Magnetometers (PPM) measure the resonance frequency of protons in the magnetic field to be measured. SQUID meters are very sensitive vector magnetometers, based on superconducting loops containing Josephson junctions. The magnetometer may be Lorentz-force-based MEM S sensor, relying on the mechanical motion of the MEMS structure due to the Lorentz force acting on the current-carrying conductor in the magnetic field.

A sensor may be a strain gauge, used to measure the strain, or any other deformation, of an object. A strain gauge commonly comprises a metallic foil pattern supported by an insulating flexible backing. As the object is deformed, the foil is deformed (due to the object tension or the compression), causing its electrical resistance to change. Some strain gauges are based on semiconductor strain gauge (such as piezoresistors), while others are using fiber optic sensors measuring the strain along an optical fiber. Capacitive strain gauges use a variable capacitor to indicate the level of mechanical deformation. Vibrating wire strains are based on vibrating tensioned wire, where the strain is calculated by measuring the resonant frequency of the wire. A sensor may be a strain gauge rosette, comprising multiple strain gauges, and can detect or sense force or torque in a particular direction, or to determine the pattern of forces or torques.

A sensor may be a tactile sensor, being sensitive to force or pressure, or being sensitive to a touch by an object, typically a human touch. A tactile sensor is commonly based on piezoresistive, piezoelectric, capacitive, or elastoresistive sensor. Further, a tactile sensor may be based on a conductive rubber, a lead zirconate titanate (PZT) material, a polyvinylidene fluoride (PVDF) material, or a metallic capacitive element. A sensor may include an array of tactile sensor elements, and may provide an 'image' of a contact surface, distribution of pressures, or pattern of forces. A tactile sensor may be a tactile switch where the touch sensing is used to trigger a switch, which may be a capacitance touch switch, where the human body capacitance increases a sensed capacitance, or may be a resistance touch switch, where the human body part such as a finger (or any other conductive object) conductivity is sensed between two conductors (e.g., two pieces of metal).

A sensor may be a piezoelectric sensor, where the piezoelectric effect is used to measure pressure, acceleration, strain or force. Depending on how the piezoelectric material is cut, there are three main modes of operation: transverse longitudinal and shear. In the transverse effect mode, a force applied along an axis generates charges in a direction perpendicular to the line of force, and in the longitudinal effect mode, the amount of charge produced is proportional to the applied force and is independent of size and shape of the piezoelectric element. When using as a pressure sensor, commonly a thin membrane is used to transfer the force to the piezoelectric element, while in accelerometer use, a mass is attached to the element, and the load of the mass is measured. A piezoelectric sensor element material may be a piezoelectric ceramics (such as PZT ceramic) or a single crystal material. A single crystal material may be gallium phosphate, quartz, tourmaline, or Lead Magnesium Niobate-Lead Titanate (PM N-PT).

In one example, the sensor is a motion sensor, and may include one or more accelerometers, which measures the absolute acceleration or the acceleration relative to freefall. For example, one single-axis accelerometer per axis may be used, requiring three such accelerometers for three-axis sensing. The motion sensor may be a single or multi-axis sensor, detecting the magnitude and direction of the acceleration as a vector quantity, and thus can be used to sense orientation, acceleration, vibration, shock and falling. The motion sensor output may be analog or digital signals, representing the measured values. The motion sensor may be based on a piezoelectric accelerometer that utilizes the piezoelectric effect of certain materials to measure dynamic changes in mechanical variables (e.g., acceleration, vibration, and mechanical shock). Piezoelectric accelerometers commonly rely on piezoceramics (e.g., lead zirconate titanate) or single crystals (e.g., Quartz, tourmaline). A piezoelectric quartz accelerometer is disclosed in U.S. Pat. No. 7,716,985 to Zhang et al. entitled: "Piezoelectric Quartz Accelerometer", U.S. Pat. No. 5,578,755 to Offenberg entitled: "Accelerometer Sensor of Crystalline Material and Method for Manufacturing the Same" and U.S. U.S. Pat. No. 5,962,786 to Le Traon et al. entitled: "Monolithic Accelerometric Transducer", which are all incorporated in their entirety for all purposes as if fully set forth herein. Alternatively or in addition, the motion sensor may be based on the Micro Electro-Mechanical Systems (MEM S, a.k.a. Micro-mechanical electrical system) technology. A MEM S based motion sensor is disclosed in U.S. Pat. No. 7,617,729 to Axelrod et al. entitled: "Accelerometer", U.S. Pat. No. 6,670,212 to M cNie et al. entitled: "Micro-Machining" and in U.S. Pat. No. 7,892,876 to Mehregany entitled: "Three-axis Accelerometers and Fabrication Methods", which are all incorporated in their entirety for all purposes as if fully set forth herein. An example of MEMS motion sensor is LIS302DL manufactured by STMicroelectronics NV and described in Data-sheet LIS302DL STMicroelectronics NV, 'MEM S motion sensor 3-axis-±2g/±8g smart digital output "piccolo" accelerometer', Rev. 4, October 2008, which is incorporated in its entirety for all purposes as if fully set forth herein.

Alternatively or in addition, the motion sensor may be based on electrical tilt and vibration switch or any other electromechanical switch, such as the sensor described in U.S. Pat. No. 7,326,866 to Whitmore et al. entitled: "Omnidirectional Tilt and vibration sensor", which is incorporated in its entirety for all purposes as if fully set forth herein. An example of an electromechanical switch is SQ-SEN-200 available from SignalQuest, Inc. of Lebanon, NH, USA, described in the data-sheet 'DATASHEET SQ-SEN-200 Omnidirectional Tilt and Vibration Sensor' Updated 2009 Aug. 3, which is incorporated in its entirety for all purposes as if fully set forth herein. Other types of motion sensors may be equally used, such as devices based on piezoelectric, piezoresistive and capacitive components to convert the mechanical motion into an electrical signal. Using an accelerometer to control is disclosed in U.S. Pat. No. 7,774,155 to Sato et al. entitled: "Accelerometer-Based Controller", which is incorporated in its entirety for all purposes as if fully set forth herein.

A sensor may be a force sensor, a load cell, or a force gauge (a.k.a. force gage), used to measure a force magnitude commonly using Newton (N) units, and typically during a push or pull action. A force sensor may be based on measured spring displacement or extension according to Hooke's law. A load cell may be based on the deformation of a strain gauge, or may be a hydraulic or hydrostatic, a piezoelectric, or a vibrating wire load cell. A sensor may be a dynamometer for measuring torque or moment or force. A dynamometer may be a motoring type or a driving type, measuring the torque or power required to operate a device, or may be an absorption or passive dynamometer, designed to be driven. The SI unit for torque is the Newton-meter (N·m). The force sensor may be according to, or based on, the sensor described in U.S. Pat. No. 4,594,898 to Kirman et al., entitled: "Force Sensors", in U.S. Pat. No. 7,047,826 to Peshkin, entitled: "Force Sensors", in U.S. Pat. No. 6,865,953 to Tsukada et al., entitled: "Force Sensors", or in U.S. Patent No. 5,844,146 to Murray et al., entitled: "Fingerpad Force Sensing System", which are all incorporated in their entirety for all purposes as if fully set forth herein.

A sensor may be a pressure sensor (a.k.a. pressure transducer or pressure transmitter/sender) for measuring a pressure of gases or liquids, commonly using units of Pascal (Pa), Bar (b) (such as millibar), Atmosphere (atm), Millimeter of Mercury (mmHg), or Torr, or in terms of force per unit area such as Barye-dyne per square centimeter (Ba). Pressure sensor may indirectly measure other variable such as fluid/gas flow, speed, water-level, and altitude. A pressure sensor may be a pressure switch, acting to complete or break an electric circuit in response to measured pressure magnitude. A pressure sensor may be an absolute pressure sensor, where the pressure is measured relative to a perfect vacuum, may be a gauge pressure sensor where the pressure is measured relative to an atmospheric pressure, may be a vacuum pressure sensor where a pressure below atmospheric pressure is measured, may be a differential pressure sensor where the difference between two pressures is measured, or may be a sealed pressure sensor where the pressure is measured relative to some fixed pressure. The changes in pressure relative to altitude may serve to use a pressure sensor for altitude sensing, and the Venturi effect may be used to measure flow by a pressure sensor. Similarly, the depth of a submerged body or the fluid level on contents in a tank may be measured by a pressure sensor.

A pressure sensor may be of a force collector type, where a force collector (such a diaphragm, piston, bourdon tube, or bellows) is used to measure strain (or deflection) due to applied force (pressure) over an area. Such sensor may be a based on the piezoelectric effect (a piezoresistive strain gauge), and may use Silicon (Monocrystalline), Polysilicon Thin Film, Bonded Metal Foil, Thick Film, or Sputtered Thin Film. Alternatively or in addition, such force collector type sensor may be of a capacitive type, which uses a metal, a ceramic, or a silicon diaphragm in a pressure cavity to create a variable capacitor to detect strain due to applied pressure. Alternatively or in addition, such force collector type sensor may be of an electromagnetic type, where the displacement of a diaphragm by means of changes in inductance is measured. Further, in optical type the physical change of an optical fiber, such as strain, due to applied pressure is sensed. Further, a potentiometric type may be used, where the motion of a wiper along a resistive mechanism is used to measure the strain caused by the applied pressure. A pressure sensor may measure the stress or the changes in gas density, caused by the applied pressure, by using the changes in resonant frequency in a sensing mechanism, by using the changes in thermal conductivity of a gas, or by using the changes in the flow of charged gas particles (ions). An air pressure sensor may be a barometer, typically used to measure the atmospheric pressure, commonly used for weather forecast applications.

A pressure sensor may be according to, or based on, the sensor described in U.S. Pat. No. 5,817,943 to Welles, II et al., entitled: "Pressure Sensors", in U.S. Pat. No. 6,606,911 to Akiyama et al., entitled: "Pressure Sensors", in U.S. Pat. No. 4,434,451 to Delatorre, entitled: "Pressure Sensors", or in U.S. Pat. No. 5,134,887 to Bell, entitled: "Pressure Sensors", which are all incorporated in their entirety for all purposes as if fully set forth herein.

A sensor may be a position sensor for measuring linear or angular position (or motion). A position sensor may be an absolute position sensor, or may be a displacement (relative or incremental) sensor, measuring a relative position, and may further be an electromechanical sensor. A position sensor may be mechanically attached to the measured object, or alternatively may use a non-contact measurement.

A position sensor may be an angular position sensor, for measuring involving an angular position (or the rotation or motion) of a shaft, an axle, or a disk. Angles are commonly expressed in radians (rad), or in degrees (°), minutes ('), and seconds ("), and angular velocity commonly uses units of radian per second (rad/s). Absolute angular position sensor output indicates the current position (angle) of the shaft, while incremental or displacement sensor provides information about the change, the angular speed or the motion of the shaft. An angular position sensor may be of optical type, using reflective or interruption schemes. A reflective sensor is based on a light-detector that senses a reflected beam from a light emitter, while an interruptive sensor is based on interrupting the light path between the emitter and the detector. An angular position sensor may be of magnetic type, relying on detection based on the changes in the magnetic field. A magnetic-based angular position sensor may be based on a variable-reluctance (VR), Eddy-Current Killed Oscillator (ECKO), Wiegand sensing, or Hall-effect sensing, used to detect a pattern in the rotating disc. A rotary potentiometer may serve as an angular position sensor.

An angular position sensor may be based on a Rotary Variable Differential Transformer (RVDT), used for measuring the angular displacement by using a type of an electrical transformer. An RVDT is commonly composed of a salient two-pole rotor and a stator consisting of a primary excitation coil and a pair of secondary output coils, electromagnetically coupled to the excitation coil. The coupling is proportional to the angle of the measured shaft; hence the AC output voltage is proportional to the angular shaft displacement. A resolver and a synchro are similar transformer based angular position sensors.

An angular position sensor may be based on a rotary encoder (a.k.a. shaft encoder), used for measuring angular position commonly by using a disc, which is rigidly fixed to the measured shaft, and contain conductive, optical, or magnetic tracks. A rotary encoder may be an absolute encoder, or may be an incremental rotary encoder, where output is provided only when the encoder is rotating. A mechanical rotary encoder use an insulating disc and sliding contacts, which close electrical circuits upon rotation of the disc. An optical rotary encoder uses a disc having transparent and opaque areas, and a light source and a photo detector to sense the optical pattern on the disc. Both mechanical and optical rotary encoders, and may use binary or gray encoding schemes.

A sensor may be an angular rate sensor, used to measure the angular rate, or the rotation speed, of a shaft, an axle or a disk. An angular rate sensor may be electromechanical, MEM S based, Laser based (such as Ring Laser Gyroscope-RLG), or a gyroscope (such as fiber-optic gyro) based. Some gyroscopes use the measurement of the Coriolis acceleration to determine the angular rate.

An angular rate sensor may be a tachometer (a.k.a. RPM gauge and revolution-counter), used to measure the rotation speed of a shaft, an axle or a disk, commonly by units of RPM (Revolutions per Minute) annotating the number of full rotations completed in one minute around the axis. A tachometer may be based on any angular position sensor, for example sensors that are described herein, using further conditioning or processing to obtain the rotation speed. A tachometer may be based on measuring the centrifugal force, or based on sensing a slotted disk, using optical means where an optical beam is interrupted, electrical means where electrical contacts sense the disk, or by using magnetic sensors, such as based on Hall-effect. Further, an angular rate sensor may be a centrifugal switch, which is an electric switch that operates using the centrifugal force created from a rotating shaft, most commonly that of an electric motor or a gasoline engine. The switch is designed to activate or de-activate as a function of the rotational speed of the shaft.

A position sensor may be a linear position sensor, for measuring a linear displacement or position typically in a straight line. The SI unit for length is meter (m), and prefixes may be used such as nanometer (nm), micrometer (μm), centimeter (cm), millimeter (mm), and kilometer (Km). A linear position sensor may be based on a resistance changing element such as linear potentiometer.

A linear position sensor may be a Linear Variable Differential Transformer (LVDT) used for measuring linear displacement based on the transformer concept. An LVDT has three coils placed in a tube, where the center coil serves as the primary winding coil, and the two outer coils serve as the transformer secondary windings. The position of a sliding cylindrical ferromagnetic core is measured by changing the mutual magnetic coupling between the windings.

A linear position sensor may be a linear encoder, which may be similar to the rotary encoder counterpart, and may be based on the same principles. A linear encoder may be either incremental or absolute, and may be of optical, magnetic, capacitive, inductive, or eddy-current type. Optical linear encoder typically uses a light source such as an LED or laser diode, and may employ shuttering, diffraction, or holographic principles. A magnetic linear encoder may employ an active (magnetized) or passive (variable reluctance) scheme, and the position may be sensed using a sense coil, 'Hall effect' or magneto-resistive read-head. A capacitive or inductive linear encoder respectively measures the changes of capacitance or the inductance. Eddy-current linear encoder may be based on U.S. Pat. No. 3,820,110 to Henrich et al. entitled: "Eddy Current Type Digital Encoder and Position Reference".

In one example, one or more of the sensor elements 51 is a motion detector or an occupancy sensor. A motion detector is a device for motion detection, that contains a physical mechanism or electronic sensor that quantifies motion commonly in order alert the user of the presence of a moving object within the field of view, or in general confirming a change in the position of an object relative to its surroundings or the change in the surroundings relative to an object. This detection can be achieved by both mechanical and electronic methods. In addition to discrete, on or off motion detection, it can also consist of magnitude detection that can measure and quantify the strength or speed of this motion or the object that created it. Motion can be typically detected by sound (acoustic sensors), opacity (optical and infrared sensors and video image processors), geomagnetism (magnetic sensors, magnetometers), reflection of the transmitted energy (infrared laser radar, ultrasonic sensors, and microwave radar sensors), electromagnetic induction (inductive-loop detectors), and vibration (triboelectric, seismic, and inertia-switch sensors). Acoustic sensors are based on: Electret effect, inductive coupling, capacitive coupling, triboelectric effect, piezoelectric effect, and fiber optic transmission. Radar intrusion sensors usually have the lowest rate of false alarms. In one example, an electronic motion detector contains a motion sensor that transforms the detection of motion into an electrical signal. This can be achieved by measuring optical or acoustical changes in the field of view. Most motion detectors can detect up to 15-25 meters (50-80 ft). A n occupancy sensor is typically a motion detector that is integrated with hardware or software-based timing device. For example, it can be used for preventing illumination of unoccupied spaces, by sensing when motion has stopped for a specified time period, in order to trigger a light extinguishing signal.

One basic form of mechanical motion detection is in the form of a mechanically-actuated switch or trigger. For electronic motion detection, passive or active sensors may be used, where four types of sensors commonly used in motion detectors spectrum: Passive infrared sensors (passive) which looks for body heat, while no energy is emitted from the sensor, ultrasonic (active) sensors that send out pulses of ultrasonic waves and measures the reflection off a moving object, microwave (active) sensor that sends out microwave pulses and measures the reflection off a moving object, and tomographic detector (active) which senses disturbances to radio waves as they travel through an area surrounded by mesh network nodes. Alternatively or in addition, motion can be electronically identified using optical detection or acoustical detection. Infrared light or laser technology may be used for optical detection. Motion detection devices, such as PIR (Passive Infrared Sensor) motion detectors, have a sensor that detects a disturbance in the infrared spectrum, such as a person or an animal.

Many motion detectors use a combination of different technologies. These dual-technology detectors benefit with each type of sensor, and false alarms are reduced. Placement of the sensors can be strategically mounted so as to lessen the chance of pets activating alarms. Often, PIR technology will be paired with another model to maximize accuracy and reduce energy usage. PIR draws less energy than microwave detection, and so many sensors are calibrated so that when the PIR sensor is tripped, it activates a microwave sensor. If the latter also picks up an intruder, then the alarm is sounded. As interior motion detectors do not 'see' through windows or walls, motion-sensitive outdoor lighting is often recommended to enhance comprehensive efforts to protect a property. Some application for motion detection are (a) detection of unauthorized entry, (b) detection of cessation of occupancy of an area to extinguish lights and (c) detection of a moving object which triggers a camera to record subsequent events.

A sensor may be a humidity sensor, such as a hygrometer, used for measuring the humidity in the environmental air or other gas, relating to the water vapors or the moisture content, or any water content in a gas-vapor mixture. The hygrometer may be a humidistat, which is a switch that responds to a relative humidity level, and commonly used to control humidifying or dehumidifying equipment. The measured humidity may be an absolute humidity, corresponding to the amount of water vapor, commonly expressed in water mass per unit of volume. Alternatively or in addition, the humidity may be relative humidity, defined as the ratio of the partial pressure of water vapor in an air-water mixture to the saturated vapor pressure of water at those conditions, commonly expressed in percents (%), or may be specific humidity (a.k.a. humidity ratio), which is the ratio of water vapor to dry air in a particular mass. The humidity may be measured with a dew-point hygrometer, where condensation is detected by optical means. In capacitive humidity sensors, the effect of humidity on the dielectric constant of a polymer or metal oxide material is measured. In resistive humidity sensors, the resistance of salts or conductive polymers is measured. In thermal conductivity humidity sensors, the change in thermal conductivity of air due to the humidity is checked, providing indication of absolute humidity. The humidity sensor may be a humidistat, which is a switch that responds to a relative humidity level, and commonly used to control humidifying or dehumidifying equipment. The humidity sensor may be according to, or based on, the sensor described in U.S. Pat. No. 5,001,453 to Ikejiri et al., entitled: "Humidity Sensor", in U.S. Pat. No. 6,840,103 to Lee at al., entitled: "Absolute Humidity Sensor", in U.S. Pat. No. 6,806,722 to Shon et al., entitled: "Polymer-Type Humidity Sensor", or in U.S. Pat. No. 6,895,803 to Seakins et al., entitled: "Humidity Sensor", which are all incorporated in their entirety for all purposes as if fully set forth herein.

A sensor may be an atmospheric sensor, and may be according to, or based on, the sensor described in U.S. Patent Application Publication No. 2004/0182167 to Orth et al., entitled: "Gage Pressure Output From an Absolute Pressure Measurement Device", in U.S. Pat. No. 4,873,481 to Nelson et al., entitled: "Microwave Radiometer and Methods for Sensing Atmospheric Moisture and Temperature", in U.S. Pat. No. 3,213,010 to Saunders et al., entitled: "Vertical Drop Atmospheric Sensor", or in U.S. Pat. No. 5,604,595 to Schoen, entitled: "Long Stand-Off Range Differential Absorption Tomographic Atmospheric Trace Substances Sensor Systems Utilizing Bistatic Configurations of Airborne and Satellite Laser Source and Detector Reflector Platforms", which are all incorporated in their entirety for all purposes as if fully set forth herein.

A sensor may be a bulk or surface acoustic wave sensor, and may be according to, or based on, the sensor described in U.S. Patent Application Publication No. 2010/0162815 to Lee, entitled: "Manufacturing Method for Acoustic Wave Sensor Realizing Dual Mode in Single Chip and Biosensor Using the Same", in U.S. Patent Application Publication No. 2009/0272193 to Okaguchi et al., entitled: "Surface Acoustic Wave Sensor", in U.S. Pat. No. 7,219,536 to Liu et al., entitled: "System and Method to Determine Oil Quality Utilizing a Single Multi-Function Surface Acoustic Wave Sensor", or in U.S. Pat. No. 7,482,732 to Kalantar-Zadeh, entitled: "Layered Surface Acoustic Wave Sensor", which are all incorporated in their entirety for all purposes as if fully set forth herein.

A sensor may be a clinometer (a.k.a. inclinometer, tilt sensor, slope gauge, and pitch/roll indicator) for measuring angle (or slope or tilt), elevation or depression of an object, or pitch or roll (commonly with respect to gravity), with respect to the earth ground plane, or with respect to the horizon, commonly expressed in degrees. The clinometers may measure inclination (positive slope), declination (negative slope), or both. A clinometer may be based on an accelerometer, a pendulum, or on a gas bubble in liquid. The inclinometer may be a tilt switch, such as a mercury tilt switch, commonly based on a sealed glass envelope which contains a bead or mercury. When tilted in the appropriate direction, the bead touches a set (or multiple sets) of contacts, thus completing an electrical circuit.

The sensor may be an angular rate sensor, and may be according to, or based on, the sensor described in U.S. Pat. No. 4,759,220 to Burdess et al., entitled: "Angular Rate Sensors", in U.S. Patent Application Publication No. 2011/0041604 to K ano et al., entitled: "Angular Rate Sensor", in U.S. Patent Application Publication No. 2011/0061460 to Seeger et al., entitled: "Extension-M ode Angular Velocity Sensor", or in U.S. Patent Application Publication No. 2011/0219873 to OHTA et al., entitled: "Angular Rate Sensor ", which are all incorporated in their entirety for all purposes as if fully set forth herein.

A sensor may be a proximity sensor for detecting the presence of nearby objects without any physical contact. A proximity sensor may be of ultrasonic, capacitive, inductive, magnetic, eddy-current or infrared (IR) type. A typical proximity sensor emits a field or a signal, and senses the changes in the field due to the object. An inductive type emits magnetic field, and may be used with a metal or conductive object. An optical type emits a beam (commonly infrared), and measures the reflected optical signal. A proximity sensor may be a capacitive displacement sensor, based on the capacitance change due to the proximity of conductive and non-conductive materials. A metal detector is one type of a proximity sensor using inductive sensing, responding to conductive material such as metal. Commonly a coil produces an alternating magnetic field, and measuring eddy-currents or the changes in the magnetic fields.

A sensor may be a flow sensor, for measuring the volumetric or mass flow rate (or flow velocity) of gas or liquid such as via a defined area or a surface, commonly expressed in liters per second, kilogram per second, gallons per minute, or cubic-meter per second. A liquid flow sensor typically involves measuring the flow in a pipe or in an open conduit. A flow measurement may be based on a mechanical flow meter, where the flow affects a motion to be sensed. Such meter may be a turbine flow meter, based on measuring the rotation of a turbine, such as axial turbine, in the liquid (or gas) flow around an axis. A mechanical flow meter may be based on a rotor with helical blades inserted axially in the flow (Woltmann meter), or a single jet meter based on a simple impeller with radial vanes, impinged upon by a single jet (such as a paddle wheel meter). Pressure-based meters may be based on measuring a pressure or a pressure differential, caused by the flow, commonly based on Bernoulli's principle. A Venturi meter is based on constricting the flow (e.g., by an orifice), and measuring the pressure differential before and within the constriction. Commonly a concentric, eccentric, or segmental orifice plate may be used, including a plate with a hole. An optical flow meter use light to determine the flow-rate, commonly by measuring the actual speed of particles in the gas (or liquid) flow, by using a light emitter (e.g., laser) and a photo-detector. Similarly, the Doppler-effect may be used with sound, such as an ultrasonic sound, or with light, such as a laser Doppler. The sensor may be based on an acoustic velocity sensor, and may be according to, or based on, the sensor described in U.S. Pat. No. 5,930,201 to Cray, entitled: "Acoustic Vector Sensing Sonar System", in U.S. Pat. No. 4,351,192 to Toda et al., entitled: "Fluid Flow Velocity Sensor Using a Piezoelectric Element", or in U.S. Pat. No. 7,239,577 to Tenghamn et al., entitled: "Apparatus and Methods for Multicomponent Marine Geophysical Data Gathering", which are all incorporated in their entirety for all purposes as if fully set forth herein.

A flow sensor may be an air flow sensor, for measuring the air flow, such as through a surface (e.g., through a tube) or a volume. The sensor may actually measure the air volume passing (such as in vane/flap air flow meter), or may measure the actual speed or air flow. In some cases, a pressure, typically differential pressure, is measured as an indicator for the air flow measurements.

An anemometer is an air flow sensor primarily for measuring wind speed. A ir or wind flow may use cup anemometer, which typically consists of hemispherical cups mounted on the ends of horizontal arms. The air flow past the cups in any horizontal direction turns the cups proportional to the wind speed. A windmill anemometer combines a propeller and a tail on the same axis, to obtain wind speed and direction measurements. Hot-wire anemometer commonly uses a fine (several micrometers) tungsten (or other metal) wire, heated to some temperature above the ambient, and uses the cooling effect of the air flowing past the wire. Hot-wire devices can be further classified as CCA (Constant-Current A nemometer), CVA (Constant-Voltage Anemometer) and CTA (Constant-Temperature Anemometer). The voltage output from these anemometers is thus the result of some sort of circuit within the device trying to maintain the specific variable (current, voltage or temperature) constant. Laser Doppler anemometers use a beam of light from a laser that is divided into two beams, with one propagated out of the anemometer. Particulates (or deliberately introduced seed material) flowing along with air molecules near where the beam exits reflect, or backscatter, the light back into a detector, where it is measured relative to the original laser beam. When the particles are in great motion, they produce a Doppler shift for measuring wind speed in the laser light, which is used to calculate the speed of the particles, and therefore the air around the anemometer. Sonic anemometers use ultrasonic sound waves to measure wind velocity. They measure wind speed based on the time of flight of sonic pulses between pairs of transducers. Measurements from pairs of transducers can be combined to yield a measurement of velocity in 1-, 2-, or 3-dimensional flow. The spatial resolution is given by the path length between transducers, which is typically 10 to 20 cm. Sonic anemometers can take measurements with very fine temporal resolution, 20 Hz or better, which makes them well suited for turbulence measurements. Air flow may be further measured by pressure anemometers, which may be a plate or a tube type. Plate anemometer uses a flat plate suspended from the top so that the wind deflects the plate, or by balancing a spring compressed by the pressure of the wind on its face. Tube anemometer comprises a glass U tube containing a liquid manometer serving as a pressure gauge, with one end bent in a horizontal direction to face the wind and the other vertical end remains parallel to the wind flow.

An inductive sensor may be eddy-current (a.k.a. Foucault currents) based sensor, used for high-resolution non-contact measurement or a position, or a change in the position, of a conductive object (such as a metal). Eddy-Current sensors operate with magnetic fields, where a driver creates an alternating current in a coil at the end of the probe. This creates an alternating magnetic field with induces small currents (eddy currents) in the target material. The eddy currents create an opposing magnetic field which resists the field being generated by the probe coil and the interaction of the magnetic fields is dependent on the distance between the probe and the target, providing a displacement measurement. Such sensors may be used to sense the vibration and position measurements, such as measurements of a rotating shaft, and to detect flaws in conductive materials, as well as in a proximity and metal detectors.

A sensor may be an ultrasound (or ultrasonic) sensor, based on transmitting and receiving ultrasound energy, and may be according to, or based on, the sensor described in U.S. Patent Application Publication No. 2011/0265572 to Hoenes, entitled: "Ultrasound Transducer, Ultrasound Sensor and Method for Operating an Ultrasound Sensor", in U.S. Pat. No. 7,614,305 to Y oshioka et al., entitled: "Ultrasonic Sensor", in U.S. Patent Application Publication No. 2008/0257050 to Watanabe, entitled: "Ultrasonic Sensor", or in U.S. Patent Application Publication No. 2010/0242611 to Terazawa, entitled: "Ultrasonic Sensor", which are all incorporated in their entirety for all purposes as if fully set forth herein.

A sensor may be a solid state sensor, which is typically a semiconductor device and which have no mobile parts, and commonly enclosed as a chip. The sensor may be according to, or based on, the sensor described in U.S. Pat. No. 5,511,547 to Markle, entitled: "Solid State Sensors", in U.S. Pat. No. 6,747,258 to Benz et al., entitled: "Intensified Hybrid Solid-State Sensor with an Insulating Layer", in U.S. Pat. No. 5,105,087 to Jagielinski, entitled: "Large Solid State Sensor Assembly Formed from Smaller Sensors", or in U.S. Pat. No. 4,243,631 to Ryerson, entitled: "Solid State Sensor", which are all incorporated in their entirety for all purposes as if fully set forth herein.

A sensor may be a nanosensor, which is a biological, chemical or physical sensor constructed using nanoscale components, usually microscopic or submicroscopic in size. A nanosensor may be according to, or based on, the sensor described in U.S. Pat. No. 7,256,466 to Lieber et al., entitled: "Nanosensors", in U.S. Patent Application Publication No. 2007/0264623 to Wang et al., entitled: "Nanosensors", in U.S. Patent Application Publication No. 2011/0045523 to Strano et al., entitled: "Optical Nenosensors Comprising Photoluminescent Nanostructures", or in U.S. Patent Application Publication No. 2011/0275544 to Zhou et al., entitled: "Microfluidic Integration with Nanosensor Platform", which are all incorporated in their entirety for all purposes as if fully set forth herein.

A sensor may consist of, or be based on, a gyroscope, for measuring orientation is space. A conventional gyroscope is a mechanical type, consisting of a wheel or disk mounted so that it can spin rapidly about an axis that is itself free to alter in direction. The orientation of the axis is not affected by tilting of the mounting; so gyroscopes are commonly used to provide stability or maintain a reference direction in navigation systems, automatic pilots, and stabilizers. A MEM S gyroscope may be based on vibrating element based on the Foucault pendulum concept. A Fiber Optic Gyroscope (FOG) uses the interference or light to detect mechanical rotation. A Vibrating structure Gyroscope (VSG, a.k.a. Coriolis Vibratory Gyroscope—CVG), is based on a metal alloy resonator, and may be a piezoelectric gyroscope type where a piezoelectric material is vibrating and the lateral motion due to centrifugal force is measured.

In one example, the same component serves as both a sensor and as an actuator. For example, a loudspeaker may serve as a microphone, as some speakers are structured similar to a dynamic or magnetic microphone. In another example, a reverse-biased LED (Light Emitting Diode) may serve as a photodiode. Further, a coil may be used to produce a magnetic field by excitation electrical current through it, or may be used as a sensor generating an electrical signal when subjected to a changing magnetic field. In another example, the piezoelectric effect may be used, converting between mechanical phenomenon and electrical signal. A transducer is a device that converts one form of energy to another. Energy types include (but are not limited to) electrical, mechanical, electromagnetic (including light), chemical, acoustic or thermal energy. Transducers that convert to an electrical signal may serve as sensors, while transducers that convert electrical energy to another form of energy may serve as actuators. Reversible transducers, that are able to convert energy both ways, may serve as both sensors and actuators. In one example, the same component (e.g., transducer) serves at one time as a sensor, and at another time as an actuator. Further, the phenomenon sensed when serving as a sensor may be the same or different phenomena affected when serving as an actuator.

In one example, multiple sensors are used arranged as a sensor array, where a set of several sensors, typically identical or similar, is used to gather information that cannot be gathered from a single sensor, or improve the measurement or sensing relating to a single sensor. A sensor array commonly improves the sensitivity, accuracy, resolution, and other parameters of the sensed phenomenon, and may be arranged as a linear sensor array. The sensor array may be directional, and better measure the parameters of the impinging signal to the array. Parameters that may be identified include the number, magnitudes, frequencies, Direction-Of-Arrival (DOA), distances and speeds of the signals. Estimation of the DOA may be improved in far-field signal applications, and may be based on Spectral-based (Non-parametric) that is based on maximizing the power of the beamforming output for a given input signal (such as Barlett beamformer, Capon beamformer and MUSIC beamformer), or may be based on Parametric approaches that is based on minimizing quadratic penalty functions. The processing of the entire sensor array outputs, such as to obtain a single measurement or a single parameter, may be performed by a dedicated processor, which may be part of the sensor array assembly, may be performed in the processor of the field unit, may be performed by the processor in the router, may be performed as part of the controller functionality (e.g., in the control server), or any combination thereof. Further, sensor array may be used to sense a phenomenon pattern in a surface or in space, as well as the phenomenon motion or distribution in a location.

Alternatively or in addition, a sensor, a sensor technology, a sensor conditioning or handling circuits, or a sensor application, may be according to the book entitled: "Sensors and Control Systems in manufacturing", Second Edition 2010, by Sabrie Soloman, The McGraw-Hill Companies, ISBN: 978-O-07-160573-1, or according to the book entitled: "Fundamentals of Industrial Instrumentation and Process Control", by William C. Dunn, 2005, The McGraw-Hill Companies, ISBN: 0-07-145735-6, or according to the book entitled: "Sensor technology Handbook", Edited by J on Wilson, by Newnes-Elsevier 2005, ISBN: 0-7506-7729-5, which are all incorporated in their entirety for all purposes as if fully set forth herein.

In one example, the sensor 51 is used for measuring magnetic or electrical quantities such as voltage (e.g., voltmeter), current (e.g., ampermeter), resistance (e.g., ohmmeter), conductance, reactance, magnetic flux, electrical charge, magnetic field (e.g., Hall sensor), electric field, electric power (e.g., electricity meter), S-matrix (e.g., network analyzer), power spectrum (e.g., spectrum analyzer), inductance, capacitance, impedance, phase, noise (amplitude or phase), transconductance, transimpedance, and frequency. In one example shown in arrangement 500a in FIG. 5a, part of a sensor unit 50a is shown, including an ampermeter 57 which is corresponding to the sensor 51, connected between a power source 56a and a power consuming circuit or load 58. In such arrangement, the current consumed by the load 58 is measured. The power source 56a may be any type of power source or power supply, and may provide AC or DC voltage or current. The power source 56a connects via a cable ending with connector 59a to a mating connector 59b that is part of the sensor unit 50a The load 58 is connected via a cable terminating with a connector 59d to a mating connector 59c that is part of the sensor unit 50a The load 58 may be any power consuming circuit, such as an actuator 61, a home appliance or any other type of equipment. The power source 56a (or power supply) may be the same power source used to power the circuits of the sensor unit 50a, or may be a separate power source used for powering the load 58 where the sensor unit 50a uses a separate power source.

Figure 5A:
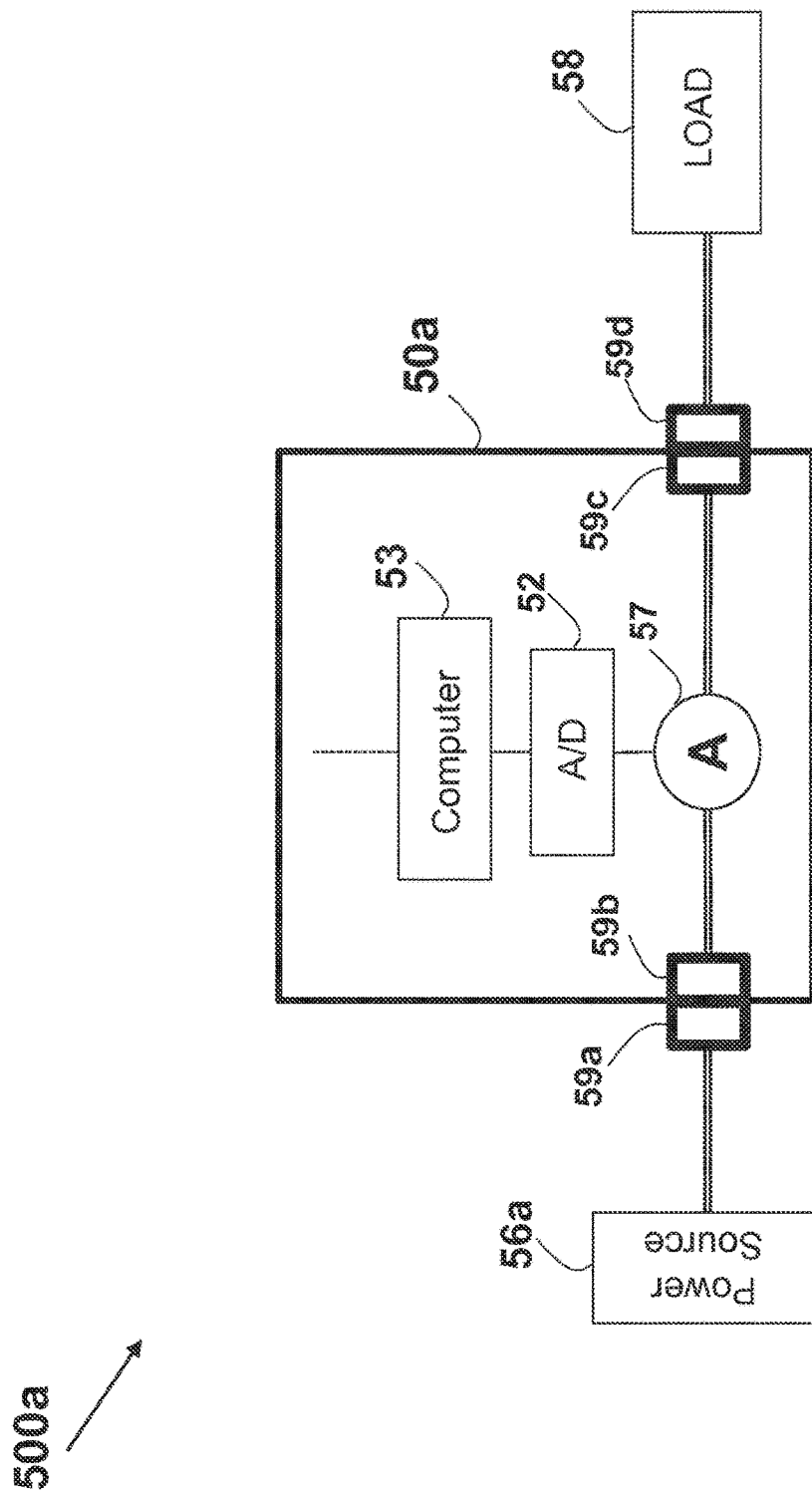
FIG. 5a illustrates a schematic electrical diagram of a current measuring sensor unit.

While the power source 56a was exampled in FIG. 5a as separated from the sensor unit 50a and connected thereto via a cable, the power source 56a may equally be integrated with the sensor unit 50a Such integration may take the form of sharing the same enclosure, or where the power source 56a is also used to power at least part of the sensor unit 50a circuits. While the load 58 was exampled in FIG. 5a as separated from the sensor unit 50a and connected thereto via a cable, the load 58 may equally be integrated with the sensor unit 50a Such integration may take the form of sharing the same enclosure, or where the power source of the load 58 is also used to power at least part of the sensor unit 50a circuits. Other types of integration may involve sharing the computer 53 or sharing any other circuits or functionalities.

Figure 5B:
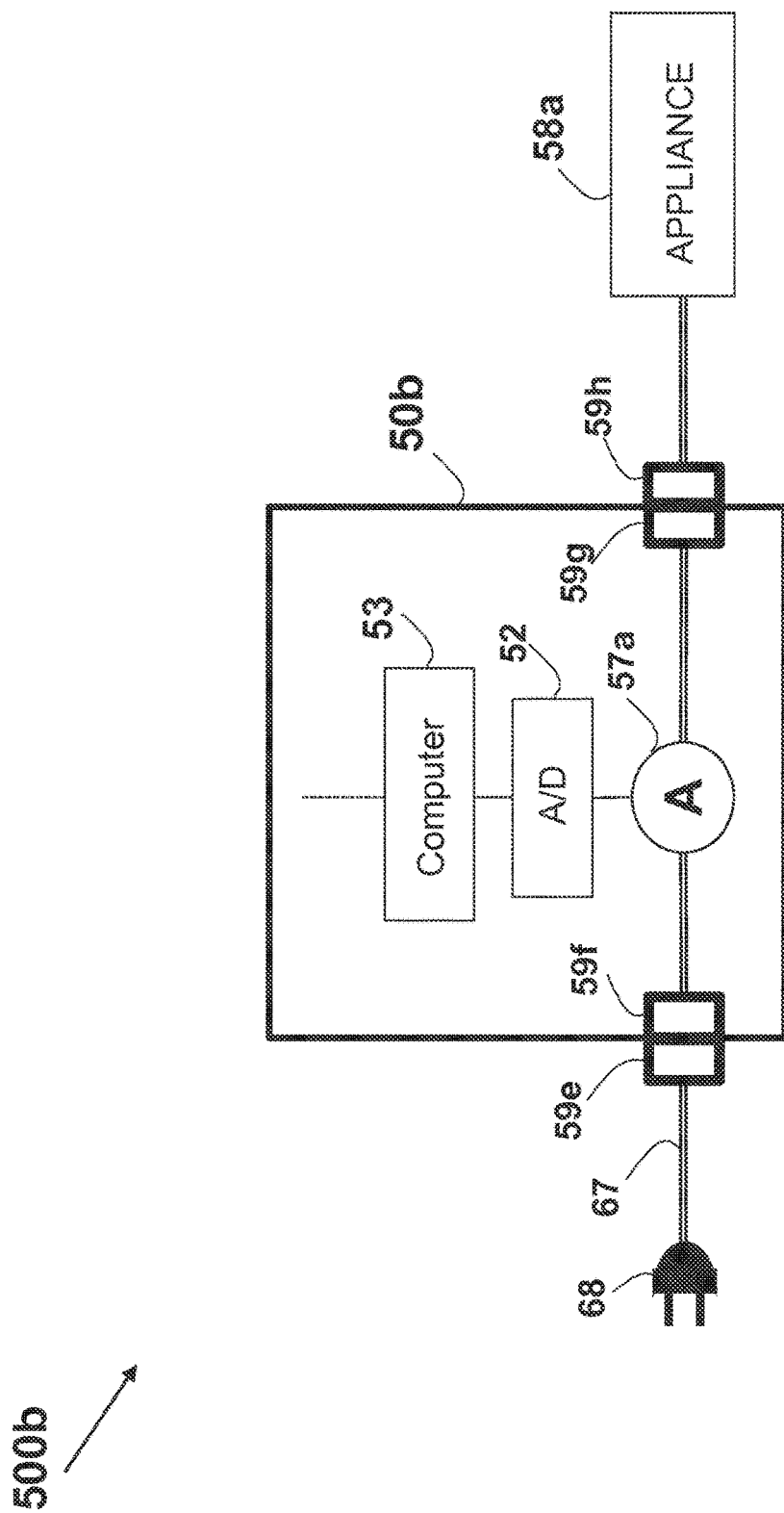
FIG. 5b illustrates a schematic electrical diagram of an AC current measuring sensor unit.

Referring now to FIG. 5b, showing an arrangement 500b where a sensor unit 50 bis used for sensing the power consumed by an AC-powered appliance 58a The appliance 58a corresponds to load 58, and is connected via cable and AC power connectors 59h and 59g to the sensor unit 50b. The appliance 58a is power fed from an AC power via the AC power plug 68, connected via AC power cable 67 to the sensor unit 50b via AC power connectors 59e and 59f. The ampermeter 57a (corresponding to ampermeter 57) is operative for measuring the AC current flowing through it, and thus measure the power consumed by the appliance 58a The appliance 58a may be a major appliance (white goods) and may be an air conditioner, dishwasher, clothes dryer, drying cabinet, freezer, refrigerator, kitchen stove, water heater, washing machine, trash compactor, microwave oven and induction cooker. The appliance 58a may similarly be a 'small' appliance such as television (TV) set, CD or DVD player, camcorder, still camera, clock, alarm clock, video game console, HiFi or home cinema, telephone or answering machine.

In one example, the sensor element includes a solar cell or photovoltaic cell, for sensing or measuring light intensity. The luminance is commonly measured in Lux (lx) units, the luminous flux is measured in Lumens (lm), and the luminous intensity is commonly measured in Candela (cd) units. A solar cell (also called photovoltaic cell or photoelectric cell) is a solid state electrical device that converts the energy of light directly into electricity by the photovoltaic effect. Assemblies of solar cells are used to make solar modules which are used to capture energy from sunlight. Cells are described as photovoltaic cells when the light source is not necessarily sunlight. These are used for detecting light or other electromagnetic radiation near the visible range, for example infrared detectors, or measurement of light intensity. The solar cell works in three steps: Photons in sunlight hit the solar panel and are absorbed by semi conducting materials, such as silicon, electrons (negatively charged) are knocked loose from their atoms, causing an electric potential difference, and current starts flowing through the material to cancel the potential and this electricity is captured. Due to the special composition of solar cells, the electrons are only allowed to move in a single direction. An array of solar cells converts solar energy into a usable amount of direct current (DC) electricity.

Materials for efficient solar cells must have characteristics matched to the spectrum of available light. Some cells are designed to efficiently convert wavelengths of solar light that reach the Earth's surface. However, some solar cells are optimized for light absorption beyond Earth's atmosphere as well. Light absorbing materials can often be used in multiple physical configurations to take advantage of different light absorption and charge separation mechanisms. Materials presently used for photovoltaic solar cells include monocrystalline silicon, polycrystalline silicon, amorphous silicon, cadmium telluride, and copper indium selenide/sulfide. M any currently available solar cells are made from bulk materials that are cut into wafers between 180 to 240 micrometers thick that are then processed like other semiconductors. Other materials are made as thin-film layers, organic dyes, and organic polymers that are deposited on supporting substrates. A third group is made of nanocrystals and used as quantum dots (electron-confined nanoparticles). Silicon remains the only material that is well-researched in both bulk and thin-film forms. The most prevalent bulk material for solar cells is crystalline silicon (abbreviated as a group as c-Si), also known as "solar grade silicon". Bulk silicon is separated into multiple categories according to crystallinity and crystal size in the resulting ingot, ribbon, or wafer.

Figure 5C:
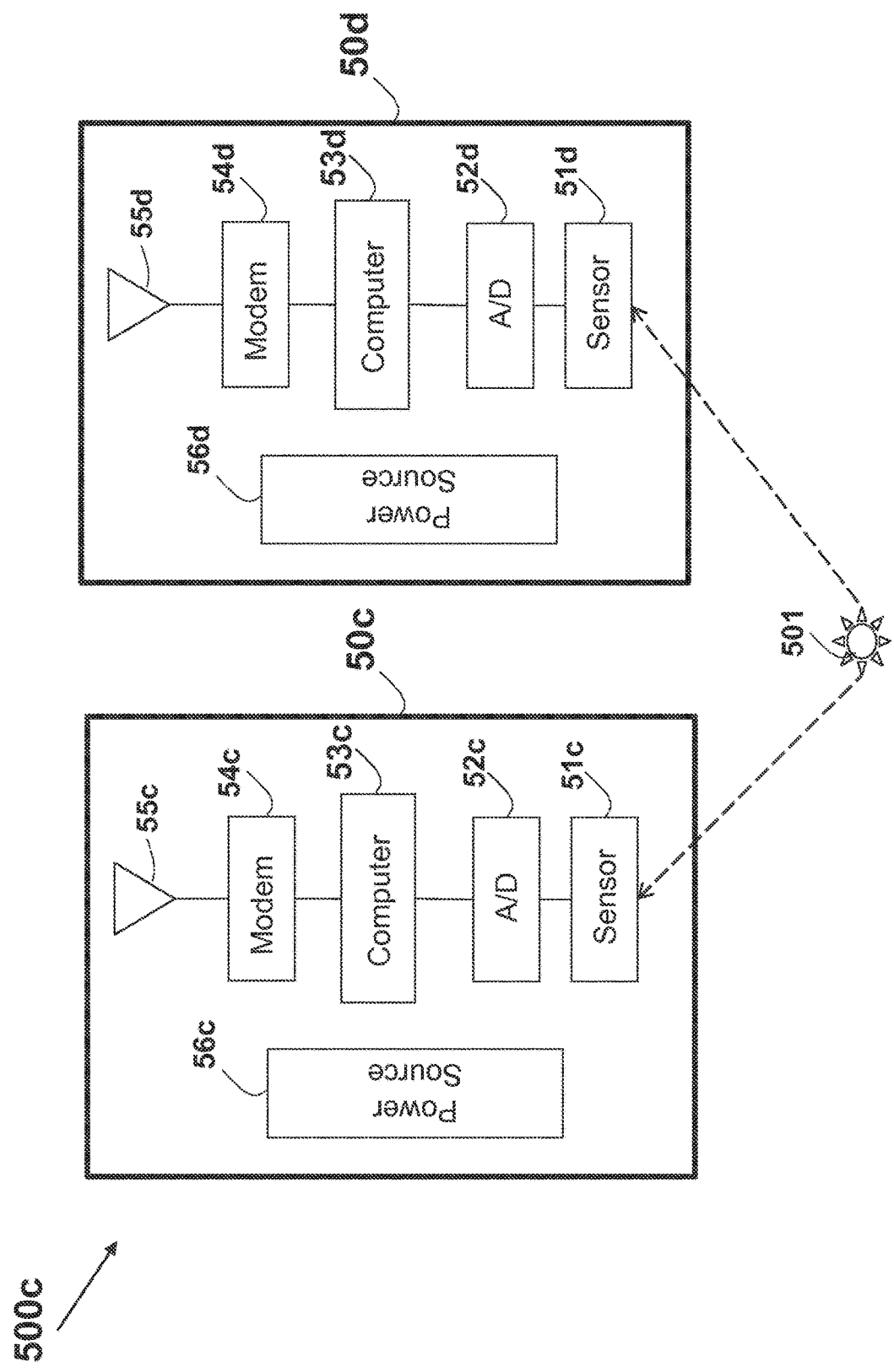
FIG. 5c illustrates a schematic electrical diagram of multiple sensor units for sensing the same phenomenon.

A sensor redundancy may be used in order to improve availability and reliability. In such arrangement, two or more sensor elements 51 are used in parallel, allowing for improved robustness and allowing for overcoming a single point of failure (SPOF). Two or more sensor elements 51 may be used, all sensing or measuring the same physical phenomenon. An example of a redundant arrangement 500c is shown in FIG. 5c, showing two sensor units 50c and 50d The sensor unit 50c includes a sensor element 51c, connected to A/D converter 52c, which in turn is connected to computer 53c The measured value (or any representation thereof) is transmitted via the wireless modem 54c and antenna 55c, and the sensor unit 50c is powered from a power source 56c Similarly, the sensor unit 50d includes a sensor element 51d, connected to A/D converter 52d, which in turn is connected to computer 53d The measured value (or any representation thereof) is transmitted via the wireless modem 54d and antenna 55d, and the sensor unit 50d is powered from a power source 56d. The two sensor elements 51c and 51d are located, installed, oriented, or otherwise arranged to sense or measure the same physical phenomenon 501 The sensor elements 51c and 51d may be different, similar, substantially the same, or of the same type. For example, both sensor elements 51c and 51d may be temperature sensors, and may be adjacently located to sense the temperature at the same place, or may be both attached to a surface to measure the surface temperature. While two sensor units 50c and 50d are described in FIG. 5c, three, four or any other number of sensor units may be equally used. In such configuration, a single failure in one of the sensor units 50c and 50d, the monitored phenomenon 501 may still be sensed or measured.

While the two sensor units 50c and 50d were described as having the same structure, other arrangement may be equally used, and the two (or more) sensor units may be different, similar, substantially or fully the same. While both sensor units 50c and 50d were exampled as having a wireless interface via the wireless modem 54 and antenna 55, other configurations may equally be used, for example where one sensor unit 50 use wireless communication and the other use a wired communication. Further, one sensor element may be of analog output type while the other may be a digital sensor element, where the use of A/D converter 52 is obviated.

Figure 5D:
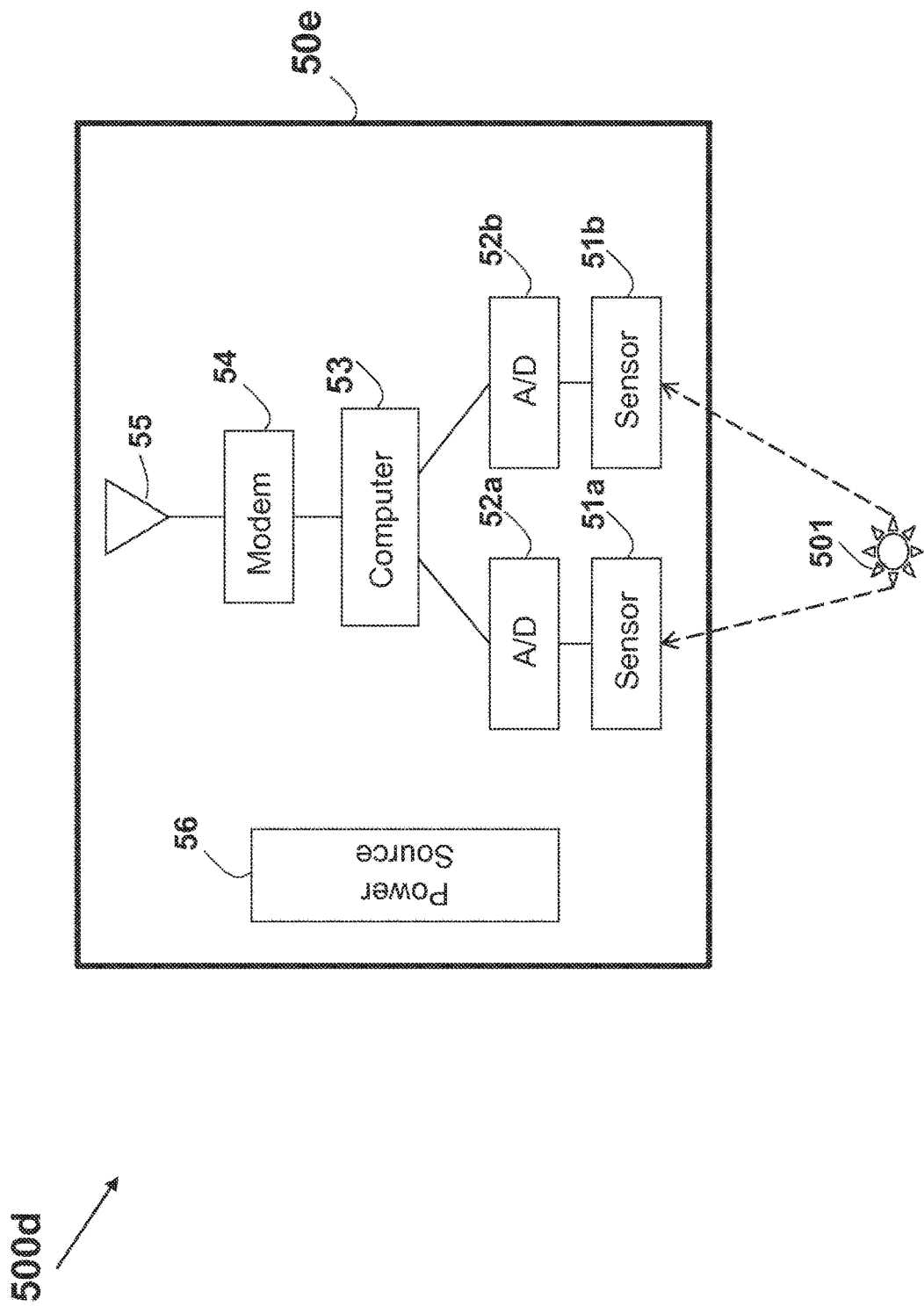
FIG. 5d illustrates a schematic electrical diagram of a sensor unit having multiple sensors for sensing the same phenomenon.
Figure 5E:
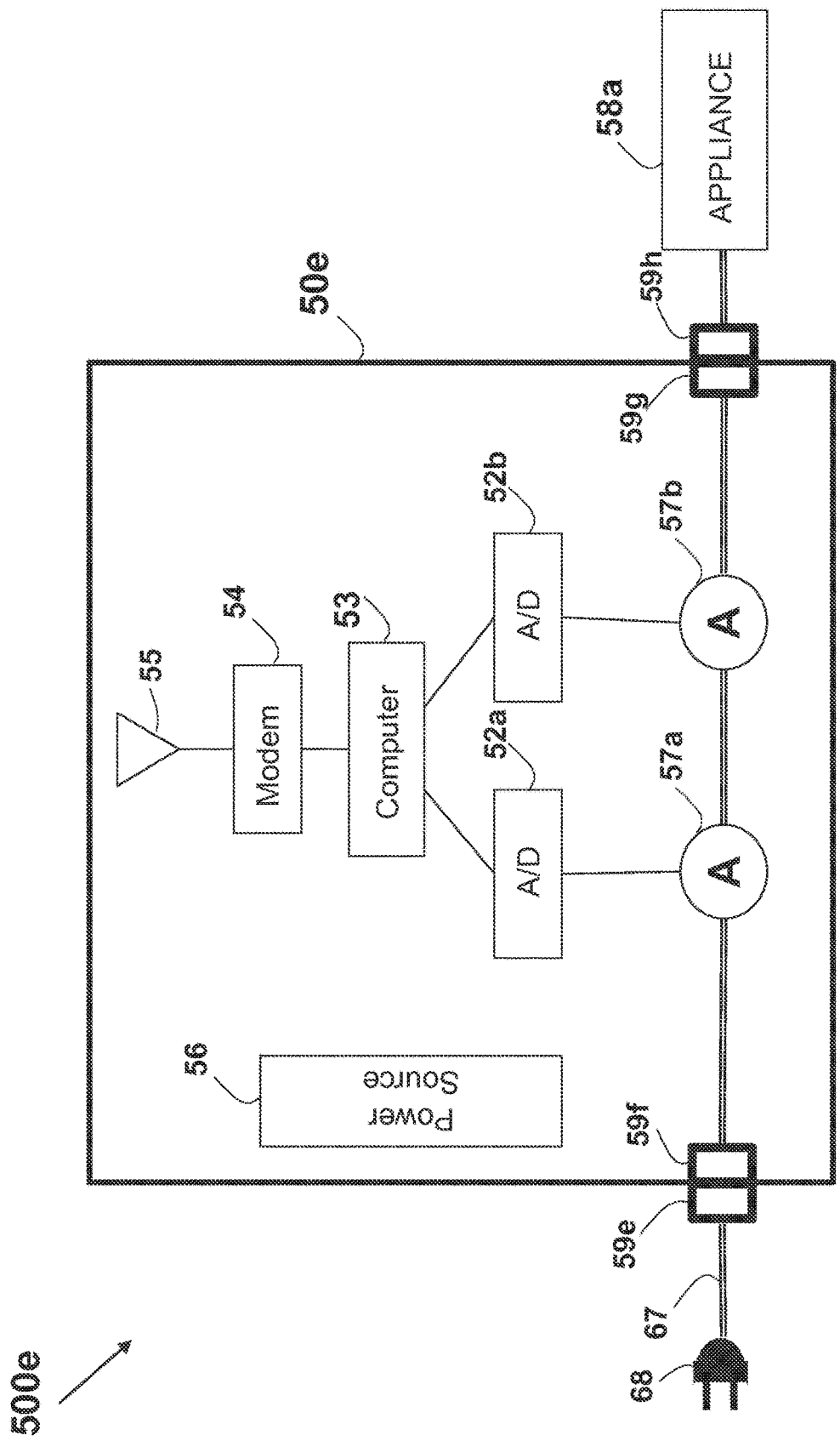
FIG. 5e illustrates a schematic electrical diagram of a sensor unit having multiple A C current sensors for sensing the same A C current.

While two separated sensor units 50c and 50d were described in FIG. 5c, the two devices may be partially or fully integrated with each other. For example, both sensor units 50 may share the same enclosure, same power source 56, same computer 53, or any other hardware, software or any other functionality. Such integration provides economical benefit due to the saving of the non-duplicated part. In one example, the two sensor elements are part of a single sensor unit 50d, as shown in arrangement 500d in FIG. 5d. The sensor unit 50 ecorresponds to the sensor unit 50 shown in FIG. 5, where the two sensors 51a and 51b are used to sense the same phenomenon. Applying such a concept to current measurement facility shown in FIG. 5b above is described in arrangement 500e shown in FIG. 5e. The sensor unit 50f shown corresponds to sensor unit 50e shown in FIG. 5d, where the two sensors are the two ampermeters 57a and 57b, connected in series such that both ampermeters 57a and 57b measure the current flow from the AC power source via the power plug 68 to the appliance 58a While the redundant sensors have been exampled with regard to the added reliability and availability, other benefits may as well be provided. For example, the average of the two (or more) sensors may be calculated and used, providing higher accuracy. Further, the multiple sensors may serve as sensor array as disclosed herein.

In one example, redundancy is employed in the communication of a sensor unit (or a field unit) with the router 21 or with another field unit. An example of a sensor unit 50g having two communication ports is shown in FIG. 5g. The sensor unit 50g corresponds to the sensor unit 50 shown in FIG. 5 above, with an additional communication port. The added communication port is a wired port including a wired modem 64 coupled to the connector 65b, for connecting to a cable 69 connected via the mating connector 65a, similar to the wired communication port described for actuator unit 60 shown in FIG. 6 below. While sensor unit 50g is exampled as having two communication ports, three or more ports may be equally used. Further, while sensor unit 50g is exampled having different and distinct communication ports, the wired communication port (comprising connector 65b and wired modem 64) and the wireless communication port (comprising wireless modem 54 and antenna 55), the two (or more) ports may as well similar or identical, and may be communicating over the same network or via two (or more) distinct networks). For example, the two ports may be wireless based, or alternately the two ports may be wired based.

Figure 5F:
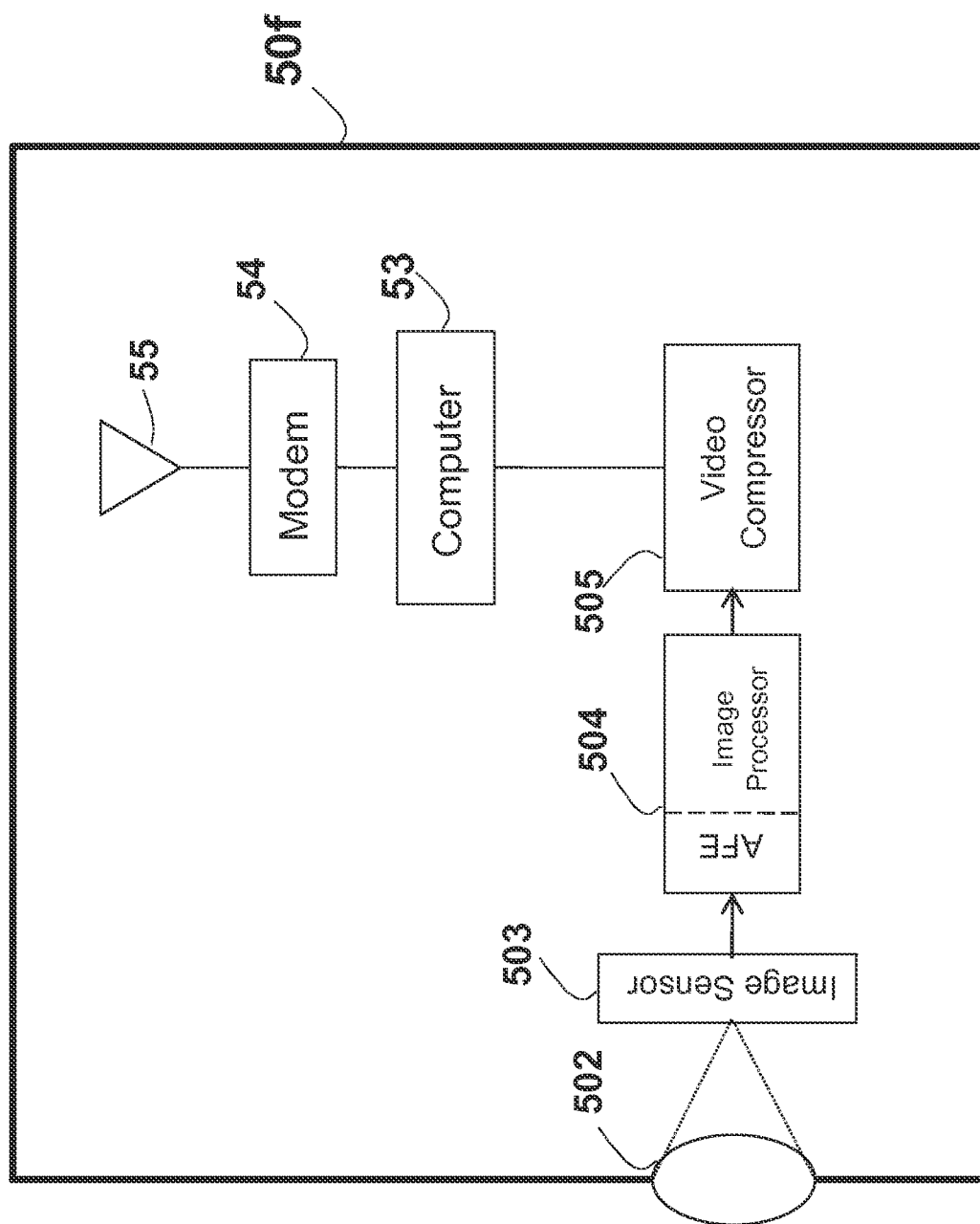
FIG. 5f illustrates a schematic electrical diagram of an image sensor based sensor unit.
Figure 5G:
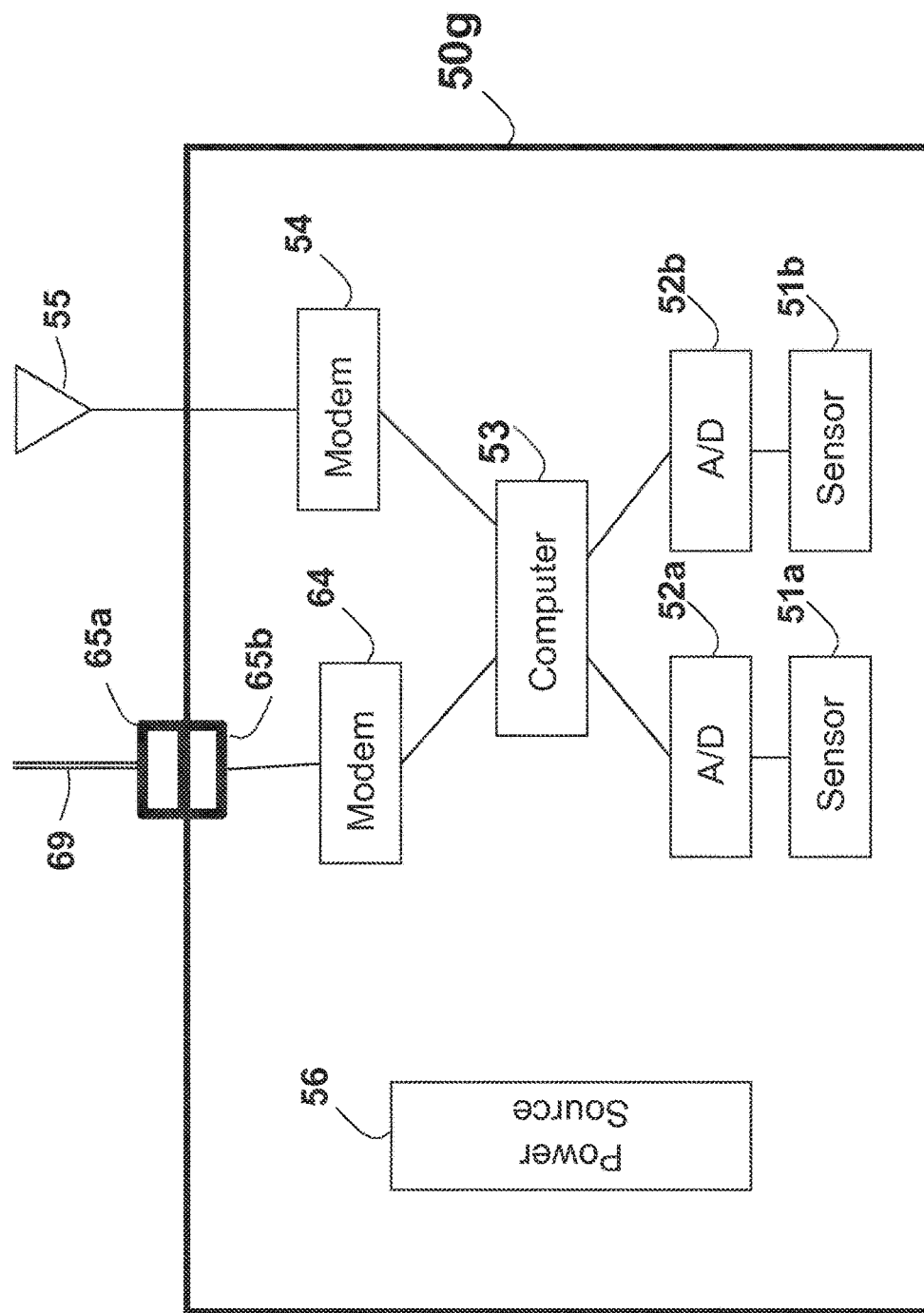
FIG. 5g illustrates a schematic electrical diagram of a sensor unit having two communication ports.
Figure 5H:
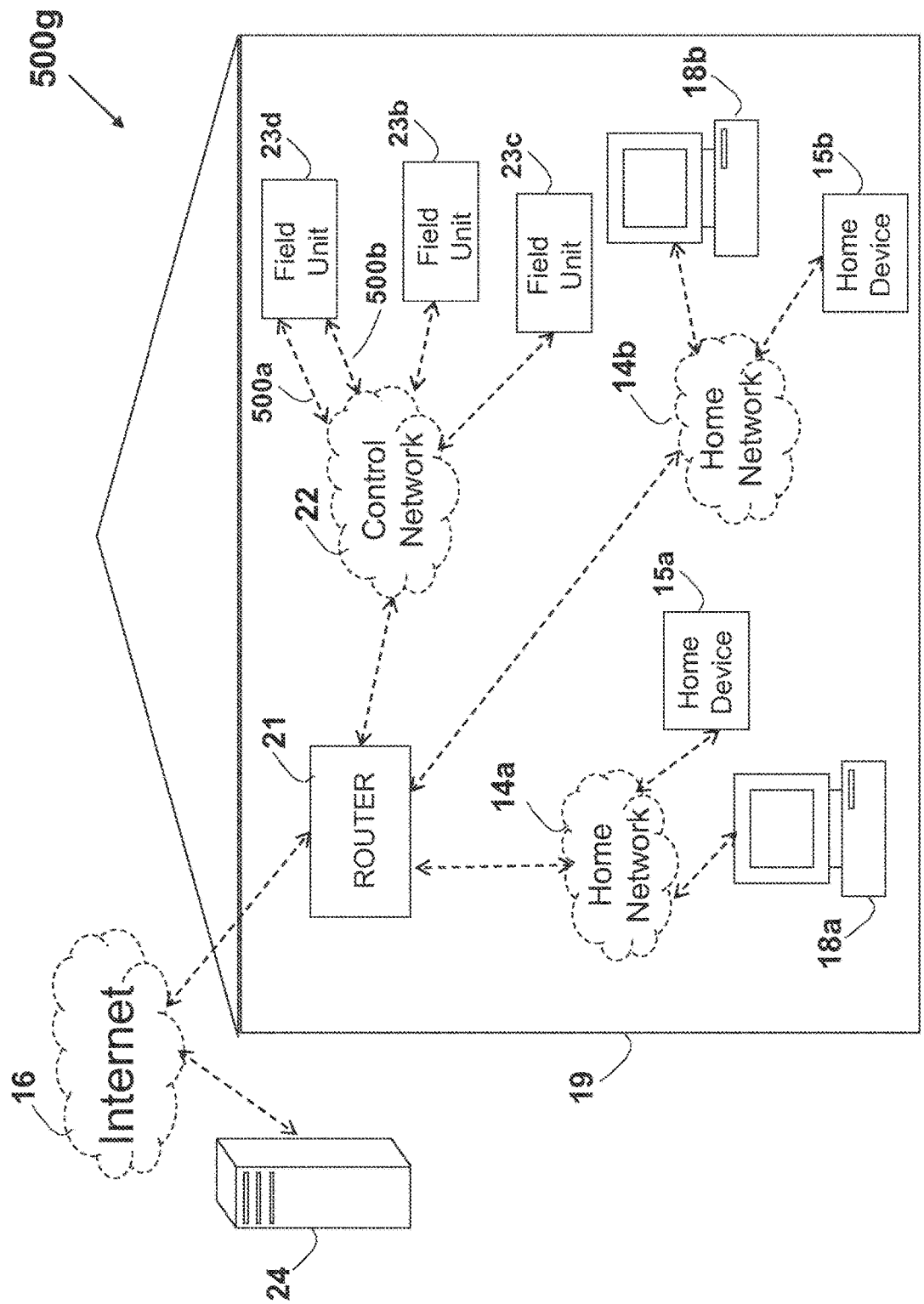
FIG. 5h illustrates a schematic electrical diagram of a system including a field unit having two communication ports.
Figure 5I:
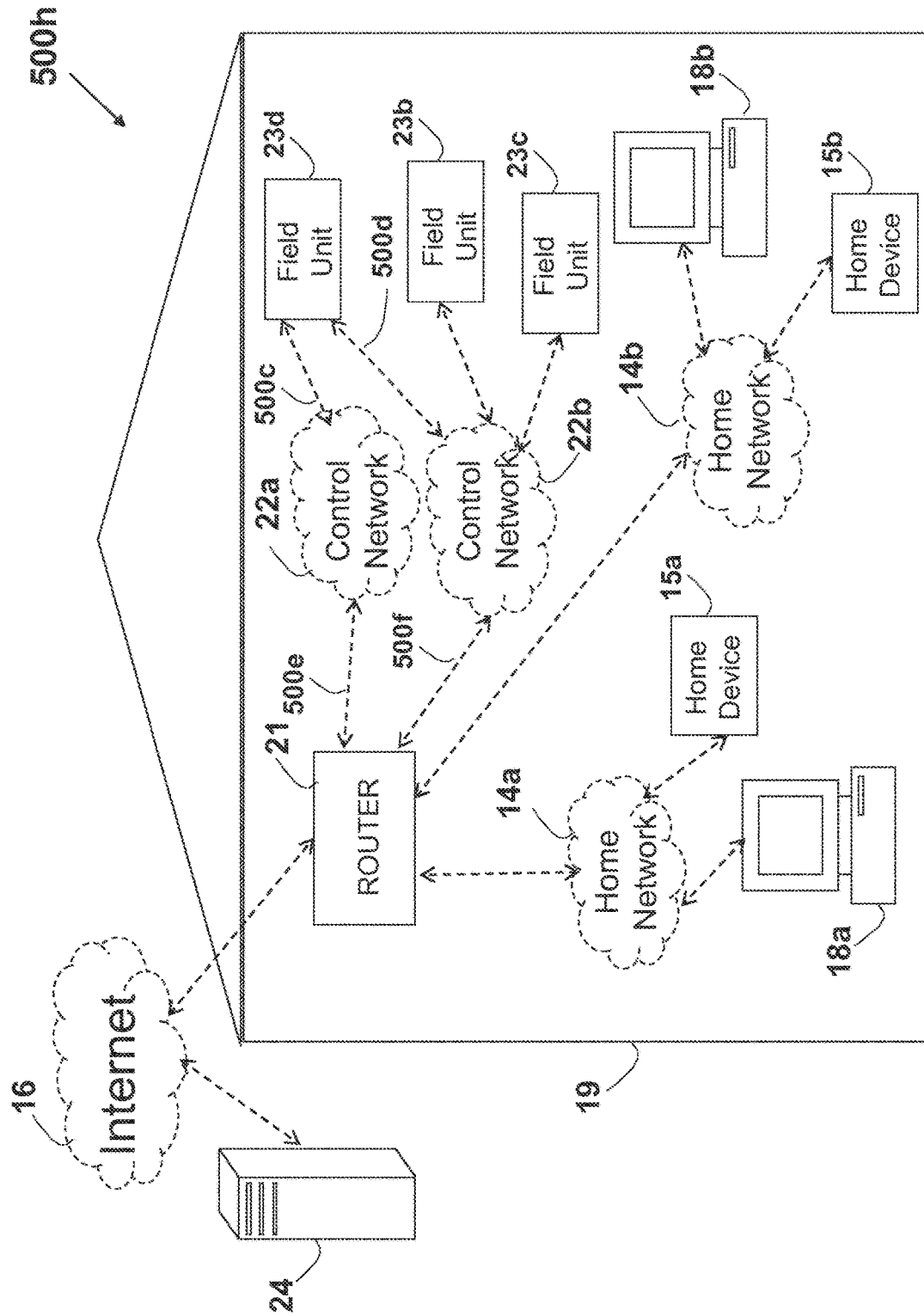
FIG. 5i illustrates a schematic electrical diagram of a system including a field unit having two communication ports and coupled to two networks.

A system employing two ports unit is shown as arrangement 500g in FIG. 5h. The arrangement 500g corresponds to the system 20 shown in FIG. 2, where the field unit 23d (replacing the one-port field unit 23a) is shown, and may correspond to the sensor unit 50g having two communication ports. In arrangement 500g the two ports are identical (or similar), and the field unit 23d communicates using its two communication ports over the same control network 22 over the two communication routes 500a and 500b, each corresponds to a respective communication port. Arrangement 500h shown in FIG. 5i describes the case where the field unit uses two distinct ports, for communication over two distinct networks 22a and 22b, respectively via connections 500c and 500d. As shown in the arrangement 500h, the control networks 22a and 22b may be connected to two distinct communication ports in the router 21 via the connections 500e and 500f. For example, the field unit 23d may correspond to the sensor unit 50g where the control network 22a may be a wired network using the cable 69, and connected to the wired port of the unit 50g such as using connector 65b and wired modem 64 Similarly, the field unit 23d may correspond to the sensor unit 50g where the control network 22b may be a wireless network, and coupled to the wireless port of the unit 50g such as using antenna 55 and wireless modem 54 Further, the router 21 may correspond to the router 40a shown in FIG. 4a, where the wired control network 22a is connected to the wired port of the router 40a, that may comprise connector 41 and wired modem 42b, while the wireless control network 22b is connected to the wireless port of the router 40a, that may comprise antenna 44 and wireless modem 43 Such an arrangement allows for two redundant data paths 500g and 500h between the field unit 23d and the router 21, as shown in arrangement 500i in FIG. 5j.

The operation of the redundant communication routes 500g and 500h between the field unit 23d and the router 21 may be based on standby redundancy, (a.k.a. Backup Redundancy), where one of the data paths or the associated hardware is considered as a primary unit, and the other data path (or the associated hardware) is considered as the secondary unit, serving as back up to the primary unit. The secondary unit typically does not monitor the system, but is there just as a spare. The standby unit is not usually kept in sync with the primary unit, so it must reconcile its input and output signals on the takeover of the communication. This approach does lend itself to give a "bump" on transfer, meaning the secondary operation may not be in sync with the last system state of the primary unit. Such mechanism may require a watchdog, which monitors the system to decide when a switchover condition is met, and command the system to switch control to the standby unit. Standby redundancy configurations commonly employ two basic types, namely 'Cold Standby' and 'Hot Standby'.

In cold standby state, the secondary unit is either powered off or otherwise non-active in the system operation, thus preserving the reliability of the unit. The drawback of this design is that the downtime is greater than in hot standby, because the standby unit needs to be powered up or activated, and brought online into a known state.

On hot standby state, the secondary unit is powered up or otherwise kept operational, and can optionally monitor the system. The secondary unit may serve as the watchdog and/or voter to decide when to switch over, thus eliminating the need for an additional hardware for this job. This design does not preserve the reliability of the standby unit as well as the cold standby design. However, it shortens the downtime, which in turn increases the availability of the system. Some flavors of Hot Standby are similar to Dual Modular Redundancy (DMR) or Parallel Redundancy. The main difference between Hot Standby and DMR is how tightly the primary and the secondary are synchronized. DMR completely synchronizes the primary and secondary units.

While a redundancy of two was examined above, where two data paths and two hardware devices were used, a redundancy involving three or more data paths or systems may be equally used. The term 'N' Modular Redundancy, (a.k.a. Parallel Redundancy) refers to the approach of having multiply units or data paths running in parallel. All units are highly synchronized and receive the same input information at the same time. Their output values are then compared and a voter decides which output values should be used. This model easily provides 'bumpless' switchovers. This model typically has faster switchover times than Hot Standby models, thus the system availability is very high, but because all the units are powered up and actively engaged with the system operation, the system is at more risk of encountering a common mode failure across all the units.

Deciding which unit is correct may be challenging if only two units are used. If more than two units are used, the problem is simpler, usually the majority wins or the two that agree win. In N Modular Redundancy, there are three main typologies: Dual Modular Redundancy, Triple Modular Redundancy, and Quadruple Redundancy. Quadruple Modular Redundancy (QMR) is fundamentally similar to TMR but using four units instead of three to increase the reliability. The obvious drawback is the 4× increase in system cost.

Dual Modular Redundancy (DMR) uses two functional equivalent units, thus either can control or support the system operation. The most challenging aspect of DMR is determining when to switch over to the secondary unit. Because both units are monitoring the application, a mechanism is needed to decide what to do if they disagree. Either a tiebreaker vote or simply the secondary unit may be designated as the default winner, assuming it is more trustworthy than the primary unit. Triple Modular Redundancy (TMR) uses three functional equivalent units to provide a redundant backup. This approach is very common in aerospace applications where the cost of failure is extremely high. TMR is more reliable than DMR due to two main aspects. The most obvious reason is that two "standby" units are used instead of just one. The other reason is that in a technique called diversity platforms or diversity programming may be applied. In this technique, different software or hardware platforms are used on the redundant systems to prevent common mode failure. The voter decides which unit will actively control the application. With TMR, the decision of which system to trust is made democratically and the majority rules. If three different answers are obtained, the voter must decide which system to trust or shut down the entire system, thus the switchover decision is straightforward and fast.

Another redundancy topology is 1: N Redundancy, where a single backup is used for multiple systems, and this backup is able to function in the place of any single one of the active systems. This technique offers redundancy at a much lower cost than the other models by using one standby unit for several primary units. This approach only works well when the primary units all have very similar functions, thus allowing the standby to back up any of the primary units if one of them fails.

While the redundant data paths have been exampled with regard to the added reliability and availability, redundant data paths may as well be used in order to provide higher aggregated data rate, allowing for faster response and faster transfer of data over the multiple data paths.

A sensor may be an image sensor, for converting an optical image into an electrical signal, as exampled in sensor unit 50f shown in FIG. 5f. In one example, a sensor unit 50f may consist, may include, or may be integrated with, a digital still camera or a video camera. The sensor unit 50*f* may include lens 502 (one or few lenses) for focusing the received light onto a small semiconductor sensor, serving as the image sensor 503. The image sensor 503 commonly includes a panel with a matrix of tiny light-sensitive diodes (photocells), converting the image light to electric charges and then to electric signals, thus creating a video picture or a still image by recording the light intensity. Charge-Coupled Devices (CCD) and CMOS (Complementary Metal-Oxide-Semiconductor) are commonly used as the light-sensitive diodes. Linear or area arrays of light-sensitive elements may be used, and the light sensitive sensors may support monochrome (black & white), color or both. For example, the CCD sensor KAI-2093 Image Sensor 1920 (H)×1080 (V) Interline CCD Image Sensor or KAF-50100 Image Sensor 8176 (H)×6132 (V) Full-Frame CCD Image Sensor can be used, available from Image Sensor Solutions, Eastman Kodak Company, Rochester, New York.

The sensor unit 50*f* may further include an image processor block 504 comprising an AFE, connected to receive the analog signal from the image sensor 503. The Analog Front End (AFE) in the image processor block 504 filters, amplifies and digitizes the signal, using an analog-to-digital (A/D) converter. The AFE further provides correlated double sampling (CDS), and provides a gain control to accommodate varying illumination conditions. In the case of a CCD sensor, a CCD AFE (Analog Front End) component may be used between the digital image processor and the image sensor. Such an AFE may be based on VSP2560 'CCD Analog Front End for Digital Cameras' from Texas Instruments Incorporated of Dallas Texas, U.S.A. The image processor block 504 may further contain a digital image processor, which receives the digital data from the AFE, and processes this digital representation of the image to handle various industry-standards, and to execute various computations and algorithms. Preferably, additional image enhancements may be performed by the block 504 such as generating greater pixel density or adjusting color balance, contrast and luminance.

Further, the block 504 may perform other data management functions and processing on the raw digital image data. Commonly, the timing relationship of the vertical/horizontal reference signals and the pixel clock are also handled in this block. Digital Media System-on-Chip device™ S320DM 357 from Texas Instruments Incorporated of Dallas Texas, U.S.A. is an example of a device implementing in a single chip (and associated circuitry) part or entire of the image processor 504, part or entire of the video compressor 505 and part or entire of a transceiver. In addition to a lens 502 or lens system, color filters may be placed between the imaging optics and the photosensor array 503 to achieve desired color manipulation. The block 504 may further convert the raw data received from the photosensor array 503 into a color-corrected image in a standard image file format. While the image processor 504 may be a separate and dedicated processor, the image processor functionality in the block 504 may be integrated, in whole or in part, in the computer 53 functions or its software/firmware, such that a single processor executes both the image processing relating functionalities and other required functionalities (e.g., communication control) associated with the sensor unit 50*f* operations.

The block 504 may convert the raw data received from the photosensor array serving as the image sensor 503 into a color-corrected image in a standard image file format. Examples of formats that can be used to represent the original or compressed captured image are TIFF (Tagged Image File Format), RAW format, AVI (Audio Video Interleaved), DV (such as based on IEC 61834), MOV, WMV (Windows Media Video), MP4 (Such as ISO/IEC 14496-14:2003), DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. In many cases, video data is compressed before transmission, in order to allow its transmission over a reduced bandwidth transmission system. A video compressor 505 (or video encoder) is shown as part of the sensor unit 50*f* in FIG. 5*f* coupled between the image processor 504 and the computer 53, allowing for compression of the digital video signal before its transmission over a communication medium. In some cases compression will not be required, hence obviating the need for such a compressor 505.

Such compression can be lossy or lossless types. Common compression algorithms are JPEG (Joint Photographic Experts Group) and MPEG (Moving Picture Experts Group). For example, the compression can be based on ADV 212 JPEG 2000 Video Codec, available from Analog Devices, Inc., from Norwood, MA, U.S.A. The above and other image or video compression techniques can make use of intraframe compression commonly based on registering the differences between part of single frame or a single image. An interframe compression can further be used for video streams, based on registering differences between frames. Other examples of image processing include run length encoding and delta modulation. Further, the image can be dynamically dithered to allow the displayed image to appear to have higher resolution and quality. While the video compressor 505 may be a separate and dedicated processor, the compression functionality in the block 505 may be integrated, in whole or in part, in the computer 53 functions or its software/firmware, such that a single processor executes both the image processing relating functionalities and other required functionalities (e.g., communication control) associated with the sensor unit 50*f* operations. Further, the compression functionality in the block 505 may be integrated, in whole or in part, with the image processor 504 functions or its software/firmware, such that a single processor executes both the image processing and image compressing relating functionalities.

Figure 6:
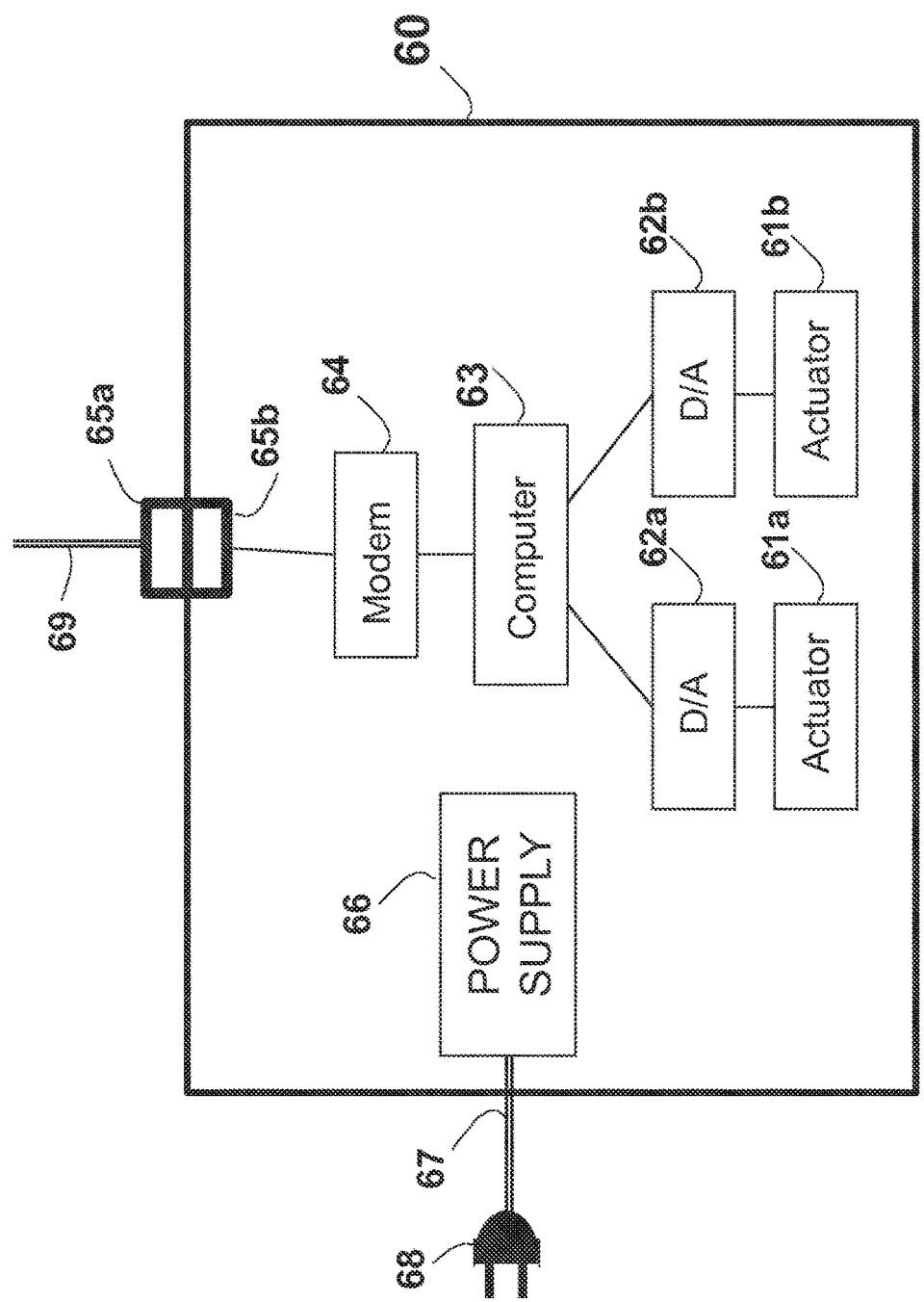
FIG. 6 illustrates a schematic electrical diagram of an actuator unit.

Referring now to FIG. 6 where an example of an actuator unit 60 is shown. The actuator unit 60 includes two actuator elements 61*a* and 61*b* In the case of analog actuators having an analog signal input, such as analog voltage, analog current or continuously changing impedance, a Digital to Analog (D/A) converter is coupled to the actuator element 61 input, that converts a digital (usually binary) code to an analog signal (current, voltage or electric charge), for converting the digital control signal to an analog signal. The actuator 61*a* input is connected to the output of D/A 62*a*, and the actuator 61*b* input is connected to the output of D/A 62*b*. While two actuator elements 61*a* and 61*b* are shown, an actuator unit may equally include a single actuator element or any number of actuators, where D/A may be connected to each analog actuator input. A computer 63, commonly a small size microprocessor, is connected to the D/A 62*a* and 62*b*, and provides the values representing the actuator operation by the actuators 61*a* and 61*b*. The computer 63 further controls and manages the sensor unit 60 operation. The actuator unit communicates via the cable 69 terminated with a connector 65*a*, connected to by connector 65 which mates the cable connector 65*a* The connector 65*a* connects to the wired modem 64 (or a wired transceiver). The computer 63 may thus communicate with any gateway, router, or other sensor unit via the cable 69. While exampled using a wired communication such as a cable, the actuator unit 60 may equally use a wireless (e.g., over-the-air) communication, where the modem 64 is replaced with a wireless modem (or transceiver), and the connector 65 is replaced with an antenna. The actuator elements may be identical, similar or different from each other. For example, some actuators may be analog while others are digital actuators. In another example, different actuators may relate to different physical phenomena. A n actuator unit may be in accordance with, or base on, U.S. Pat. No. 7,898,147 to Grabinger et al. entitled: "Wireless Actuator Interface", which is incorporated in its entirety for all purposes as if fully set forth herein.

An analog actuator element such as an actuator 61 produces a physical, chemical, or biological action, stimulation or phenomenon, such as a changing or generating temperature, humidity, pressure, audio, vibration, light, motion, sound, proximity, flow rate, electrical voltage, and electrical current, in response to the electrical input (current or voltage). For example, an actuator may provide visual or audible signaling, or physical movement. An actuator may include motors, winches, fans, reciprocating elements, extending or retracting, and energy conversion elements, as well as a heater or a cooler. In the case of an analog actuator having an analog input, a Digital-to-Analog (D/A) converter 52 that converts a digital (usually binary) code to an analog signal (current, voltage or electric charge), is coupled to the actuator input. A signal conditioning circuit may be used to adapt between the D/A converter 52 output and the input of analog actuator 61 In the case the actuator is a digital actuator having a digital input, the actuator may be coupled to the computer 63 directly or via a communication link, thus obviating the need for any signal conditioning. For example, an actuator 61 may include motors, winches, fans, reciprocating elements, extending or retracting, and energy conversion elements. In addition, heaters or coolers may be used. Further, an actuator 61 may include an indicator for indicating free-form, shape, form, amorphous, abstract, conceptual, representational, organic, biomorphic, partially geometric, conventional, unconventional, multi-sided, natural, figurative, recognizable concept, geometric, amorphous, abstract, organic, virtual, irregular, regular, biomorphic, conventional, unconventional, symmetric, asymmetric, manmade, composite, geometric, letter, number, code, and symbol.

The actuator 61 may be or may include a visual or audible signaling device, or any other device that indicates a status to the person. In one example, the device illuminates a visible light, such as a Light-Emitting-Diode (LED). However, any type of visible electric light emitter such as a flashlight, an incandescent lamp and compact fluorescent lamps can be used. Multiple light emitters may be used, and the illumination may be steady, blinking or flashing. Further, the illumination can be directed for lighting a surface, such as a surface including an image or a picture. Further, a single single-state visual indicator may be used to provide multiple indications, for example by using different colors (of the same visual indicator), different intensity levels, variable duty-cycle and so forth.

In one example, the actuator 61 includes a solenoid, which is typically a coil wound into a packed helix, and used to convert electrical energy into a magnetic field. Commonly, an electromechanical solenoid is used to convert energy into linear motion. Such electromagnetic solenoid commonly consists of an electromagnetically inductive coil, wound around a movable steel or iron slug (the armature), and shaped such that the armature can be moved along the coil center. In one example, the actuator 61 may include a solenoid valve, used to actuate a pneumatic valve, where the air is routed to a pneumatic device, or a hydraulic valve, used to control the flow of a hydraulic fluid. In another example, the electromechanical solenoid is used to operate an electrical switch. Similarly, a rotary solenoid may be used, where the solenoid is used to rotate a ratcheting mechanism when power is applied.

In one example, the actuator 61 is used for effecting or changing magnetic or electrical quantities such as voltage, current, resistance, conductance, reactance, magnetic flux, electrical charge, magnetic field, electric field, electric power, S-matrix, power spectrum, inductance, capacitance, impedance, phase, noise (amplitude or phase), trans-conductance, trans-impedance, and frequency. In one example shown in arrangement 600a in FIG. 6a, part of an actuator unit 60a is shown, including a controlled switch 601 which is corresponding to the actuator 61, connected between a power source 56a and a power consuming circuit or load 58. The switch 601 may be implemented by a relay, an optocoupler, a solid state circuitry or any other controlled switches known in the art.

In such arrangement, the power to the load 58 may be turned on and off under the control of the actuator unit 60a The power source 56a may be any type of power source or power supply, and may provide AC or DC voltage or current. The power source 56a connects via a cable ending with connector 59a to a mating connector 59b that is part of the actuator unit 60a The load 58 is connected via a cable terminating with a connector 59d to a mating connector 59c that is part of the actuator unit 60a The load 58 may be any power consuming circuit, such as an actuator 61, a home appliance or any other type of equipment. The power source 56a (or power supply) may be the same power source used to power the circuits of the actuator unit 60a, or may be a separate power source used for powering the load 58 while the actuator unit 60a uses a separate power source.

Figure 6A:
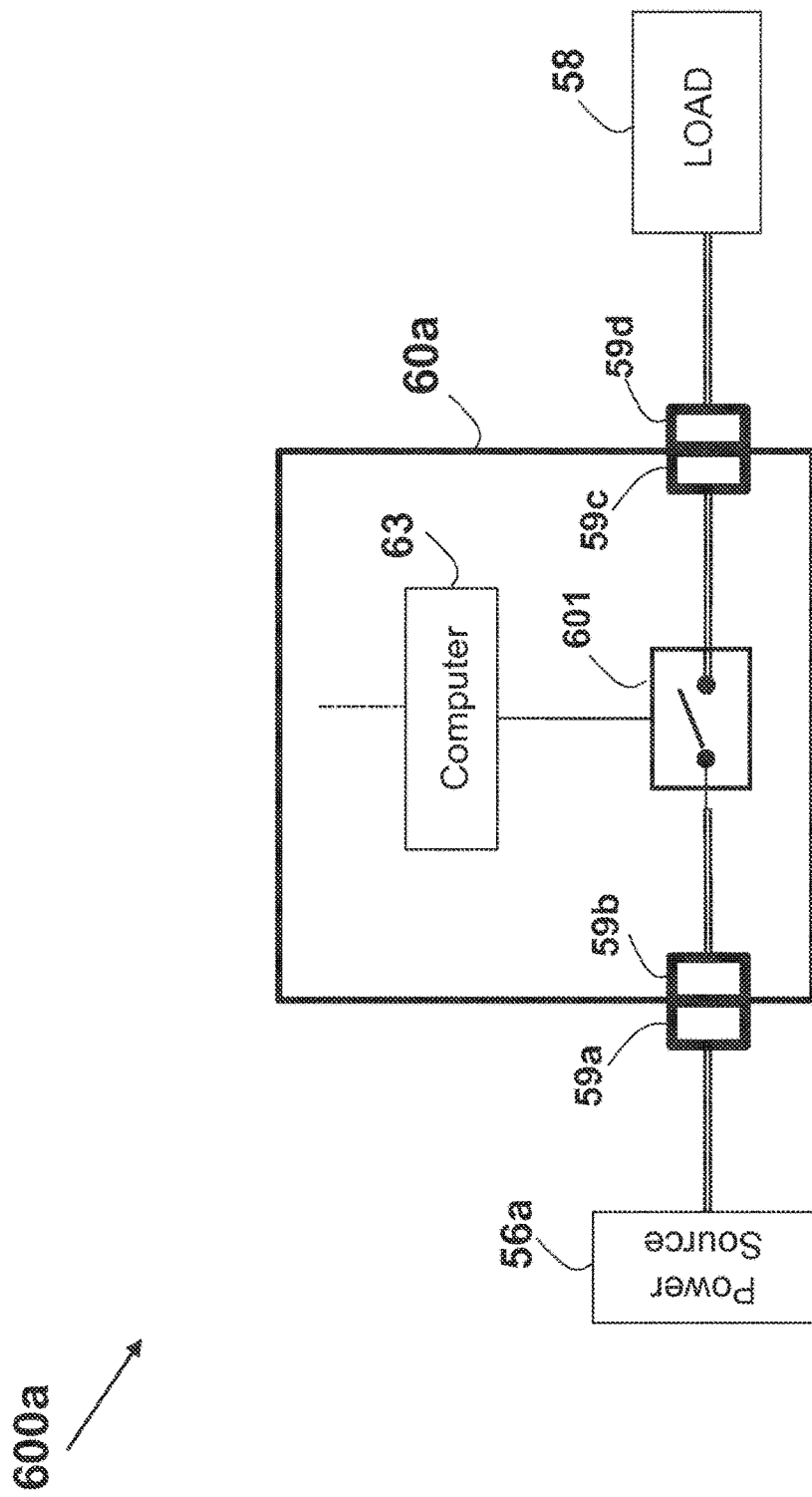
FIG. 6a illustrates a schematic electrical diagram of an electrical switch actuator unit.

While the power source 56a was exampled in FIG. 6a as separated from the actuator unit 60a and connected thereto via a cable, the power source 56a may equally be integrated with the actuator unit 60a Such integration may take the form of sharing the same enclosure, or where the power source 56a is also used to power at least part of the actuator unit 60a circuits. While the load 58 was exampled in FIG. 6a as separated from the actuator unit 60a and connected thereto via a cable, the load 58 may equally be integrated with the actuator unit 60a Such integration may take the form of sharing the same enclosure, or where the power source of the load 58 is also used to power at least part of the actuator unit 60a circuits. Other types of integration may involve sharing the computer 53 or sharing any other circuits or functionalities.

Figure 6B:
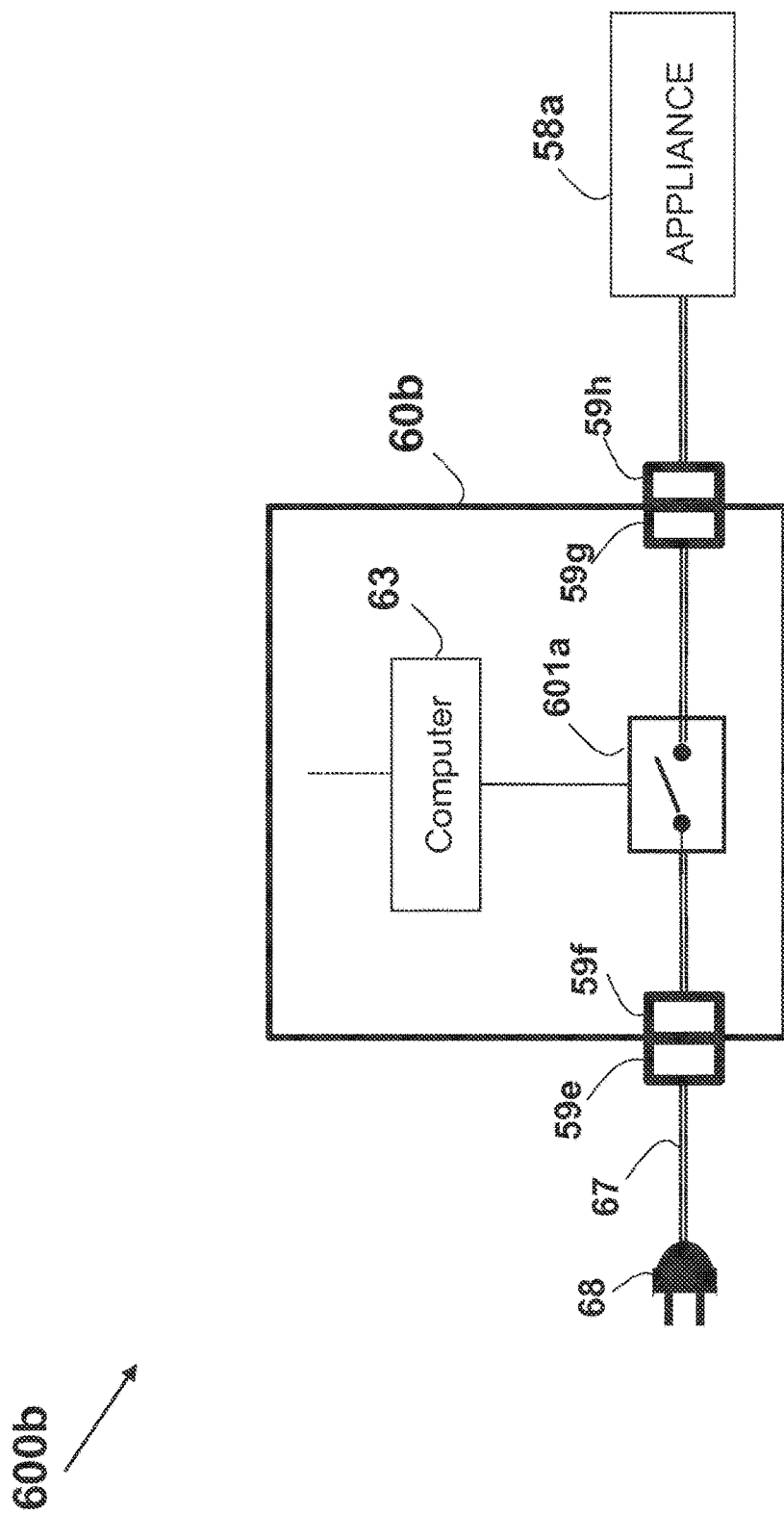
FIG. 6b illustrates a schematic electrical diagram of an AC electrical switch actuator unit.

Referring now to FIG. 6b showing an arrangement 600b where an actuator unit 60b is used, for controlling the power that is supplied to an AC-powered appliance 58a The appliance 58a corresponds to load 58, and is connected via cable and AC power connectors 59h and 59g to the actuator unit 60b. The appliance 58a is power fed from an AC power via the AC power plug 68, connected via A C power cable 67 to the actuator unit 60b via A C power connectors 59e and 59f. The AC power switch 601a (corresponding to switch 601) is operative for enabling the A C current flowing through it, and thus control the power supplied to the appliance 58a The appliance 58a may be a major appliance (white goods) and may be an air conditioner, dishwasher, clothes dryer, drying cabinet, freezer, refrigerator, kitchen stove, water heater, washing machine, trash compactor, microwave oven and induction cooker. The appliance 58a may similarly be a 'small' appliance such as TV set, CD or DVD player, camcorder, still camera, clock, alarm clock, video game console, HiFi or home cinema, telephone or answering machine.

Figure 6C:
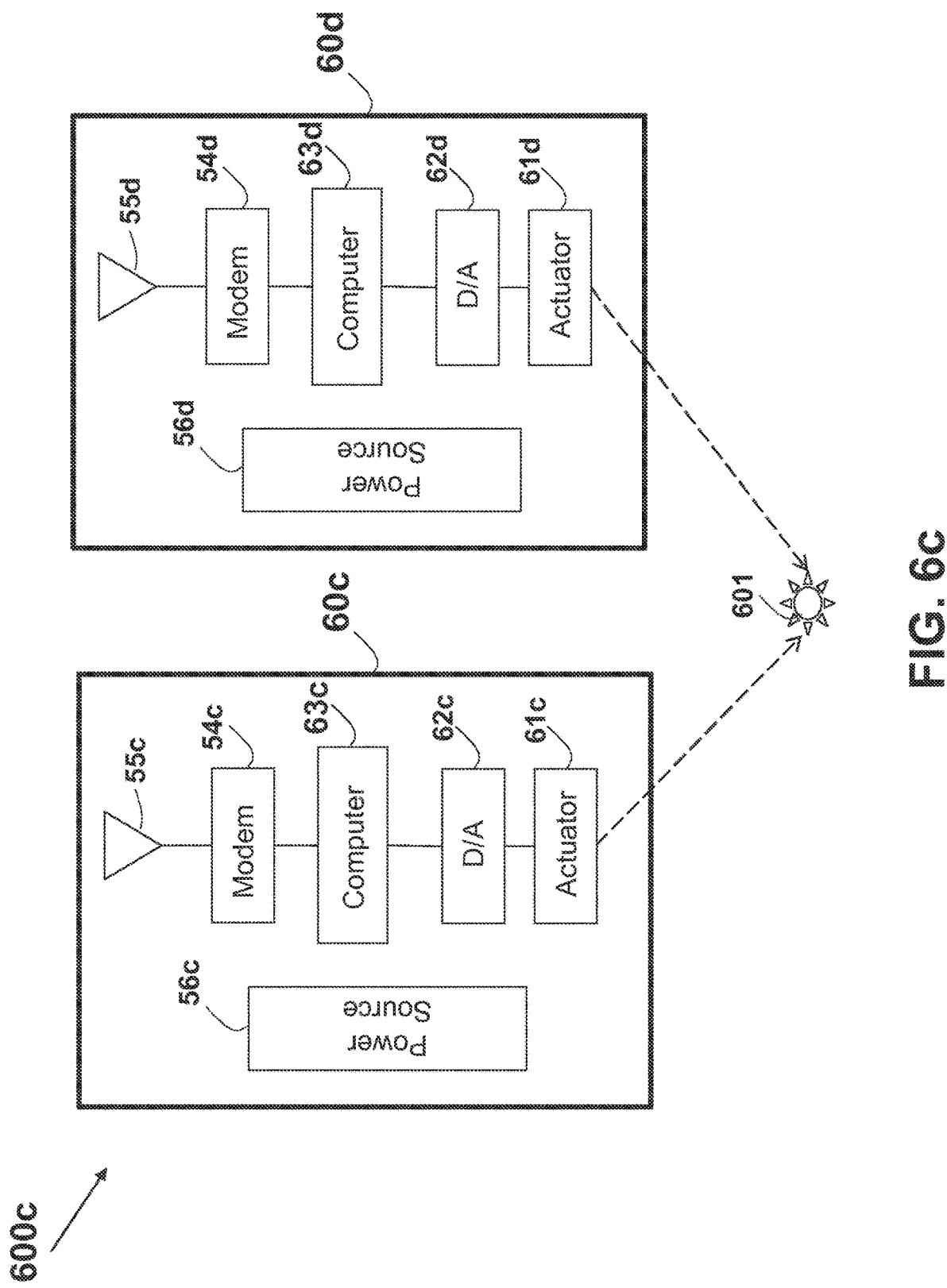
FIG. 6c illustrates a schematic electrical diagram of multiple actuator units affecting the same phenomenon.

An actuator redundancy may be used in order to improve availability and reliability. In such arrangement, two or more actuator elements 61 are used, allowing for improved robustness and allowing for overcoming a Single Point of Failure (SPOF). Two or more actuator elements 61 may be used, all creating, affecting or changing the same physical phenomenon. An example of a redundant arrangement 600c is shown in FIG. 6c, showing two actuator units 60c and 60d. The actuator unit 60c includes an actuator element 61c, connected to D/A converter 62c, which in turn is connected to computer 63c The value to actuate (or any representation thereof) is received via the wireless modem 54c and antenna 55c, and the actuator unit 60c is powered from a power source 56c Similarly, the actuator unit 60d includes an actuator element 61d, connected to D/A converter 62d, which in turn is connected to computer 63d The actuator control information (or any representation thereof) is received via the wireless modem 54d and antenna 55d, and the actuator unit 60d is powered from a power source 56d The two actuator elements 61c and 61d are located, installed, oriented, or otherwise arranged to affect, generate, create or change the same physical phenomenon 601 The actuator elements 61c and 61d may be different, similar, substantially the same, or of the same type or functionality. For example, both actuator elements 61c and 61d may be temperature actuators such as heaters, and may be adjacently located to provide heating at the same place, or both may be attached to a surface to change the surface temperature. In such configuration, a single failure in one of the actuator units 60c and 60d, the affected phenomenon 601 may still be actuated. While two actuator units 60c and 60d are described in FIG. 6c, three, four or any other number of actuator units may be equally used.

While the two actuator units 60c and 60d were described as having the same structure, other arrangement may be equally used, and the two (or more) actuator units may be different, similar, substantially or fully the same type or functionality. While both actuator units 60c and 60d were exampled as having a wireless interface via the wireless modem 54 and antenna 55, other configurations may equally be used, for example where one actuator unit 60 use wireless communication and the other use a wired communication. Further, one actuator element may be of analog control input type while the other may be a digital actuator element, where the use of D/A converter 62 is obviated.

Figure 6D:
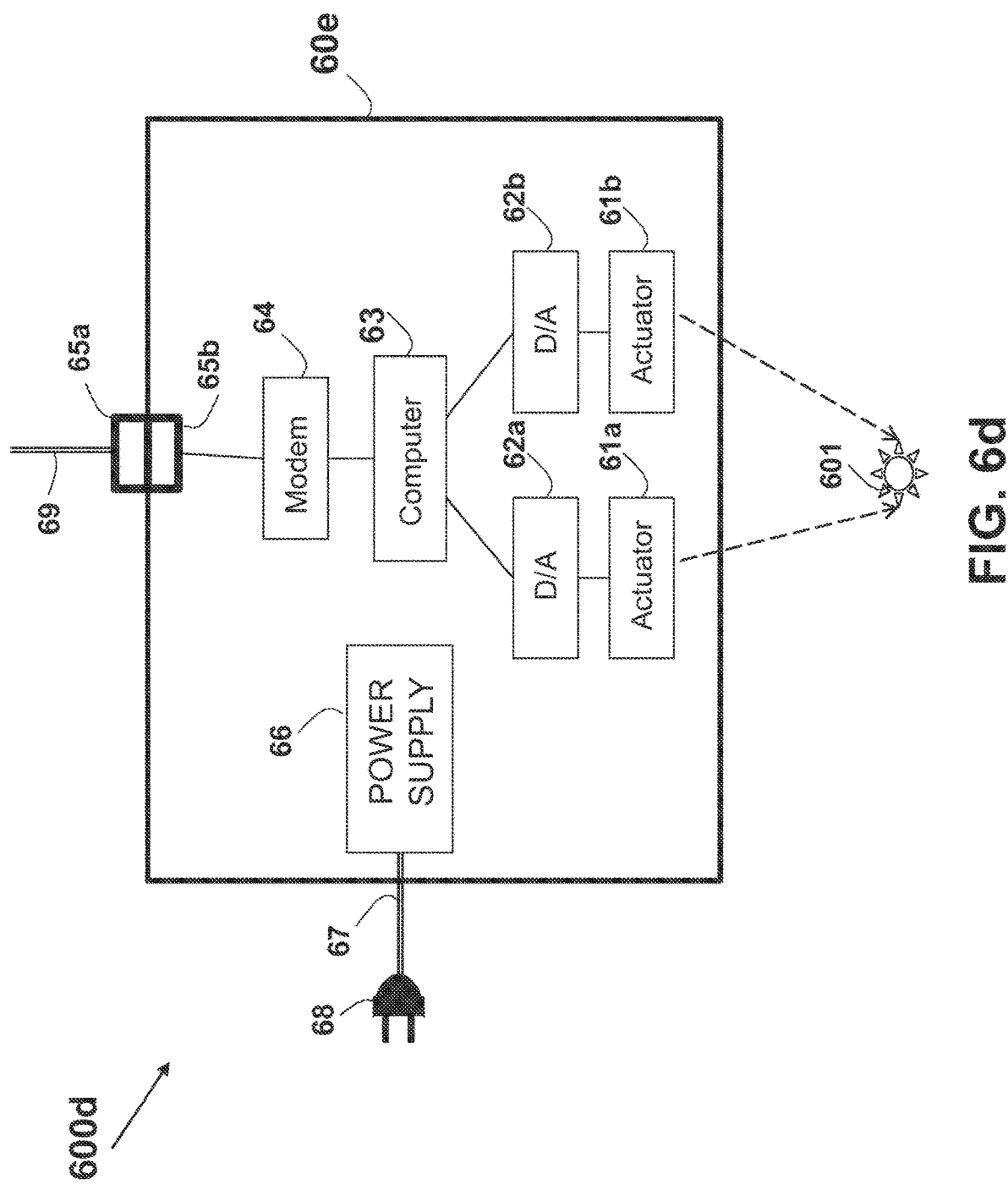
FIG. 6d illustrates a schematic electrical diagram of an actuator unit having multiple actuators affecting the same phenomenon.
Figure 6E:
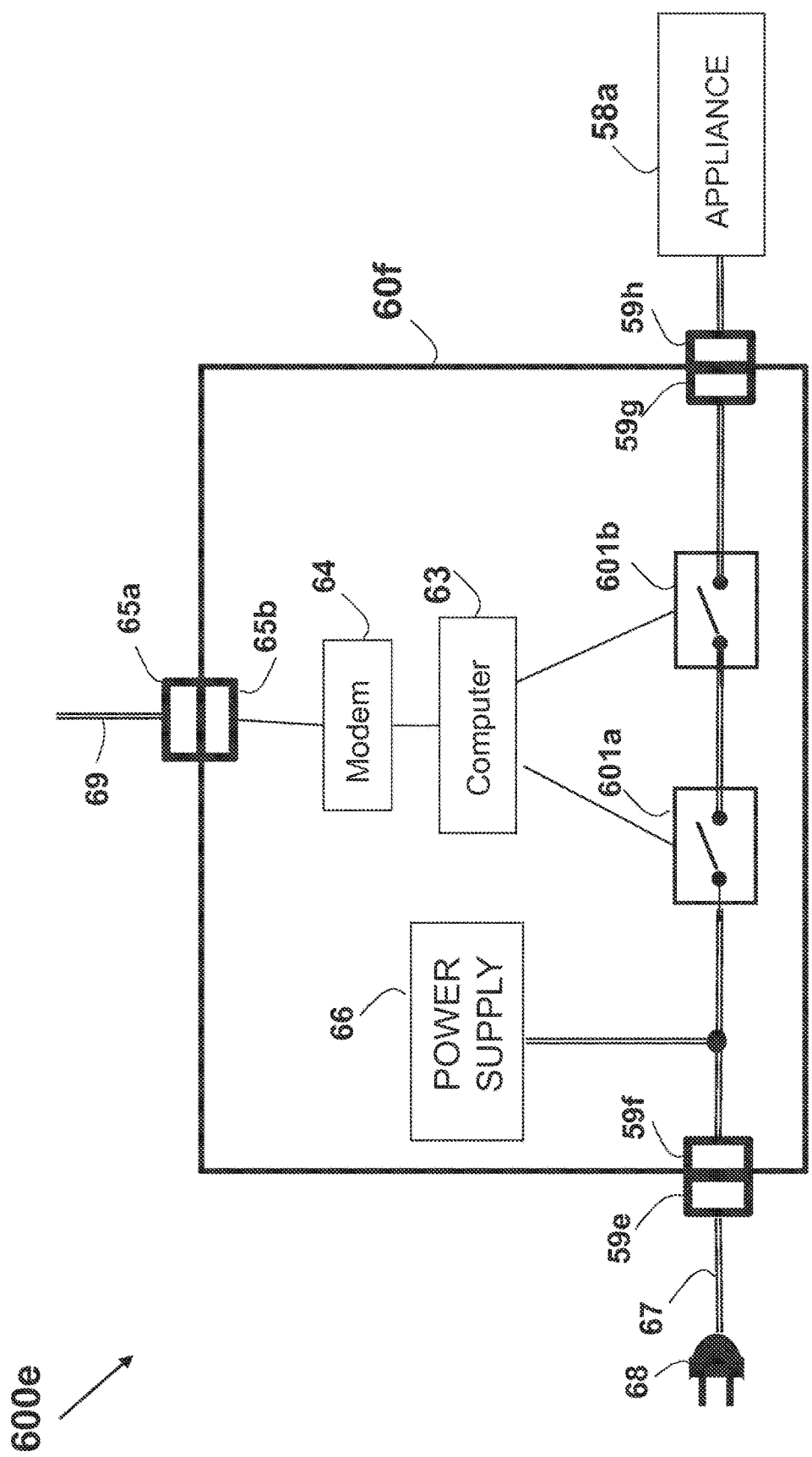
FIG. 6e illustrates a schematic electrical diagram of an actuator unit having multiple AC power switches connected in series.
Figure 6F:
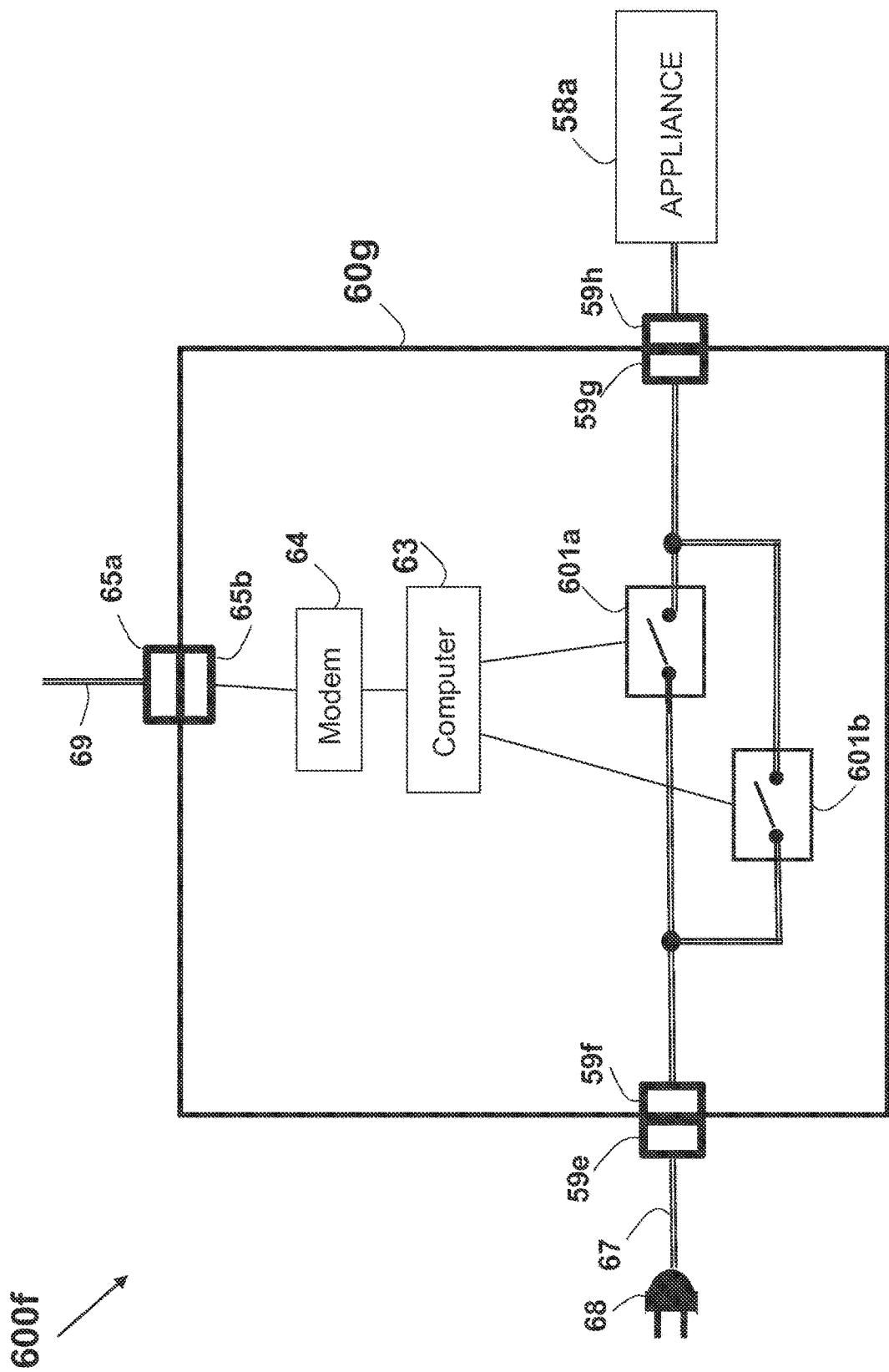
FIG. 6f illustrates a schematic electrical diagram of an actuator unit having multiple A C power switches connected in parallel.

While two separated actuator units 60c and 60d were described in FIG. 6c, the two devices may be partially or fully integrated with each other. For example, both actuator units 60 may share the same enclosure, same power source 56, same computer 63, or any other hardware, software or any other functionality. Such integration provides economical benefit due to the saving of the non-duplicated part. In one example, the two actuator elements are part of a single actuator unit 60e as shown in the arrangement 600d in FIG. 6d. The actuator unit 60e corresponds to the actuator unit 60 shown in FIG. 5, where the two actuators 61a and 61b are used to affect the same phenomenon. Applying such a concept to power switching facility shown in FIG. 6b above is described in arrangement 600e which is shown in FIG. 6e. The shown actuator unit 60f corresponds to actuator unit 60e that is shown in FIG. 6d, where the two actuators are the two power switches 601a and 601 b, connected in series such that both power switches 601a and 601b are required to operate in order to allow the current flow from the AC power source via the power plug 68 to the appliance 58a Hence, in case of malfunction where only one power switch 601 is activated, the appliance 58a will not be turned on. Alternatively or in addition, applying such a concept to power switching facility shown in FIG. 6b above is described in arrangement 600f shown in FIG. 6f. The actuator unit 60g shown corresponds to actuator unit 60e that is shown in FIG. 6d, where the two actuators are the two power switches 601a and 601b, connected in parallel such that one of the power switches 60a and 601b is required to operate in order to allow the current flow from the AC power source via the power plug 68 to the appliance 58a Hence, in case of malfunction where only one power switch 601 is activated, the appliance 58a will be turned on.

Figure 5J:
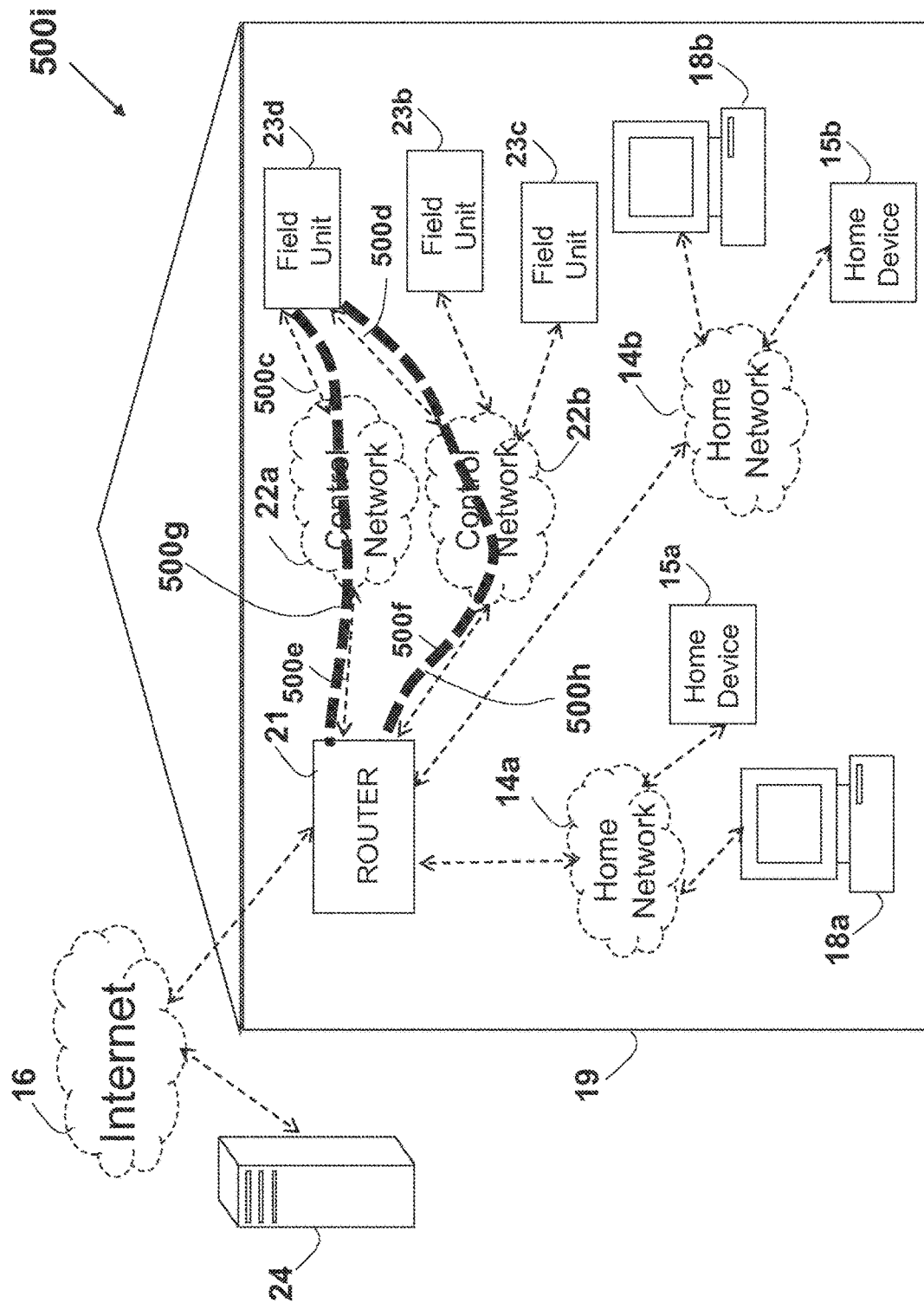
FIG. 5j illustrates a schematic electrical diagram of data paths in a system including a field unit having two communication ports and coupled to two networks.
Figure 6G:
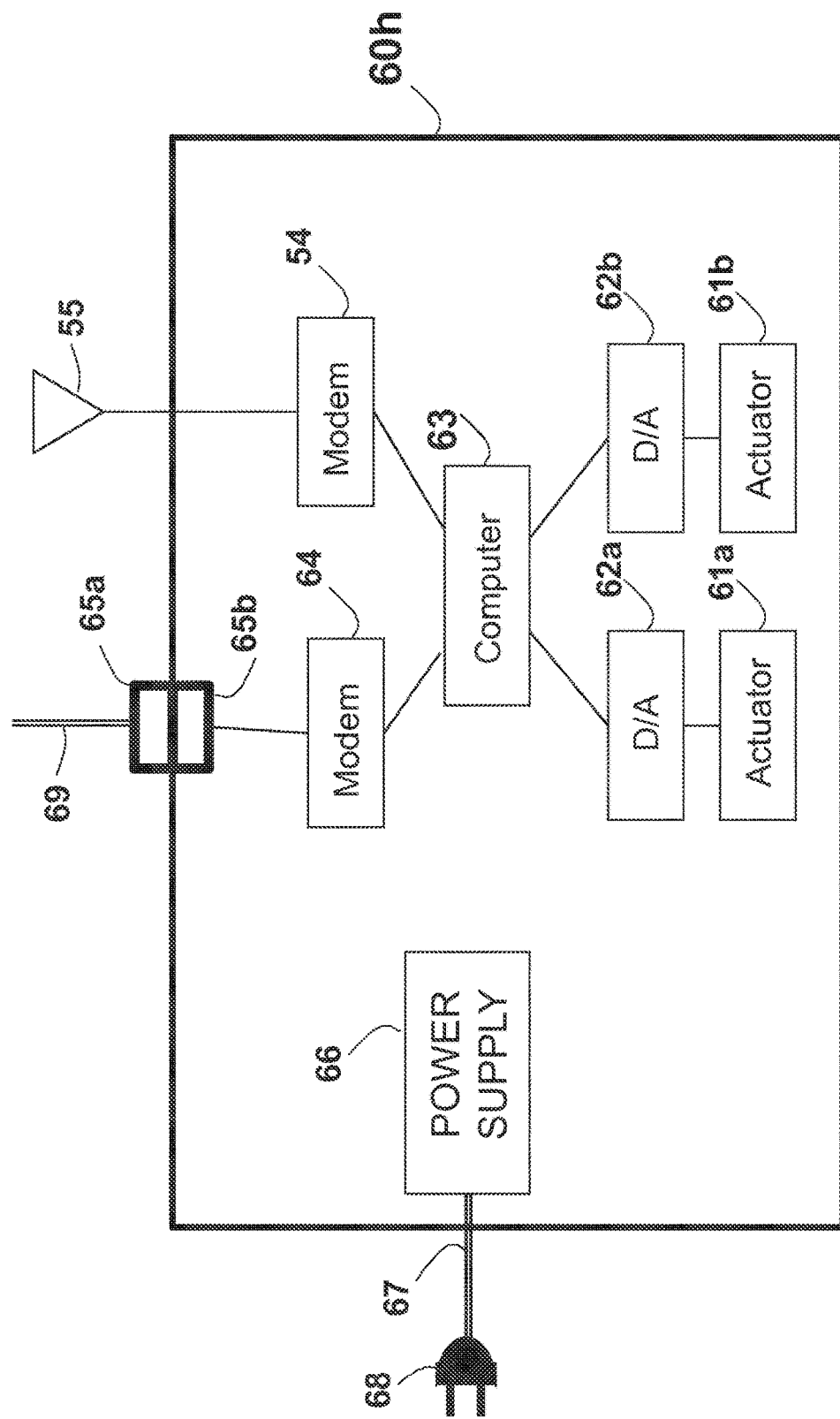
FIG. 6g illustrates a schematic electrical diagram of an actuator unit having two communication ports.

In one example, redundancy is employed in the communication of an actuator unit (or a field unit) with the router 21 or with another field unit. An example of an actuator unit 60h having two communication ports is shown in FIG. 6g. The actuator unit 60h corresponds to the actuator unit 60 shown in FIG. 6 above, with an additional communication port. The added communication port is a wireless port including a wireless modem 44 coupled to an antenna 55, similar to the wireless communication port described for sensor unit 50 shown in FIG. 5 above. While actuator unit 60h is exampled as having two communication ports, three or more ports may be equally used. Further, while actuator unit 60h is exampled having different and distinct communication ports, the wired communication port (comprising the connector 65b and the wired modem 64) and the wireless communication port (comprising the wireless modem 54 and the antenna 55), the two (or more) ports may as well similar or identical, and may be used for communicating over the same network or via two (or more) distinct networks. For example, the two ports may be wireless based, or alternately the two ports may be wired based. While the arrangements 500g 500h and 500i shown in the respective FIG. 5h, FIG. 5i and FIG. 5j above were exampled where the field unit 23d in a sensor unit, it may equally be any field unit, and further may be an actuator unit, such as the actuator unit 50g shown in FIG. 5g.

The actuator 61 is a mechanism, system, or device that creates, produces, changes, stimulates, or affects a phenomenon, in response to an electrical signal or an electrical power. An actuator may affect a physical, chemical, biological or any other phenomenon, serving as a stimulus to the sensor. Alternatively or in addition, the actuator may affect the magnitude of the phenomenon, or any parameter or quantity thereof. For example, the actuator may be used to affect or change pressure, flow, force or other mechanical quantities. The actuator may be an electrical actuator, where electrical energy is supplied to affect the phenomenon, or may be controlled by an electrical signal (e.g., voltage or current). A signal conditioning may be used in order to adapt the actuator operation, or in order to improve the handling of the actuator input or adapting it to the former stage or manipulating, such as attenuation, delay, current or voltage limiting, level translation, galvanic isolation, impedance transformation, linearization, calibration, filtering, amplifying, digitizing, integration, derivation, and any other signal manipulation. Further, in the case of conditioning, the conditioning circuit may involve time related manipulation, such as filter or equalizer for frequency related manipulation such as filtering, spectrum analysis or noise removal, smoothing or de-blurring in case of image enhancement, a compressor (or de-compressor) or coder (or decoder) in the case of a compression or a coding/decoding schemes, modulator or demodulator in case of modulation, and extractor for extracting or detecting a feature or parameter such as pattern recognition or correlation analysis. In case of filtering, passive, active or adaptive (such as Wiener or Kalman) filters may be used. The conditioning circuits may apply linear or non-linear manipulations. Further, the manipulation may be time-related such as using analog or digital delay-lines or integrators, or any rate-based manipulation. An actuator 61 may have an analog input, requiring a D/A 62 to be connected thereto, or may have a digital input.

The actuator may directly or indirectly create, change or otherwise affect the rate of change of the physical quantity (gradient) versus the direction around a particular location, or between different locations. For example, a temperature gradient may describe the differences in the temperature between different locations. Further, an actuator may affect time-dependent or time-manipulated values of the phenomenon, such as time-integrated, average or Root Mean Square (RM S or rms), relating to the square root of the mean of the squares of a series of discrete values (or the equivalent square root of the integral in a continuously varying value). Further, a parameter relating to the time dependency of a repeating phenomenon may be affected, such as the duty-cycle, the frequency (commonly measured in Hertz-Hz) or the period. An actuator may be based on the Micro Electro-Mechanical Systems-MEM S (a.k.a. Micro-mechanical electrical systems) technology. An actuator may affect environmental conditions such as temperature, humidity, noise, vibration, fumes, odors, toxic conditions, dust, and ventilation.

An actuator may change, increase, reduce, or otherwise affect the amount of a property or of a physical quantity or the magnitude relating to a physical phenomenon, body or substance. Alternatively or in addition, an actuator may be used to affect the time derivative thereof, such as the rate of change of the amount, the quantity or the magnitude. In the case of space related quantity or magnitude, an actuator may affect the linear density, relating to the amount of property per length, an actuator may affect the surface density, relating to the amount of property per area, or an actuator may affect the volume density, relating to the amount of property per volume. In the case of a scalar field, an actuator may further affect the quantity gradient, relating to the rate of change of property with respect to position. Alternatively or in addition, an actuator may affect the flux (or flow) of a property through a cross-section or surface boundary. Alternatively or in addition, an actuator may affect the flux density, relating to the flow of property through a cross-section per unit of the cross-section, or through a surface boundary per unit of the surface area. Alternatively or in addition, an actuator may affect the current, relating to the rate of flow of property through a cross-section or a surface boundary, or the current density, relating to the rate of flow of property per unit through a cross-section or a surface boundary. An actuator may include or consists of a transducer, defined herein as a device for converting energy from one form to another for the purpose of measurement of a physical quantity or for information transfer. Further, a single actuator may be used to affect two or more phenomena. For example, two characteristics of the same element may be affected, each characteristic corresponding to a different phenomenon. An actuator may have multiple states, where the actuator state is depending upon the control signal input. An actuator may have a two state operation such as 'on' (active) and 'off' (non active), based on a binary input such as '0' or '1', or 'true' and 'false'. In such a case, it can be activated by controlling an electrical power supplied or switched to it, such as by an electric switch.

An actuator may be a light source used to emit light by converting electrical energy into light, and where the luminous intensity is fixed or may be controlled, commonly for illumination or indicating purposes. Further, an actuator may be used to activate or control the light emitted by a light source, being based on converting electrical energy or other energy to a light. The light emitted may be a visible light, or invisible light such as infrared, ultraviolet, X-ray or gamma rays. A shade, reflector, enclosing globe, housing, lens, and other accessories may be used, typically as part of a light fixture, in order to control the illumination intensity, shape or direction. The illumination (or the indication) may be steady, blinking or flashing. Further, the illumination can be directed for lighting a surface, such as a surface including an image or a picture. Further, a single single-state visual indicator may be used to provide multiple indications, for example by using different colors (of the same visual indicator), different intensity levels, variable duty-cycle and so forth.

Electrical sources of illumination commonly use a gas, a plasma (such as in an arc and fluorescent lamps), an electrical filament, or Solid-State Lighting (SSL), where semiconductors are used. An SSL may be a Light-Emitting Diode (LED), an Organic LED (OLED), or Polymer LED (PLED). Further, an SSL may be a laser diode, which is a laser whose active medium is a semiconductor, commonly based on a diode formed from a p-n junction and powered by the injected electric current.

A light source may consist of, or comprise, a lamp, which is typically replaceable and is commonly radiating a visible light. A lamp, sometimes referred to as 'bulb', may be an arc lamp, a Fluorescent lamp, a gas-discharge lamp, or an incandescent light. An arc lamp (a.k.a. arc light) is the general term for a class of lamps that produce light by an electric arc (also called a voltaic arc). Such a lamp consists of two electrodes, first made from carbon but typically made today of tungsten, which are separated by a gas. The type of lamp is often named by the gas contained in the bulb; including Neon, Argon, X enon, Krypton, Sodium, metal Halide, and Mercury, or by the type of electrode as in carbon-arc lamps. The common fluorescent lamp may be regarded as a low-pressure mercury arc lamp.

Gas-discharge lamps are a family of artificial light sources that generate light by sending an electrical discharge through an ionized gas (plasma). Typically, such lamps use a noble gas (argon, neon, krypton and xenon) or a mixture of these gases and most lamps are filled with additional materials, like mercury, sodium, and metal halides. In operation the gas is ionized, and free electrons, accelerated by the electrical field in the tube, collide with gas and metal atoms. Some electrons in the atomic orbitals of these atoms are excited by these collisions to a higher energy state. When the excited atom falls back to a lower energy state, it emits a photon of a characteristic energy, resulting in infrared, visible light, or ultraviolet radiation. Some lamps convert the ultraviolet radiation to visible light with a fluorescent coating on the inside of the lamp's glass surface. The fluorescent lamp is perhaps the best known gas-discharge lamp.

A fluorescent lamp (a.k.a. fluorescent tube) is a gas-discharge lamp that uses electricity to excite mercury vapor, and is commonly constructed as a tube coated with phosphor containing low pressure mercury vapor that produces white light. The excited mercury atoms produce short-wave ultraviolet light that then causes a phosphor to fluoresce, producing visible light. A fluorescent lamp converts electrical power into useful light more efficiently than an incandescent lamp. Lower energy cost typically offsets the higher initial cost of the lamp. A neon lamp (a.k.a. Neon glow lamp) is a gas discharge lamp that typically contains neon gas at a low pressure in a glass capsule. Only a thin region adjacent to the electrodes glows in these lamps, which distinguishes them from the much longer and brighter neon tubes used for public signage.

An incandescent light bulb (a.k.a. incandescent lamp or incandescent light globe) produces light by heating a filament wire to a high temperature until it glows. The hot filament is protected from oxidation in the air commonly with a glass enclosure that is filled with inert gas or evacuated. In a halogen lamp, filament evaporation is prevented by a chemical process that redeposits metal vapor onto the filament, extending its life. The light bulb is supplied with electrical current by feed-through terminals or wires embedded in the glass. Most bulbs are used in a socket which provides mechanical support and electrical connections. A halogen lamp (a.k.a. Tungsten halogen lampor quartz iodine lamp) is an incandescent lamp that has a small amount of a halogen such as iodine or bromine added. The combination of the halogen gas and the tungsten filament produces a halogen cycle chemical reaction which redeposits evaporated tungsten back to the filament, increasing its life and maintaining the clarity of the envelope. Because of this, a halogen lamp can be operated at a higher temperature than a standard gas-filled lamp of similar power and operating life, producing light of a higher luminous efficacy and color temperature. The small size of halogen lamps permits their use in compact optical systems for projectors and illumination.

A Light-Emitting Diode (LED) is a semiconductor light source, based on the principle that when a diode is forward-biased (switched on), electrons are able to recombine with electron holes within the device, releasing energy in the form of photons. This effect is called electroluminescence and the color of the light (corresponding to the energy of the photon) is determined by the energy gap of the semiconductor. Conventional LEDs are made from a variety of inorganic semiconductor materials, such as A luminium gallium arsenide (AlGaAs), Gallium arsenide phosphide (GaAsP)

Aluminium gallium indium phosphide (AIGaInP), Gallium (III) phosphide (GaP), Zinc selenide (ZnSe), Indium gallium nitride (InGaN), and Silicon carbide (SIC) as substrate.

In an Organic Light-Emitting Diodes (OLEDs) the electroluminescent material comprising the emissive layer of the diode, is an organic compound. The organic material is electrically conductive due to the delocalization of pi electrons caused by conjugation over all or part of the molecule, and the material therefore functions as an organic semiconductor. The organic materials can be small organic molecules in a crystalline phase, or polymers.

High-power LEDs (HPLED) can be driven at currents from hundreds of mA s to more than an amper, compared with the tens of mAs for other LEDs. Some can emit over a thousand Lumens. Since overheating is destructive, the HPLEDs are commonly mounted on a heat sink to allow for heat dissipation.

LEDs are efficient, and emit more light per watt than incandescent light bulbs. They can emit light of an intended color without using any color filters as traditional lighting methods need. LEDs can be very small (smaller than 2 mm$^2$) and are easily populated onto printed circuit boards. LEDs light up very quickly. A typical red indicator LED will achieve full brightness in under a microsecond. LEDs are ideal for uses subject to frequent on-off cycling, unlike fluorescent lamps that fail faster when cycled often, or HID lamps that require a long time before restarting and can very easily be dimmed either by pulse-width modulation or lowering the forward current. Further, in contrast to most light sources, LEDs radiate very little heat in the form of IR that can cause damage to sensitive objects or fabrics, and typically have a relatively long useful life.

An actuator may be a thermoelectric actuator such as a cooler or a heater for changing the temperature of an object, that may be solid, liquid or gas (such as the air temperature), using conduction, convection, thermal radiation, or by the transfer of energy by phase changes. Radiative heaters contain a heating element that reaches a high temperature. The element is usually packaged inside a glass envelope resembling a light bulb and with a reflector to direct the energy output away from the body of the heater. The element emits infrared radiation that travels through air or space until it hits an absorbing surface, where it is partially converted to heat and partially reflected. In a convection heater, the heating element heats the air next to it by convection. Hot air is less dense than cool air, so it rises due to buoyancy, allowing more cool air to flow in to take its place. This sets up a constant current of hot air that leaves the appliance through vent holes and heats up the surrounding space. These are generally filled with oil, in an oil heater, due to oil functioning as an effective heat reservoir. They are ideally suited for heating a closed space. They operate silently and have a lower risk of ignition hazard in the event that they make unintended contact with furnishings compared to radiant electric heaters. This is a good choice for long periods of time or if left unattended. A fan heater, also called a forced convection heater, is a variety of convection heater that includes an electric fan to speed up the airflow. This reduces the thermal resistance between the heating element and the surroundings faster than passive convection, allowing heat to be transferred more quickly.

A thermoelectric actuator may be a heat pump, which is a machine or device that transfers thermal energy from one location, called the "source," which is at a lower temperature, to another location called the "sink" or "heat sink", which is at a higher temperature. Heat pumps may be used for cooling or for heating. Thus, heat pumps move thermal energy opposite to the direction that it normally flows, and may be electrically driven such as compressor-driven air conditioners and freezers. A heat pump may use an electric motor to drive a refrigeration cycle, drawing energy from a source such as the ground or outside air and directing it into the space to be warmed. Some systems can be reversed so that the interior space is cooled and the warm air is discharged outside or into the ground.

A thermoelectric actuator may be an electric heater, converting electrical energy into heat, such as for space heating, cooking, water heating, and industrial processes. Commonly, the heating element inside every electric heater is simply an electrical resistor, and works on the principle of Joule heating: an electric current through a resistor converts electrical energy into heat energy. In a dielectric heater, high-frequency alternating electric field, or radio wave or microwave electromagnetic radiation heats a dielectric material, and is based on heating caused by molecular dipole rotation within the dielectric. Microwave heaters, as distinct from RF heating, is a sub-category of dielectric heating at frequencies above 100 MHz, where an electromagnetic wave can be launched from a small dimension emitter and conveyed through space to the target. M odern microwave ovens make use of electromagnetic waves (microwaves) with electric fields of much higher frequency and shorter wavelength than RF heaters. Typical domestic microwave ovens operate at 2.45 GHz, but 0.915 GHz ovens also exist, thus the wavelengths employed in microwave heating are 12 or 33 cm, providing for highly efficient, but less penetrative, dielectric heating.

A thermoelectric actuator may be a thermoelectric cooler or a heater (or a heat pump) based on the Peltier effect, where heat flux in the junction of two different types of materials is created. When direct current is supplied to this solid-state active heat pump device (a.k.a. Peltier device, Peltier heat pump, solid state refrigerator, or ThermoElectric Cooler-TEC), heat is moved from one side to the other, building up a difference in temperature between the two sides, and hence can be used for either heating or cooling. A Peltier cooler can also be used as a thermoelectric generator, such that when one side of the device is heated to a temperature greater than the other side, a difference in voltage will build up between the two sides.

A thermoelectric actuator may be an air cooler, sometimes referred to as an air conditioner. Common air coolers, such as in refrigerators, are based on a refrigeration cycle of a heat pump. This cycle takes advantage of the way phase changes work, where latent heat is released at a constant temperature during a liquid/gas phase change, and where varying the pressure of a pure substance also varies its condensation/boiling point. The most common refrigeration cycle uses an electric motor to drive a compressor.

An electric heater may be an induction heater, producing the process of heating an electrically conducting object (usually a metal) by electromagnetic induction, where eddy currents (also called Foucault currents) are generated within the metal and resistance leads to Joule heating of the metal. An induction heater (for any process) consists of an electromagnet, through which a high-frequency Alternating Current (AC) is passed. Heat may also be generated by magnetic hysteresis losses in materials that have significant relative permeability.

An actuator may use pneumatics, involving the application of pressurized gas to affect mechanical motion. A motion actuator may be a pneumatic actuator that converts energy (typically in the form of compressed air) into rotary or linear motion. In some arrangements, a motion actuator may be used to provide force or torque. Similarly, force or torque actuators may be used as motion actuators. A pneumatic actuator mainly consists of a piston, a cylinder, and valves or ports. The piston is covered by a diaphragm, or seal, which keeps the air in the upper portion of the cylinder, allowing air pressure to force the diaphragm downward, moving the piston underneath, which in turn moves the valve stem, which is linked to the internal parts of the actuator. Pneumatic actuators may only have one spot for a signal input, top or bottom, depending on the action required. Valves input pressure is the "control signal", where each different pressure is a different set point for a valve. Valves typically require little pressure to operate and usually double or triple the input force. The larger the size of the piston, the larger the output pressure can be. Having a larger piston can also be good if air supply is low, allowing the same forces with less input.

An actuator may use hydraulics, involving the application of a fluid to affect mechanical motion. Common hydraulics systems are based on Pascal's famous theory, which states that the pressure of the liquid produced in an enclosed structure has the capacity of releasing a force up to ten times the pressure that was produced earlier. A hydraulic actuator may be a hydraulic cylinder, where pressure is applied to the fluids (oil), to get the desired force. The force acquired is used to power the hydraulic machine. These cylinders typically include the pistons of different sizes, used to push down the fluids in the other cylinder, which in turn exerts the pressure and pushes it back again. A hydraulic actuator may be a hydraulic pump, is responsible for supplying the fluids to the other essential parts of the hydraulic system. The power generated by a hydraulic pump is about ten times more than the capacity of an electrical motor. There are different types of hydraulic pumps such as the vane pumps, gear pumps, piston pumps, etc. Among them, the piston pumps are relatively more costly, but they have a guaranteed long life and are even able to pump thick, difficult fluids. Further, a hydraulic actuator may be a hydraulic motor, where the power is achieved with the help of exerting pressure on the hydraulic fluids, which is normally oil. The benefit of using hydraulic motors is that when the power source is mechanical, the motor develops a tendency to rotate in the opposite direction, thus acting like a hydraulic pump.

A motion actuator may further be a vacuum actuator, producing a motion based on vacuum pressure, commonly controlled by a Vacuum Switching Valve (VSV), which controls the vacuum supply to the actuator. A motion actuator may be a rotary actuator that produces a rotary motion or torque, commonly to a shaft or axle. The simplest rotary actuator is a purely mechanical linear actuator, where linear motion in one direction is converted to a rotation. A rotary actuator may be electrically powered, or may be powered by pneumatic or hydraulic power, or may use energy stored internally by springs. The motion produced by a rotary motion actuator may be either continuous rotation, such as in common electric motors, or movement to a fixed angular position as for servos and stepper motors. A further form, the torque motor, does not necessarily produce any rotation but merely generates a precise torque which then either cause rotation, or is balanced by some opposing torque. Some motion actuators may be intrinsically linear, such as those using linear motors. Motion actuators may include, or coupled with, a wide variety of mechanical elements to change the nature of the motion such as provided by the actuating/transducing elements, such as levers, ramps, limit switches, screws, cams, crankshafts, gears, pulleys, wheels, constant-velocity joints, shock absorbers or dampers, or ratchets.

A stepper motor (a.k.a. step motor) is a brushless DC electric motor that divides a full rotation into a number of equal steps, commonly of a fixed size. The motor position can then be commanded to move and hold on one of these steps without any feedback sensor (an open-loop controller), or may be combined with either a position encoder or at least a single datum sensor at the zero position. The stepper motor may be a switched reluctance motor, which is a very large stepping motor with a reduced pole count, and generally is closed-loop commutated. A stepper motor may be a permanent magnet stepper type, using a Permanent Magnet (PM) in the rotor and operate on the attraction or repulsion between the rotor PM and the stator electromagnets. Further, a stepper motor may be a variable reluctance stepper using a Variable Reluctance (VR) motor that has a plain iron rotor and operate based on the principle that minimum reluctance occurs with minimum gap, hence the rotor points are attracted toward the stator magnet poles. Further, a stepper motor may be a hybrid synchronous stepper, where a combination of the PM and VR techniques are used to achieve maximum power in a small package size. Furthermore, a stepper motor may be a Lavet type stepping motor using a single-phase stepping motor, where the rotor is a permanent magnet and the motor is built with a strong magnet and large stator to deliver high torque.

A rotary actuator may be a servomotor (a.k.a. servo), which is a packaged combination of a motor (usually electric, although fluid power motors may also be used), a gear train to reduce the many rotations of the motor to a higher torque rotation, and a position encoder that identifies the position of the output shaft and an inbuilt control system. The input control signal to the servo indicates the desired output position. Any difference between the position commanded and the position of the encoder gives rise to an error signal that causes the motor and geartrain to rotate until the encoder reflects a position matching that commanded. Further, a rotary actuator may be a memory wire type, which uses applying current such that the wire is heated above its transition temperature and so changes shape, applying a torque to the output shaft. When power is removed, the wire cools and returns to its earlier shape.

A rotary actuator may be a fluid power actuator, where hydraulic or pneumatic power may be used to drive a shaft or an axle. Such fluid power actuators may be based on driving a linear piston, to where a cylinder mechanism is geared to produce rotation, or may be based on a rotating asymmetrical vane that swings through a cylinder of two different radii. The differential pressure between the two sides of the vane gives rise to an unbalanced force and thus a torque on the output shaft. Such vane actuators require a number of sliding seals and the joins between these seals have tended to cause more problems with leakage than for the piston and cylinder type.

Alternatively or in addition, a motion actuator may be a linear actuator that creates motion in a straight line. Such linear actuator may use hydraulic or pneumatic cylinders which inherently produce linear motion, or may provide a linear motion by converting from a rotary motion created by a rotary actuator, such as electric motors. Rotary-based linear actuators may be a screw, a wheel and axle, or a cam type. A screw actuator operates on the screw machine principle, whereby rotating the actuator nut, the screw shaft moves in a line, such as a lead-screw, a screw jack, a ball screw or roller screw. A wheel-and-axle actuator operates on the principle of the wheel and axle, where a rotating wheel moves a cable, rack, chain or belt to produce linear motion. Examples are hoist, winch, rack and pinion, chain drive, belt drive, rigid chain, and rigid belt actuators. Cam actuator includes a wheel-like cam, which upon rotation, provides thrust at the base of a shaft due to its eccentric shape. Mechanical linear actuators may only pull, such as hoists, chain drive and belt drives, while others only push (such as a cam actuator). Some pneumatic and hydraulic cylinder based actuators may provide force in both directions.

A linear hydraulic actuator (a.k.a. hydraulic cylinder) commonly involves a hollow cylinder having a piston inserted in it. An unbalanced pressure applied to the piston provides a force that can move an external object, and since liquids are nearly incompressible, a hydraulic cylinder can provide controlled precise linear displacement of the piston. The displacement is only along the axis of the piston. Pneumatic actuators, or pneumatic cylinders, are similar to hydraulic actuators except they use compressed gas to provide pressure instead of a liquid. A linear pneumatic actuator (a.k.a. pneumatic cylinder) is similar to hydraulic actuator, except that it uses compressed gas to provide pressure instead of a liquid.

A linear actuator may be a piezoelectric actuator, based on the piezoelectric effect in which application of a voltage to the piezoelectric material causes it to expand. Very high voltages correspond to only tiny expansions. As a result, piezoelectric actuators can achieve extremely fine positioning resolution, but also have a very short range of motion.

A linear actuator may be a linear electrical motor. Such a motor may be based on a conventional rotary electrical motor, connected to rotate a lead screw, that has a continuous helical thread machined on its circumference running along the length (similar to the thread on a bolt). Threaded onto the lead screw is a lead nut or ball nut with corresponding helical threads, used for preventing from rotating with the lead screw (typically the nut interlocks with a non-rotating part of the actuator body). The electrical motor may be a DC brush, a DC brushless, a stepper, or an induction motor type.

Telescoping linear actuators are specialized linear actuators used where space restrictions or other requirements require, where their range of motion is many times greater than the unextended length of the actuating member. A common form is made of concentric tubes of approximately equal length that extend and retract like sleeves, one inside the other, such as the telescopic cylinder. Other more specialized telescoping actuators use actuating members that act as rigid linear shafts when extended, but break that line by folding, separating into pieces and/or uncoiling when retracted. Examples of telescoping linear actuators include a helical band actuator, a rigid belt actuator, a rigid chain actuator, and a segmented spindle.

A linear actuator may be a linear electric motor, that has had its stator and rotor "unrolled" so that instead of producing a torque (rotation) it produces a linear force along its length. The most common mode of operation is as a Lorentz-type actuator, in which the applied force is linearly proportional to the current and the magnetic field. A linear electric motor may be a Linear Induction Motor (LIM), which is an AC (commonly 3-phase) asynchronous linear motor that works with the same general principles as other induction motors but which has been designed to directly produce motion in a straight line. In such motor type, the force is produced by a moving linear magnetic field acting on conductors in the field, such that any conductor, be it a loop, a coil or simply a piece of plate metal, that is placed in this field, will have eddy currents induced in it thus creating an opposing magnetic field, in accordance with Lenz's law. The two opposing fields will repel each other, thus creating motion as the magnetic field sweeps through the metal. The primary of a linear electric motor typically consists of a flat magnetic core (generally laminated) with transverse slots which are often straight cut with coils laid into the slots, while the secondary is frequently a sheet of aluminum, often with an iron backing plate. Some LIMs are double sided, with one primary either side of the secondary, and in this case no iron backing is needed. A LIM may be based on a synchronous motor, where the rate of movement of the magnetic field is controlled, usually electronically, to track the motion of the rotor. A linear electric motor may be a Linear Synchronous Motor (LSM), in which the rate of movement of the magnetic field is controlled, usually electronically, to track the motion of the rotor. Synchronous linear motors may use commutators, or preferably the rotor may contain permanent magnets, or soft iron.

A motion actuator may be a piezoelectric motor (a.k.a. piezo motor), which is based upon the change in shape of a piezoelectric material when an electric field is applied. Piezoelectric motors make use of the converse piezoelectric effect whereby the material produces acoustic or ultrasonic vibrations in order to produce a linear or rotary motion. In one mechanism, the elongation in a single plane is used to make a series stretches and position holds, similar to the way a caterpillar moves. Piezoelectric motors may be made in both linear and rotary types.

One drive technique is to use piezoelectric ceramics to push a stator. Commonly known as Inchworm or PiezoWalk motors, these piezoelectric motors use three groups of crystals: two of which are Locking and one Motive, permanently connected to either the motor's casing or stator (not both) and sandwiched between the other two, which provides the motion. These piezoelectric motors are fundamentally stepping motors, with each step comprising either two or three actions, based on the locking type. Another mechanism employs the use of Surface Acoustic Waves (SAW) to generate linear or rotary motion. An alternative drive technique is known as Squiggle motor, in which piezoelectric elements are bonded orthogonally to a nut and their ultrasonic vibrations rotate and translate a central lead screw, providing a direct drive mechanism. The piezoelectric motor may be according to, or based on, the motor described in U.S. Pat. No. 3,184,842 to Maropis, entitled: "Method and Apparatus for Delivering Vibratory Energy", in U.S. Pat. No. 4,019,073 to Vishnevsky et al., entitled: "Piezoelectric Motor Structures", or in U.S. Pat. No. 4,210,837 to Vasiliev et al., entitled: "Piezoelectrically Driven Torsional Vibration Motor", which are all incorporated in their entirety for all purposes as if fully set forth herein.

A linear actuator may be a comb-drive capacitive actuator utilizing electrostatic forces that act between two electrically conductive combs. The attractive electrostatic forces are created when a voltage is applied between the static and moving combs causing them to be drawn together. The force developed by the actuator is proportional to the change in capacitance between the two combs, increasing with driving voltage, the number of comb teeth, and the gap between the teeth. The combs are arranged so that they never touch (because then there would be no voltage difference). Typically the teeth are arranged so that they can slide past one another until each tooth occupies the slot in the opposite comb. Comb drive actuators typically operate at the micro- or nanometer scale and are generally manufactured by bulk micromachining or surface micromachining a silicon wafer substrate.

An electric motor may be an ultrasonic motor, which is powered by the ultrasonic vibration of a component, the stator, placed against another component, the rotor or slider depending on the scheme of operation (rotation or linear translation). Ultrasonic motors and piezoelectric actuators typically use some form of piezoelectric material, most often lead zirconate titanate and occasionally lithium niobate or other single-crystal materials. In ultrasonic motors, resonance is commonly used in order to amplify the vibration of the stator in contact with the rotor.

A motion actuator may consist of, or based on, Electroactive Polymers (EA Ps), which are polymers that exhibit a change in size or shape when stimulated by an electric field, and may use as actuators and sensors. A typical characteristic property of an EAP is that they will undergo a large amount of deformation while sustaining large forces. EA Ps are generally divided into two principal classes: Dielectric and Ionic. Dielectric EAPs, are materials in which actuation is caused by electrostatic forces between two electrodes which squeeze the polymer. Dielectric elastomers are capable of very high strains and are fundamentally a capacitor that changes its capacitance when a voltage is applied, by allowing the polymer to compress in thickness and expand in the area due to the electric field. This type of EAP typically requires a large actuation voltage to produce high electric fields (hundreds to thousands of volts), but very low electrical power consumption. Dielectric EA Ps require no power to keep the actuator at a given position. Examples are electrostrictive polymers and dielectric elastomers. In Ionic EAPs actuation is caused by the displacement of ions inside the polymer. Only a few volts are needed for actuation, but the ionic flow implies a higher electrical power needed for actuation, and energy is needed to keep the actuator at a given position. Examples of ionic EAPS are conductive polymers, ionic polymer-metal composites (IPM Cs), and responsive gels.

A linear motion actuator may be a wax motor, typically providing smooth and gentle motion. Such a motor a heater that when energized, heats a block of wax causing it to expand and to drive a plunger outwards. When the electric current is removed, the wax block cools and contracts, causing the plunger to withdraw, usually by spring force applied externally or by a spring incorporated directly into the wax motor.

A motion actuator may be a thermal bimorph, which is a cantilever that consists of two active layers: piezoelectric and metal. These layers produce a displacement via thermal activation where a temperature change causes one layer to expand more than the other. A piezoelectric unimorph is a cantilever that consists of one active layer and one inactive layer. In the case where active layer is piezoelectric, deformation in that layer may be induced by the application of an electric field. This deformation induces a bending displacement in the cantilever. The inactive layer may be fabricated from a non-piezoelectric material.

An electric motor may be an electrostatic motor (a.k.a. capacitor motor) which is based on the attraction and repulsion of electric charge. Often, electrostatic motors are the dual of conventional coil-based motors. They typically require a high voltage power supply, although very small motors employ lower voltages. The electrostatic motor may be used in micro-mechanical (MEM S) systems where their drive voltages are below 100 volts, and where moving charged plates are far easier to fabricate than coils and iron cores. An alternative type of electrostatic motor is the spacecraft electrostatic ion drive thruster where forces and motion are created by electrostatically accelerating ions. The electrostatic motor may be according to, or based on, the motor described in U.S. Pat. No. 3,433,981 to Bollee, entitled: "Electrostatic Motor", in U.S. Pat. No. 3,436,630 to Bollee, entitled: "Electrostatic Motor", in U.S. Pat. No. 3,436,630 to Robert et al. entitled: "Electrostatic Motor", or in U.S. Pat. No. 5,552,654 to Konno et al., entitled: "Electrostatic actuator", which are all incorporated in their entirety for all purposes as if fully set forth herein.

An electric motor may be an AC motor, which is driven by an Alternating Current (A C). Such a motor commonly consists of two basic parts, an outside stationary stator having coils supplied with alternating current to produce a rotating magnetic field, and an inside rotor attached to the output shaft that is given a torque by the rotating field. An AC motor may be an induction motor, which runs slightly slower than the supply frequency, where the magnetic field on the rotor of this motor is created by an induced current. Alternatively, an AC motor may be a synchronous motor, which does not rely on induction and as a result, can rotate exactly at the supply frequency or a sub-multiple of the supply frequency. The magnetic field on the rotor is either generated by current delivered through slip rings or by a permanent magnet. Other types of A C motors include eddy current motors, and also AC/DC mechanically commutated machines in which speed is dependent on voltage and winding connection.

An AC motor may be a two-phase A C servo motor, typically having a squirrel cage rotor and a field consisting of two windings: a constant-voltage (AC) main winding and a control-voltage (AC) winding in quadrature (i.e., 90 degrees phase shifted) with the main winding, so as to produce a rotating magnetic field. Reversing phase makes the motor reverse. The control winding is commonly controlled and fed from an AC servo amplifier and a linear power amplifier.

An AC motor may be a single-phase A C induction motor; where the rotating magnetic field must be produced using other means, such as shaded-pole motor, commonly including a small single-turn copper "shading coil" creates the moving magnetic field. Part of each pole is encircled by a copper coil or strap; the induced current in the strap opposes the change of flux through the coil. Another type is a split-phase motor, having a startup winding separate from the main winding. When the motor is started, the startup winding is connected to the power source via a centrifugal switch, which is closed at low speed. Another type is a capacitor start motor, including a split-phase induction motor with a starting capacitor inserted in series with the startup winding, creating an LC circuit which is capable of a much greater phase shift (and so, a much greater starting torque). The capacitor naturally adds expense to such motors. Similarly, a resistance-start motor is a split-phase induction motor with a starter inserted in series with the startup winding, creating a reactance. This added starter provides assistance in the starting and the initial direction of rotation. Another variation is the Permanent-Split Capacitor (PSC) motor (also known as a capacitor start and run motor), which operates similarly to the capacitor-start motor described above, but there is no centrifugal starting switch, and what correspond to the start windings (second windings) are permanently connected to the power source (through a capacitor), along with the run windings. PSC motors are frequently used in air handlers, blowers, and fans (including ceiling fans) and other cases where a variable speed is desired.

An AC motor may be a three-phase AC synchronous motor, where the connections to the rotor coils of a three-phase motor are taken out on slip-rings and fed a separate field current to create a continuous magnetic field (or if the rotor consists of a permanent magnet), the result is called a synchronous motor because the rotor will rotate synchronously with the rotating magnetic field produced by the polyphase electrical supply.

An electric motor may be a DC motor, which is driven by a Direct Current (DC), and is, similarly based on a torque that is produced by the principle of Lorentz force. Such a motor may be a brushed, a brushless, or an uncommutated type. A brushed DC electric motor generates torque directly from DC power supplied to the motor by using internal commutation, stationary magnets (permanent or electromagnets), and rotating electrical magnets. Brushless DC motors use a rotating permanent magnet or soft magnetic core in the rotor, and stationary electrical magnets on the motor housing, and use a motor controller that converts DC to AC. Other types of DC motors require no commutation, such as a homopolar motor that has a magnetic field along the axis of rotation and an electric current that at some point is not parallel to the magnetic field, and a ball bearing motor that consists of two ball bearing-type bearings, with the inner races mounted on a common conductive shaft, and the outer races connected to a high current, low voltage power supply. An alternative construction fits the outer races inside a metal tube, while the inner races are mounted on a shaft with a non-conductive section (e.g., two sleeves on an insulating rod). This method has the advantage that the tube will act as a flywheel. The direction of rotation is determined by the initial spin which is usually required to get it going.

An actuator may be a pump, typically used to move (or compress) fluids or liquids, gasses, or slurries, commonly by pressure or suction actions. Pumps commonly consume energy to perform mechanical work by moving the fluid or the gas, where the activating mechanism is often reciprocating or rotary. Pumps may be operated in many ways, including manual operation, electricity, a combustion engine of some type, and wind action. An air pump moves air either into, or out of, something, and a sump pump used for the removal of liquid from a sump or sump pit. A fuel pump is commonly used to move transport the fuel through a pipe, and a vacuum pump is a device that removes gas molecules from a sealed volume in order to leave behind a partial vacuum. A gas compressor is a mechanical device that increases the pressure of a gas by reducing its volume. A pump may be a valveless pump, where no valves are present to regulate the flow direction, and are commonly used in biomedical and engineering systems. Pumps can be classified into many major groups, for example according to their energy source or according to the method they use to move the fluid, such as direct lift, impulse, displacement, velocity, centrifugal, and gravity pumps.

A positive displacement pump causes a fluid to move by trapping a fixed amount of it and then forcing (displacing) that trapped volume into the discharge pipe. Some positive displacement pumps work using an expanding cavity on the suction side and a decreasing cavity on the discharge side. The liquid flows into the pump as the cavity on the suction side expands, and the liquid flows out of the discharge as the cavity collapses. The volume is constant given each cycle of operation. A positive displacement pump can be further classified according to the mechanism used to move the fluid: A rotary-type positive displacement type such as internal gear, screw, shuttle block, flexible vane or sliding vane, circumferential piston, helical twisted roots (e.g., Wendelkolben pump) or liquid ring vacuum pumps, a reciprocating-type positive displacement type, such as a piston or diaphragm pumps, and a linear-type positive displacement type, such as rope pumps and chain pumps. The positive displacement principle applies also to a rotary lobe pump, a progressive cavity pump, a rotary gear pump, a piston pump, a diaphragm pump, a screw pump, a gear pump, a hydraulic pump, and a vane pump.

A rotary positive displacement pumps can be grouped into three main types: Gear pumps where the liquid is pushed between two gears, Screw pumps where the shape of the pump internals usually two screws turning against each other pump the liquid, and Rotary vane pumps, which are similar to scroll compressors, and are consisting of a cylindrical rotor enclosed in a similarly shaped housing. As the rotor turns, the vanes trap fluid between the rotor and the casing, drawing the fluid through the pump.

Reciprocating positive displacement pumps cause the fluid to move using one or more oscillating pistons, plungers or membranes (diaphragms). Typical reciprocating pumps include plunger pumps type, which are based on a reciprocating plunger that pushes the fluid through one or two open valves, closed by suction on the way back, diaphragm pumps type which are similar to plunger pumps, where the plunger pressurizes hydraulic oil which is used to flex a diaphragm in the pumping cylinder, diaphragm valves type that are used to pump hazardous and toxic fluids, piston displacement pumps type that are usually simple devices for pumping small amounts of liquid or gel manually, and radial piston pumps type.

A pump may be an impulse pump which uses pressure created by gas (usually air). In some impulse pumps the gas trapped in the liquid (usually water), is released and accumulated somewhere in the pump, creating a pressure which can push part of the liquid upwards. Impulse pump types include: a hydraulic ram pump type, which use a pressure built up internally from a released gas in a liquid flow; a pulser pump type which runs with natural resources by kinetic energy only; and an airlift pump type which runs on air inserted into a pipe, pushing up the water, when bubbles move upward, or on a pressure inside the pipe pushing the water up.

A velocity pump may be a rotodynamic pump (a.k.a. dynamic pump) which is a type of velocity pump in which kinetic energy is added to the fluid by increasing the flow velocity. This increase in energy is converted to a gain in potential energy (pressure) when the velocity is reduced prior to or as the flow exits the pump into the discharge pipe. This conversion of kinetic energy to pressure is based on the First law of thermodynamics or more specifically by Bernoulli's principle.

A pump may be a centrifugal pump which is a rotodynamic pump that uses a rotating impeller to increase the pressure and flow rate of a fluid. Centrifugal pumps are the most common type of pump used to move liquids through a piping system. The fluid enters the pump impeller along or near to the rotating axis and is accelerated by the impeller, flowing radially outward or axially into a diffuser or volute chamber, from where it exits into the downstream piping system. A centrifugal pump may be a radial flow pump type, where the fluid exits at right angles to the shaft, an axial flow pump type where the fluid enters and exits along the same direction parallel to the rotating shaft, or may be a mixed flow pump, where the fluid experiences both radial acceleration and lift and exits the impeller somewhere between 0-90 degrees from the axial direction.

An actuator may be an electrochemical or chemical actuator, used to produce, change, or otherwise affect a matter structure, properties, composition, process, or reactions. An electrochemical actuator may affect or generate a chemical reaction or an oxidation/reduction (redox) reaction, such as an electrolysis process.

An actuator may be an electroacoustic actuator, such as a sounder which converts electrical energy to sound waves transmitted through the air, an elastic solid material, or a liquid, usually by means of a vibrating or moving ribbon or diaphragm. The sound may be audio or audible, having frequencies in the approximate range of 20 to 20,000 hertz, capable of being detected by human organs of hearing. Alternatively or in addition, the sounder may be used to emit inaudible frequencies, such as ultrasonic (a.k.a. ultrasound) acoustic frequencies that are above the range audible to the human ear, or above approximately 20,000 Hz. A sounder may be omnidirectional, unidirectional, bidirectional, or provide other directionality or polar patterns.

A loudspeaker (a.k.a. speaker) is a sounder that produces sound in response to an electrical audio signal input, typically audible sound. The most common form of loudspeaker is the electromagnetic (or dynamic) type, uses a paper cone supporting a moving voice coil electromagnet acting on a permanent magnet. Where accurate reproduction of sound is required, multiple loudspeakers may be used, each reproducing a part of the audible frequency range. A loudspeaker is commonly optimized for middle frequencies; tweeters for high frequencies; and sometimes supertweeter is used which is optimized for the highest audible frequencies.

A loudspeaker may be a piezo (or piezoelectric) speaker contains a piezoelectric crystal coupled to a mechanical diaphragm and is based on the piezoelectric effect. An audio signal is applied to the crystal, which responds by flexing in proportion to the voltage applied across the crystal surfaces, thus converting electrical energy into mechanical. Piezoelectric speakers are frequently used as beepers in watches and other electronic devices, and are sometimes used as tweeters in less-expensive speaker systems, such as computer speakers and portable radios. A loudspeaker may be a magnetostrictive transducers, based on magnetostriction, have been predominantly used as sonar ultrasonic sound wave radiators, but their usage has spread also to audio speaker systems.

A loudspeaker may be an electrostatic loudspeaker (ESL), in which sound is generated by the force exerted on a membrane suspended in an electrostatic field. Such speakers use a thin flat diaphragm usually consisting of a plastic sheet coated with a conductive material such as graphite sandwiched between two electrically conductive grids, with a small air gap between the diaphragm and grids. The diaphragm is usually made from a polyester film (thickness 2-20 um) with exceptional mechanical properties, such as PET film. By means of the conductive coating and an external high voltage supply the diaphragm is held at a DC potential of several kilovolts with respect to the grids.

The grids are driven by the audio signal; and the front and rear grids are driven in antiphase. As a result a uniform electrostatic field proportional to the audio signal is produced between both grids. This causes a force to be exerted on the charged diaphragm, and its resulting movement drives the air on either side of it.

A loudspeaker may be a magnetic loudspeaker, and may be a ribbon or planar type, is based on a magnetic field. A ribbon speaker consists of a thin metal-film ribbon suspended in a magnetic field. The electrical signal is applied to the ribbon, which moves with it to create the sound. Planar magnetic speakers are speakers with roughly rectangular flat surfaces that radiate in a bipolar (i.e., front and back) manner, and may be having printed or embedded conductors on a flat diaphragm. Planar magnetic speakers consist of a flexible membrane with a voice coil printed or mounted on it.

The current flowing through the coil interacts with the magnetic field of carefully placed magnets on either side of the diaphragm, causing the membrane to vibrate more uniformly and without much bending or wrinkling. A loudspeaker may be a bending wave loudspeaker, which uses a diaphragm that is intentionally flexible.

A sounder may an electromechanical type, such as an electric bell, which may be based on an electromagnet, causing a metal ball to clap on cup or half-sphere bell. A sounder may be a buzzer (or beeper), a chime, a whistle or a ringer. Buzzers may be either electromechanical or ceramic-based piezoelectric sounders which make a high-pitch noise, and may be used for alerting. The sounder may emit a single or multiple tones, and can be in continuous or intermittent operation.

In one example, the sounder is used to play a stored digital audio. The digital audio content can be stored in the sounder, the actuator unit, the router, the control server, or any combination thereof. Further, few files may be stored (e.g., representing different announcements or songs), selected by the control logic. Alternatively or in addition, the digital audio data may be received by the sounder, the actuator unit, the router, the control server, or any combination thereof, from external sources via the above networks. Furthermore, the source of the digital audio may a microphone serving as a sensor, either after processing, storing, delaying, or any other manipulation, or as originally received resulting 'doorphone' or 'intercom' functionality between a microphone and a sounder in the building.

In another example, the sounder simulates the voice of a human being or generates music, typically by using an electronic circuit having a memory for storing the sounds (e.g., music, song, voice message, etc.), a digital to analog converter 62 to reconstruct the electrical representation of the sound, and a driver for driving a loudspeaker, which is an electro-acoustic transducer that converts an electrical signal to sound. An example of a greeting card providing music and mechanical movement is disclosed in U.S. Patent Application No. 2007/0256337 to Segan entitled: "User Interactive Greeting Card", which is incorporated in its entirety for all purposes as if fully set forth herein.

In one example, the system is used for sound or music generation. For example, the sound produced can emulate the sounds of a conventional acoustical music instrument, such as a piano, tuba, harp, violin, flute, guitar and so forth. In one example, the sounder is an audible signaling device, emitting audible sounds that can be heard (having frequency components in the 20-20,000 Hz band). In one example the sound generated is music or song. The elements of the music such as pitch (which governs melody and harmony), rhythm (and its associated concepts tempo, meter, and articulation), dynamics, and the sonic qualities of timbre and texture, may be associated with the shape theme. For example, if a musical instrument shown in the picture, the music generated by that instrument will be played, e.g., drumming sound of drums and playing of a flute or guitar. In one example, a talking human voice is played by the sounder. The sound may be a syllable, a word, a phrase, a sentence, a short story or a long story, and can be based on speech synthesis or pre-recorded. Male or female voice can be used, further being young or old.

Some examples of toys that include generation of an audio signal such as music are disclosed in U.S. Pat. No. 4,496,149 to Schwartzberg entitled: "Game Apparatus Utilizing Controllable Audio Signals", in U.S. Pat. No. 4,516,260 to Breedlove et al. entitled: "Electronic Learning Aid or Game having Synthesized Speech", in U.S. Pat. No. 7,414,186 to Scarpa et al. entitled: "System and Method for Teaching Musical Notes", in U.S. Pat. No. 4,968,255 to Lee et al., entitled: "Electronic Instructional Apparatus", in U.S. Pat. No. 4,248,123 to Bunger et al., entitled: "Electronic Piano" and in U.S. Pat. No. 4,796,891 to Milner entitled: "Musical Puzzle Using Sliding Tiles", and toys with means for synthesizing human voice are disclosed in U.S. Pat. No. 6,527,611 to Cummings entitled: "Place and Find Toy", and in U.S. Pat. No. 4,840,602 to Rose entitled: "Talking Doll Responsive to External Signal", which are all incorporated in their entirety for all purposes as if fully set forth herein. A music toy kit combining music toy instrument with a set of construction toy blocks is disclosed in U.S. Pat. No. 6,132,281 to K litsner et al. entitled: "Music Toy Kit" and in U.S. Pat. No. 5,349,129 to Wisniewski et al. entitled: "Electronic Sound Generating Toy", which are incorporated in their entirety for all purposes as if fully set forth herein.

A speech synthesizer used to produce natural and intelligible artificial human speech may be implemented in hardware, in software, or combination thereof. A speech synthesizer may be Text-To-Speech (TTS) based, that converts normal language text to speech, or alternatively (or in addition) may be based on rendering symbolic linguistic representation like phonetic transcription. A TTS typically involves two steps, the front-end where the raw input text is pre-processed to fully write-out words replacing numbers and abbreviations, followed by assigning phonetic transcriptions to each word (text-to-phoneme), and the back-end (or synthesizer) where the symbolic linguistic representation is converted to output sound.

The generating of synthetic speech waveform typically uses a concatenative or formant synthesis. The concatenative synthesis commonly produces the most natural-sounding synthesized speech, and is based on the concatenation (or stringing together) of segments of recorded speech. There are three main types of concatenative synthesis: Unit selection, diphone synthesis, and domain-specific synthesis. Unit selection synthesis is based on large databases of recorded speech including individual phones, diphones, half-phones, syllables, morphemes, words, phrases, and sentences, indexed based on the segmentation and acoustic parameters like the fundamental frequency (pitch), duration, position in the syllable, and neighboring phones. At run time, the desired target utterance is created by determining (typically using a specially weighted decision tree) the best chain of candidate units from the database (unit selection). Diphone synthesis uses a minimal speech database containing all the diphones (sound-to-sound transitions) occurring in a language, and at runtime, the target prosody of a sentence is superimposed on these minimal units by means of digital signal processing techniques such as linear predictive coding. Domain-specific synthesis is used where the output is limited to a particular domain, using concatenates prerecorded words and phrases to create complete utterances. In formant synthesis the synthesized speech output is created using additive synthesis and an acoustic model (physical modeling synthesis), rather than on using human speech samples. Parameters such as fundamental frequency, voicing, and noise levels are varied over time to create a waveform of artificial speech. The synthesis may further be based on articulatory synthesis where computational techniques for synthesizing speech are based on models of the human vocal tract and the articulation processes occurring there, or may be HM M-based synthesis which is based on hidden Markov models, where the frequency spectrum (vocal tract), fundamental frequency (vocal source), and duration (prosody) of speech are modeled simultaneously by HM M s and generated based on the maximum likelihood criterion. The speech synthesizer may further be based on the book entitled: "Development in Speech Synthesis", by M ark Tatham and Katherine M orton, published 2005 by John Wiley & Sons Ltd., ISBN: 0-470-85538-X, and on the book entitled: "Speech Synthesis and Recognition" by John Holmes and Wendy Holmes, 2nd Edition, published 2001 ISBN: 0-7484-0856-8, which are both incorporated in their entirety for all purposes as if fully set forth herein.

A speech synthesizer may be software based such as Apple VoiceOver utility which uses speech synthesis for accessibility, and is part of the Apple IOS operating system used on the iPhone, iPad and iPod Touch. Similarly, Microsoft uses SA PI 4.0 and SA PI 5.0 as part of Windows operating system. Similarly, hardware may be used, and may be based on an IC. A tone, voice, melody, or song hardware-based sounder typically contains a memory storing a digital representation of the pre-recorder or synthesized voice or music, a Digital to Analog (D/A) converter for creating an analog signal, a speaker and a driver for feeding the speaker.

A sounder may be based on Holtek HT 3834 CMOS VLSI Integrated Circuit (IC) named '36 Melody Music Generator' available from Holtek Semiconductor Inc., headquartered in Hsinchu, Taiwan, and described with application circuits in a data sheet Rev. 1.00 dated Nov. 2, 2006, on EPSON 7910 series 'Multi-Melody IC' available from Seiko-Epson Corporation, Electronic Devices Marketing Division located in Tokyo, Japan, and described with application circuits in a data sheet PF226-04 dated 1998, on Magnevation SpeakJ et chip available from Magnevation LLC and described in 'Natural Speech & Complex Sound Synthesizer', described in User's Manual Revision 1.0 Jul. 27, 2004, on Sensory Inc. NLP-5x described in the Data sheet "Natural Language Processor with Motor, Sensor and Display Control", P/N 80-0317-K, published 2010 by Sensory, Inc. of Santa-Clara, California, U.S.A., or on OPTi 82C 931 'Plug and Play Integrated Audio Controller' described in Data Book 912-3000-035 Revision: 2.1 published on Aug. 1, 1997, which are all incorporated herein in their entirety for all purposes as if fully set forth herein. Similarly, a music synthesizer may be based on Y M F721 OPL4-ML2 FM+Wavetable Synthesizer LSI available from Yamaha Corporation described in Y M F721 Catalog No. LSI-4M F 721A 20, which is incorporated in its entirety for all purposes as if fully set forth herein.

An actuator may be used to generate an electric or magnetic field. An electromagnetic coil (sometimes referred to simply as a "coil") is formed when a conductor (usually an insulated solid copper wire) is wound around a core or form to create an inductor or electromagnet. One loop of wire is usually referred to as a turn, and a coil consists of one or more turns. Coils are often coated with varnish or wrapped with insulating tape to provide additional insulation and secure them in place. A completed coil assembly with taps is often called a winding. An electromagnet is a type of magnet in which the magnetic field is produced by the flow of electric current, and disappears when the current is turned off. A simple electromagnet consisting of a coil of insulated wire wrapped around an iron core. The strength of the magnetic field generated is proportional to the amount of current.

An actuator may be a display for presentation of visual data or information, commonly on a screen. A display is typically consists of an array of light emitters (typically in a matrix form), and commonly provides a visual depiction of a single, integrated, or organized set of information, such as text, graphics, image or video. A display may be a monochrome (a.k.a. black-and-white) type, which typically displays two colors, one for the background and one for the foreground. Old computer monitor displays commonly use black and white, green and black, or amber and black. A display may be a gray-scale type, which is capable of displaying different shades of gray, or may be a color type, capable of displaying multiple colors, anywhere from 16 to over many millions different colors, and may be based on Red, Green, and Blue (RGB) separate signals. A video display is designed for presenting video content. The screen is the actual location where the information is actually optically visualized by humans. The screen may be an integral part of the display. Alternatively or in addition, the display may be an image or video projector, that projects an image (or a video consisting of moving images) onto a screen surface, which is a separate component and is not mechanically enclosed with the display housing. Most projectors create an image by shining a light through a small transparent image, but some newer types of projectors can project the image directly, by using lasers. A projector may be based on an Eidophor, Liquid Crystal on Silicon (LCoS or LCOS), or LCD, or may use Digital Light Processing (DLP™) technology, and may further be MEM S based. A virtual retinal display, or retinal projector, is a projector that projects an image directly on the retina instead of using an external projection screen. Common display resolutions used today include SVGA (800×600 pixels), XGA (1024×768 pixels), 720p (1280×720 pixels), and 1080p (1920×1080 pixels). Standard-Definition (SD) standards, such as used in SD Television (SDTV), are referred to as 576$i$, derived from the European-developed PAL and SECAM systems with 576 interlaced lines of resolution; and 480i, based on the American National Television System Committee (ANTSC) NTSC system. High-Definition (HD) video refers to any video system of higher resolution than standard-definition (SD) video, and most commonly involves display resolutions of 1,280×720 pixels (720p) or 1,920×1,080 pixels (1080i/1080p). A display may be a 3D (3-Dimensions) display, which is the display device capable of conveying a stereoscopic perception of 3-D depth to the viewer. The basic technique is to present offset images that are displayed separately to the left and right eye. Both of these 2-D offset images are then combined in the brain to give the perception of 3-D depth. The display may present the information as scrolling, static, bold or flashing.

The display may be an analog display having an analog signal input. Analog displays are commonly using interfaces such as composite video such as NTSC, PAL or SECAM formats. Similarly, analog RGB, VGA (Video Graphics Array), SVGA (Super Video Graphics Array), SCART, S-video and other standard analog interfaces can be used. Alternatively or in addition, a display may be a digital display, having a digital input interface. Standard digital interfaces such as an IEEE 1394 interface (a.k.a. FireWire™), may be used. Other digital interfaces that can be used are USB, SDI (Serial Digital Interface), HDMI (High-Definition Multimedia Interface), DVI (Digital Visual Interface), UDI (Unified Display Interface), DisplayPort, Digital Component Video and DV B (Digital Video Broadcast). In some cases, an adaptor is required in order to connect an analog display to the digital data. For example, the adaptor may convert between composite video (PAL, NTSC) or S-Video and DVI or HDTV signal. Various user controls can be available to allow the user to control and effect the display operations, such as an on/off switch, a reset button and others. Other exemplary controls involve display associated settings such as contrast, brightness and zoom.

A display may be a Cathode-Ray Tube (CRT) display, which is based on moving an electron beam back and forth across the back of the screen. Such a display commonly comprises a vacuum tube containing an electron gun (a source of electrons), and a fluorescent screen used to view images. It further has a means to accelerate and deflect the electron beam onto the fluorescent screen to create the images Each time the beam makes a pass across the screen, it lights up phosphor dots on the inside of the glass tube, thereby illuminating the active portions of the screen. By drawing many such lines from the top to the bottom of the screen, it creates an entire image. A CRT display may be a shadow mask or an aperture grille type.

A display may be a Liquid Crystal Display (LCD) display, which utilize two sheets of polarizing material with a liquid crystal solution between them. An electric current passed through the liquid causes the crystals to align so that light cannot pass through them. Each crystal, therefore, is like a shutter, either allowing a backlit light to pass through or blocking the light. In monochrome LCD images usually appear as blue or dark gray images on top of a grayish-white background. Color LCD displays commonly use passive matrix and Thin Film Transistor (TFT) (or active-matrix) for producing color. Recent passive-matrix displays are using new CSTN and DSTN technologies to produce sharp colors rivaling active-matrix displays.

Some LCD displays use Cold-Cathode Fluorescent Lamps (CCFLs) for backlight illumination. An LED-backlit LCD is a flat panel display that uses LED backlighting instead of the cold cathode fluorescent (CCFL) backlighting, allowing for a thinner panel, lower power consumption, better heat dissipation, a brighter display, and better contrast levels. Three forms of LED may be used: White edge-LEDs around the rim of the screen, using a special diffusion panel to spread the light evenly behind the screen (the most usual form currently), an array of LEDs arranged behind the screen whose brightness are not controlled individually, and a dynamic "local dimming" array of LEDs that are controlled individually or in clusters to achieve a modulated backlight light pattern. A Blue Phase Mode LCD is an LCD technology that uses highly twisted cholesteric phases in a blue phase, in order to improve the temporal response of liquid crystal displays (LCDs).

A Field Emission Display (FED) is a display technology that uses large-area field electron emission sources to provide the electrons that strike colored phosphor, to produce a color image as an electronic visual display. In a general sense, a FED consists of a matrix of cathode ray tubes, each tube producing a single sub-pixel, grouped in threes to form red-green-blue (RGB) pixels. FEDs combine the advantages of CRTs, namely their high contrast levels and very fast response times, with the packaging advantages of LCD and other flat panel technologies. They also offer the possibility of requiring less power, about half that of an LCD system. FED display operates like a conventional cathode ray tube (CRT) with an electron gun that uses high voltage (10 kV) to accelerate electrons which in turn excite the phosphors, but instead of a single electron gun, a FED display contains a grid of individual nanoscopic electron guns. A FED screen is constructed by laying down a series of metal stripes onto a glass plate to form a series of cathode lines.

A display may be an Organic Light-Emitting Diode (OLED) display, a display device that sandwiches carbon-based films between two charged electrodes, one a metallic cathode and one a transparent anode, usually being glass. The organic films consist of a hole-injection layer, a hole-transport layer, an emissive layer and an electron-transport layer. When voltage is applied to the OLED cell, the injected positive and negative charges recombine in the emissive layer and create electro luminescent light. Unlike LCDs, which require backlighting, OLED displays are emissive devices-they emit light rather than modulate transmitted or reflected light. There are two main families of OLEDs: those based on small molecules and those employing polymers. Adding mobile ions to an OLED creates a light-emitting electrochemical cell or LEC, which has a slightly different mode of operation. OLED displays can use either Passive-Matrix (PM OLED) or active-matrix addressing schemes. Active-Matrix OLEDs (AMOLED) require a thin-film transistor backplane to switch each individual pixel on or off, but allow for higher resolution and larger display sizes.

A display may be an Electroluminescent Displays (ELDs) type, which is a flat panel display created by sandwiching a layer of electroluminescent material such as GaAs between two layers of conductors. When current flows, the layer of material emits radiation in the form of visible light. Electroluminescence (EL) is an optical and electrical phenomenon where a material emits light in response to an electric current passed through it, or to a strong electric field.

A display may be based on an Electronic Paper Display (EPD) (a.k.a. e-paper and electronic ink) display technology which is designed to mimic the appearance of ordinary ink on paper. Unlike conventional backlit flat panel displays which emit light, electronic paper displays reflect light like ordinary paper. Many of the technologies can hold static text and images indefinitely without using electricity, while allowing images to be changed later. Flexible electronic paper uses plastic substrates and plastic electronics for the display backplane.

An EPD may be based on Gyricon technology, using polyethylene spheres between 75 and 106 micrometres across. Each sphere is a janus particle composed of negatively charged black plastic on one side and positively charged white plastic on the other (each bead is thus a dipole). The spheres are embedded in a transparent silicone sheet, with each sphere suspended in a bubble of oil so that they can rotate freely. The polarity of the voltage applied to each pair of electrodes then determines whether the white or black side is face-up, thus giving the pixel a white or black appearance.

Alternatively or in addition, an EPD may be based on an electrophoretic display, where titanium dioxide (Titania) particles approximately one micrometer in diameter are dispersed in hydrocarbon oil. A dark-colored dye is also added to the oil, along with surfactants and charging agents that cause the particles to take on an electric charge. This mixture is placed between two parallel, conductive plates separated by a gap of 10 to 100 micrometers. When a voltage is applied across the two plates, the particles will migrate electrophoretically to the plate bearing the opposite charge from that on the particles.

Further, an EPD may be based on Electro-Wetting Display (EWD), which is based on controlling the shape of a confined water/oil interface by an applied voltage. With no voltage applied, the (colored) oil forms a flat film between the water and a hydrophobic (water-repellent) insulating coating of an electrode, resulting in a colored pixel. When a voltage is applied between the electrode and the water, it changes the interfacial tension between the water and the coating. As a result the stacked state is no longer stable, causing the water to move the oil aside. Electrofluidic displays are a variation of an electrowetting display, involving the placing of aqueous pigment dispersion inside a tiny reservoir. Voltage is used to electromechanically pull the pigment out of the reservoir and spread it as a film directly behind the viewing substrate. As a result, the display takes on color and brightness similar to that of conventional pigments printed on paper. When voltage is removed liquid surface tension causes the pigment dispersion to rapidly recoil into the reservoir.

A display may be a Vacuum Fluorescent Display (VFD) that emits a very bright light with high contrast and can support display elements of various colors. VFDs can display seven-segment numerals, multi-segment alphanumeric characters or can be made in a dot-matrix to display different alphanumeric characters and symbols.

A display may be a laser video display or a laser video projector. A Laser display requires lasers in three distinct wavelengths-red, green, and blue. Frequency doubling can be used to provide the green wavelengths, and a small semiconductor laser such as Vertical-External-Cavity Surface-Emitting-Laser (VECSEL) or a Vertical-Cavity Surface-Emitting Laser (VCSEL) may be used. Several types of lasers can be used as the frequency doubled sources: fiber lasers, inter cavity doubled lasers, external cavity doubled lasers, eV CSELs, and OPSLs (Optically Pumped Semiconductor Lasers). Among the inter-cavity doubled lasers V CSELs have shown much promise and potential to be the basis for a mass produced frequency doubled laser. A VECSEL is a vertical cavity, and is composed of two mirrors. On top of one of them is a diode as the active medium. These lasers combine high overall efficiency with good beam quality. The light from the high power IR-laser diodes is converted into visible light by means of extra-cavity waveguided second harmonic generation. Laser-pulses with about 10 K Hz repetition rate and various lengths are sent to a Digital Micromirror Device where each mirror directs the pulse either onto the screen or into the dump.

A display may be a segment display, such as a numerical or an alphanumerical display that can show only digits or alphanumeric characters, commonly composed of several segments that switch on and off to give the appearance of desired glyph, The segments are usually single LEDs or liquid crystals, and may further display visual display material beyond words and characters, such as arrows, symbols, ASCII and non-ASCII characters. Non-limiting examples are Seven-segment display (digits only), Fourteen-segment display, and Sixteen-segment display. A display may be a dot matrix display, used to display information on machines, clocks, railway departure indicators and many other devices requiring a simple display device of limited resolution. The display consists of a matrix of lights or mechanical indicators arranged in a rectangular configuration (other shapes are also possible, although not common) such that by switching on or off selected lights, text or graphics can be displayed. A dot matrix controller converts instructions from a processor into signals which turns on or off the lights in the matrix so that the required display is produced.

In one non-limiting example, the display is a video display used to play a stored digital video, or an image display used to present stored digital images, such as photos. The digital video (or image) content can be stored in the display, the actuator unit, the router, the control server, or any combination thereof. Further, few video (or still image) files may be stored (e.g., representing different announcements or songs), selected by the control logic. Alternatively or in addition, the digital video data may be received by the display, the actuator unit, the router, the control server, or any combination thereof, from external sources via any one of the networks. Furthermore, the source of the digital video or image may an image sensor (or video camera) serving as a sensor, either after processing, storing, delaying, or any other manipulation, or as originally received, resulting Closed-Circuit Television (CCTV) functionality between an image sensor or camera and a display in the building, which may be used for surveillance in areas that may need monitoring such as banks, casinos, airports, military installations, and convenience stores.

In one non-limiting example, an actuator unit further includes a signal generator coupled between the processor and the actuator. The signal generator may be used to control the actuator, for example by providing an electrical signal affecting the actuator operation, such as changing the magnitude of the actuator affect or operation. Such a signal generator may be a digital signal generator, or may be an analog signal generator, having an analog electrical signal output. Analog signal generator may be a digital signal generator, which digital output is converted to analog signal using a digital to analog converter, as shown in actuator unit 60 shown in FIG. 6, where two D/A converters 62a and 62b are connected to the computer 63 outputs, and where the analog outputs are coupled to respectively control the actuators 61a and 61b. The signal generator may be based on software (or firmware) stored in the unit and executed by the computer 63, or may be a separated circuit or component connected between the computer 63 and the D/A converters 62a and 62b. In such an arrangement, the computer may be used to activate the signal generator, or to select a waveform or signal to be generated. In one non-limiting example, the signal generator serves as the actuator, for generating an electrical signal, such as voltage and current.

A signal generator (a.k.a. frequency generator) is an electronic device or circuit devices that can generate repeating or non-repeating electronic signals (typically voltage or current), having an analog output (analog signal generator) or a digital output (digital signal generator). The output signal may be based on an electrical circuit, or may be based on a generated or stored digital data. A function generator is typically a signal generator which produces simple repetitive waveforms. Such devices contain an electronic oscillator, a circuit that is capable of creating a repetitive waveform, or may use digital signal processing to synthesize waveforms, followed by a digital to analog converter, or DAC, to produce an analog output. Common waveforms are a sine wave, a sawtooth, a step (pulse), a square, and a triangular waveforms. The generator may include some sort of modulation functionality such as Amplitude Modulation (AM), Frequency Modulation (FM), or Phase Modulation (PM). An Arbitrary Waveform Generators (A W Gs) are sophisticated signal generators which allow the user to generate arbitrary waveforms, within published limits of frequency range, accuracy, and output level. Unlike function generators, which are limited to a simple set of waveforms; an AWG allows the user to specify a source waveform in a variety of different ways. Logic signal generator (a.k.a. data pattern generator and digital pattern generator) is a digital signal generator that produces logic types of signals that is logic 1's and 0's in the form of conventional voltage levels. The usual voltage standards are: LVTTL, LVCMOS.

In one non-limiting example, an actuator unit further includes an electrical switch (or multiple switches) coupled between the processor and the actuator. The electric switch may be used to activate the actuator, for example by completing an electrical circuit allowing current to flow to the actuator. Such arrangement is exampled regarding the actuator units 60a, 60b, 60f and 60g respectively shown in FIGS. 6a, 6b, 6e, and 6f, connecting an electrical power source to a load. The load may be an actuator, and may be internal or external to the actuator unit, and may further be power fed from the same power source (and same power supply) of the actuator unit, or alternatively or in addition, a separate power source may be used to power the load or the actuator. The switch may be integrated with the actuator (if separated from the actuator unit), with the actuator unit, or any combination thereof. In the above examples, a controller can affect the actuator (or load) activation by sending the actuator unit a message to activate the actuator by powering it, or to deactivate the actuator operation by breaking the current floe thereto. In another non-limiting example, the actuator may be in two (or more) states, and the switch activates one or more of the states, or shifts the actuator between states. For example, an electric motor may have two speeds, controlled by a connected switch, which is under the controller control.

Any component that is designed to open (breaking, interrupting), close (making), or change one or more electrical circuits may serve as a switch, preferably under some type of external control. Preferably, the switch is an electromechanical device with one or more sets of electrical contacts having two or more states. The switch may be a 'normally open' type, requiring actuation for closing the contacts, may be 'normally closed' type, where actuation affects breaking the circuit, or may be a changeover switch, having both types of contacts arrangements. A changeover switch may be either a 'make-before-break' or 'break-before-make' types. The switch contacts may have one or more poles and one or more throws. Common switches contacts arrangements include Single-Pole-Single-Throw (SPST), Single-Pole-Double-Throw (SPDT), Double-Pole-Double-Throw (DPDT), Double-Pole-Single-Throw (DPST), and Single-Pole-Changeover (SPCO). A switch may be electrically or mechanically actuated.

A relay is a non-limiting example of an electrically operated switch. A relay may be a latching relay, that has two relaxed states (bistable), and when the current is switched off, the relay remains in its last state. This is achieved with a solenoid operating a ratchet and cam mechanism, or by having two opposing coils with an over-center spring or permanent magnet to hold the armature and contacts in position while the coil is relaxed, or with a permanent core. A relay may be an electromagnetic relay, that typically consists of a coil of wire wrapped around a soft iron core, an iron yoke which provides a low reluctance path for magnetic flux, a movable iron armature, and one or more sets of contacts. The armature is hinged to the yoke and mechanically linked to one or more sets of moving contacts. It is held in place by a spring so that when the relay is de-energized there is an air gap in the magnetic circuit. In this condition, one of the two sets of contacts in the relay pictured is closed, and the other set is open. A reed relay is a reed switch enclosed in a solenoid, and the switch has a set of contacts inside an evacuated or inert gas-filled glass tube, which protects the contacts against atmospheric corrosion.

Alternatively or in addition, a relay may be a Solid State Relay (SSR), where a solid-state based component functioning as a relay, without having any moving parts. Alternatively or in addition, a switch may be implemented using an electrical circuit. For example, an open collector (or open drain) based circuit may be used. Further, an opto-isolator (a.k.a. optocoupler, photocoupler, or optical isolator) may be used to provide isolated signal transfer to the actuator. Further, a thyristor such as a Triode for Alternating Current (TRIAC) may be used for triggering power to an actuator.

Figure 7:
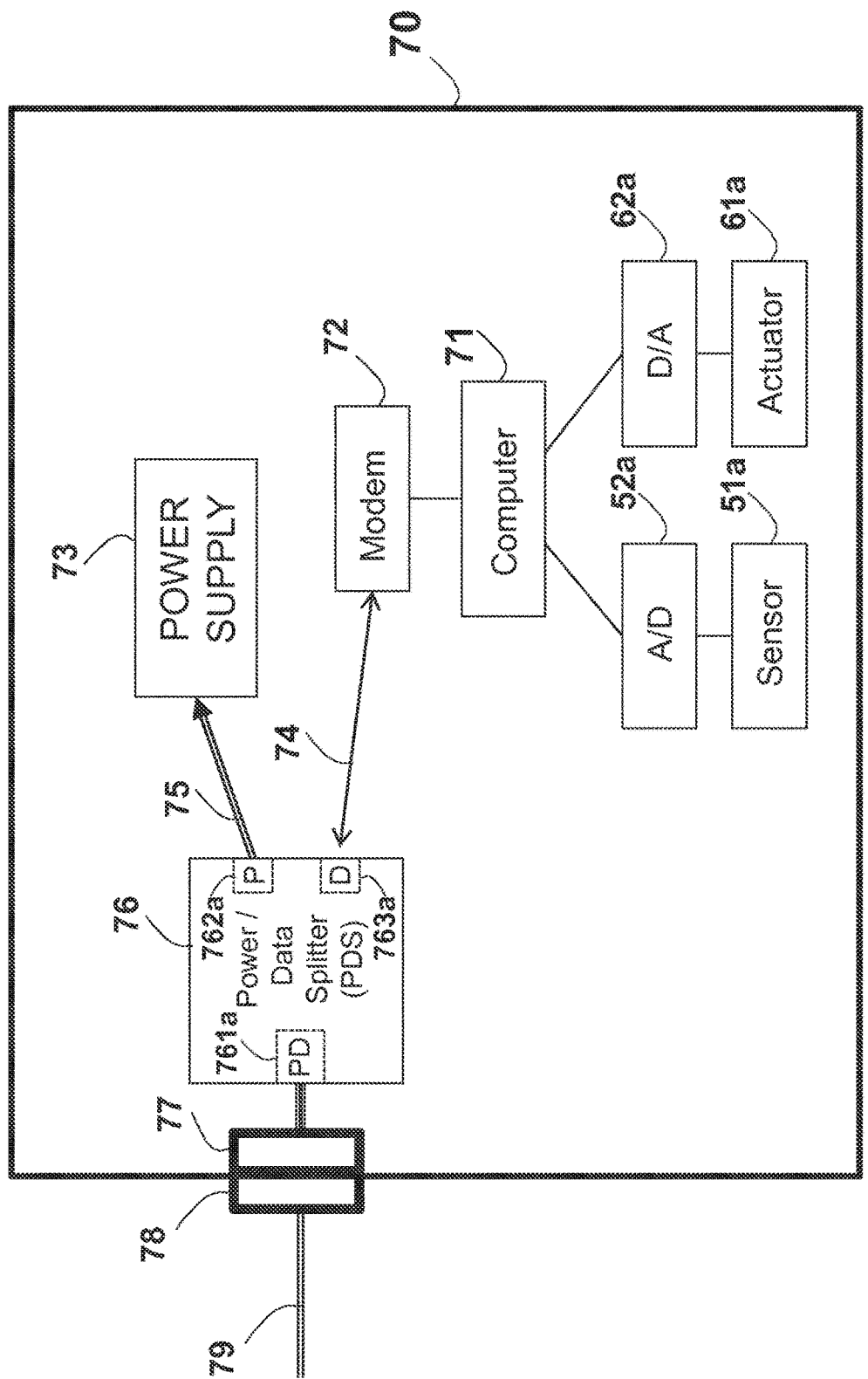
FIG. 7 illustrates a schematic electrical diagram of a sensor/actuator unit.

A field unit may be a sensor unit such as sensor unit 50 shown above in FIG. 5, including one or more sensors, or may be an actuator unit such as actuator unit 60 shown above in FIG. 6, including one or more actuators, or may be a sensor/actuator unit such as sensor actuator unit 70 shown in FIG. 7. Such a sensor/actuator 70 includes an analog sensor 51a connected via A/D converter 52a Any number of sensors 51 of any type may be equally used. The sensor/actuator 70 further includes an analog actuator 61a connected via D/A converter 62a Any number of actuators 61 of any type may be equally used. The sensors 51 and the actuators 61 are connected to a computer 71, which communicates over the network medium via a suitable modem, such as wired modem (or transceiver) 72 suitable for communication over the cable 79 terminated by connector 78, which connects to the mating connector 77 in the sensor/actuator unit 70 Similarly, sensor and actuator units or their functionalities may be integrated, and thus may share any resources. For example, both circuits may share a power source, a power supply or a power connector. Similarly, other electronic circuits mat be shared and used for both functionalities. Further, the same connector or connectors, as well as interfaces and other support circuits may be used by both functionalities. Furthermore, the associated components implementing these functionalities may be housed in the same enclosure, or may be mounted to the same surface. In one non-limiting example, the hardware relating to both functionalities may be integrated onto a single substrate (e.g., Silicon "die"), or as components mounted on the same PCB.

Figure 7A:
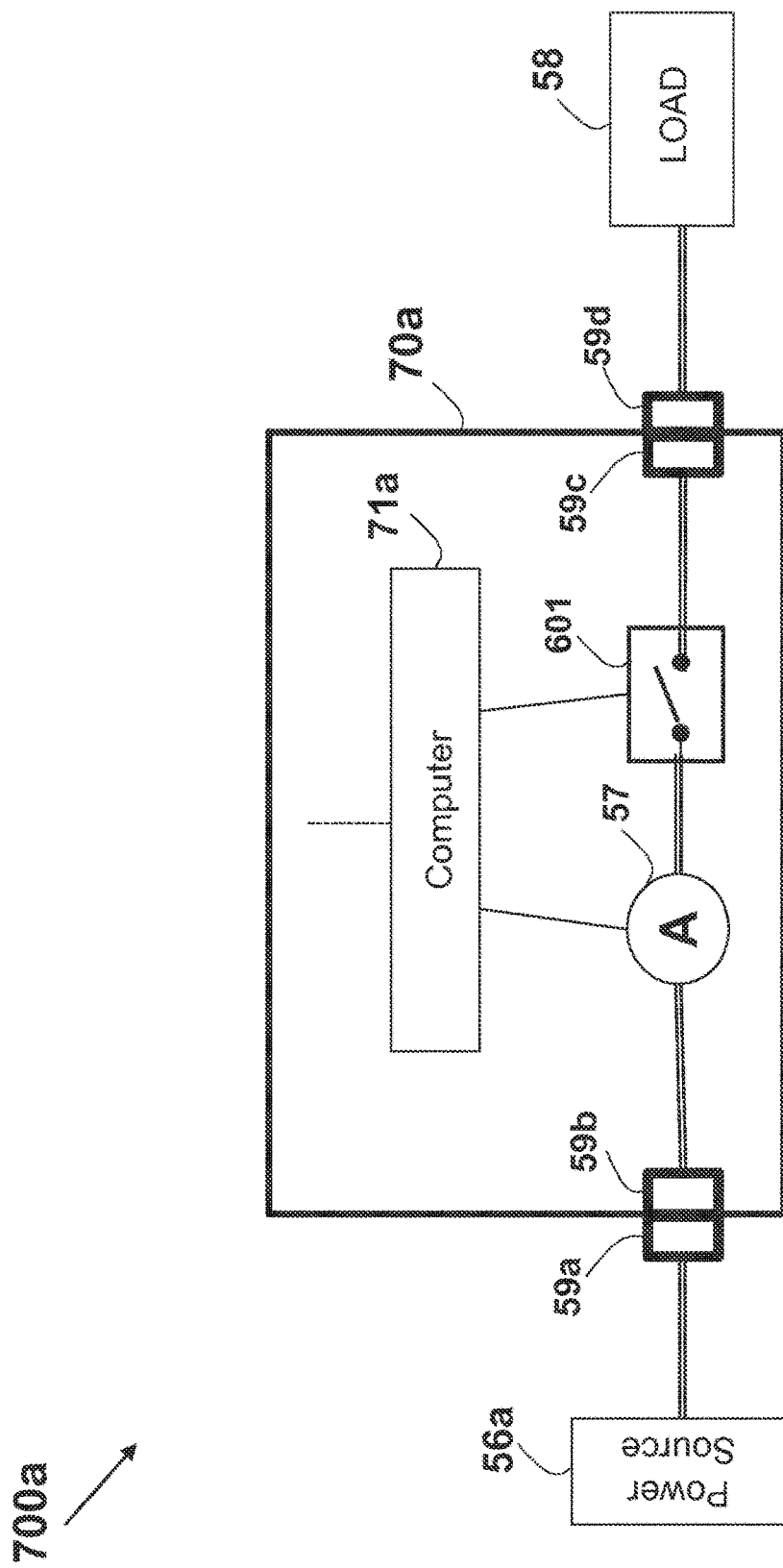
FIG. 7a illustrates a schematic electrical diagram of a power control field unit.

A non-limiting example of a power control field unit 70a is shown as part of arrangement 700a shown in FIG. 7a. Similar to arrangement 600a shown in FIG. 6a, a load 58 is powered from a power source 56a and can be turned on and off by the controlled switch 601 controlled by computer 71a In addition, a current meter 57 is connected in series to measure the current or the power consumption of the load 58.

A field unit may be powered, in whole or in part, from an AC or DC power source, which may be integrated with the unit enclosure, may be external to the unit enclosure, or any combination thereof. Typically, a power supply is connected to the power source to be power fed therefrom, and provides a single (or multiple) voltage as required by the field unit. Commonly, one or more regulated DC voltage is supplied by the power supply, which may be a linear or a switching type. The power supply outputs are commonly regulated to provide stable voltages (and/or currents, if applicable), under varying power source and load conditions. The power supply outputs are commonly protected against overload, for example by a fuse or a current limiter, and are commonly protected against overvoltage, over-current, or other instabilities and abnormal condition of the power source. Further, a power supply may also serve to provide electrical isolation, and further commonly filters an electrical noise between its inputs and outputs. A sensor may be power fed from the same power source or power supply powering the field unit circuits, or may use a dedicated power source or power supply, which may be internal or external to the field unit enclosure. An actuator may be power fed from the same power source or power supply powering the field unit circuits, or may use a dedicated power source or power supply, which may be internal or external to the field unit enclosure.

A field unit may be locally electrically powered from a power source integrated within the unit. Such a power source 56 is shown as part of the sensor unit 50 in FIG. 5. Such power source 56 may be based on a battery. The battery may be a primary battery or cell, in which an irreversible chemical reaction generates the electricity, and thus the cell is disposable and cannot be recharged, and need to be replaced after the battery is drained. Such battery replacement may be expensive and cumbersome. Alternatively or in addition, a rechargeable (secondary) battery may be used, such as a nickel-cadmium based battery. In such a case, a battery charger is employed for charging the battery while it is in use or not in use. Various types of such battery chargers are known in the art, such as trickle chargers, pulse chargers and the like. The battery charger may be integrated with the field unit or be external to it. The battery may be a primary or a rechargeable (secondary) type, may include a single or few batteries, and may use various chemicals for the electrochemical cells, such as lithium, alkaline and nickel-cadmium. Common batteries are manufactured in pre-defined standard output voltages (1.5, 3, 4.5, 9 Volts, for example), as well as defined standard mechanical enclosures (usually defined by letters such as "A", "AA", "B", "C" sizes), and 'coin' type. In one embodiment the battery (or batteries) is held in a battery holder or compartment, and thus can be easily replaced.

In one non-limiting example, the field unit is locally energized using an electrical energy generator to locally generate electrical power for charging the rechargeable battery via a battery charger. Preferably, the generator is integrated within the field unit enclosure. Alternatively or in addition, the generator may directly feed the power consuming components in the field unit without using any electrical energy storage device such as a rechargeable battery. Such generator may be based on converting kinetic energy harvested from the field unit motion, which may be caused by a human or animal activity, to electrical energy. Such a generator is described in U.S. Pat. No. 7,692,320 to Lemieux entitled: "Electrical Energy Generator", in U.S. Pat. No. 5,578,877 to Tiemann entitled: "Apparatus for Converting Vibratory Motion to Electrical Energy", in U.S. Pat. No. 7,847,421 to Gardner et al. entitled: "System for Generating Electrical Energy from Ambient Motion" and in U.S. Patent Application No. 2007/0210580 to Roberts et al. entitled: "Electromechanical Generator for, and Method of, Converting Mechanical Vibrational Energy into Electrical Energy", as well as a battery-shaped generator described in U.S. Pat. No. 7,688,036 to Y arger et al. entitled: "System and Method for Storing Energy", which are all incorporated in their entirety for all purposes as if fully set forth herein. Using kinetic energy harvesting as an electrical power source may be useful in cased wherein the sensor in a field unit is involved in measuring motion (e.g., speed or acceleration). Another type of power source may use a solar or photovoltaic cell described above. In one non-limiting example, the same element may double as a sensor and as a power source. For example, a solar or photovoltaic cell may be used as a light sensor, simultaneously with serving as a power source, and an electromechanical generator, for example based on harvesting mechanical vibration energy, may at the same time be used to measure the mechanical vibrations (e.g., frequency or magnitude). Similarly, a thermoelectric device based on the Peltier effect may be used as a thermoelectric generator, in addition to being a temperature sensor, heater or a cooler. In another non-limiting example, a field unit is powered from an external power source. Such implementation is exampled in the actuator unit 60 shown in FIG. 6. The unit 60 is powered from a power supply 66 which is power fed from the common AC power supply via AC plug connector 68 and a power cord 67, using the mains AC power (commonly 115VA C/60 Hz in North America or 220 VAC/50 Hz in Europe) as the power source. The power supply commonly includes an AC/DC converter, for converting the A C voltage into the required low-level stabilized DC voltage or voltages, commonly suitable for power the digital circuits, such as 3.3V DC, 5 VDC or 12 VDC. Power supplies commonly include voltage stabilizers for ensuring that the output remains within certain limits under various load conditions, and typically employs a transformer, silicon diode bridge rectifier, reservoir capacitor and voltage regulator IC. Switched mode regulator supplies also include an inductor. In one embodiment, the power supply 66 is integrated into a single device or circuit, in order to share common circuits. Further, the power supply 66 may include a boost converter, such as a buck boost converter, charge pump, inverter and regulators as known in the art, as required for conversion of one form of electrical power to another desired form and voltage. While power supply 66 (either separated or integrated) can be an integral part and housed within the unit enclosure (together with the computer 63), it may be enclosed as a separate housing connected via cable to the computer system enclosure. For example, a small outlet plug-in step-down transformer shape can be used (also known as wall-wart, "power brick", "plug pack", "plug-in adapter", "adapter block", "domestic mains adapter", "power adapter", or AC adapter). Further, power supply 66 may be a linear or switching type.

In one example, a field unit is powered by a power signal carried over the same wires or over the same cable used also for communication. For example, in the case of wired communication with a router, a gateway or another field unit, the same cable may be used for simultaneously carrying the digital data communication and the power signal. In one non-limiting example, the power is carried over dedicated and distinct wires, thus the power signal is carried separated from any other signals carried over the cable. Such configuration further requires the use of a cable and connectors having at least four contacts, where two (or more) are used for the power and at least two are used for the digital data signal (or for any other signal carried in the system).

In an alternative remote powering scheme, the power signal and the data signal (e.g., serial digital data signal) are concurrently carried together over the same wires, as exampled in the sensor/actuator unit 70 shown in FIG. 7. This scheme makes use of a power/data splitter (PDS) 76 and a power/data combiner (PDC) circuit 86, where the latter combines the power and data signals to a combined signal, and the first split a combined signal into its power and data signal components, as described in arrangement 80 in FIG. 8. Such PDS or PDC circuits (e.g., PDC 86 and PDS 76 in FIG. 8) commonly employ three ports designated as 'PD' 761 (stands for Power+Data), 'D' 763 (stands for Data only) and 'P' 762 (stands for Power only). The PDC 77 may be part of another device 81 such as a switch, a router or a gateway. In the PDS 76, the cable 79 (carrying both power and data) is connected to port 'PD' 761*a* which passes the a data signal received from, or transmitted to, the port 'D' 763*a* to or from the modem 72 while the power signal carried over the cable 79 is split and supplied to port P 762*a* and connected to via the connection 75 to the power supply 73, which in turn feeds power to the unit 70 electrical circuits. Similarly, the power signal fed by connection 82 to the power port P 762*b*, and the digital data signal carried over the connection 83 are combined in PDC 77 and connected via port 'PD' 761 bto cable 79 via connectors 84 and its mating connector 85. Thus, power signal transparently passes between ports 'PD' 761 and P762 while data signal (e.g., serial digital data signal) is transparently passed between ports 'PD' 761 and 'D' 763. The power signal may be AC or DC, and the PDC 86 or the PDS 76 may each contain only passive components or alternatively may contain both active and passive electronic circuits.

In an alternative arrangement, the power and communication signals are carried over the wires in the cable using Frequency Division Multiplexing (FDM, a.k.a. Frequency Domain Multiplexing). In such an implementation, the power and the communications signals are carried each in its frequency band (or a single frequency) distinct from each other. For example, the power signal can be a DC (Direct Current) power (effectively 0 Hz), while the communication signal is carried over the 100 Hz-10MHz (or 4-30MHz) frequency band, which is distinct and above the DC power frequency. In this case, the component on each side may further include a low pass filter coupled between the connector and the transceiver (transmitter/receiver) for substantially passing only the power frequency, for powering the device from the power signal, or for injecting the power signal. Such device may also further include a high pass filter coupled between the connector and the transceiver for substantially passing only the communication frequency band, for passing the communication signal between the connector and the transceiver. Another technique for carrying power and data signals over the same conductors is known as Power-over-Ethernet (POE) (i.e., Power over LAN-PoL) and standardized under IEEE 802.3af and IEEE 802.3at, also explained in U.S. Pat. No. 6,473,609 to Lehr et al. entitled: "Structure Cabling System", which is incorporated in its entirety for all purposes as if fully set forth herein, which describes a method to carry power over LAN wiring, using the spare pairs and the phantom mechanism. The latter makes use of center-tap transformers. The powering scheme may use the standards above, as well as using non-standard and proprietary powering schemes.

Figure 9:
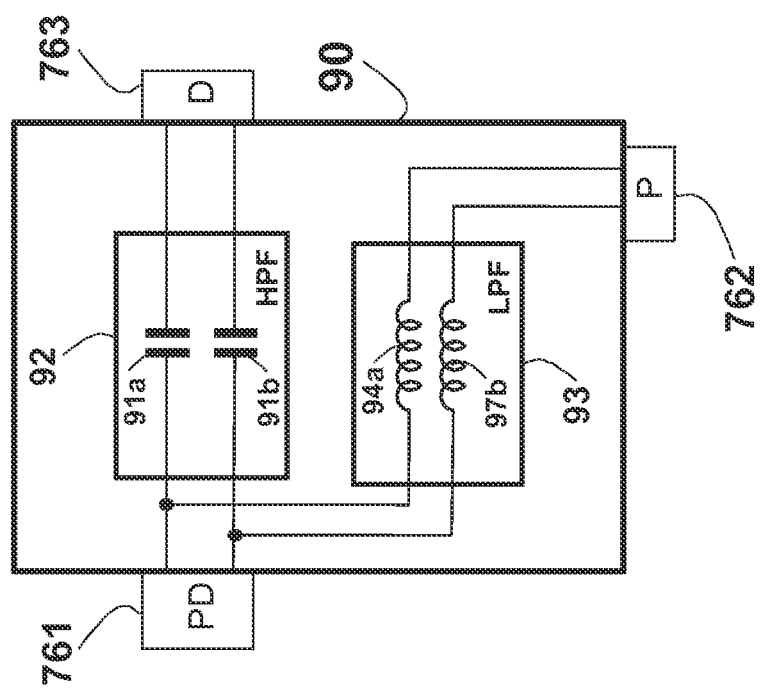
FIG. 9 illustrates a schematic electrical diagram of FDM power/data signals combining/splitting circuit.
Figure 10:
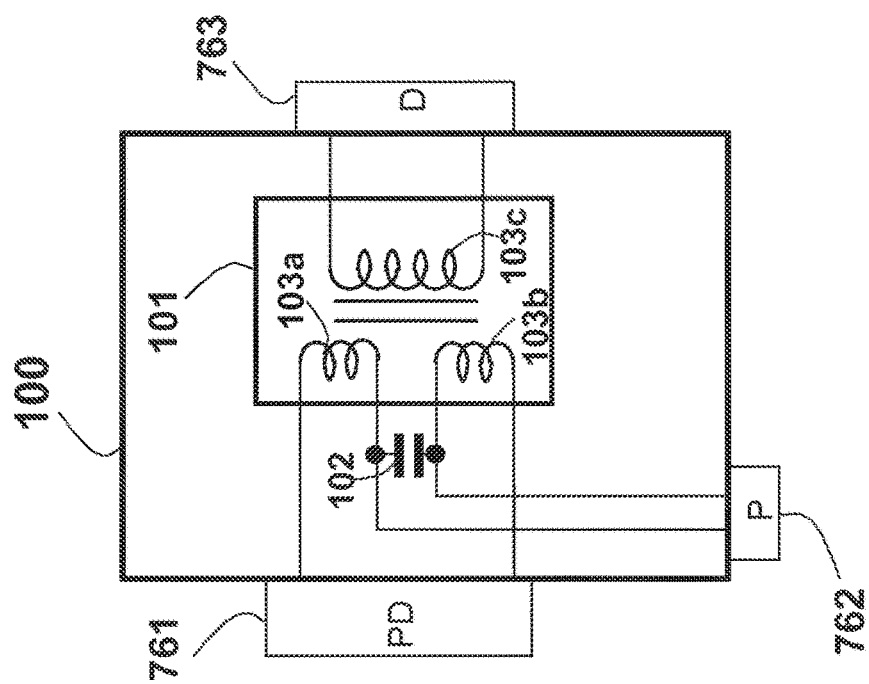
FIG. 10 illustrates a schematic electrical diagram of FDM power/data signals combining/splitting circuit using capacitor and transformer.

In one non-limiting example, the data and power signals are carried over the same wires using Frequency Division Multiplexing (FDM), where each signal is using a different frequency band, and wherein the frequency bands are spaced in frequency. For example, the power signal can be a DC signal (0 Hz), while the data signal will be carried over a band excluding the DC frequency. Similarly, the power signal can be an AC power signal, using a frequency above the frequency band used by the data signal. Separation or combining the power and data signals makes use of filters, passing or stopping the respective bands. A non-limiting example of a circuit 90 that may serve as a PDS 76 or as PDC 77 is shown in FIG. 9, corresponding to the case wherein the power signal is a DC signal (0 Hz), while the data signal is an AC signal carried over a band excluding the DC frequency. A capacitor 91*a*, which may be supplemented with another capacitor 91*b* is connected between the PD port 761 and the D port 763, implementing a High Pass Filter (HPF) 92 The HPF 92 substantially stops the DC power signal and substantially passes the data signal (or any AC signal) between the connected corresponding ports. An inductor 94*a*, which may be supplemented with another inductor 94*b* is connected between the PD port 761 and the P port 762 implementing a Low Pass Filter (LPF) 93. The LPF 93 substantially stops the data signal and substantially passes the DC power signal between the connected corresponding ports. Other passive or active implementations of the HPF 92 and LPF 93 can be equally used. Similarly, the power signal may be low-frequency power voltage, such as 50 Hz or 60 Hz.

Figure 8:
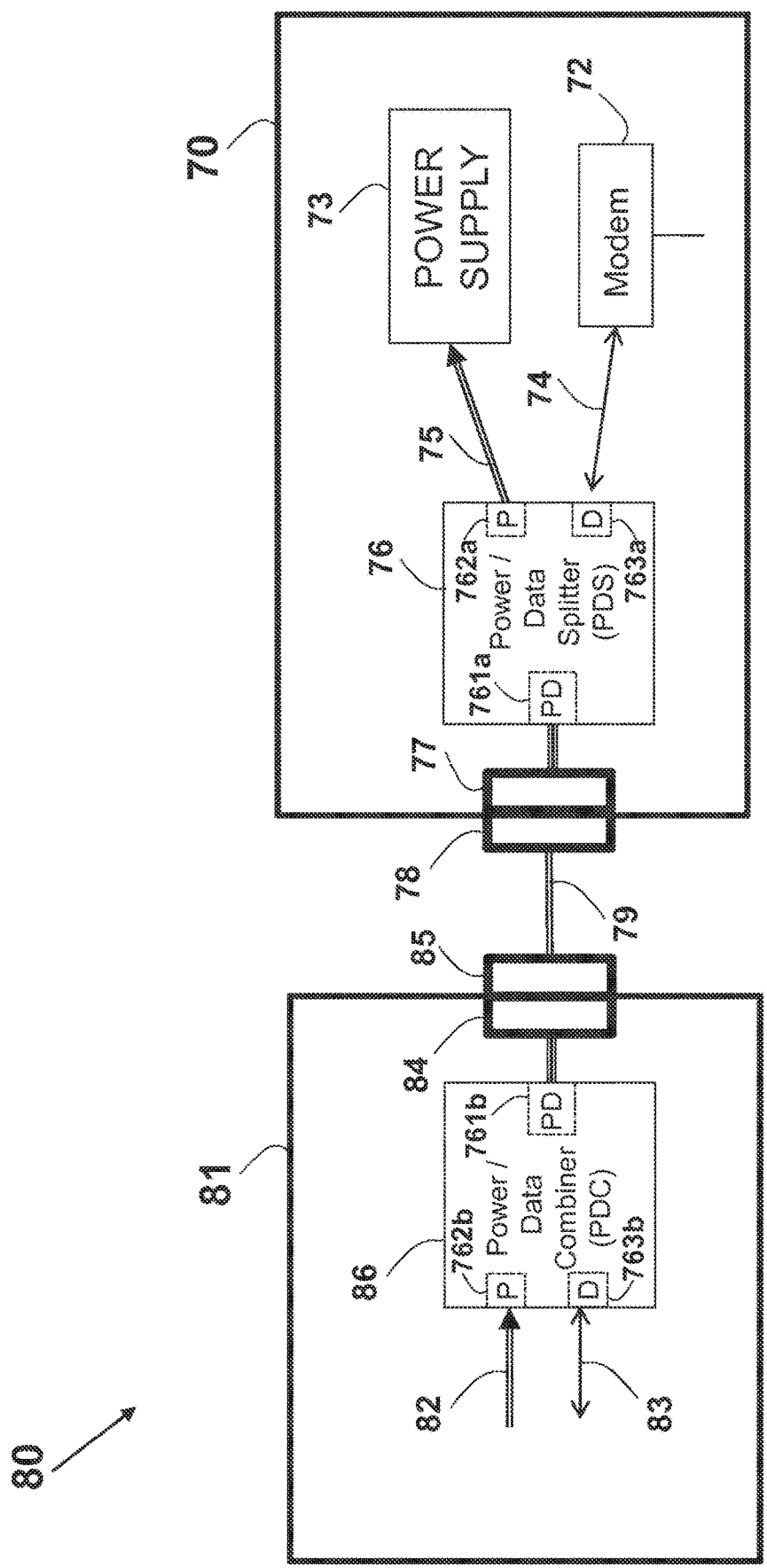
FIG. 8 illustrates a schematic electrical diagram of remote powering scheme of a field unit.

Alternatively or in addition, the data and power signals are carried over the same wires using a split-tap transformer, as commonly known for powering an analog telephone set known as POTS (Plain Old Telephone Service and ISDN). A non-limiting example of a circuit 100 that may serve as a PDS 76 or as PDC 86 is shown in FIG. 8, corresponding for example to the case wherein the power signal is a DC signal (0 Hz), while the data signal is an AC signal carried over a band excluding the DC frequency. A transformer 101 is connected between the PD port 761 and the D port 763, where the primary side windings 103*a* and 103*b* connected to the PD port 761, and the secondary winding 103*c* is connected to the D port 763. The primary side is split to be formed of two windings 10Ba and 103*b*, connected together with capacitor 102 The transformer substantially passes the data signal between PD port 761 and the D port 763, while the DC power signal (or a low frequency AC signal) is blocked by the capacitor 102 Any DC signal such as the DC power signal is substantially passed between the PD port 761 and the P port 762.

Figure 11:
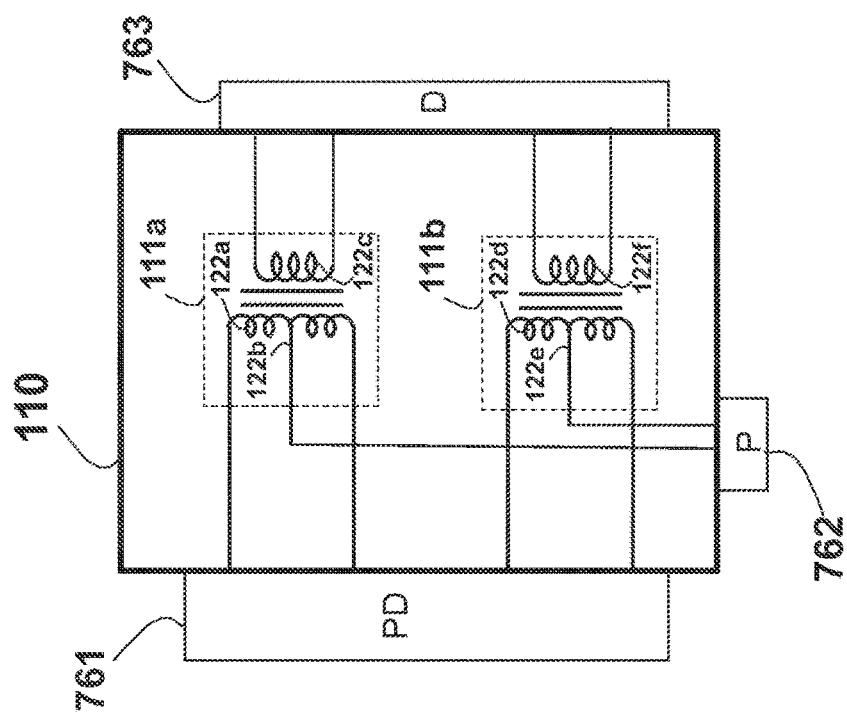
FIG. 11 illustrates a schematic electrical diagram of phantom scheme power/data signals combining/splitting circuit.

In another alternative, the power signal is carried over a phantom channel between two pairs carrying the data signal or other signals. A non-limiting example of a of a circuit 110 that may serve as a PDS 76 or as PDC 86 is shown in FIG. 11, corresponding for example to the case wherein the power signal is a DC signal (0 Hz), while the data signal is an AC signal carried over a band excluding the DC frequency. The transformers 111*a* and 111*b* are connected between the PD port 761 and the D port 763, substantially passing data signals there between. The split-tap 122*b* (of the winding 122*a* of transformer 111*a*) and the split-tap 122*e* (of the winding 122*d* of transformer 111*b*) are connected to the P port 762 allowing for DC power flow between the PD port 761 and the P port 762 Such a phantom arrangement is used in communication based on IEEE802.3af or IEEE802.3at standards. Using the phantom channel for carrying power may be used in the case wherein at least four conductors are used as a connecting medium between modules.

In one non-limiting example, the same element is simultaneously used as both a sensor and as a power source. For example, a solar or photovoltaic cell may be doubly used as a sensor measuring the light intensity, for example by measuring the voltage or current output of the cell, and further the voltage or current generated are used to power in whole or part of the sensor unit or the field unit. Similarly, a dynamo, an alternator, an electric generator, or any other device that converts mechanical energy to electrical energy may be used, where the output power, voltage or current is used both as the sensor indicating the magnitude of the mechanical phenomenon, and also as the power source to power entire or part of the unit.

In one non-limiting example, the bus connecting to the field unit or to the processor is based on a LAN communication, such as Ethernet, and may be partly or in full in accordance with the IEEE 802.3 standard. For example, Gigabit Ethernet (GbE or 1 GigE) may be used, describing various technologies for transmitting Ethernet frames at a rate of a gigabit per second (1,000,000,000 bits per second), as defined by the IEEE 802.3-2008 standard. There are five physical layer standards for gigabit Ethernet using optical fiber (1000BASE-X), twisted pair cable (1000BASE-T), or balanced copper cable (1000BASE-CX). The IEEE 802.3z standard includes 1000BASE-SX for transmission over multi-mode fiber, 1000BASE-LX for transmission over single-mode fiber, and the nearly obsolete 1000BASE-CX for transmission over balanced copper cabling. These standards use 8b/10b encoding, which inflates the line rate by 25%, from 1000 M bit/s to 1250 M bit/s, to ensure a DC balanced signal. The symbols are then sent using NRZ. The IEEE 802.3ab, which defines the widely used 1000BASE-T interface type, uses a different encoding scheme in order to keep the symbol rate as low as possible, allowing transmission over twisted pair. Similarly, The 10 gigabit Ethernet (10GE or 10 GbE or 10 GigE may be used, which is a version of Ethernet with a nominal data rate of 10 G bit/s (billion bits per second), ten times faster than gigabit Ethernet. The 10 gigabit Ethernet standard defines only full duplex point to point links which are generally connected by network switches. The 10 gigabit Ethernet standard encompasses a number of different physical layers (PHY) standards. A networking device may support different PHY types through pluggable PHY modules, such as those based on SFP+.

The powering scheme may be based on Power-over-Ethernet (POE), which describes a system to pass electrical power safely, along with data, on Ethernet cabling, and may use phantom configuration for carrying the power. The PoE technology and applications are described in the White Paper "All You Need To Know About Power over Ethernet (POE) and the IEEE 802.3af Standard", by PowerDsine Ltd., 06-0002-082 20-May-04, and in U.S. Pat. No. 6,473,609 to Lehr et al. entitled: "Structure Cabling System", which are all incorporated in their entirety for all purposes as if fully set forth herein. The IEEE standard for PoE requires category 5 cable or higher for high power levels, but can operate with category 3 cable for low power levels. The power is supplied in common mode over two or more of the differential pairs of wires found in the Ethernet cables, and fed from a power supply within a PoE-enabled networking device such as an Ethernet switch, or can be injected into a cable run with a midspan power supply. The IEEE 802.3af-2003 PoE standard, which is incorporated in its entirety for all purposes as if fully set forth herein, provides up to 15.4 Watts of DC power (minimum 44 V DC and 350 mA) to each device. Only 12.95 Watts is assured to be available to the powered device as some power is dissipated in the cable. The updated IEEE 802.3at-2009 PoE standard, also known as PoE+ or PoE plus, and which is incorporated in its entirety for all purposes as if fully set forth herein, provides up to 25.5 Watts of power. In PoE environment, a powering unit (such as unit 81) which may be a switch, a router or a gateway, may serve as a Power Sourcing Equipment (PSE) that provides ("sources") power on the Ethernet cable. A field unit (such as sensor/actuator unit 70) consuming power from the LAN is referred to as a Powered Device (PD).

Figure 14:
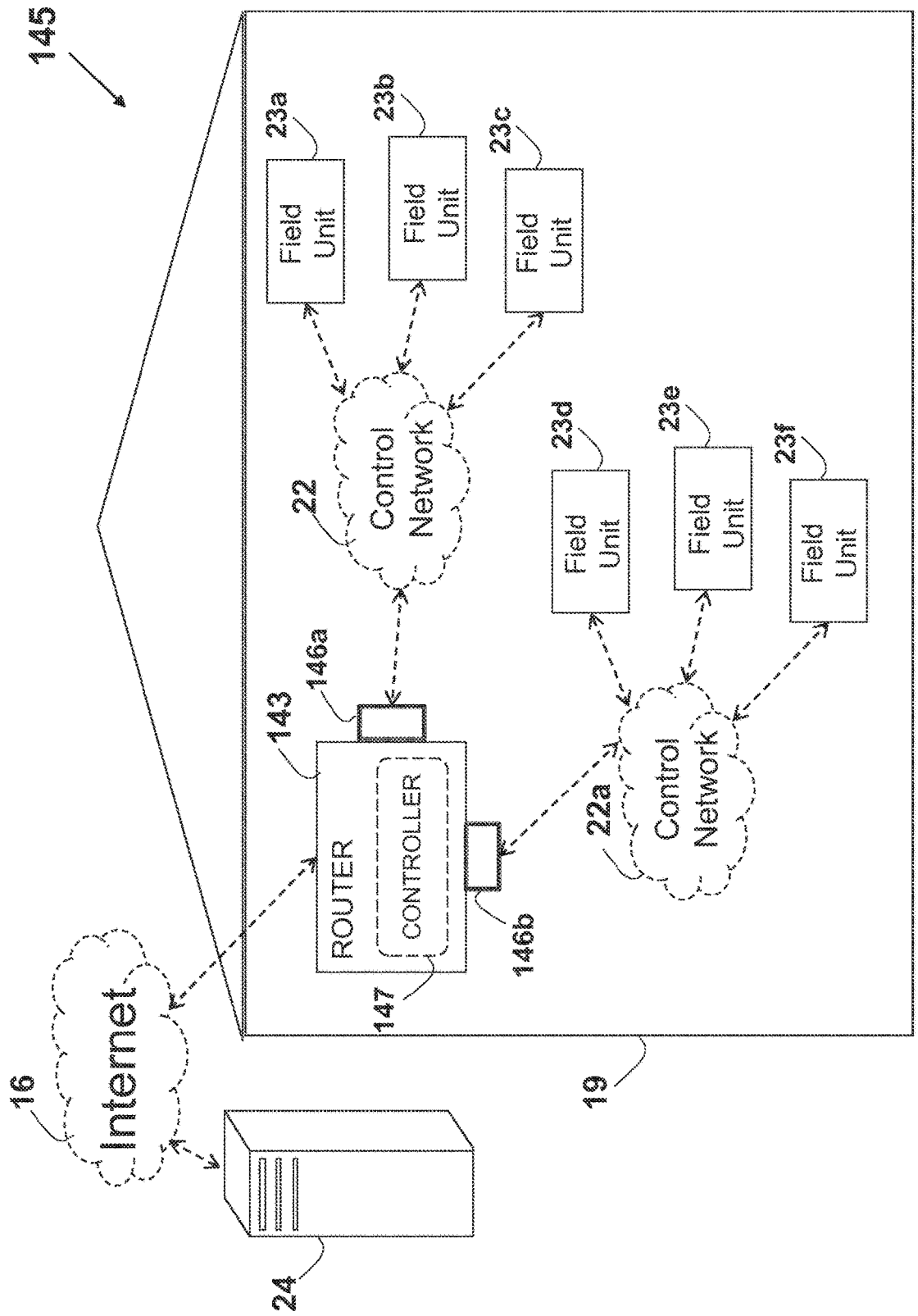
FIG. 14 illustrates a schematic electrical diagram of a controller integrated with a router.

The controller functionality 147 may be integrated in the router 143 (corresponding for example to router 12 in FIG. 2, router 40 in FIG. 4, gateway 11 in FIG. 1, or router 40a in FIGS. 4a-4d), as shown in arrangement 145 in FIG. 14. The router 143 is exampled having a port 146a for coupling to the control network 22 and a port 146b for connecting to control network 22a The control network 22 couples field units 23a, 23b and 23c to each other and to the router 143. The control network 22a couples field units 23d, 23e and 23f to each other and to the router 143 A non-limiting example of data flow used for implementing a control system is shown in arrangement 145a in FIG. 14. Data from a sensor in the field unit 23f is communicated to the router 143 over the communication path 144d, referring to the data transmitted from the field unit 23f, and carried (directly or via intervening devices) over the control network 22a to the port 146b of the router 143. Similarly, data from a sensor in the field unit 23c is communicated to the router 143 over the communication path 144b, referring to the data transmitted from the field unit 23c, and carried over the control network 22 to the port 146a of the router 143. The data received from the field units 23 in the router 143 is analyzed and processed, and based on control logic that may be embedded in the controller 147, may generate a command for activating or triggering various actuators. For example, a command to an actuator in the field unit 23a is communicated from the router 143 over the communication path 144a referring to the data transmitted from router 143 via the port 146a, and carried over the control network 22 the field unit 23a Similarly, a command to an actuator in the field unit 23e is communicated from the router 143 over the communication path 144c, referring to the data transmitted from router 143 via the port 146b, and carried over the control network 22a the field unit 23e While a single sensor in a field unit is described, two or more sensors may equally be used in the same field unit 23. Further, while two field units are described to send data to the router 143, one, three or more field units may be part of the control system, each sending data from one or more sensors associated with it. Further, while two field units 23c and 23f are described, each communicating via the respective associated control network 22 and 22a, a single control network or multiple (three or more) control networks may be equally used. Further, while two field units are described to send data to the router 143, one, three or more field units may be part of the control system, each sending data from one or more sensors associated with it. While a single actuator in a field unit is described, two or more actuators may equally be used in the same field unit 23, with or without sensors associated with it. Further, while two field units are described to receive data from the router 143, one, three or more field units may be part of the control system, each receiving data for activating or triggering one or more actuators associated with it. Further, while two field units 23a and 23e are described, each communicating via the respective associated control network 22 and 22a a single control network or multiple (three or more) control networks may be equally used. Further, while two field units are described to receive data from the router 143, one, three or more field units may be part of the control system, each receiving data for activating or triggering one or more actuators associated with it.

Figure 15:
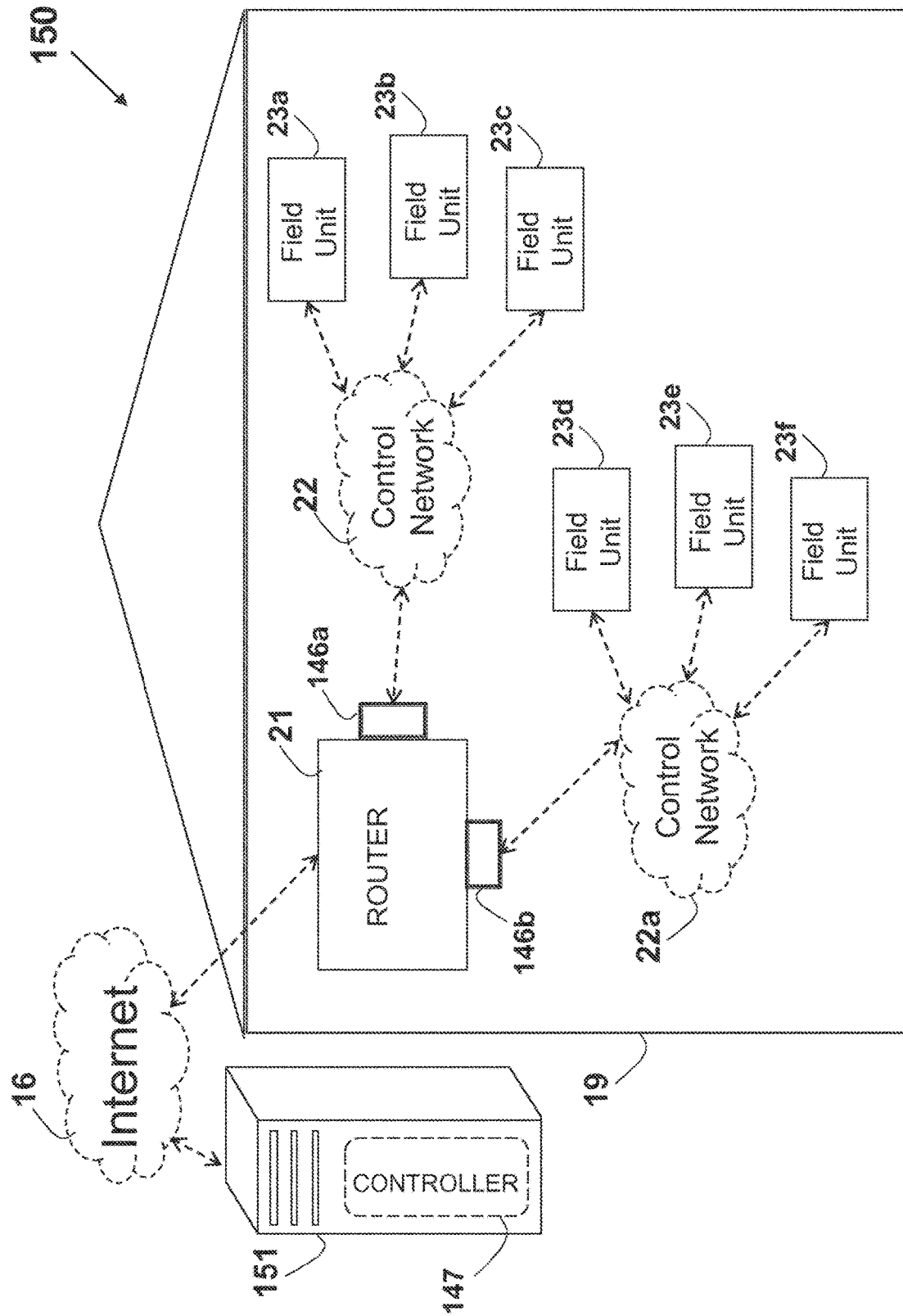
FIG. 15 illustrates a schematic electrical diagram of a controller integrated with a server.
Figure 15A:
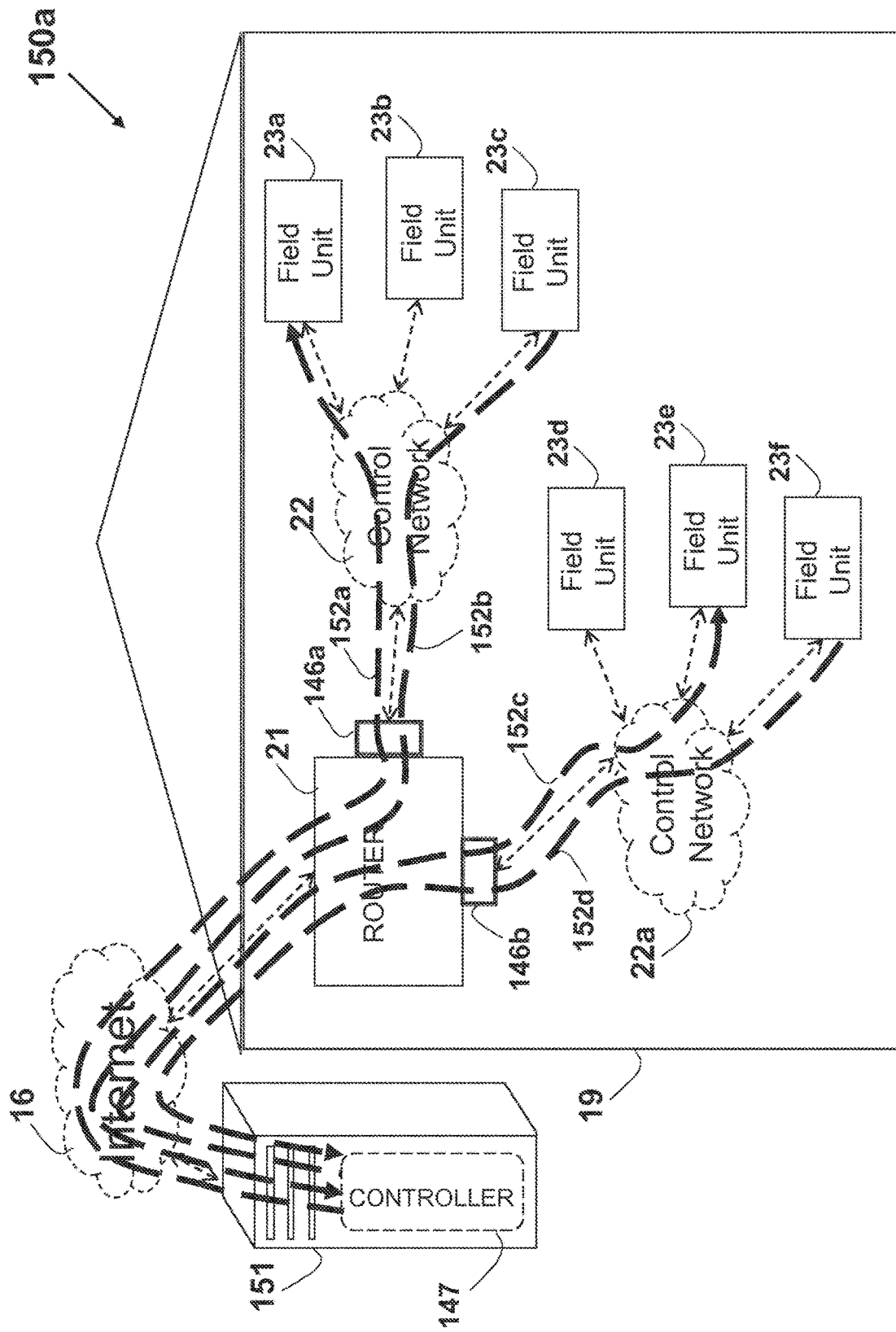
FIG. 15a illustrates the data paths and a schematic electrical diagram of a controller integrated with a server.

Alternatively or in addition, the controller 147 may be in part or in whole located external to the controlled premises 19. Such an arrangement 150 is shown in FIG. 15, where the controller 147 is integrated with the server 151, which may correspond to the server 17 shown in FIG. 1, the gateway server 24 shown in FIGS. 2-3, or the gateway server 48 shown in FIGS. 4-4e. In such configuration, the router 21 may serve for relaying sensor data from the field units 23 to the controller 147, and for relaying command data from the controller 147 to the field units 23 in the premises 19. The router 21 may condition or otherwise manipulate the data in one or both directions. Arrangement 150a in FIG. 15a shows a non-limiting example of data paths in the arrangement 150 The data path 152d describes the data flow from the field unit 23f via control network 22a to port 146b of the router 21, which in turn transmits the data to the server 151 via the Internet 16. Similarly, the data path 152b describes the data flow from the field unit 23c via control network 22 to port 146a of the router 21, which in turn transmits the data to the server 151 via the Internet 16 The command data is sent over the data path 152c from the server 151 via the Internet 16 to the field unit 23e via the router 21 and control network 22a Similarly, a command data may be sent over data path 152a from the server 151 via the Internet 16 to the field unit 23a, via the router 21 and control network 22.

Figure 16:
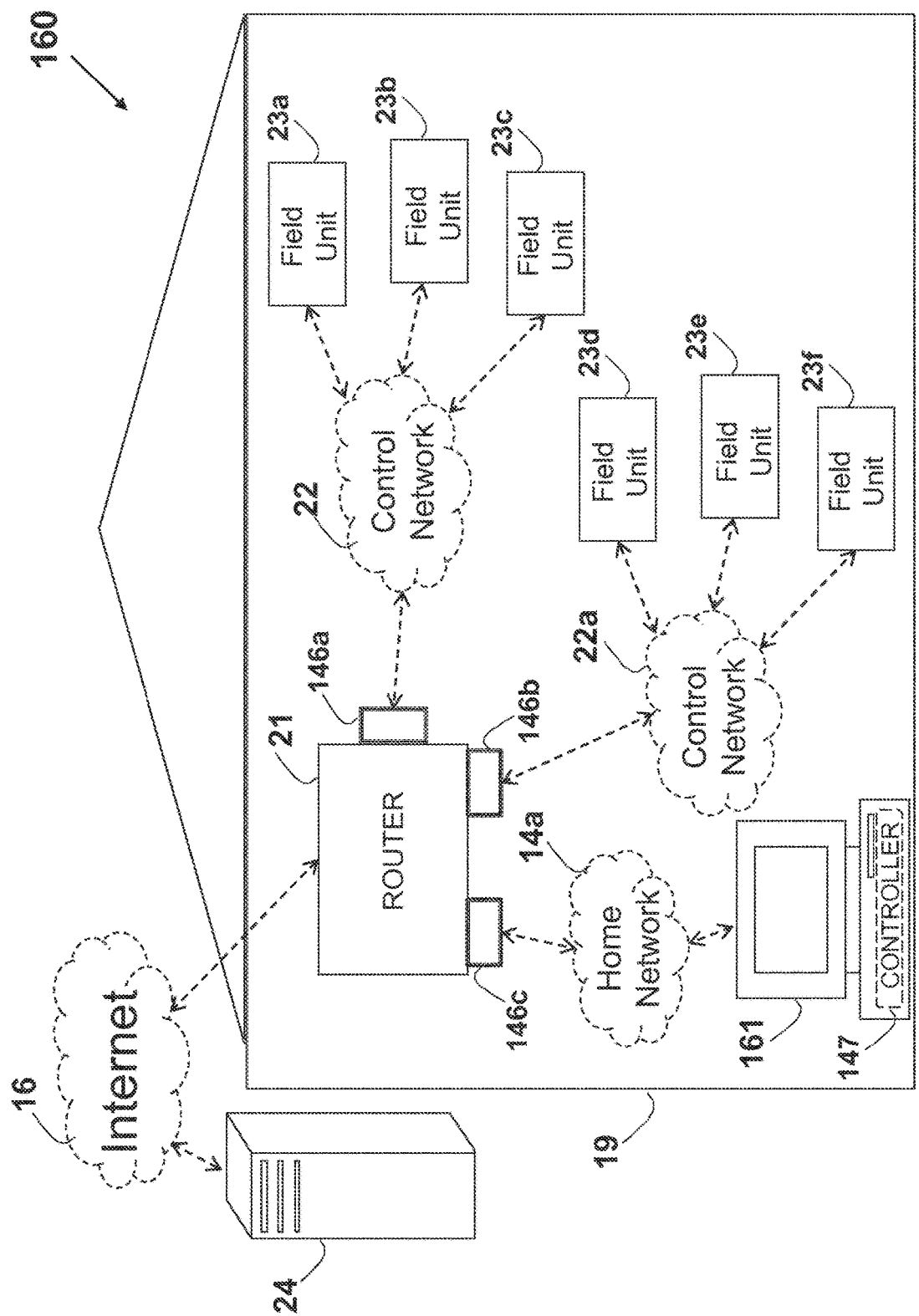
FIG. 16 illustrates a schematic electrical diagram of a controller integrated with a personal computer.
Figure 16A:
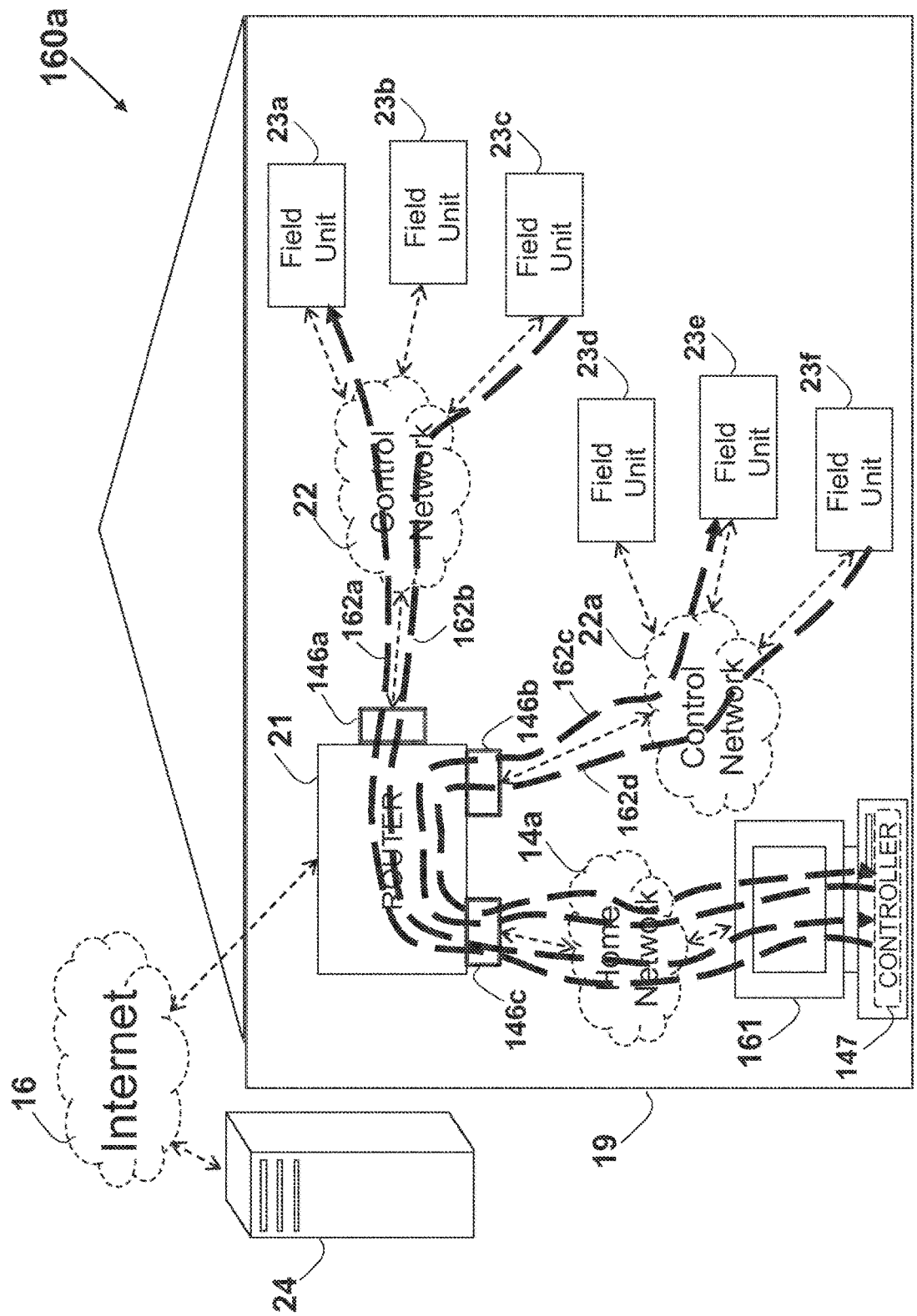
FIG. 16a illustrates the data paths and a schematic electrical diagram of a controller integrated with a personal computer.

Alternatively or in addition, the controller functionality 147 may be in part or in whole located internal to the controlled premises 19. In one non-limiting example, the controller 147 is integrated in a computer located inside the premises 19, as shown in arrangement 160 in FIG. 16. The controller 147 in shown integrated with a personal computer 161 The computer 161 may be connected to the router 21 directly or via a network, such as via one of the control networks, or alternatively (or in addition) use another network, such as home network 14a, as shown in FIG. 16, where the router 21 includes a port 146a connected to the home network 14a Arrangement 160a shown in FIG. 16a shows example of the various data paths that may be used, such as the data path 162d coupling the field unit 23f to the computer 161 via the control network 22a, router 21 and the home network 14a, the data path 162b coupling the field unit 23c to the computer 161 via the control network 22 router 21 and the home network 14a, the data path 162c coupling the computer 161 to the field unit 23e via the control network 22a, router 21 and the home network 14a, and the data path 162a coupling the computer 161 to the field unit 23a via the control network 22 router 21 and the home network 14a.

The controller functionality 147 may consist of, or include part or whole, of the flow chart 170 shown in FIG. 17. At step 'Receive Sensor Data' 171, data sent from one or more sensors (which are part of one or more field units) is received at the controller location. The sensor information is checked, processed, conditioned, or otherwise manipulated in step 'Sensor Conditioning' 172 Other signal conditioning functionalities may also be applied in order to improve the handling of the sensor received data or for adapting it to the next step or manipulating, such as attenuation, delay, filtering, amplifying, digitizing, integration, derivation, and any other signal manipulation. The conditioning may include frequency related manipulation such as filtering, spectrum analysis or noise removal, smoothing or de-blurring in case of image enhancement, a compressor (or de-compressor) or a coder (or decoder) in case of compression or coding/decoding, a modulator or a demodulator in case or modulation, and an extractor for extracting or detecting a feature or parameter such as pattern recognition or correlation analysis. The 'Sensor conditioning' step 172 may apply linear or non-linear manipulations, and the manipulation may be time-related such as delaying, integration or rate-based manipulation. The sensors conditioned data serves as input to the step 'Logic' 173, determining the output based on the sensors input according to a pre-determined logic function or algorithm. The control logic executed in step 'Logic' 173 outputs various actuators commands, which are conditioned in the 'Actuator Conditioning' step 174, for proper operation of the specific actuators. The conditioning may include attenuation, delay, filtering, amplifying, time integration, derivation, and any other data manipulations as described above regarding the 'Sensor Conditioning' step 172 The conditioned control commands are sent to the relevant actuators in the applicable field units in the step 'Send Actuator Command' 175 While the flowchart 170 is exampled including both receiving data from sensors and activating actuators, a controller 143 may only receive data from various sensors in the field units (e.g., for logging purposes) while not activating any actuators, or only transmit commands to various actuators in the field units (e.g., according to time) regardless of any sensing information, or any combination thereof. Further, a controller 143 may use various control logic patterns at different times, where at one time the controller only receives data from the sensors, at another time the controller only transmit commands to the actuators, and yet at another time the controller does both functions.

In the 'Send Notification' step 178, a message is sent to a user device to notify or alert a user. The notification may be sent periodically and include the system or any sub-system status, or may be sent upon an event, based on a predetermined condition or criteria. The message may be sent upon receiving a sensor data at 'Receive Sensor Data' step 171, may include a notification of the event of receiving the sensor data, and may include the received sensor data. Alternatively or in addition the message may be sent before, in parallel to, or after the conditioning in step 'Sensor Conditioning' 172 may include a notification of the event of conditioning the sensor data, and may include the sensor data before or after the conditioning of step 172 or any other conditioning. Alternatively or in addition the message may be sent before, in parallel to, or after the control logic process execution in step 'Logic' 173, may include a notification of the event of processing according to the logic of the sensor data, and may include the logic input or the logic output such as the actuator commands, or may use any other logic. Alternatively or in addition the message may be sent before, in parallel to, or after the conditioning and the generation of the actuator commands in step 'Actuator Conditioning' 174, may include a notification of the event of the conditioning, and may include the actuator commands before or after the conditioning. The conditioning, logic or processing associated with the message sensing in step 178 may be the same, based on, or may be different from, the condition and logic used for the control itself, and may use the same of different predetermined criteria. For example, a message may be sent upon receiving sensor data above or below a threshold, or upon an actuator command that is above or below a threshold. Any event, notification, or alert may include a timestamp, which is a sequence of characters or encoded information identifying when a certain event occurred, usually giving date and time of day, sometimes accurate to a small fraction of a second. Anotification may include a sensor data, such as the sensor or the associated field unit address (e.g., IP address) and location (e.g., kitchen, bedroom #1), the sensor type (e.g., temperature sensor) and make, the measured value (e.g. 25° C.), the sensor version or part-number, and the notification reason (e.g., periodic, pre-set time, above predetermined threshold). Similarly, a notification may include an actuator status or commands, such as the actuator or the associated field unit address (e.g., IP address) and location (e.g., kitchen, bedroom #1), the actuator type (e.g., heater) and make, the commanded value (e.g. 25° C.), the actuator version or part-number, and the notification reason (e.g., periodic, preset time, above predetermined threshold). Further, the notification may include an audio such as from a microphone serving as a sensor as in FIG. 19, or a video or images, such as from a camera serving as a sensor as in FIG. 18.

The notification or alert to the user device may be text based, such as an electronic mail (e-mail), website content, fax, or a Short Message Service (SMS). Alternatively or in addition, the notification or alert to the user device may be voice based, such as a voicemail, a voice message to a telephone device. Alternatively or in addition, the notification or the alert to the user device may activate a vibrator, causing vibrations that are felt by human body touching, or may be based on a Multimedia Message Service (MMS) or Instant Messaging (IM). The messaging, alerting, and notifications may be based on, include part of, or may be according to U.S. Patent Application No. 2009/0024759 to Mckibben et al. entitled: "System and Method for Providing Alerting Services", U.S. Pat. No. 7,653,573 to Hayes, Jr. et al. entitled: "Customer Messaging Service", U.S. Pat. No. 7,653,573 to Langseth. et al. entitled: "System and Method for a Subject-Based Channel Distribution of Automatic, Real-Time Delivery of Personalized Informational and Transactional Data", U.S. Pat. No. 7,334,001 to Eichstaedt et al. entitled: "Method and System for Data Collection for Alert Delivery", U.S. Pat. No. 7,136,482 to Wille entitled: "Progressive Alert Indications in a Communication Device", U.S. Patent Application No. 2007/0214095 to A dams et al. entitled: "Monitoring and Notification System and Method", U.S. Patent Application No. 2008/0258913 to Busey entitled: "Electronic Personal Alert System", or U.S. Pat. No. 7,557,689 to Seddigh et al. entitled: "Customer Messaging Service", which are all incorporated in their entirety for all purposes as if fully set forth herein.

The information and the notification sent to the user device in 'Send Notification' step 178, may be further logged or recorded in a data-base in 'Log' step 176 The data base may be accessed or sent in 'Send Log Information' step 177. The logging and the storing the data base may be in the same user device receiving the notification in 'Send Notification' step 178, or may be a distinct user device, and may be part of, or integrated with, any other device in the system.

The control logic 173 may be a Single-Input-Single-Output (SISO) which is based a single sensor and operative to control a single actuator. Alternatively or in addition, multiple sensors and actuators may be part of the control loop, referred to as Multi-Input-Multi-Output (MIMO). Similarly, SIMO and MISO control may be used as well. Further, the control may use linear or non-linear control schemes.

The control logic 173 may implement a sequential control (a.k.a. logic control), functioning much as a Programmable Logic Controller (PLC). Such sequential controllers commonly respond to various sensors by starting and stopping various operations, and typically make use of Boolean logic. Typically the system operation is based a state machine (or state diagram) and can be in various states (one state active at a time), and may transition from one state to another sequentially, or based on a transition condition, which are based on timing and data from the sensors. The system operation may be described or programmed graphically such as in a Ladder diagram (LD) or in a Function block diagram (FBD), or alternatively textually such as in Structured text (ST) and Instruction list (IL), as described for example in IEC 61131-3.

Alternatively or in addition, the control logic 173 implements an open-loop control, a feed-forward control, a closed-loop control or any combination thereof. In one non-limiting example, the controller 143 is a non-feedback controller, where the control logic 173 implemented as part of the controller flowchart 170 involves an open-loop control. In such a system, the control logic 173 does not use any feedback, such as from the various sensors, to determine the output commands to the actuators, but rather employs a pre-defined control mechanism. Unlike closed-control system, an open-loop system typically cannot engage in machine learning, cannot correct errors and does not compensate for any disturbances in the system. In some open-loop control systems, a human operator is involved in order to provide a 'feedback' for the system operation.

Alternatively or in addition, a non-feedback control, such as feed-forward control scheme may be used. In a typical feed-forward system, a measured disturbance is responded to in a pre-defined way, usually to maintain some desired state of the system in a changing environment. The disturbance is measured and fed forward to the control loop, so that corrective action can be initiated (without an actual feedback from the controlled element) in advance of the disturbance having an adverse effect on the system. The control systems may combine both feed-forward and feedback control, for better performance, such as the system disclosed in U.S. Pat. No. 7,499,239 to Chang entitled: "Feedforward Controller and Methods for Use Therewith", which is incorporated in its entirety for all purposes as if fully set forth herein. Such system is also described and analyzed in Ben-Gurion University Publication entitled: "Chapter 9—Feedforward Control" (pages 221-240) downloaded from http://www.bgu.ac.il/chem_eng/pages/Courses/oren % 20courses/Chapter_9.pdf, which is incorporated in its entirety for all purposes as if fully set forth herein.

Alternatively or in addition, a closed-loop control is implemented by the controller 143 In such a system, a physical phenomenon is sensed, measured, or detected by one or more sensors, and the logic 173 responses to the data received by commanding the activity of actuators, which directly or indirectly affects, change, regulate, or otherwise associated with, the sensed physical phenomenon. For example, the logic 173 may respond to a temperature sensor data by activating a heater or a cooler to change the measured temperature at that location. In one non-limiting example, a set-point or a reference value is defined which is (directly or indirectly) measured or sensed by one or more sensors, and the control loop is active to command the actuators to reach the set-point as measured by the sensors. The control loop may be a linear proportional only control loop, wherein the amount of the actuator control is proportional to the calculated deviation from a set-point, a PI (Proportional Integral) control, a Bistable control, a Hysteretic control, or a PID (Proportional, Integral and Derivative) control loop wherein the amount of the actuator command is calculated based on proportional, integral and derivative computations of the calculated deviation. Alternatively or in addition, the PID control loop may be based on the publication: "PID Control System Analysis, Design, and Technology" by Kiam Heong Ang, Gregory Chong, and Y un Li, published IEEE Transaction on Control System Technology, Vol. 13 No. 4, July 2005 (pp. 559-576), which is incorporated in its entirety for all purposes as if fully set forth herein.

Alternatively or in addition, the controller may employ a bang-bang control (a.k.a. on-off control), where one or more of the actuators may be only in two states, turned fully ON or turned fully OFF. Further, a sensor may be a switch-based sensor, having two states as well. For example, a thermostat is a simple negative-feedback control: when the temperature (the "process variable" or PV) goes below a set point (SP), the heater is switched on. Another example could be a pressure switch on an air compressor: when the pressure (PV) drops below the threshold (SP), the pump is powered. Refrigerators and vacuum pumps contain similar mechanisms operating in reverse, but still providing negative feedback to correct errors. A practical on-off control system is designed to include a hysteresis, usually in the form of an adjustable or programmable deadband, a region around the setpoint value in which no control action occurs.

The term 'random' herein is intended to cover not only pure random, non-deterministically generated signals, but also pseudo-random, deterministic signals such as the output of a shift-register arrangement provided with a feedback circuit as used to generate pseudo-random binary signals or as scramblers, and chaotic signals.

The system operation may involve randomness. For example, the control logic may use randomness in order to avoid predictability, or for having a statistical-based advantage. Randomness is commonly implemented by using random numbers, defined as a sequence of numbers or symbols that lack any pattern and thus appear random, are often generated by a random number generator, which may be included in one or more field units, in the router or gateway, or in the control server. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers. Such algorithm may be executed by a dedicated processor and firmware (or software), or may be integrated into one or more of the field units, in the router or gateway, or in the control server. Non-limiting examples of pseudo-random numbers generators are described in U.S. Pat. No. 6,285,761 to Patel et al. entitled: "Method for Generating Pseudo-Random Numbers", in U.S. Pat. No. 7,512,645 to Pitz et al. entitled: "System and Method for Generating Pseudorandom Numbers", in U.S. Patent Application Publication No. 2005/0044119 to Langin-Hooper et al. entitled: "Pseudo-Random Number Generator", and in U.S. Patent Application Publication No. 2008/0263117 to Rose et al. entitled: "Initial Seed M anagement for Pseudorandom Number Generator", which are all incorporated in their entirety for all purposes as if fully set forth herein.

The random signal generator may be hardware based, using a physical process such as thermal noise, shot noise, nuclear decaying radiation, photoelectric effect or other quantum phenomena, or can be software based, using a processor executing an algorithm for generating pseudo-random numbers which approximates the properties of random numbers. A non-limiting example of random number generators is disclosed in U.S. Pat. No. 7,124,157 to Ikake entitled: "Random Number Generator", in U.S. Pat. No. 4,905,176 to Schulz entitled: "Random Number Generator Circuit", in U.S. Pat. No. 4,853,884 to Brown et al. entitled: "Random Number Generator with Digital Feedback", and in U.S. Pat. No. 7,145,933 to Szajnowski entitled: "Method and Apparatus for generating Random signals", which are all incorporated in their entirety for all purposes as if fully set forth herein. The digital random signal generator may be based on 'True Random Number Generation IC RPG100/RPG100B' available from FDK Corporation and described in the data sheet 'Physical Random number generator RPG100.RPG100B' REV. 08 publication number HM-RAE106-0812, which is incorporated in its entirety for all purposes as if fully set forth herein.

The controller, the control logic, or the system operation may be based on, or involves, a fuzzy control, which is typically based on fuzzy logic. In fuzzy logic, the logical variables that take on continuous values between 0 and 1, in contrast to classical or digital logic, which operates on discrete values of either 1 or 0 (true or false respectively). The fuzzy logic has the advantage that the solution to the problem can be cast in terms that human operators can understand, so that their experience can be used in the design of the controller. This makes it easier to mechanize tasks that are already successfully performed by humans. Further, fuzzy logic is able to process incomplete data and provide approximate solutions to problems other methods find difficult to solve. The fuzzy logic or the fuzzy control may be in accordance with, or based on, the publication entitled: "Introduction to Fuzzy Control" by Marcelo Godoy Simoes, or the publication entitled: "Fuzzy Logic in Embedded Microcomputers and Control Systems" by Walter Banks and Gordon Hayward, published by the Byte Craft Limited, which are all incorporated in their entirety for all purposes as if fully set forth herein.

Alternatively or in addition, the control loop implementation may be based on, or be according to, the book entitled: "Sensors and Control Systems in manufacturing", Second Edition 2010, by Sabrie Soloman, The McGraw-Hill Companies, ISBN: 978-O-07-160573-1, or according to the book entitled: "Fundamentals of Industrial Instrumentation and Process Control", by William C. Dunn, 2005, The McGraw-Hill Companies, ISBN: 0-07-145735-6, which are incorporated in their entirety for all purposes as if fully set forth herein.

The control loop may use a single fixed-value setpoint. Alternatively or addition, multiple setpoint values may be available as continuous or discrete values, to be selected by a human, which may be a tenant in the building. Further, a setpoint may be automatically set, such as being changed according to a pre-configured scheme. In one example, the value of the setpoint may be time dependent. For example, a first value may be automatically applied during day time, and a second value may be used during the night time. Similarly, a value of a setpoint may be dependent upon, and may be automatically changed or updated, based on TOD (Time-of-Day), day of the week, the month, the year and so forth. In such a case, the system may comprise hardware- or software-based timer, or may use an external timing source or signal for changing or selecting the setpoint value. Using multiple setpoint values is described for example in U.S. Pat. No. 8,214,070 to Grossmann et al. entitled: "Method and Device for Controlling an Actuator", which is incorporated in its entirety for all purposes as if fully set forth herein.

In one example, a setpoint affecting a control loop having a sensor (or sensors) and actuator (or actuators) for controlling a phenomenon, is selected by the control logic based on a sensor data that is not part of the control loop, and is not directly sensing or measuring the controlled phenomenon. For example, a temperature control system may have a low setpoint value such as 15° C. where there is no person in the building (or in a room) in order to preserve electricity or energy, and may have another setpoint value such as 25° C. when there is a person in the building (or in the room). An occupancy sensor, which is not part HVAC control loop including a thermostat and a heater, may be used to detect the presence of a person in the house, and then the control logic may automatically change the setpoint to the higher and more comfortable temperature. An example of adjusting a setpoint based on the state of occupancy is described in U.S. Pat. No. 8,180,492 to Steinberg entitled: "System and Method for Using a Networked Electronic Device as an Occupancy Sensor for an Energy Management System", which is incorporated in its entirety for all purposes as if fully set forth herein.

In one non-limiting example, one (or more) of the sensors in one or more of the field units may be, or may include, an image sensor, such as the sensor unit 50*f* shown in FIG. 5*f*. In such a case, information in the captured image may be extracted and used as part of the control loop. In one example, the field unit may include, be part of, or be integrated with, a digital camera. The digital camera may be a still camera primarily used to take photographs, or may be a video camera where video (and commonly audio) is captured and stored. Some digital cameras can capture and store both still and video images. The digital camera may be portable or may be fixed, such as in most surveillance applications.

The digital camera (or the field unit including an image sensor) may communicate the captured still image or video to the router (or other field units) via wireless communication. Digital cameras utilizing wireless communication are disclosed in U.S. Pat. No. 6,535,243 to Tullis entitled: "Wireless Hand-Held Digital Camera", U.S. Pat. No. 6,552,743 to Rissman entitled: "Digital Camera-Ready Printer", U.S. Pat. No. 6,788,332 to Cook entitled: "Wireless Imaging Device and System", and in U.S. Pat. No. 5,666,159 to Parulski et al. entitled: "Electronic Camera System with Programmable Transmission Capability", which are all incorporated in their entirety for all purposes as if fully set forth herein. A display system and method utilizing a cellular telephone having digital camera capability and a television linked directly over a UWB wireless signal is disclosed in U.S. Pat. No. 7,327,385 to Yamaguchi entitled: "Home Picture/Video Display System with Ultra Wide-Band Technology", which is incorporated in its entirety for all purposes as if fully set forth herein. In one embodiment, a WirelessHD standard based wireless communication is employed, which is based on the 7 GHz of continuous bandwidth around the 60 GHz radio frequency and allows for uncompressed, digital transmission.

The digital camera (or the field unit including an image sensor) may be connected via a conductive coupling (e.g., cable) to the router or to other field units. A tethered portable electronic camera connectable to a computer is disclosed in U.S. Pat. No. 5,402,170 to Parulski et al. entitled: "Hand-Manipulated Electronic Camera Tethered to a Personal Computer". A digital electronic camera which can accept various types of input/output cards or memory cards is disclosed in U.S.

U.S. Pat. No. 7,432,952 to Fukuoka entitled: "Digital Image Capturing Device having an Interface for Receiving a Control Program", and the use of a disk drive assembly for transferring images out of an electronic camera is disclosed in U.S. Pat. No. 5,138,459 to Roberts et al., entitled: "Electronic Still Video Camera with Direct Personal Computer (PC) Compatible Digital Format Output", which are both incorporated in their entirety for all purposes as if fully set forth herein.

The connection of an image sensor unit (either a digital camera or a field unit) may be based on a standard video connection. In this case, the modem 64 and the associated connector are adapted to output this standard video signal. Such analog interfaces can be composite video such as NTSC, PAL or SECAM formats. Similarly, analog RGB, VGA (Video Graphics Array), SVGA (Super Video Graphics Array), SCART, S-video and other standard analog interfaces can be used. In case of a cable connection, the connector may be implemented as suitable standard analog video connector.

For example, F-Type, BNC (Bayonet Neill-Concelman), RCA, and similar RF/coax connectors can be used. In one non-limiting example, the modem 64 and the related connector 65b are adapted to support the digital video interface. In one example, an IEEE 1394 interface, also known as FireWire™, is used. Other digital interfaces that may be used are USB, SDI (Serial Digital Interface), FireWire, HDMI (High-Definition Multimedia Interface), DVI (Digital Visual Interface), UDI (Unified Display Interface), DisplayPort, Digital Component Video and DVB (Digital Video Broadcast).

Figure 18:
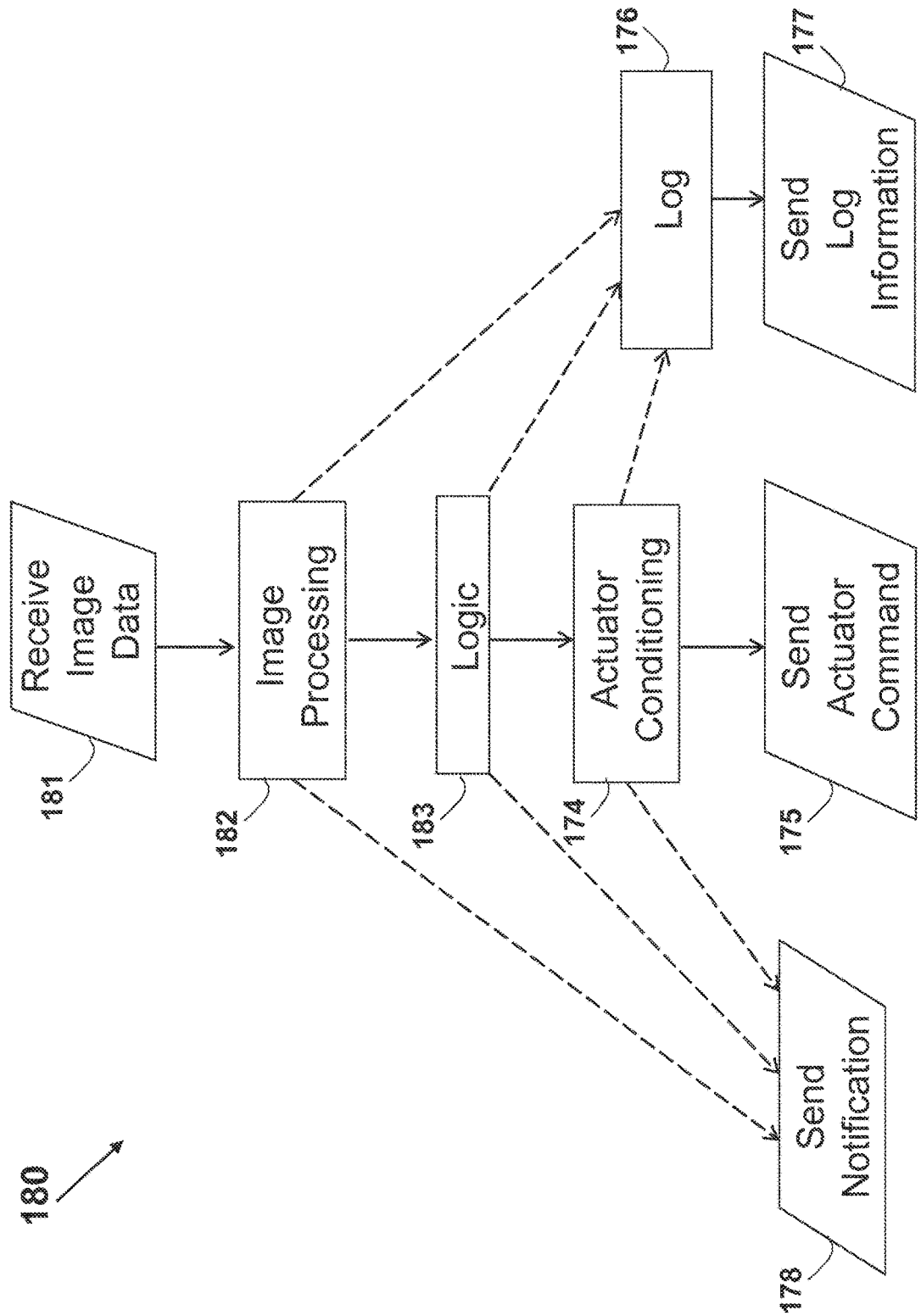
FIG. 18 illustrates a schematic flow-chart diagram of a controller involving image processing.

In the case of image capturing application, the controller functionality 147 may consist of, or include part or whole, of the flow chart 180 shown in FIG. 18. At step 'Receive Image Data' 181, image data sent from one or more image sensors (which are part of one or more field units) is received at the controller location. The image sensor information is checked, processed, conditioned, or otherwise manipulated in step 'Image Processing' 182 The image processing in this step may include frequency related manipulation such as filtering, spectrum analysis or noise removal, smoothing or de-blurring in case of image enhancement, a compressor (or de-compressor) or a coder (or decoder) in case of compression or coding/decoding, a modulator or a demodulator in case or modulation, and an extractor for extracting or detecting a feature or parameter such as pattern recognition or correlation analysis. In one non-limiting example, a decompression is performed in order to restore the original pre-compressed image, before the video compression such as in the video compressor 505 in the field unit 50f shown in FIG. 5f.

Other image processing functions may include adjusting color balance, gamma and luminance, filtering pattern noise, filtering noise using Wiener filter, changing zoom factors, recropping, applying enhancement filters, applying smoothing filters, applying subject-dependent filters, and applying coordinate transformations. Other enhancements in the image data may include applying mathematical algorithms to generate greater pixel density or adjusting color balance, contrast and/or luminance.

The 'Image Processing' step 182 may further include a face detection (also known as face localization), which includes an algorithm for identifying a group of pixels within a digitally-acquired image that relates to the existence, locations and sizes of human faces. Common face-detection algorithms focused on the detection of frontal human faces, and other algorithms attempt to solve the more general and difficult problem of multi-view face detection. That is, the detection of faces that are either rotated along the axis from the face of the observer (in-plane rotation), or rotated along the vertical or left-right axis (out-of-plane rotation), or both. Various face-detection techniques and devices (e.g., cameras) having face detection features are disclosed in U.S. Pat. No. 5,870,138 to Smith et al., entitled: "Facial Image Processing", in U.S. Pat. No. 5,987,154 to Gibbon et al., entitled: "Method and M eans for Detecting People in Image Sequences", in U.S. Pat. No. 6,128,397 to Baluja et al., entitled: "Method for Finding All Frontal Faces in Arbitrarily Complex Visual Scenes", in U.S. Pat. No. 6,188,777 to Darrell et al., entitled: "M ethod and Apparatus for Personnel Detection and Tracking ", in U.S. Pat. No. 6,282,317 to Luo et al., entitled: "Method for Automatic Determination of Main Subjects in Photographic Images", in U.S. Pat. No. 6,301,370 to Steffens et al., entitled: "Face Recognition from Video Images", in U.S. Pat. No. 6,332,033 to Qian entitled: "System for Detecting Skin-Tone Regions within an Image", in U.S. Pat. No. 6,404,900 to Qian et al., entitled: "Method for Robust Human Face Tracking in Presence of Multiple Persons", in U.S.

U.S. Pat. No. 6,407,777 to DeLuca entitled: "Red-Eye Filter Method and Apparatus", in U.S. Pat. No. 7,508,961 to Chen et al., entitled: "Method and System for Face Detection in Digital Images", in U.S. Pat. No. 7,317,815 to Steinberg et al., entitled: "Digital Image Processing Composition Using Face Detection Information", in U.S. Pat. No. 7,315,630 to Steinberg et al., entitled: "Perfecting a Digital Image Rendering Parameters within Rendering Devices using Face Detection", in U.S. Pat. No. 7,110,575 to Chen et al., entitled: "Method for Locating Faces in Digital Color Images", in U.S. Pat. No. 6,526,161 to Y an entitled: "System and Method for Biometrics-Based Facial Feature Extraction", in U.S. Pat. No. 6,516,154 to Parulski et al., entitled: "Image Revising Camera and Method", in U.S. Pat. No. 6,504,942 to Hong et al., entitled: "Method and Apparatus for Detecting a Face-Like Region and Observer Tracking Display", in U.S. Pat. No. 6,501,857 to Gotsman et al., entitled:

"Method and System for Detecting and Classifying Objects in an Image", and in U.S. Pat. No. 6,473,199 to Gilman et al., entitled: "Correcting Exposure and Tone Scale of Digital Images Captured by an Image Capture Device", which are all incorporated in their entirety for all purposes as if fully set forth herein. Another camera with human face detection means is disclosed in U.S. Pat. No. 6,940,545 to Ray et al., entitled: "Face Detecting Camera and Method", which is incorporated in its entirety for all purposes as if fully set forth herein. The image processing may use algorithms and techniques described in the book entitled: "The Image Processing Handbook", Sixth Edition, by John C. Russ, from CRC Press ISBN: 978-1-4398-4063-4, as well as algorithms and techniques described in U.S. patents RE 33,682, RE 31,370, 4,047,187, 4,317,991, 4,367,027, 4,638,364, 5,291,234, 5,386,103, 5,488,429, 5,638,136, 5,642,431, 5,710,833, 5,724,456, 5,781,650, 5,812,193, 5,818,975, 5,835,616, 5,870,138, 5,978,519, 5,991,456, 6,097,470, 6,101,271, 6,148,092, 6,151,073, 6,192,149, 6,249,315, 6,263,113, 6,268,939, 6,393,148, 6,421,468, 6,438,264, 6,456,732, 6,459,436, 6,504,951, 7,466,866 and 7,508,961, which are all incorporated in their entirety for all purposes as if fully set forth herein.

The 'Image Processing' step 182 may further include an algorithm for motion detection by comparing the current image with a reference image and counting the number of different pixels, where the image sensor or the digital camera are assumed to be in a fixed location and thus assumed to capture the same image. Since images will naturally differ due to factors such as varying lighting, camera flicker, and CCD dark currents, pre-processing is useful to reduce the number of false positive alarms. More complex algorithms are necessary to detect motion when the camera itself is moving, or when the motion of a specific object must be detected in a field containing other movement which can be ignored.

The image processing may further include video enhancement such as video denoising, image stabilization, unsharp masking, and super-resolution. Further, the image processing may include a Video Content Analysis (VCA), where the video content is analyzed to detect and determine temporal events based on multiple images, and is commonly used for entertainment, healthcare, retail, automotive, transport, home automation, safety and security. VCA functionalities include Video Motion Detection (VMD), video tracking, and egomotion estimation, as well as identification, behavior analysis and other forms of situation awareness. A dynamic masking functionality involves the blocking a part of the video signal based on the signal itself, for example because of privacy concerns. An egomotion estimation functionality involves the determining of the location of a camera or estimating the camera motion relative to a rigid scene, by analyzing its output signal. Motion detection is used to determine the presence of a relevant motion in the observed scene, while object detection is used to determine the presence of a type of object or entity, for example a person or car, as well as fire and smoke detection. Similarly, Face recognition and Automatic Number Plate Recognition may be used to recognize, and therefore possibly identify persons or cars. Tamper detection is used to determine whether the camera or the output signal is tampered with, and video tracking is used to determine the location of persons or objects in the video signal, possibly with regard to an external reference grid. A pattern is defined as any form in an image having discernible characteristics that provide a distinctive identity when contrasted with other forms. Pattern recognition may also be used, for ascertaining differences, as well as similarities, between patterns under observation and partitioning the patterns into appropriate categories based on these perceived differences and similarities; and may include any procedure for correctly identifying a discrete pattern, such as an alphanumeric character, as a member of a predefined pattern category. Further, the video or image processing may use, or be based on, the algorithms and techniques disclosed in the book entitled: "Handbook of Image & Video Processing", edited by Al Bovik, by Academic Press ISBN: 0-12-119790-5, which is incorporated in its entirety for all purposes as if fully set forth herein.

In one example, the image processing may be used for non-verbal human control of the system, such as by hand posture or gesture recognition, typically involving movement of the hands, face, or other parts of the human body. The recognized hand posture or gesture is used as input by the control logic in the controller, and thus enables humans to interface with the machine (HM I) and interact naturally without any mechanical devices, and thus to impact the system operation and the actuators commands and operation. The image-based recognition may use a single camera, or may be based on a 3D representation, captured by 3-D stereo cameras that is using two cameras whose relations to one another are known, or alternatively by a depth-aware camera. The gesture recognition may be based on 3-D information of key elements of the body parts in order to obtain several important parameters, like palm position or joint angles, or alternatively (or in addition) may be appearance-based, where images or videos are used for direct interpretation.

The 3D model approach can use volumetric or skeletal models, or a combination of the two. Skeletal-based algorithms are based on using a simplified version of joint angle parameters along with segment lengths, known as a skeletal representation of the body, where a virtual skeleton of the person is computed and parts of the body are mapped to certain segments. The analysis is using the position and orientation of these segments and the relation between each one of them (for example the angle between the joints and the relative position or orientation). Appearance-based models derive the parameters directly from the images or videos using a template database. Some are based on the deformable 2D templates of the human parts of the body, particularly hands. Deformable templates are sets of points on the outline of an object, used as interpolation nodes for the object's outline approximation. The interpolation function may be linear, which performs an average shape from point sets, point variability parameters and external deformators. These template-based models are mostly used for hand-tracking, but could also be of use for simple gesture classification. A second approach in gesture detecting using appearance-based models uses image sequences as gesture templates. Parameters for this method are either the images themselves, or certain features derived from these, using only one (monoscopic) or two (stereoscopic) views. The technology, algorithm or techniques used for hand posture or gesture recognition may be based on the Brown University publication CS-99-11 entitled: "A survey of hand Posture and Gesture Recognition Techniques and Technology", by Joseph J. LaViola Jr., U.S. Pat. No. 5,047,952 to Kramer et al., entitled: "Communication System for Deaf, Deaf-Blind, or non-Vocal Individuals Using Instrumented Glove", U.S. Pat. No. 4,414,537 to Grimes, entitled: "Digital data Entry Glove Interface Device", U.S. Pat. No. 7,702,130 to Sung-Ho Im et al., entitled: "User interface apparatus using hand gesture recognition and method thereof", U.S. Pat. No. 7,598,942 to Underkoffler et al., entitled: "System and Method for Gesture Based Control System", U.S. Patent Application Publication No. 2011/0222726 to Ruan, entitled: "Gesture Recognition Apparatus, Method for Controlling Gesture Recognition Apparatus, and Control Program", ", U.S. Patent Application Publication No. 2010/0211918 to Liang et al., entitled: "Web Cam Based User Interaction", U.S. Patent Application Publication No. 2007/0132725 to Kituara, entitled: "Electronic Appliance", U.S.

Patent Application Publication No. 2012/0268373 to Grzesiak, entitled: "Method for Recognizing User's Gesture in Electronic Device", U.S. Pat. No. 5,652,849 to Conway et al., entitled: "Apparatus and Method for Remote Control Using a Visual Information Stream", U.S. Pat. No. 7,289,645 to Yamamoto et al., entitled: "Hand Pattern Switch Device", U.S. Pat. No. 7,821,541 to Delean, entitled: "Remote Control Apparatus Using Gesture Recognition", U.S. Pat. No. 5,454,043 to Freeman, entitled: "Dynamic and Static Hand Gesture Recognition Through Low-Level Image Analysis", or U.S. Pat. No. 5,046,022 to Conway et al., entitled: "Tele-Autonomous System and Method Employing Time/Position Synchrony/Desynchrony", which are all incorporated in their entirety for all purposes as if fully set forth herein.

In one non-limiting example, the control may be based on extracting the location of an identified element in the captured image. The element may be a human body part such as face, hand, and body contour. Example of a control systems which are based on the location of a human being by analyzing the human face location are described in U.S. Pat. No. 6,931,596 to Gutta et al., entitled: "Automatic Positioning of Display Depending upon the Viewer's Location" and in U.S. Patent Application Publication No. 2010/0295782 to Binder, entitled: "System and Method for Control Based on Face or Hand Gesture Detection", both incorporated in their entirety for all purposes as if fully set forth herein. Further, the control may be based on the number of identified elements in a captured image. For example, the number of human beings in a location may be determined by using image processing, such as face detection algorithms.

Any image processing functionality may be performed only as part of the 'Image Processing' step 182 executed as part of the controller functionality 147. Alternatively, an image processing functionality may be performed only as part of the Image Processor 504 in the field unit 50f shown in FIG. 5f. Further, an image processing functionality may be split between the field unit 50f and the 'Image Processing' step 182 of the controller 147. In another non-limiting example, some image processing functionality may be split between the field unit 50f and the controller 147, where some functionalities will be executed (in whole or in part) in the field unit 50f, while other functionalities will be executed (in whole or in part) as part of the flow chart 180 as part of the controller 147.

The information extracted from the received image serves as input to the step 'Logic' 183, determining the output based on the sensors input according to a pre-determined logic function or algorithm. The 'Logic' step 183 may be identical, similar or different from the corresponding 'Logic' step 173 of the flowchart 170 The control logic executed in step 'Logic' 183 outputs various actuators commands, which are conditioned in the 'Actuator Conditioning' step 174, for proper operation of the specific actuators. The conditioning may include attenuation, delay, filtering, amplifying, time integration, derivation, and any other data manipulations as described above regarding the 'Sensor Conditioning' step 172 The conditioned control commands are sent to the relevant actuators in the applicable field units in the step 'Send Actuator Command' 175 While the flowchart 180 is exampled including both receiving data from sensors and activating actuators, a controller 143 may only receive data from various image sensors in the field units (e.g., for logging purposes) while not activating any actuators, or only transmit commands to various actuators in the field units (e.g., according to time) regardless of any sensing information, or any combination thereof. Further, a controller 143 may use various control logic patterns at different times, where at one time the controller only receives data from the image sensors, at another time the controller only transmit commands to the actuators, and yet at another time the controller does both functions. In one non-limiting example, the actuators are Pan, Tilt, and Zoom (PTZ) electric motors of the digital camera, and the commands are used to position the image sensor and the focus in order to obtain an image of a specific location or target.

In one non-limiting example, the information extracted from the captured image as part of the 'Image Processing' step 182 detect an event that may impact the system operation. For example, in the case of an image processing that includes a face detection function, the first detection of a face is an event that may trigger one or more actuators into action (or to stop an activity) by the control logic. Similarly, the lack of detection of a human face may cause activation or deactivation of one or more actuators in the systems. Similarly, detection of a motion by the image processing may trigger actuators for an action, or may deactivate actuators, according to a pre-defined logic.

While flowchart 180 in FIG. 18 was described above where the sensors are image sensors only, additional sensors may be equally used in the control system. In such a case, the general flowchart 170 and the image-based flow chart 180 are integrated, and the combined 'Logic' step 173 uses both the non-related image sensor data (after conditioning in 'Sensor Conditioning' step 172) and the image extracted data (after the 'Image Processing' step 182), to determine the output and the commands to be sent to the actuators.

In one non-limiting example, one (or more) of the sensors in one or more of the field units may be, or may include, a sound or voice sensor, such as a microphone. In such a case, information in the captured voice may be extracted and used as part of the control loop. In one non-limiting example, the field unit may include, be part of, or be integrated with, a telephone.

Figure 19:
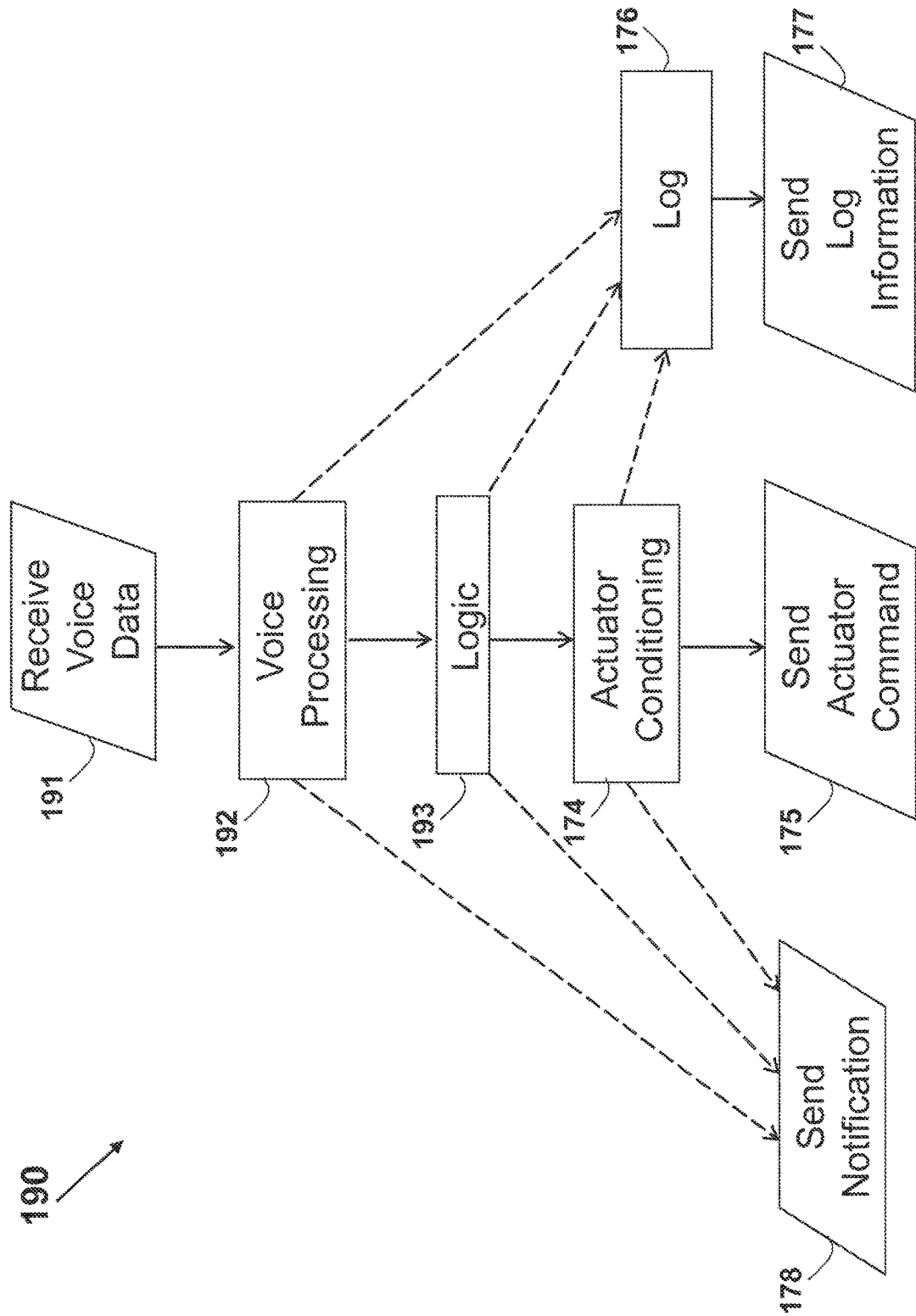
FIG. 19 illustrates a schematic flow-chart diagram of a controller involving voice processing.

In the case of voice capturing application, the controller functionality 147 may consist of, or include part or whole, of the flow chart 190 shown in FIG. 19. At step 'Receive Voice Data' 191, voice data sent from one or more microphones (which are part of one or more field units) is received at the controller location. The voice data is checked, processed, conditioned, or otherwise manipulated in step 'Voice Processing' 192 The voice processing in this step may include frequency related manipulation such as filtering, spectrum analysis or noise removal, a compressor (or decompressor) or a coder (or decoder) in case of compression or coding/decoding, a modulator or a demodulator in case or modulation, and an extractor for extracting or detecting a feature or parameter such as pattern recognition or correlation analysis. In one non-limiting example, a decompression is performed in order to restore the original pre-compressed voice, before the voice compression executed in the field unit. The 'Voice Processing' step 192 may further include a voice recognition, which includes an algorithm for identifying the voice of a specific person.

Any voice processing functionality may be performed only as part of the 'Voice Processing' step 192 executed as part of the controller functionality 147. Alternatively or in addition, a voice processing functionality may be performed as part of the field unit. Further, an image processing functionality may be split between the field unit and the 'Voice Processing' step 192 of the controller 147. In another example, some voice processing functionality may be split between the field unit and the controller 147, where some functionalities will be executed (in whole or in part) in the field unit, while other functionalities will be executed (in whole or in part) as part of the flow chart 190 as part of the controller 147.

The information extracted from the received voice serves as input to the step 'Logic' 193, determining the output based on the sensors input according to a pre-determined logic function or algorithm. The 'Logic' step 193 may be identical, similar or different from the corresponding 'Logic' step 173 of the flowchart 170 The control logic executed in step 'Logic' 193 outputs various actuators commands, which are conditioned in the 'Actuator Conditioning' step 174, for proper operation of the specific actuators. The conditioning may include attenuation, delay, filtering, amplifying, time integration, derivation, and any other data manipulations as described above regarding the 'Sensor Conditioning' step 172 The conditioned control commands are sent to the relevant actuators in the applicable field units in the step 'Send Actuator Command' 175 While the flow chart 190 is exampled including both receiving data from sensors and activating actuators, a controller 143 may only receive data from various voice or sound sensors in the field units (e.g., for logging purposes) while not activating any actuators, or only transmit commands to various actuators in the field units (e.g., according to time) regardless of any sensing information, or any combination thereof. Further, a controller 143 may use various control logic patterns at different times, where at one time the controller only receives data from the voice sensors, at another time the controller only transmit commands to the actuators, and yet at another time the controller does both functions.

In one non-limiting example, the information extracted from the captured voice as part of the 'Voice Processing' step 192 detect an event that may impact the system operation. For example, in the case of a voice processing that includes a voice recognition function, the detection of a specific human voice is an event that may trigger one or more actuators into action (or to stop an activity) by the control logic. Similarly, the lack of detection of a human voice may cause activation or deactivation of one or more actuators in the systems.

While flowchart 190 in FIG. 19 was described above where the sensors are only voice sensors, additional sensors may be equally used in the control system. In such a case, the general flowchart 170 and the voice-based flow chart 190 are integrated, and the combined 'Logic' step 173 uses both the non-related voice sensor data (after conditioning in 'Sensor Conditioning' step 172) and the voice extracted data (after the 'Voice Processing' step 192), to determine the output and the commands to be sent to the actuators.

A field unit (such as field unit 23 in FIG. 2, sensor unit 50. 50*e* in FIGS. 5-5*e*, or actuator unit 60 60*g* in FIGS. 6-6*f*), may be integrated, in part or in whole, in a router such as router 143 (corresponding for example to router 12 in FIG. 2, router 40 in FIG. 4, gateway 11 in FIG. 1, or router 40*a* in FIGS. 4*a*-4*d*). Alternatively or in addition, a router such as router 143 (corresponding for example to router 12 in FIG. 2, router 40 in FIG. 4, gateway 11 in FIG. 1, or router 40*a* in FIGS. 4*a*-4*d*) may be integrated, in part or in whole, in an appliance such as a home appliance. Further, a field unit (such as field unit 23 in FIG. 2, sensor unit 50. 50*e* in FIGS. 5-5*e*, or actuator unit 60. 60*g* in FIGS. 6-6*f*), may be integrated, in part or in whole, in an appliance such as a home appliance. In such a case, the sensors or the actuators (or both) of the appliance, may serve as the sensors or actuators of the field unit, and handled as described herein. Home appliances are electrical and mechanical devices using technology for household use, such as food handling, cleaning, clothes handling, or environmental control. Appliances are commonly used in household, institutional, commercial or industrial setting, for accomplishing routine housekeeping tasks, and are typically electrically powered. The appliance may be a major appliance, also known as "White Goods", which is commonly large, difficult to move, and generally to some extent fixed in place (usually on the floor or mounted on a wall or ceiling), and is electrically powered from the AC power (mains) grid. Non-limiting examples of major appliances are washing machines, clothes dryers, dehumidifiers, conventional ovens, stoves, refrigerators, freezers, air-conditioners, trash compactors, furnaces, dishwasher, water heaters, microwave ovens and induction cookers. The appliance may be a small appliance, also known as "Brown Goods", which is commonly a small home appliance that is portable or semi-portable, and is typically a tabletop or a coutertop type. Examples of small appliances are television sets, CD and DVD players, HiFi and home cinema systems, telephone sets and answering machines, and beverage making devices such as coffee-makers and iced-tea makers.

Figure 12A:
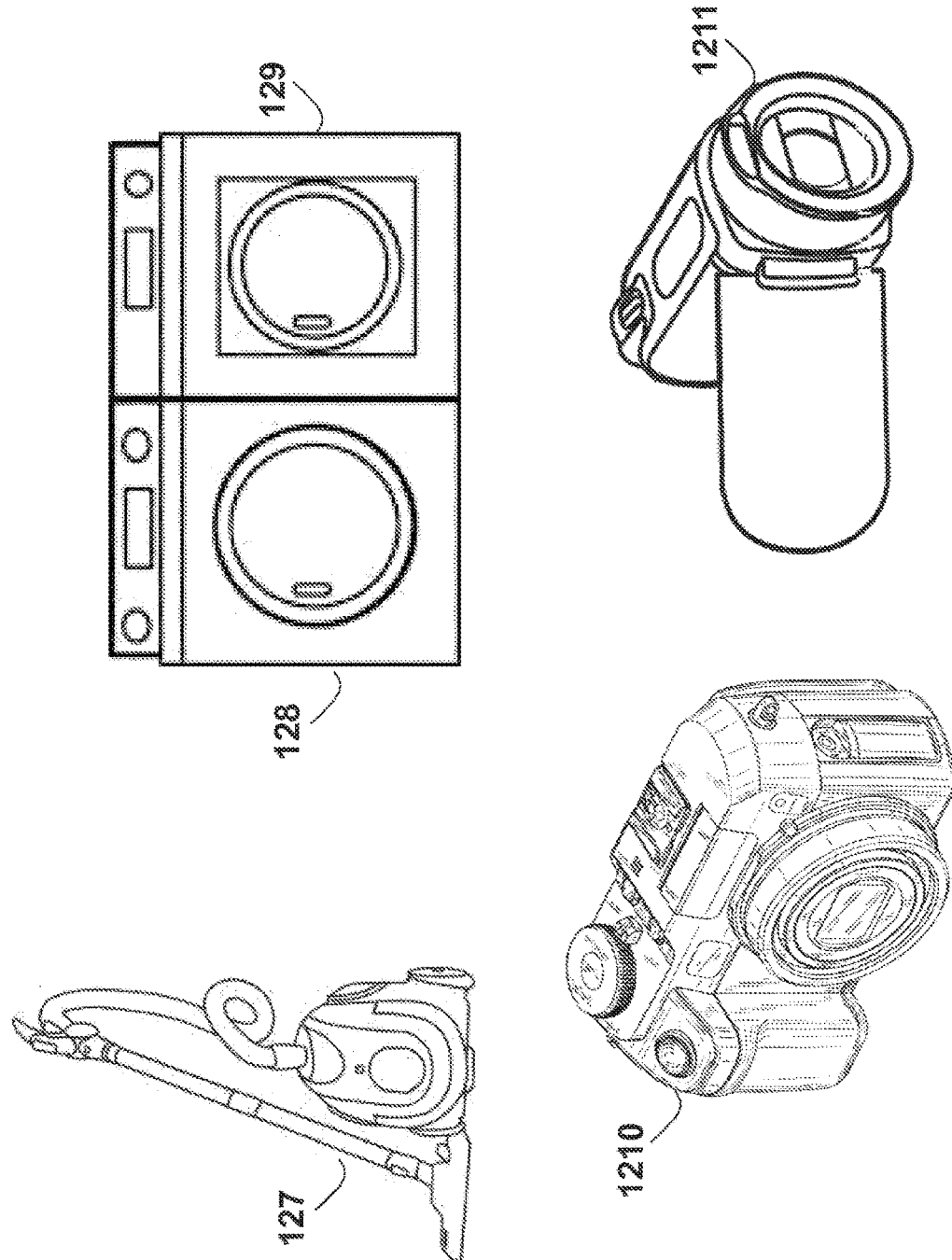
FIG. 12a depicts schematically a few cleaning-related home appliances and digital cameras.

Some appliances main function is food storage, commonly refrigeration related appliances such as refrigerators and freezers. Other appliances main function is food preparation, such as conventional ovens (stoves) or microwave ovens, electric mixers, food processors, and electric food blenders, as well as beverage makers such as coffee-makers and iced-tea makers. Few food related appliances, commonly found in a home kitchen, are illustrated in FIG. 12, showing a dishwasher 121, a food processor 122, a refrigerator 123, an oven 124, a mixer 125, and a microwave oven 126 Some appliances main function relates to cleaning, such as clothes cleaning. Clothes cleaning appliances examples are washing/laundry machines and clothes dryers. A vacuum cleaner is an appliance used to suck up dust and dirt, usually from floors and other surfaces. Few cleaning-related appliances are illustrated in FIG. 12*a*, showing a vacuum cleaner 127, a cloth dryer 128 and a washing machine 129, as well as a still digital camera 1210 and a digital video camera 1211 Some appliances main function relates to temperature control, such as heating and cooling. Air conditioners and heaters, as well as HVAC (Heating, Ventilation and Air Conditioning) systems, are commonly used for climate control, usually for thermal comfort for occupants of buildings or other enclosures. Similarly, water heaters are used for heating water.

The system may be used for lighting control, moisture control, freeze control, pet feeding, propane gauge, interior and exterior cameras, security, smoke alarms, or health monitoring. In one non-limiting example, a field unit may be integrated with a smoke detector assembly, which is typically housed in a disk-shaped plastic enclosure, which may be about 150 millimeters (6 inch) in diameter and 25 millimeters (1 inch) thick, and is commonly mounted on a ceiling or on a wall.

The system may be used for building automation, or may be part of, integrated with, or coupled to a building automation system, such as the building automation system described in U.S. Pat. No. 6,967,565 to Lingemann entitled: "Building Automation System", which is incorporated in its entirety for all purposes as if fully set forth herein. A field unit, a sensor, or an actuator in the system may be part of, integrated with, coupled to, or used to control indoor or outdoor lighting, fans, sprinklers, pool/spa heaters and pumps, electronic drapes, windoware units, fireplaces, garage doors openers, electronic door locks, hot water heaters, fire detection and monitoring equipment, electronic gates, digital security cameras, motion sensors, flood monitors, humidifiers, home theater units, phone PBX, voice mail, intercom, door phone, aquarium sensors and heaters, sidewalk and driveway heaters, sprinklers, dampers, doorbells, lighting fixtures and fans. The system may further support, be part of, or be integrated with, a Building Automation System (BAS) standard, and may further be in part or in full in accordance with Cisco Validated Design document entitled: Building Automation System over IP (BAS/IP) Design and Implementation Guide" by Cisco Systems and Johnson Controls, which is incorporated in its entirety for all purposes as if fully set forth herein.

The system may be used for Remote Patient Monitoring (RPM), enabling monitoring of patients outside of conventional clinical settings (e.g., in their home), which may increase access to care and decrease healthcare delivery costs. The monitoring and trend analysis of physiological parameters, enable early detection of deterioration; thereby, reducing number of emergency department visits, hospitalizations, and duration of hospital stays. Physiological data such as blood pressure and subjective patient data are collected by sensors on peripheral devices such as blood pressure cuff, pulse oximeter, and glucometer. The data is transmitted to healthcare providers or third parties via various networks, and may be evaluated for potential problems by a healthcare professional or via a clinical decision support algorithm, and patient, caregivers, and health providers are immediately alerted if a problem is detected. As a result, timely intervention ensures positive patient outcomes. Other applications may provide education, test, and medication reminder alert, and may include Telesurgery (remote surgery), enabling medical doctors to perform surgery on a patient being physically at another location, Teleaudiology for providing audiological services, Teledentistry for remote dental care, consultation, education, or awareness, Teledermatology for exchanging information concerning skin conditions or tumors of the skin, Telepathology fort practicing pathology at a distance, Teleradiology for imaging and sending radiographic images, and Telecardiology where ECGs are transmitted for remote evaluation.

The term "outlet" herein denotes an electro-mechanical device, which facilitates easy, rapid connection and disconnection of external devices to and from wiring installed within a building. An outlet commonly has a fixed connection to the wiring, and permits the easy connection of external devices as desired, commonly by means of an integrated standard connector in a faceplate. The outlet is normally mechanically attached to, or mounted in, a wall or similar surface. Non-limiting examples of common outlets include: telephone outlets for connecting telephones and related devices; CATV outlets for connecting television sets, VCR's, and the like; outlets used as part of LAN wiring (i.e. "structured wiring") and electrical outlets for connecting power to electrical appliances. The term "wall" herein denotes any interior or exterior surface of a building, including, but not limited to, ceilings and floors, in addition to vertical walls. The term "building" herein includes any site, location, premises, or structure with a roof and walls, such as a house, school, store, or factory, including, without limitation, residential house, apartments, trailers, motor homes, offices, and businesses.

Outlets in general (to include LAN structured wiring, electrical power outlets, telephone outlets, and cable television outlets) are typically passive devices being part of the wiring system house infrastructure and solely serving the purpose of providing access to the in-wall wiring. However, there is a trend toward embedding active circuitry in the outlet in order to use them as part of the home/office network, and typically to provide a standard data communication interface. In most cases, the circuits added serve the purpose of adding data interface connectivity to the outlet, added to its basic passive connectivity function.

An outlet supporting both telephony and data interfaces for use with telephone wiring is disclosed in U.S. Pat. No. 6,549,616 to Binder entitled 'Telephone outlet for implementing a local area network over telephone lines and a local area network using such outlets', and in U.S. Pat. No. 6,216,160 to Dichter entitled 'Automatically configurable computer network', which are all incorporated in their entirety for all purposes as if fully set forth herein. A non-limiting example of home networking over CATV coaxial cables using outlets is described in U.S. Patent Application Publication No. 2002/0194383 to Cohen et al. entitled: 'Cableran Networking over Coaxial Cables', which is incorporated in its entirety for all purposes as if fully set forth herein. Such outlets are available as part of HomeRAN™ system from TMT Ltd. of Jerusalem, Israel. Outlets for use in conjunction with wiring carrying telephony, data and entertainment signals are disclosed in U.S. Patent Application Publication No. 2003/0099228 to Alcock entitled 'Local area and multimedia network using radio frequency and coaxial cable', which is incorporated in its entirety for all purposes as if fully set forth herein. Outlets for use with combined data and power using powerlines are described in U.S. Patent Application Publication No. 2003/0062990 to Schaeffer et al. entitled 'Powerline bridge apparatus', which is incorporated in its entirety for all purposes as if fully set forth herein. Such power outlets are available as part of PlugLAN™ by Asoka USA Corporation of San Carlos, CA USA.

While the active outlets have been described above with regard to networks formed over wiring used for basic services (e.g., telephone, CATV and power), it will be appreciated that the principle can be equally applied to outlets used in networks using dedicated wiring. In such a case, the outlet circuitry is used to provide additional interfaces to an outlet, beyond the basic service of single data connectivity interface. As a non-limiting example, it may be used to provide multiple data interfaces wherein the wiring supports single such data connection. An example of such an outlet is the Network Jack™ product family manufactured by 3Com™ of Santa-Clara, California, U.S.A. In addition, such outlets are described in U.S. Pat. No. 6,108,331 to Thompson entitled 'Single Medium Wiring Scheme for Multiple Signal Distribution in Building and Access Port Therefor', in U.S. Patent Application No. 2003/0112965 to McNamara et al. entitled 'Active Wall Outlet', and in U.S. Patent Application Publication No. 2005/0010954 to Binder entitled: "Modular Outlet", which are all incorporated in their entirety for all purposes as if fully set forth herein.

One approach to adding functionality to existing outlets is by using a plug-in module. Such plug-in modules are described in U.S. Patent Application Publication No. 2002/0039388 to Smart et al. entitled 'High data-rate powerline network system and method', U.S. Patent Application Publication No. 2002/0060617 to Walbeck et al. entitled 'Modular power line network adapter', and also in U.S. Patent Application Publication No. 2003/0062990 to Schaeffer, J R et al. entitled 'Powerline bridge apparatus', which are all incorporated in their entirety for all purposes as if fully set forth herein. Such modules using HomePlug™ technology are available from multiple sources such as part of Plug-Link™ products by Asoka USA Corporation of San Carlos, California, U.S.A. (HomePlug is a trademark of HomePlug Powerline Alliance, Inc. of San Ramon, California, U.S.A.). Various types of snap-on devices are also described in U.S. Patent Application No. 2005/0180561, and in U.S. Patent Application Publication No. 2005/0180561 to Hazani, et al. entitled: "Outlet Add-On module", which are all incorporated in their entirety for all purposes as if fully set forth herein. A non-limiting example of a server-based automation system using outlets is described in U.S. Patent Application Publication No. 2005/0125083 to Kiko entitled: "Automation Apparatus and Methods", which is incorporated in its entirety for all purposes as if fully set forth herein.

In one non-limiting example, a sensor, an actuator, one or more field units, or the router are integrated with, or are part of, an outlet or a plug-in module. The outlet may be telephone, LAN (such as Structured Wiring based on Category 5, 6 or 7 wiring), AC power or CATV outlet. The field unit or the router may further communicate over the in-wall wiring connected to the outlet, such as telephone, AC power, LAN or CATV wiring. Further, the outlet associated sensor, actuator, one or more field units, or router may be powered from a power signal carried over the in-wall wiring, and may further communicate using the in-wall wiring as a network medium. For example, in the case of telephone wiring and telephone outlet, the powering may be carried over the telephone wire pair using the technique disclosed in U.S. Pat. No. 6,862,353 to Rabenko et al. entitled: "System and Method for Providing Power over a Home Phone Line Network", which teaches carrying AC power over telephone wiring carrying both telephony and data, by using a part of the spectrum not used by the other signals, or be based on U.S. Patent Application Publication No. 2004/0151305 to Binder, et al. entitled: "Method and System for Providing DC Power on Local Telephone Lines", which are all incorporated in their entirety for all purposes as if fully set forth herein.

The system may be used for assistive domotics applications of home automation, making it possible for the elderly and disabled to remain at home, rather than moving to a healthcare facility, such as embedded health systems and private health networks. Embedded health systems integrate sensors and computers/microprocessors in appliances, furniture, and clothing for collecting data that is analyzed and can be used to diagnose diseases and recognize risk patterns. Private health networks typically implement wireless technology to connect portable devices and store data in a household health database. The system may provide both the elderly and disabled with many different types of emergency assistance systems, security features, fall prevention, automated timers, and alerts. The system may further allow for the individual to feel secure in their homes knowing that help is only minutes away, as well as making it possible for family members to monitor their loved ones from anywhere via an internet or other connection. The system may track the individual person location within the home, and may detect water on the floor, as well as a camera that allows the person to view who is at the door and let them in using a cell phone. The system may include devices worn around the neck or wrist, and may be connected to a control center that is 24-hour activated, and may analyze medical symptoms, medication allergies, and dispatch emergency services. The system generates alarms and alerts automatically if significant changes are observed in the user's vital signs. The system may implement medication dispensing devices in order to ensure that necessary medications are taken at appropriate times, and may use automated pill dispensers can dispense only the pills that are to be taken at that time and are locked; such as the versions that are available for Alzheimer's patients that have a lock on them. For diabetic patients a talking glucose monitor allows the patient to check their blood sugar level and take the appropriate injection, digital thermometers are able to recognize a fever and alert physicians, and blood pressure and pulse monitors may dispense hypertensive medications when needed. Other applications and advantages are described in the article entitled:" Smart Homes for Older People: Positive Aging in a Digital World" published in Future Internet 2012, which is incorporated in its entirety for all purposes as if fully set forth herein.

The system may be used in biometrics (a.k.a. biometric authentication) applications, where humans are identified by the control logic by their characteristics or traits sensed by the sensors. Biometrics may be used for identification and access control, as well as to identify individuals in groups that are under surveillance. Biometric identifiers or traits are typically distinctive, measurable physiological or behavioral characteristics used to identify, label and describe individuals. Behavioral biometrics relates to the behavior of a person, such as typing rhythm, gait, and voice, and physiological biometric would identify using voice, DNA, hand print or behavior. Biometrics may be based on sensors measuring or sensing a brain (electroencephalogram) or a heart (electrocardiogram) signals.

Many different aspects of human physiology, chemistry or behavior can be used for biometric authentication. Preferably, any person using a system should possess the trait; however the trait should be unique and sufficiently different for individuals in the relevant population such that they can be distinguished from one another. The control logic may accommodate both permanent traits that are reasonably invariant over time with respect to the specific matching algorithm, as well as traits that vary over time. Preferably the sensors easily acquire or measure the trait with accuracy, speed, and robustness, and in a form that permits subsequent processing and extraction of the relevant feature sets by the control logic, with minimal possibility of system circumvention such as by trait imitating using an artifact or substitute.

The system may be used for person verification purposes, where the system performs a one-to-one comparison of a captured biometric with a specific template stored in a biometric database that may be stored in the control server (or in any other device in the system or external to the system such as in another server), in order to verify the individual is the person they claim to be. Reference models for all the users are generated and stored in the biometric database. Then some samples are matched with reference models to generate the genuine and impostor scores and calculate the threshold. In the testing step, a smart card, username or ID number (e.g., PIN) is used to indicate which template should be used for comparison.

The system may be used for identification purposes, where the system performs a one-to-many comparison against a biometric database in an attempt to establish the identity of an unknown individual. The system succeeds in identifying the individual 'positive recognition' if the comparison of the biometric sample to a template in the database falls within a previously set threshold. A 'negative recognition' of the person means that the system establishes that the person is who he (implicitly or explicitly) denies to be, achieved through biometrics since other methods of personal recognition such as passwords, PINs or keys may be ineffective.

The system may be a multi-biometric system that uses multiple sensors or biometrics to overcome the limitations of unimodal biometric systems. For instance iris recognition systems can be compromised by aging irides and finger scanning systems by worn-out or cut fingerprints. Multi-biometric may obtain sets of information from the same sensors or markers (i.e., multiple images of an iris, or scans of the same finger), or may be based on information from different biometrics such as requiring fingerprint scans, using voice recognition, and a spoken pass-code. Multi-biometric systems can integrate unimodal systems sequentially, simultaneously, a combination thereof, or in series, which refer to sequential, parallel, hierarchical and serial integration modes, respectively.

The information fusion may be broadly divided into three parts: pre-mapping fusion, midst-mapping fusion, and post-mapping fusion/late fusion. In pre-mapping fusion information can be combined at sensor level or feature level. Sensor-level fusion may be single sensor-multiple instances, intra-class multiple sensors, or inter-class multiple sensors. Feature-level fusion may be inter-class or intra-class type, the latter may be based on same sensor-same features, same sensor-different features, different sensors-same features, or different sensors-different features.

The system may be an adaptive biometric system capable of auto-updating the templates or models to the intra-class variation of the operational data, for solving the problem of limited training data and tracking the temporal variations of the input data through adaptation.

Soft biometrics traits are physical, behavioral, or adhered human characteristics, which have been derived from the way human beings commonly distinguish their peers (e.g., height, gender, hair color). Such traits include, but are not limited to, physical characteristics such as skin color, eye color, hair color, presence of beard, presence of mustache, height, and weight, behavioral characteristics such as gait and keystroke, and adhered human characteristics such as clothes color, tattoos, and accessories.

The system may be a security system, and may be according to, or based on, the system described in U.S. Pat. No. 5,510,765 to Madau, entitled: "Motor Vehicle Security Sensor System", in U.S. Pat. No. 6,934,426 to Rich et al., entitled: "Fiber Optic Security Sensor and System with Integrated Secure Data Transmission and Power Cables", in U.S. Pat. No. 7,843,336 to Kucharyson, entitled: "Self-Contained Wireless Security Sensor Collective System and Method", or in U.S. Patent Application Publication No. 2007/0164865 to Giasson et al., entitled: "Security Sensor System", which are all incorporated in their entirety for all purposes as if fully set forth herein.

The system may be an environmental control system, and may be according to, or based on, the system described in U.S. Pat. No. 8,115,646 to Tanielian et al., entitled: "Environmental Sensor System", in U.S. Patent Application Publication No. 2010/0100327 to Jensen, entitled: "Environmental Sensing and Communication", in U.S. Patent Application Publication No. 2007/0004449 to Sham, entitled: "Mobile Communication Device with Environmental Sensors", or in U.S. Pat. No. 6,452,499 to Runge et al., entitled: "Wireless Environmental Sensor System", which are all incorporated in their entirety for all purposes as if fully set forth herein.

Figure 20:
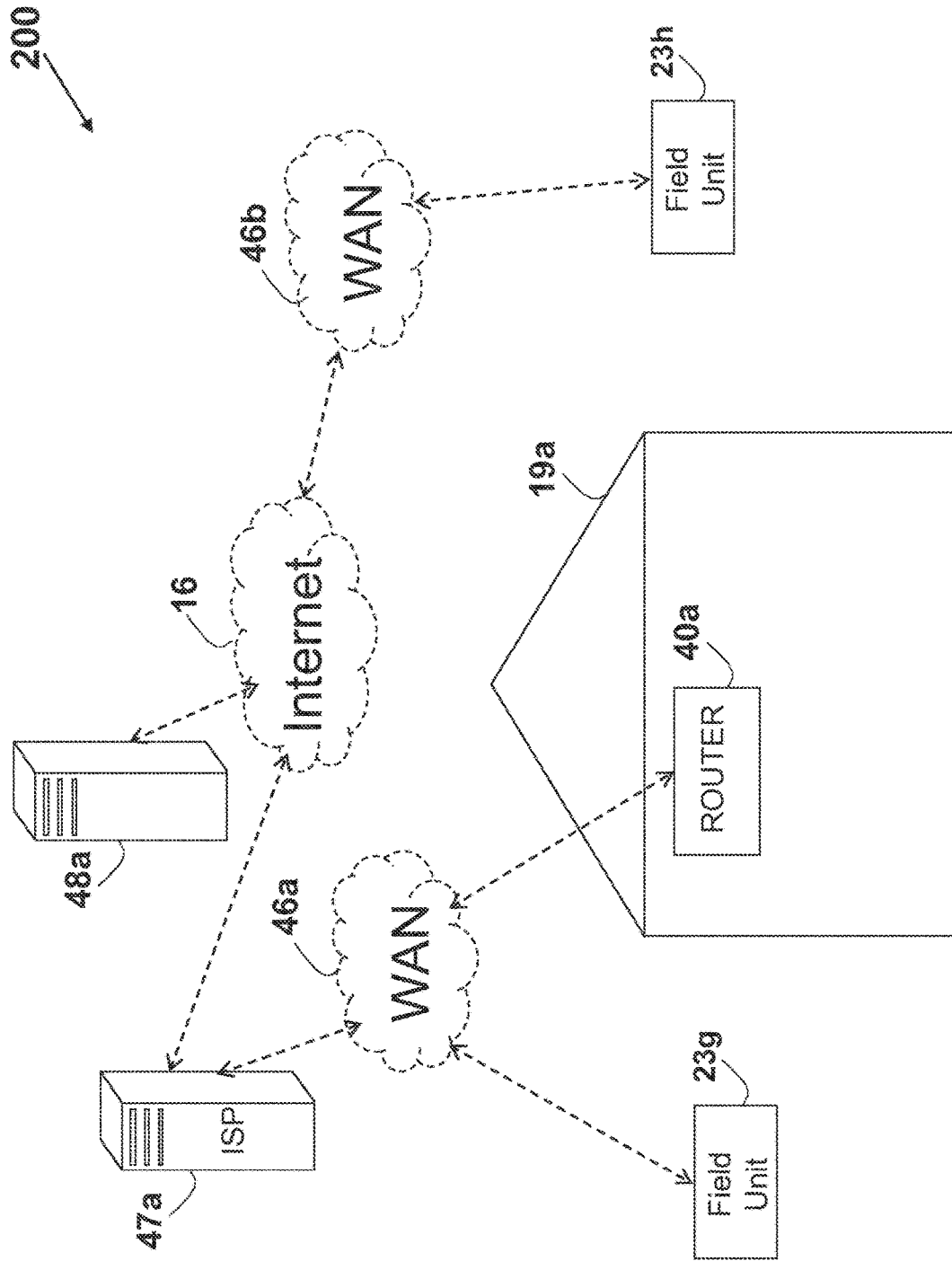
FIG. 20 illustrates a schematic electrical diagram of a system including field units external to a building.
Figure 20A:
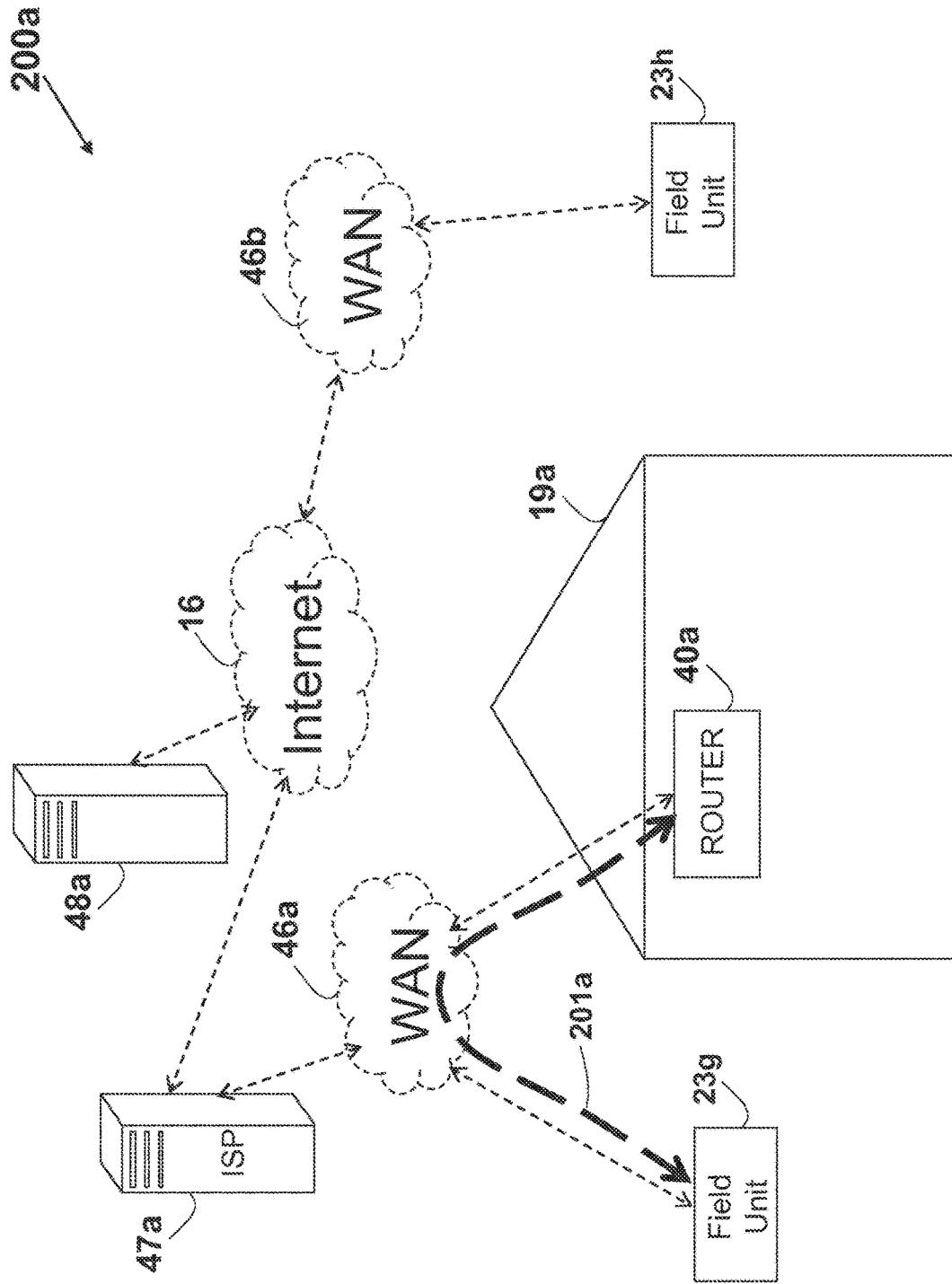
FIG. 20a illustrates a schematic electrical diagram of a data path between a field unit external to a building and a router in the building.
Figure 20B:
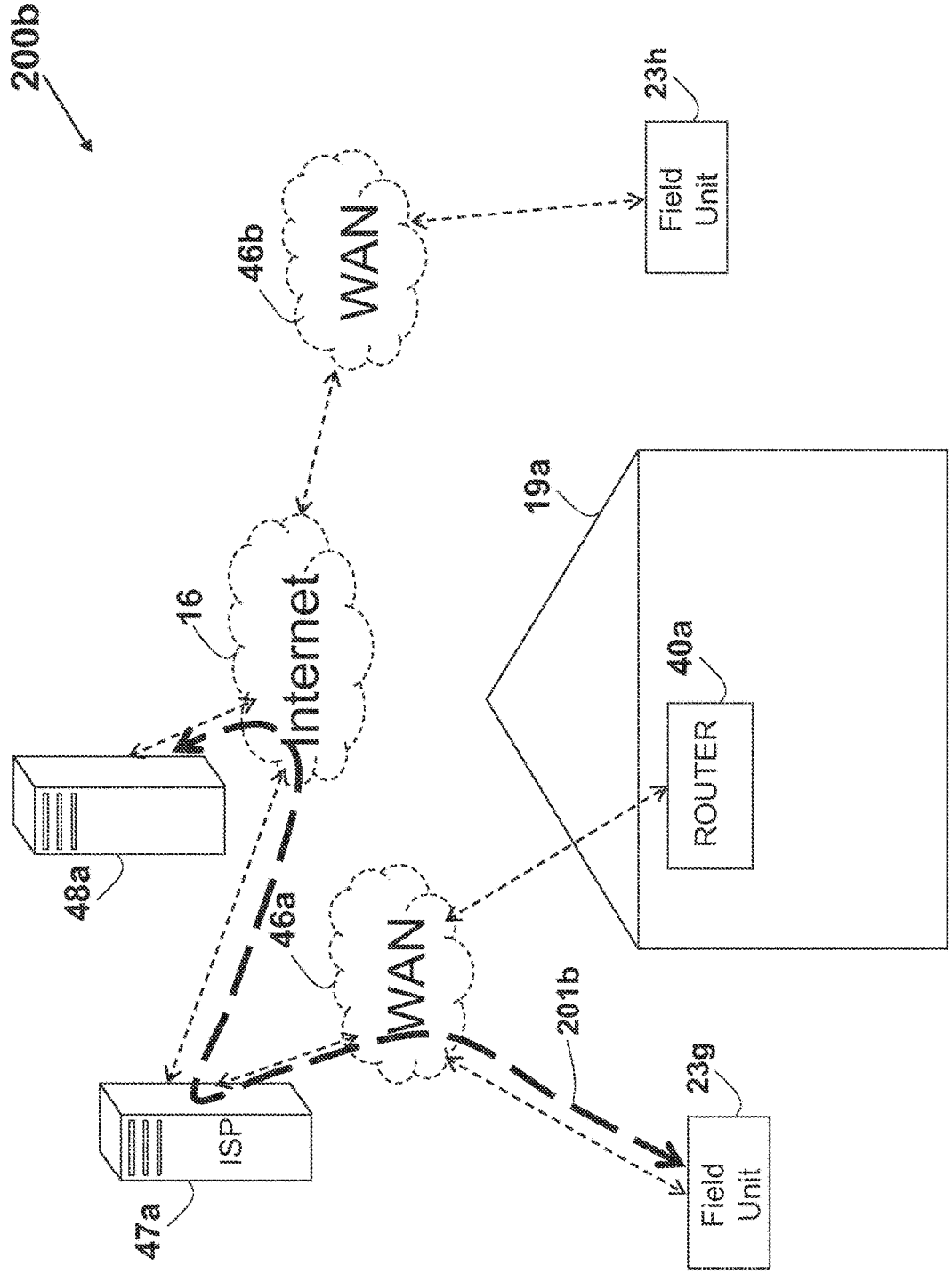
FIG. 20b illustrates a schematic electrical diagram of a data path between a field unit located external to a building and a control or gateway server.
Figure 20C:
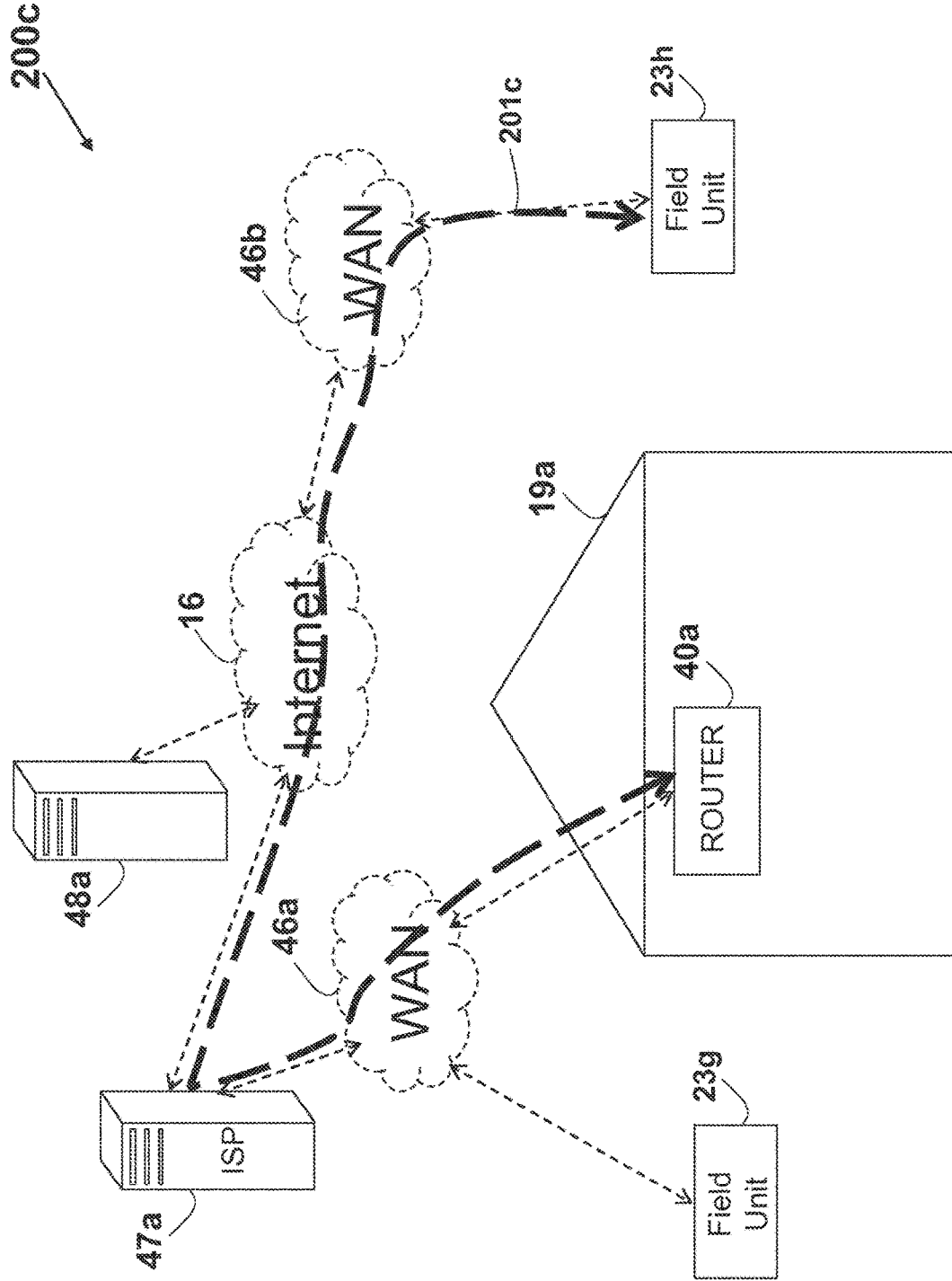
FIG. 20c illustrates a schematic electrical diagram of a data path over the Internet between a field unit external to a building and a router in the building.
Figure 20D:
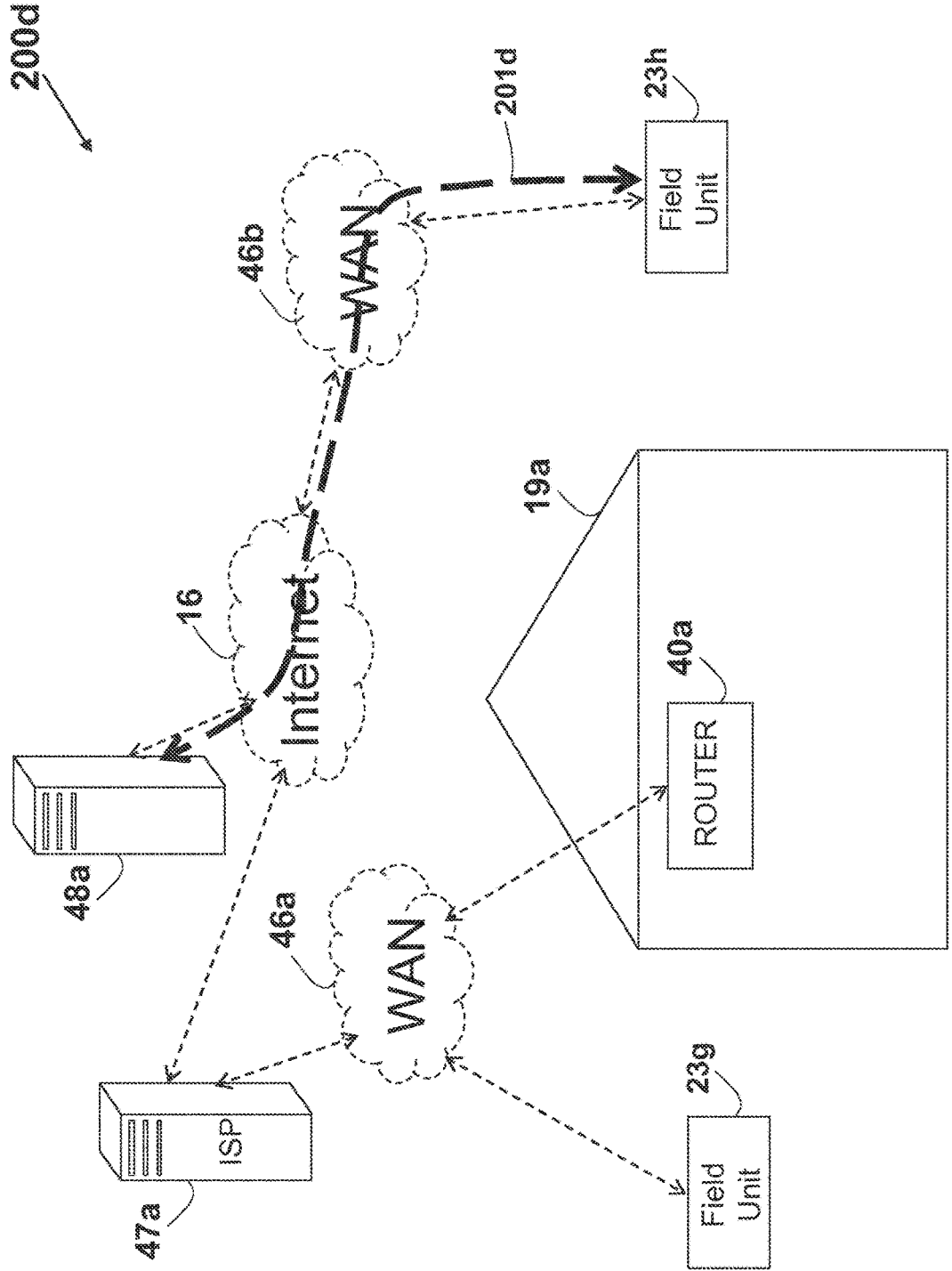
FIG. 20d illustrates a schematic electrical diagram of a data path over the Internet between a field unit located external to a building and a control or gateway server.

While some arrangements are exampled above where the router or gateway (such as router 40a), the field units (such as field units 23a-f), the sensors, and the actuators are located in the same building, it is apparent that this disclosure equally applies to any arrangement where one or more of these devices or elements is located in different buildings or external to the building. In one example, one or more of these devices or elements is located in the user premises, such as adjacent to the building, for example located on the roof, mounted on external walls, in the outdoor part of the premises such as garden, yard or garage. Further, one or more of these devices or elements is located remote from the user premises, such as in another street, neighborhood, city, region, state, or country. An example of such arrangement is described as arrangement 200 in FIG. 20, showing two field units 23g and 23h, located externally from the building 19a The router 40a is shown located in the building, connected to the server 48a similar to the arrangement 49 shown in FIG. 4. In the example shown in arrangement 200, the field unit 23g may communicate with WAN 46a In such a case, the field unit 46a may communicate with the router 40a via the WAN 46a, as shown by the data path 201a shown in arrangement 200a in FIG. 20a. Alternatively or in addition, the field unit 23a may communicate with the server 48a via the WAN 46a, as shown by the data path 201b shown in arrangement 200b in FIG. 20b. Similarly, the field unit 23h is shown connected to the WAN 46b, which is distinct from the WAN 46a to which the router 40a is connected. In such a case, the field unit 23h may communicate with the router 40a via the WAN 46a, the Internet 16, and WAN 46a, as shown by the data path 201c shown in arrangement 200c in FIG. 20c. Alternatively or in addition, the field unit 23h may communicate with the server 48a via the WAN 46b (and the Internet 16), as shown by the data path 201d shown in arrangement 200d in FIG. 20d.

In the case each of the field unit 23g or 23h include a sensor, the sensor information may be part of the control logic executed by the controller as described above. In the case the controller is located inside the building such as in the router arrangement 145 shown in FIG. 14 above, the router 40a (serving also as the controller) may receive the sensor information directly from the field unit, such as described in arrangement 200a Alternatively or in addition, the sensor information may be sent to the router 40a from the server 48a upon its receipt of such information, for example in the arrangement 200d described in FIG. 20d. Similarly, in the case the controller is part of the server 48a, sensor information reaching the router 40a is sent by the router 40a to the server 48a to be used as part of the control logic. Similarly, actuator commands from the controller are sent to the associated field unit via the server 48a or via the router 40a, as appropriate.

While some arrangements are exampled above regarding the Internet, it is apparent that this disclosure equally applies to any network such as a LAN (Local Area Network), a WAN (Wide Area Network), or a MAN (Metropolitan Area Network). Further, the arrangement equally applies to any digital data network connecting multiple devices, wherein multiple distinct communication paths may be formed between a sender and a receiver of the message. Further, non-packet based networks and networks which use protocols other than IP (e.g., cell-based networks such as ATM) may equally use the arrangement. In addition, while IP addresses have been exampled herein for identification of the entities involved in the communication (such as the source and ultimate destination computers and the intermediate servers), any other type of addresses or identifiers (involving any of the OSI layers) may be equally used. For example, MAC (Medium Access Control) address may be used as an alternative or in addition to the IP address.

The applications that can use the arrangement include Electronic Mail (E-Mail) and electronic commerce such as banking, shopping, products, or services purchase. Further, the arrangement may be used for carrying sensitive information such as passwords and public (or private) encryption keys. Messages carried according to the arrangement may include voice, text, images, video, facsimile, characters, numbers or any other digitally represented information. In one aspect, the messages are carrying multimedia information, such as audio or video. The multimedia is carried as part of a one-way or interactive audio or video service. The arrangement may be equally used for carrying any real-time or near-real-time information. The carried audio may be speech or music, and may serve telephony such as VoIP or an Internet radio service. Similarly, the carried video may be part of video services over the Internet such as video conferencing and IPTV (IP Television).

There is a growing widespread use of the Internet for carrying multimedia, such as video and audio. Various audio services include Internet-radio stations and VoIP (Voice-over-IP). Video services over the Internet include video conferencing and IPTV (IP Television). In most cases, the multimedia service is a real-time (or near real-time) application, and thus sensitive to delays over the Internet. In particular, two-way services such a VoIP or other telephony services and video-conferencing are delay sensitive.

In addition to the equipment cost, the costs associated with the operation of the information device are as follows: a. Communication service. The costs associated with the communication sessions. b. ISP, in the case of using the Internet. c. Information service. The costs associated with operating the relay servers. In general, billing the user for communication services by the provider may be based on a one-time fee; a flat fee for a period (e.g., monthly); per communication session; per lengths of communication sessions or messages; or any combination of the above.

A Next Generation Network (NGN) is a packet based network which can provide services including telecommunication services and able to make use of multiple broadband, Quality of Service (QoS)—enabled transport technologies and in which service-related functions are independent from underlying transport-related technologies. The NGN offers unrestricted access by users to different service providers. The NGN operator or any service provider using the NGN may offer gateway services based on the method described herein.

In one aspect the arrangement is used for security as part of cloud computing deployment. For example, messages exchanged between a cloud services provider and a user or as part of the cloud computing infrastructure. The cloud services may include Cloud Software as a Service (Saas), Cloud Platform as a Service (PaaS) and Cloud Infrastructure as a Service (IaaS), and the method described herein may be used as part of the implementing security measures such as described in the publication "Security Guidance for Critical Areas of Focus in Cloud Computing V2.1", Prepared by the Cloud Security Alliance, December 2009, which is incorporated in its entirety for all purposes as if fully set forth herein.

Figure 13:
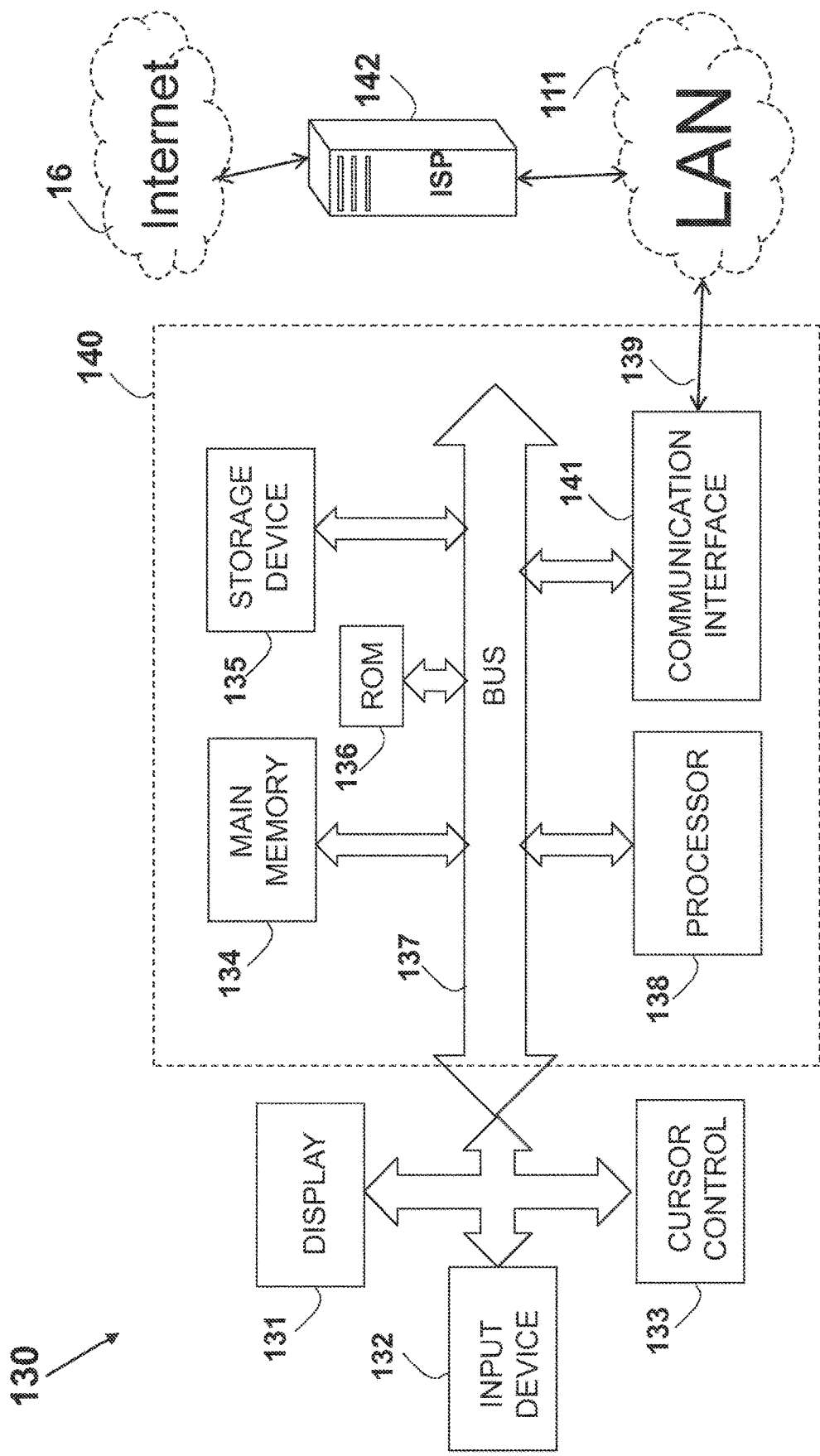
FIG. 13 illustrates schematically a general computer system connected to the Internet.

FIG. 13 is a block diagram that illustrates a system 130 including a computer system 140 and the associated Internet 11 connection upon which an embodiment may be implemented. Such configuration is typically used for computers (hosts) connected to the Internet 11 and executing a server or a client (or a combination) software. A source computer such as laptop 12a an ultimate destination computer 13c and relay servers 14a 14d above, as well as any computer or processor described herein, may use the computer system configuration and the Internet connection shown in FIG. 13.

The system 140 may be used as a portable electronic device such as a notebook/laptop computer, a media player (e.g., MP3 based or video player), a cellular phone, a Personal Digital Assistant (PDA), an image processing device (e.g., a digital camera or video recorder), and/or any other handheld computing devices, or a combination of any of these devices. Note that while FIG. 13 illustrates various components of a computer system, it is not intended to represent any particular architecture or manner of interconnecting the components; as such details are not germane. It will also be appreciated that network computers, handheld computers, cell phones and other data processing systems which have fewer components or perhaps more components may also be used.

The computer system of FIG. 13 may, for example, be an Apple Macintosh computer or Power Book, or an IBM compatible PC. Computer system 140 includes a bus 137, an interconnect, or other communication mechanism for communicating information, and a processor 138, commonly in the form of an integrated circuit, coupled with bus 137 for processing information and for executing the computer executable instructions. Computer system 140 also includes a main memory 134, such as a Random Access Memory (RAM) or other dynamic storage device, coupled to bus 137 for storing information and instructions to be executed by processor 138 Main memory 134 also may be used for storing temporary variables or other intermediate information during execution of instructions to be executed by processor 138 Computer system 140 further includes a Read Only Memory (ROM) 136 (or other non-volatile memory) or other static storage device coupled to bus 137 for storing static information and instructions for processor 138 A storage device 135, such as a magnetic disk or optical disk, a hard disk drive for reading from and writing to a hard disk, a magnetic disk drive for reading from and writing to a magnetic disk, and/or an optical disk drive (such as DVD) for reading from and writing to a removable optical disk, is coupled to bus 137 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically computer system 140 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Computer system 140 may be coupled via bus 137 to a display 131, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display allows a user to view, enter, and/or edit information that is relevant to the operation of the system. An input device 132 including alphanumeric and other keys, is coupled to bus 137 for communicating information and command selections to processor 138 Another type of user input device is cursor control 133, such as a mouse, a trackball, or cursor direction keys for communicating direction information and command selections to processor 138 and for controlling cursor movement on display 131 This input device typically has two degrees of freedom in two axes, a first axis (e.g., x) and a second axis (e.g., y), that allows the device to specify positions in a plane.

The computer system 140 may be used for implementing the methods and techniques described herein. According to one embodiment, those methods and techniques are performed by computer system 140 in response to processor 138 executing one or more sequences of one or more instructions contained in main memory 134. Such instructions may be read into main memory 134 from another computer-readable medium, such as storage device 135 Execution of the sequences of instructions contained in main memory 134 causes processor 138 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "computer-readable medium" (or "machine-readable medium") as used herein is an extensible term that refers to any medium or any memory, that participates in providing instructions to a processor, (such as processor 138) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise bus 137. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 138 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infra-red transmitter to convert the data to an infrared signal. An infrared detector can receive the data carried in the infrared signal and appropriate circuitry can place the data on bus 137. Bus 137 carries the data to main memory 134, from which processor 138 retrieves and executes the instructions. The instructions received by main memory 134 may optionally be stored on storage device 135 either before or after execution by processor 138.

Computer system 140 also includes a communication interface 141 coupled to bus 137. Communication interface 141 provides a two-way data communication coupling to a network link 139 that is connected to a local network 111 For example, communication interface 141 may be an Integrated Services Digital Network (ISDN) card or a modem to provide a data communication connection to a corresponding type of telephone line. As another non-limiting example, communication interface 141 may be a local area network (LAN) card to provide a data communication connection to a compatible LAN. For example, Ethernet based connection based on IEEE 802.3 standard may be used such as 10/100BaseT, 1000BaseT (gigabit Ethernet), 10 gigabit Ethernet (10GE or 10 GbE or 10 GigE per IEEE Std 802.3ae-2002 as standard), 40 Gigabit Ethernet (40 GbE), or 100 Gigabit Ethernet (100 GbE as per Ethernet standard IEEE P802.3ba), as described in Cisco Systems, Inc. Publication number 1-587005-001-3 (6/99), "Internetworking Technologies Handbook", Chapter 7: "Ethernet Technologies", pages 7-1 to 7-38, which is incorporated in its entirety for all purposes as if fully set forth herein. In such a case, the communication interface 141 typically include a LAN transceiver or a modem, such as Standard Microsystems Corporation (SM SC) LAN91C111 10/100 Ethernet transceiver described in the Standard Microsystems Corporation (SM SC) data-sheet "LAN91C111 10/100 Non-PCI Ethernet Single Chip MAC+PHY" Data-Sheet, Rev. 15 (02-20-04), which is incorporated in its entirety for all purposes as if fully set forth herein.

In one non-limiting example, the communication is based on a LAN communication, such as Ethernet, and may be partly or in full in accordance with the IEEE802.3 standard. For example, Gigabit Ethernet (GbE or 1 GigE) may be used, describing various technologies for transmitting Ethernet frames at a rate of a gigabit per second (1,000,000,000 bits per second), as defined by the IEEE 802.3-2008 standard. There are five physical layer standards for gigabit Ethernet using optical fiber (1000BASE-X), twisted pair cable (1000BASE-T), or balanced copper cable (1000BASE-CX).

The IEEE 802.3z standard includes 1000BASE-SX for transmission over multi-mode fiber, 1000BASE-LX for transmission over single-mode fiber, and the nearly obsolete 1000BASE-CX for transmission over balanced copper cabling. These standards use 8b/10b encoding, which inflates the line rate by 25%, from 1000 M bit/s to 1250 M bit/s, to ensure a DC balanced signal. The symbols are then sent using NRZ. The IEEE 802.3ab, which defines the widely used 1000BASE-T interface type, uses a different encoding scheme in order to keep the symbol rate as low as possible, allowing transmission over twisted pair. Similarly, The 10 gigabit Ethernet (10GE or 10 GbE or 10 GigE may be used, which is a version of Ethernet with a nominal data rate of 10 Gbit/s (billion bits per second), ten times faster than gigabit Ethernet. The 10 gigabit Ethernet standard defines only full duplex point to point links which are generally connected by network switches. The 10 gigabit Ethernet standard encompasses a number of different physical layers (PHY) standards. A networking device may support different PHY types through pluggable PHY modules, such as those based on SFP+.

The powering scheme may be based on Power over Ethernet (POE), which describes a system to pass electrical power safely, along with data, on Ethernet cabling, and may use phantom configuration for carrying the power. The PoE technology and applications are described in the White Paper "All You Need To Know About Power over Ethernet (POE) and the IEEE 802.3af Standard", by PowerDsine Ltd., 06-0002-082 20-May-04, and in U.S. Pat. No. 6,473,609 to Lehr et al. entitled: "Structure Cabling System", which are all incorporated in their entirety for all purposes as if fully set forth herein. The IEEE standard for PoE requires category 5 cable or higher for high power levels, but can operate with category 3 cable for low power levels. The power is supplied in common mode over two or more of the differential pairs of wires found in the Ethernet cables, and comes from a power supply within a PoE-enabled networking device such as an Ethernet switch or can be injected into a cable run with a midspan power supply. The IEEE 802.3af-2003 PoE standard, which is incorporated in its entirety for all purposes as if fully set forth herein, provides up to 15.4 Watts of DC power (minimum 44 V DC and 350 mA) to each device. Only 12.95 Watts is assured to be available to the powered device as some power is dissipated in the cable. The updated IEEE 802.3at-2009 PoE standard, also known as PoE+ or PoE plus, and which is incorporated in its entirety for all purposes as if fully set forth herein, provides up to 25.5 Watts of power. In PoE environment, a device may serve as a Power Sourcing Equipment (PSE) that provides ("sources") power on the Ethernet cable. A device consuming power from the LAN is referred to as a Powered Device (PD).

In the case of a dedicated or separated PCB or enclosure, the PCB or enclosure may be designed to be easily removable, for example by an end user. Such plug-in module is commonly designed to be installed and removed typically by respectively connecting or disconnecting the module connectors (pins, plugs, jacks, sockets, receptacles or any other types) to or from the mating connectors, commonly using human hand force and without any tool. The connection mechanical support may be based only on the connectors, or supplemented by guides, rails, or any other mechanical support. Such a plug-in module may be pluggable into a computer system, motherboard, an intermediary device, or a memory.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "couple", and variations of that word such as "coupling", "coupled" and "couplable", refer to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example for allowing for the transfer of power, signal, or data, as well as connections formed through intervening devices or elements.

The arrangements and methods described herein may be implemented using hardware, software or a combination of both. The term "software integration" or any other reference to the integration of two programs or processes herein refers to software components (e.g., programs, modules, functions, processes etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein refers (as applicable) to a software integration, a hardware integration, or any combination thereof.

The term "message" is used generically herein to describe at least an ordered series of characters or bits intended to convey a package of information (or a portion thereof), which may be transferred from one point to another, such as by using communication via one or more communication mechanisms or by transferring among processes. The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular V LAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

As used herein, the term "Integrated Circuit" (IC) shall include any type of integrated device of any function where the electronic circuit is manufactured by the patterned diffusion of trace elements into the surface of a thin substrate of semiconductor material (e.g., Silicon), whether single or multiple die, or small or large scale of integration, and irrespective of process or base materials (including, without limitation Si, SiGe, CMOS and GAs) including without limitation applications specific integrated circuits (ASICs), field programmable gate arrays (FPGA s), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs. The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a multi-chip module (MCM) may be used, where multiple integrated circuits (ICs), semiconductor dies, or other discrete components are packaged onto a unifying substrate, facilitating their use as a single component (as though a larger IC).

The term "computer" is used generically herein to describe any number of computers, including, but not limited to personal computers, embedded processing elements and systems, control logic, ASICs, chips, workstations, mainframes, etc. Any computer herein may consist of, or be part of, a handheld computer, including any portable computer which is small enough to be held and operated while holding in one hand or fit into a pocket. Such a device, also referred to as a mobile device, typically has a display screen with touch input and/or miniature keyboard. Non-limiting examples of such devices include Digital Still Camera (DSC), Digital video Camera (DVC or digital camcorder), Personal Digital Assistant (PDA), and mobile phones and Smartphones. The mobile devices may combine video, audio and advanced communication capabilities, such as PAN and WLAN. A mobile phone (also known as a cellular phone, cell phone and a hand phone) is a device which can make and receive telephone calls over a radio link whilst moving around a wide geographic area, by connecting to a cellular network provided by a mobile network operator. The calls are to and from the public telephone network which includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, M M S, email, Internet access, short-range wireless communications (infrared, Bluetooth), business applications, gaming and photography.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11 g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DV B) devices or systems, multi-standard radio devices or systems, a wired or wireless handheld device (e.g., BlackBerry, Palm Treo), a Wireless Application Protocol (WAP) device, or the like.

As used herein, the term "user device" is meant to include any device having a computer, a user interface, and a network interface. The network interface allows for communication over a network with other devices. The user interface (such as Graphical User Interface-GUI) allows for a human to interact with the device, to operate, control, or to output information to the user device, and to receive indications from the device. The user interface typically includes, or is based on, a Human Interface Device (HID), used to interact directly to receive input from humans, to provide output to humans, or both. Examples of HIDs that receive information from humans are keyboard, a pointing device such as a mouse, a trackball or a pointing stick, a joystick, a fingerprint scanner, a dance pad, a touch screen, a camera, a microphone, and a motion sensor (such as Wii™ remote), and such devices may include, or be based on, a sensor, such as any one of the sensors disclosed herein. The input may be based on a human touch, a human motion, a human voice, or a human gesture (such as hand gesture). Examples of HIDs that output information to humans are a display (for visual presentation), a speaker (for audio sounding), and a vibrator, and such devices may include, or be based on, an actuator, such as any one of the actuators disclosed herein. The HID, and the operation in USB environment, may be as described in the standard "HID Usage Tables" Version 1.12 (10/28/2004) by the USB Implementers' Forum, which is incorporated in its entirety for all purposes as if fully set forth herein. The user device may communicate over any of the networks described herein via its network interface. A user device may consists of, comprises, be part of, or integrated with, a Digital Still Camera (DSC), a Digital video Camera (DVC or digital camcorder), a landline telephone set, a television set, a Personal Digital Assistant (PDA), a mobile phones, one way or two-way radio communication device, a pager, a cellular radio-telephone communication device, a cellular telephone handset, a wireless telephone, a Personal Communication Systems (PCS) device, a mobile or portable Global Positioning System (GPS) device, a Personal Computer (PC), a desktop computer, a mobile computer, a laptop computer, a notebook computer, a tablet computer, a server computer, or a handheld computer. Alternatively or in addition, a user device may consists of, comprises, be part of, or integrated with, a personal computer (such as the personal computer 18a shown in FIG. 5i), a home device (such as the home devices 15a and 15b shown in FIG. 5i), a field unit (such as the field units 23a-c shown in FIG. 5i), a router (such as the router 21 shown in FIG. 5i), an appliance, or a server (such as the server 24 shown in FIG. 5i). A user device may communicate over a home network, a control network, the Internet, or any other network, for communication with another device in the system.

As used herein, the terms "program", "programmable", and "computer program" are meant to include any sequence or human or machine cognizable steps which perform a function. Such programs are not inherently related to any particular computer or other apparatus, and may be rendered in virtually any programming language or environment including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J 2M E, Java Beans, etc.) and the like, as well as in firmware or other implementations. Generally, program modules include routines, programs, objects, components, data structures, etc., that performs particular tasks or implement particular abstract data types.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

As used herein, the terms "network", "communication link" and "communications mechanism" are used generically to describe one or more networks, communications media or communications systems, including, but not limited to, the Internet, private or public telephone, cellular, wireless, satellite, cable, data networks. Data networks include, but not limited to, Metropolitan Area Networks (MANs), Wide Area Networks (WANs), Local Area Networks (LANs), Personal Area networks (PANs), WLANs (Wireless LANs), Internet, internets, NGN, intranets, Hybrid Fiber Coax (HFC) networks, satellite networks, and Telco networks. Communication media include, but not limited to, a cable, an electrical connection, a bus, and internal communications mechanisms such as message passing, interprocess communications, and shared memory. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.). While exampled herein with regard to secured communication between a pair of network endpoint devices (host-to-host), the described method can equally be used to protect the data flow between a pair of gateways or any other networking-associated devices (network-to-network), or between a network device (e.g., security gateway) and a host (network-to-host).

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (RTM), Global Positioning System (GPS), Wi-Fi, Wi-Max, Zig-Bee™, Ultra-Wideband (UWB), Global System for Mobile communication (GSM), 2G, 2.5G, 3G, 3.5G, Enhanced Data rates for GSM Evolution (EDGE), or the like. Further, a wireless communication may be based on wireless technologies that are described in Chapter 20: "Wireless Technologies" of the publication number 1-587005-001-3 by Cisco Systems, Inc. (7/99) entitled: "Internetworking Technologies Handbook", which is incorporated in its entirety for all purposes as if fully set forth herein.

A wireless communication may be partly or in full in accordance with, or based on, the WiGig™ technology developed by the Wireless Gigabit Alliance (http://wireless-gigabitalliance.org), and standardized as IEEE 802.11ad, allowing multi-gigabit data rate and using the unlicensed 60 GH z frequency band. The WiGig tri-band enabled in-room devices, which operate in the 2.4, 5 and 60 GHz bands, supports data transmission rates up to 7 Gbit/s, and is based on, supplements and extends the 802.11 Media Access Control (MAC) layer and is thus backward compatible with the IEEE 802.11 standard. The specifications further supports protocol adaptation layers are being developed to support specific system interfaces including data buses for PC peripherals and display interfaces for HDTVs, monitors and projectors, and is based on phase array antenna beamforming, enabling robust communication at distances beyond 10 meters, while the beams can move within the coverage area through modification of the transmission phase of individual antenna elements. The WiGig technology is further described in the white paper entitled: "WiGig White Paper-Defining the Future of Multi-Gigabit Wireless Communications", published by WiGig Alliance, July 2010, which is incorporated in its entirety for all purposes as if fully set forth herein.

Alternatively or in addition, an in-room wireless communication may be in accordance with, or based on, the WirelessHD™ technology developed by the WirelessHD™ Consortium (http://www.wirelesshd.org) and standardized as IEEE 802.15.3c-2009, which based on a 7 GHz channel in the 60 GHz Extremely High Frequency radio band. It allows for either compressed (H.264) or uncompressed digital transmission of high-definition video and audio and data signals. The 1.1 version of the specification increases the maximum data rate to 28 Gbit/s, supports common 3D formats, 4K resolution, WPAN data, low-power mode for portable devices, and HDCP 2.0 content protection. The 60 GHz band usually requires line of sight between transmitter and receiver, and the WirelessHD specification ameliorates this limitation through the use of beam forming at the receiver and transmitter antennas to increase the signal's effective radiated power. The range obtained may be in-room, point-to-point, non line-of-sight (NLOS) at up to 10 meters. Further, The WirelessHD specification has provisions for content encryption via Digital Transmission Content Protection (DTCP) as well as provisions for network management. The WirelessH DTM technology is further described in the overview entitled: "WirelessHD Specifications Version 1.1 Overview", published by the WirelessHD consortium, May 2010, which is incorporated in its entirety for all purposes as if fully set forth herein.

Alternatively or in addition, a wireless communication may be in accordance with, or based on, the Wireless Home Digital Interface (WHDI™) technology developed by the WHDI™ Special Interest Group (http://www.whdi.org), and provides a high-quality, uncompressed wireless link which can support delivery of equivalent video data rates of up to 3 Gbps (including uncompressed 1080p) in a 40MHz channel in the 5 GHz unlicensed band, conforming to FCC regulations. Equivalent video data rates of up to 1.5 Gbps (including uncompressed 1080i and 720p) can be delivered on a single 20MHz channel in the 5 GHz unlicensed band, conforming to worldwide 5 GHz spectrum regulations. The range is beyond 100 feet, through walls, and latency is less than one millisecond. The WHDI™ technology is further described in the technical overview entitled: "Enabling Wireless uncompressed HDTV Connectivity with a Unique Video-Modem Approach" by Meir Feder, published by the AMIMON Ltd., which is incorporated in its entirety for all purposes as if fully set forth herein.

A wireless communication may use white spaces, which relates to the frequencies and frequency bands allocated between used or licensed radio frequency bands (or channels) to avoid interference or to serve as guard band. Further, white space refers to frequency bands between about 50 MHz and 700 MHz traditionally used for analog television broadcast, and were freed in the switchover to digital television. In the United States, full power analog television broadcasts, which operated between the 54 MHz and 806 MHz (54-72, 76-88, 174-216, 470-608, and 614-806) television frequencies (Channels 2-69), ceased operating on Jun. 12, 2009 per a United States digital switchover mandate. At that time, full power TV stations were required to switch to digital transmission and operate only between 54 MHz and 698 MHz. The abandoned television frequencies are primarily covering TV channels 52 to 69 (698 to 806 MHz), as well as unused television frequencies between 54 MHz and 698 MHz (TV Channels 2-51). In the rest of the world, the abandoned television channels are VHF, and the resulting large VHF white spaces are being re-allocated for the worldwide (except the U.S.) digital radio standard DAB and DAB+, and DM B. A device intended to use these available channels is commonly referred to as a "White-Spaces Device" (WSD), and are typically designed to detect the presence of existing but unused areas of the airwaves, such as those reserved for analog television, and utilize these unused airwaves to transmit signals for communication application such as for Internet connectivity. The communication over white spaces may be partly or in full in accordance with, or based on, IEEE 802.11af or IEEE 802.22 standards (sometimes referred to as Super Wi-Fi standards).

The wireless communication over white spaces may be partly or in full in accordance with, or based on, Wireless Regional Area Network (WRAN) standard IEEE 802.22- "Standard for Wireless Regional Area Networks (WRAN)— Specific requirements-Part 22: Cognitive Wireless RAN Medium Access Control (MAC) and Physical Layer (PHY) Specifications: Policies and procedures for operation in the TV Bands", described in the article 'IEEE 802.22: An Introduction to the First Wireless Standard based on Cognitive Radios', by Carlos Cordeiro, Kiran Challapali, Dagnachew Birru, and Sai Shankar, published in the Journal of Communication, Vol. 1, No. 1, April 2006, and in the presentation 'IEEE 802.22 Wireless Regional Area Networks-Enabling Rural Broadband Wireless Access Using Cognitive Radio Technology', by A pruva N. Mody and Gerald Chouinard, Doc. #IEEE 802.22-10/0073r03 June 2010, which are both incorporated in their entirety for all purposes as if fully set forth herein.

Such communication may use Cognitive Radio (CR) techniques to allow sharing of geographically unused spectrum formerly allocated to the Television Broadcast Service, on a non-interfering basis. Cognitive-based dynamic spectrum access is described, for example, in the document entitled: 'Dynamic Spectrum Access In IEEE 802.22-Based Cognitive Wireless Networks: A Game Theoretic Model for Competitive Spectrum Bidding and Pricing' by Dusit Niyato and Ekram Hossain, published IEEE Wireless Communication April 2009, which is incorporated in its entirety for all purposes as if fully set forth herein.

The communication may operate in a point to multipoint basis (P2M P), and the network may be formed by Base Stations (BS) and Customer-Premises Equipment (CPE), where the CPEs are communicating with a BS via a wireless link, while the BSs control the medium access for all the CPEs attached to it. The WRAN Base Stations may capable of performing a distributed sensing, where the CPEs are sensing the spectrum and are sending periodic reports to the BS informing it about what they sense, such that the BS, with the information gathered, may evaluate whether a change is necessary in the channel or channels used, or on the contrary, if it should stay transmitting and receiving in the same one. The PHY layer may use OFDM A as the modulation scheme and may use one TV channel (a TV channel typically has a bandwidth of 6 MHz; in some countries 7 or 8 MHz is used), and may use more than one channel using a Channel Bonding scheme.

In such environment, the gateway or router 21, 40, or 143 may serve as the base station, while the field units 23, computer 161, server 24, or the home devices 15 functions as CPEs. Similarly, the gateway or router 21, 40, or 143 may serve as the CPE, while part or all of the field units 23, computer 161 server 24, or the home devices 15 functions as BS.

The wireless communication may be partly or in full in accordance with, or based on, short-range communication such as Near Field Communication (NFC), having a theoretical working distance of 20 centimeters and a practical working distance of about 4 centimeters, and commonly used with mobile devices, such as smartphones. The NFC typically operates at 13.56 MHz as defined in ISO/IEC 18000-3 air interface and at data rates ranging from 106 K bit/s to 424 K bit/s. NFC commonly involves an initiator and a target; the initiator actively generates an RF field that may power a passive target. NFC peer-to-peer communication is possible, provided both devices are powered. In NFC environment, the gateway or router 21, 40, or 143 may serve as the initiator, while the field units 23, computer 161, server 24, or the home devices 15 functions as targets. Similarly, the gateway or router 21, 40, or 143 may serve as the target, while part or all of the field units 23, computer 161 server 24, or the home devices 15 functions as initiators.

The NFC typically supports passive and active modes of operation. In passive communication mode, the initiator device provides a carrier field and the target device answers by modulating the existing field, and the target device may draw its operating power from the initiator-provided electromagnetic field, thus making the target device a transponder. In active communication mode, both devices typically have power supplies, and both initiator and target devices communicate by alternately generating their own fields where a device deactivates its RF field while it is waiting for data. NFC typically uses Amplitude-Shift Keying (ASK), and employs two different schemes to transfer data. At the data transfer rate of 106 K bit/s, a modified Miller coding with 100% modulation is used, while in all other cases Manchester coding is used with a modulation ratio of 10%.

The NFC communication may be partly or in full in accordance with, or based on, NFC standards ISO/IEC 18092 or ECMA-340 entitled: "Near Field Communication Interface and Protocol-1 (NFCIP-1)", and ISO/IEC 21481 or ECMA-352 standards entitled: "Near Field Communication Interface and Protocol-2 (NFCIP-2)". The NFC technology is described in ECMA International white paper Ecma/ TC32-TG 19/2005/012 entitled: "Near Field Communication-White paper", in Rohde& Schwarz White Paper 1M A 182_4e entitled: "Near Field Communication (NFC) Technology and Measurements White Paper", and in J an Kremer Consulting Services (JKCS) white paper entitled: "NFC-Near Field Communication-White paper", which are all incorporated in their entirety for all purposes as if fully set forth herein.

The system 49b in FIG. 4b above shows two communication routes designated as routes 400a and 400b connecting the router 40a to servers 48a and 48b. Similarly, system 49d in FIG. 4d examples the connection of router 40a to the ISP server 47a via two communication routes, consisting of wired WAN 46a and wireless WAN 46b. The system 500i shown in FIG. 5j similarly shows two communication routes 500g and 500h, connecting the field unit 23d to router 21 In the general case, any pair of devices in the system may communicate over two or more distinct or independent communication routes. Further, one, two, three or all of the communicating device pairs in the system may use two, three, or more distinct or independent alternative communication routes. The communication routes may involve direct communication between the pair of devices where the devices communicate directly with each other over a communication network. Alternatively or in addition, one or more of the alternative communication route use one or more intermediary device, acting as a repeater or a router.

The intermediary device may be a dedicated device functioning as a traditional repeater, or alternatively a device in the system may double as a repeater. For example, while the arrangement 500i in FIG. 5j shows communication route 500g using network 22a and communication route 500g using network 22b, both routes directly connecting field unit 23d to the router 21 In one example, a new communication route may be formed, where the field unit 23b also serves as a repeater for field unit 23d, and passes information between these two devices.

Multiple distinct or independent communication routes provide higher reliability such as avoiding single point of failure (SPOF), where in the case of any failure in one of the communication routes, the other routes may still provide the required connection and the system functionality is preserved, thus a therein renders the system fully functional, using a backup or fail-safe scheme. The operation of the redundant communication routes may be based on standby redundancy, (a.k.a. Backup Redundancy), where one of the data paths or the associated hardware is considered as a primary unit, and the other data path (or the associated hardware) is considered as the secondary unit, serving as back up to the primary unit. The secondary unit typically does not monitor the system, but is there just as a spare. The standby unit is not usually kept in sync with the primary unit, so it must reconcile its input and output signals on the takeover of the communication. This approach does lend itself to give a "bump" on transfer, meaning the secondary operation may not be in sync with the last system state of the primary unit. Such mechanism may require a watchdog, which monitors the system to decide when a switchover condition is met, and command the system to switch control to the standby unit. Standby redundancy configurations commonly employ two basic types, namely 'Cold Standby' and 'Hot Standby'.

In cold standby, the secondary unit is either powered off or otherwise non-active in the system operation, thus preserving the reliability of the unit. The drawback of this design is that the downtime is greater than in hot standby, because the standby unit needs to be powered up or activated, and brought online into a known state.

On hot standby, the secondary unit is powered up or otherwise kept operational, and can optionally monitor the system. The secondary unit may serve as the watchdog and/or voter to decide when to switch over, thus eliminating the need for an additional hardware for this job. This design does not preserve the reliability of the standby unit as well as the cold standby design. However, it shortens the downtime, which in turn increases the availability of the system. Some flavors of Hot Standby are similar to Dual Modular Redundancy (DMR) or Parallel Redundancy. The main difference between Hot Standby and DMR is how tightly the primary and the secondary are synchronized. DMR completely synchronizes the primary and secondary units.

While a redundancy of two was exampled above, where two data paths and two hardware devices were used, a redundancy involving three or more data paths or systems may be equally used. The term 'N' Modular Redundancy, (a.k.a. Parallel Redundancy) refers to the approach of having multiply units or data paths running in parallel. A ll units are highly synchronized and receive the same input information at the same time. Their output values are then compared and a voter decides which output values should be used. This model easily provides 'bumpless' switchovers. This model typically has faster switchover times than Hot Standby models, thus the system availability is very high, but because all the units are powered up and actively engaged with the system operation, the system is at more risk of encountering a common mode failure across all the units. Deciding which unit is correct can be challenging if only two units are used. If more than two units are used, the problem is simpler, usually the majority wins or the two that agree win. In N Modular Redundancy, there are three main typologies: Dual Modular Redundancy, Triple Modular Redundancy, and Quadruple Redundancy. Quadruple Modular Redundancy (QMR) is fundamentally similar to TMR but using four units instead of three to increase the reliability. The obvious drawback is the 4× increase in system cost.

Dual Modular Redundancy (DMR) uses two functional equivalent units, thus either can control or support the system operation. The most challenging aspect of DMR is determining when to switch over to the secondary unit. Because both units are monitoring the application, a mechanism is needed to decide what to do if they disagree. Either a tiebreaker vote or simply the secondary unit may be designated as the default winner, assuming it is more trustworthy than the primary unit. Triple Modular Redundancy (TMR) uses three functionally equivalent units to provide a redundant backup. This approach is very common in aerospace applications where the cost of failure is extremely high. TMR is more reliable than DMR due to two main aspects. The most obvious reason is that two "standby" units are used instead of just one. The other reason is that in a technique called diversity platforms or diversity programming may be applied. In this technique, different software or hardware platforms are used on the redundant systems to prevent common mode failure. The voter decides which unit will actively control the application. With TMR, the decision of which system to trust is made democratically and the majority rules. If three different answers are obtained, the voter must decide which system to trust or shut down the entire system, thus the switchover decision is straightforward and fast.

Another redundancy topology is 1: N Redundancy, where a single backup is used for multiple systems, and this backup is able to function in the place of any single one of the active systems. This technique offers redundancy at a much lower cost than the other models by using one standby unit for several primary units. This approach only works well when the primary units all have very similar functions, thus allowing the standby to back up any of the primary units if one of them fails.

While the redundant data paths have been exampled with regard to the added reliability and availability, redundant data paths may as well be used in order to provide higher aggregated data rate, allowing for faster response and faster transfer of data over the multiple data paths. Further, multiple communication routes may improve the delay through the system, in particular where the transfer delay is statistical and practically random, such as in packet-based delivery systems or over the Internet.

Figure 21:
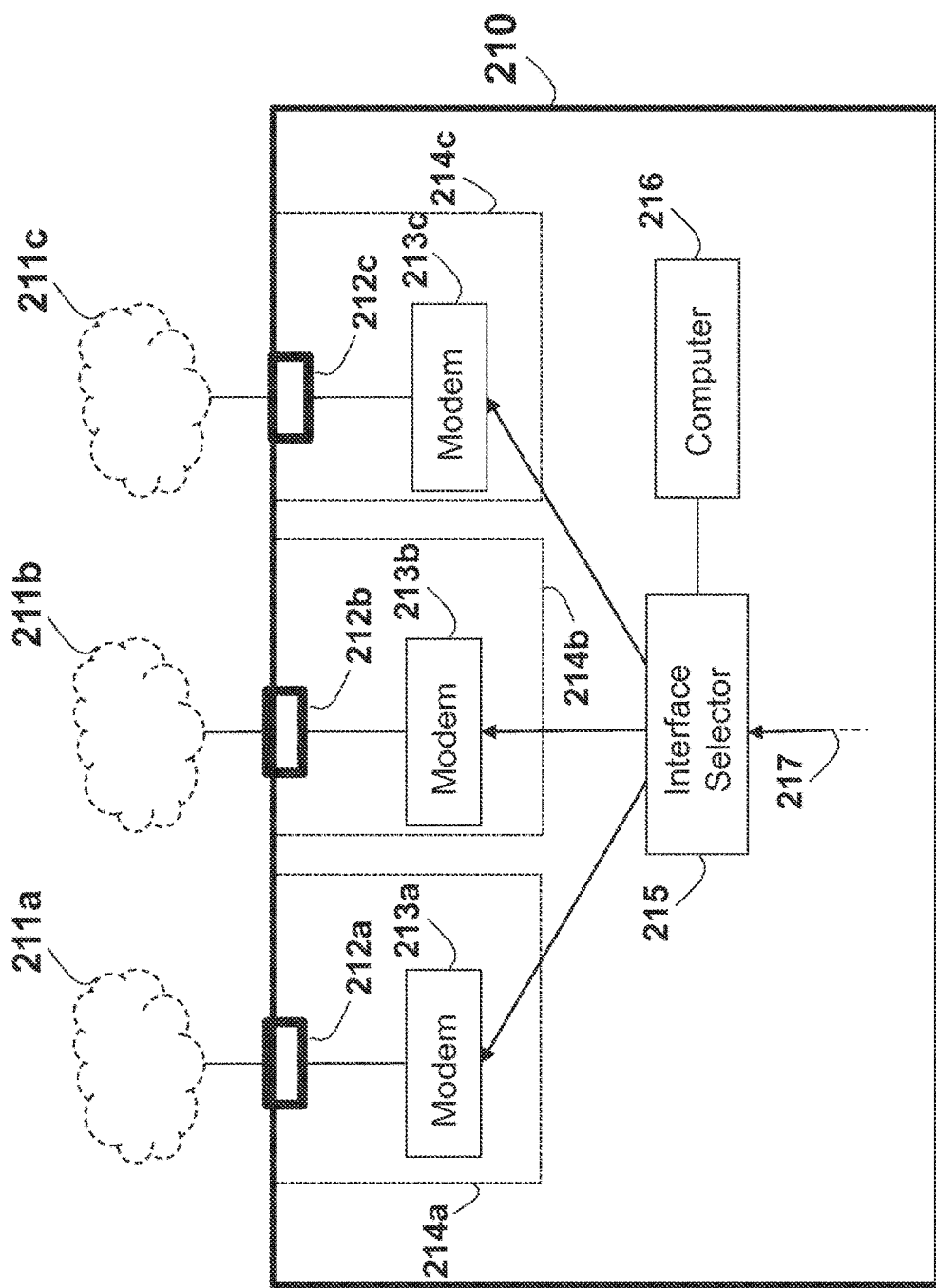
FIG. 21 illustrates a schematic electrical diagram of part of a device having multiple network interfaces.

An example of part of a device 210 capable of communicating over three networks 211a, 221b and 211c is shown in FIG. 21. The device may be any device, and in particular any one or more of the devices described herein such as the field unit 23, the router 21 or the router 40, or the home device 15 The device 210 includes three interfaces 214a, 214b, and 214c, for respectively communicating over the networks 211a, 211b, and 211c Each of the interfaces commonly includes all the components required for the communication over the respective network, and adapted to the specific network. The interface 214a includes network connection 212a connected to a modem 213a (or a transceiver in general). Similarly, the interface 214b includes a network connection 212b connected to a modem 213b, and the interface 214c includes network connection 212c connected to a modem 213c In the case of a wired or a conductive medium, the network connection 212 is typically a connector, while in the case of a radio-frequency and over-the-air network, the network connection 212 is commonly an antenna. A packet (or any otherwise formatted digital data information piece) to be transmitted is received by the interface selector 215 via input 217, which directs the packet to one of more of the network interfaces 214a, 214b and 214c to be sent over the respective networks 211a 211b, and 211c The interface selector 215 operation is controlled by the computer or processor 216 The computer 216 may be in part or in whole a dedicated separated component, or may be the same computer used by the device 210 for other device functionalities, such as computer 53 in the sensor unit 50, computer 63 in actuator unit 60, computer 71 in field unit 70, or controller 147 in router 143 described herein. While device 210 is exampled having three network interfaces 214, two, four and any number of interfaces may be equally used for connecting to multiple networks 211 The interface selector 215 may be hardware based, where the input 217 is a physical port or connection, or may be implemented in software or firmware executed by the computer 216 where the packet is received from other processes executed by the computer or processor 216.

The networks 211a, 211b, and 211c may be similar, identical or different from each other. For example, networks 211a and 211b may use different, similar or the same type of medium, and may use different, similar or the same protocol for communication over the network medium. Similarly, networks 211a and 211c may use different, similar or the same type of medium, and may use different, similar or the same protocol for communication over the network medium. In the general case, some of the networks may be similar, identical or different from each other. The network interfaces 214a, 214b, and 214c may be (in part or in whole) similar, identical or different from each other. For example, network interfaces 214a and 214b may use different, similar or the same type of physical layer or other OSI layers, and may use different, similar or the same type of modem 213 or network connection 212

Figure 22:
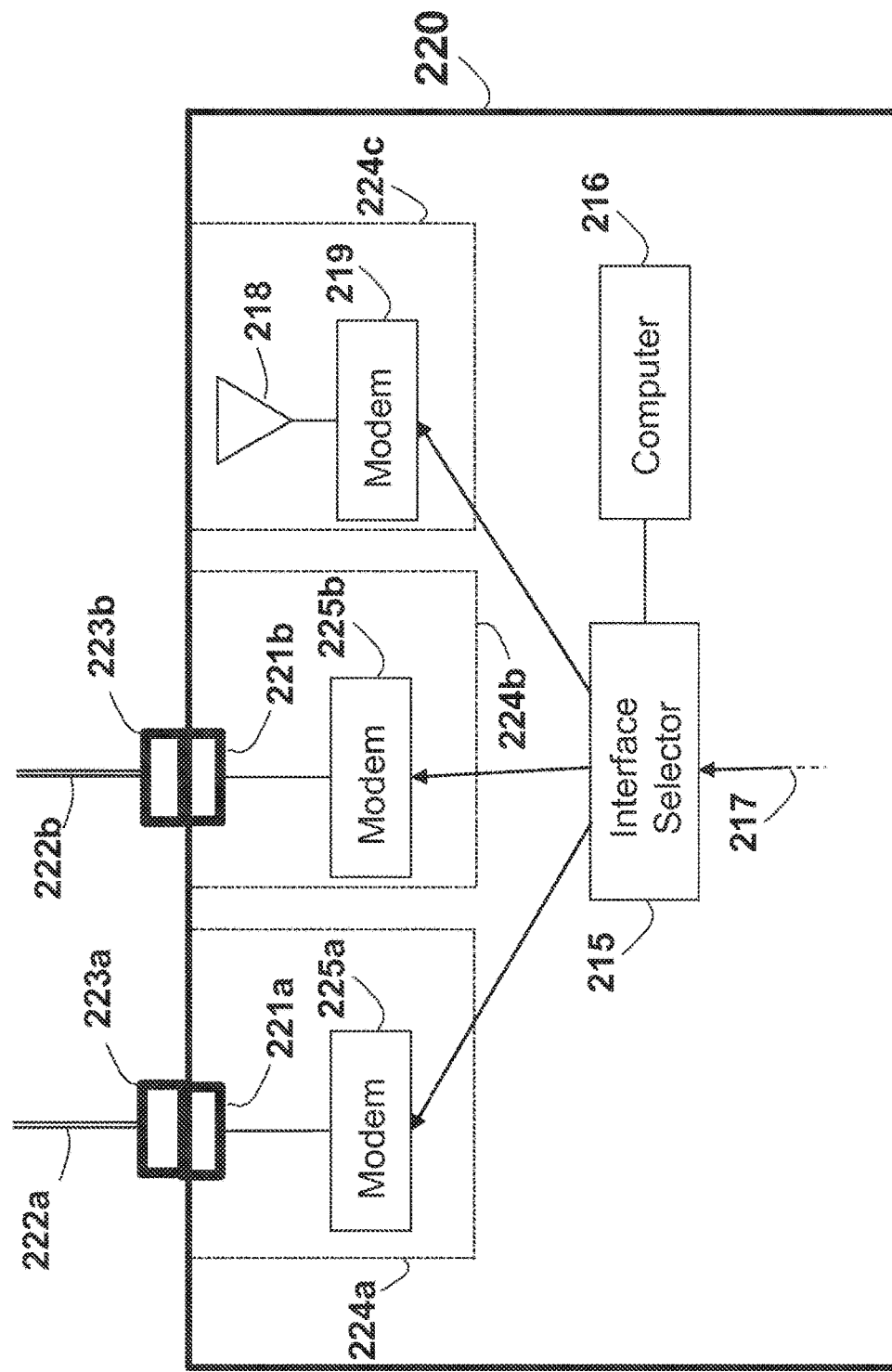
FIG. 22 illustrates a schematic electrical diagram of part of a device having wired and wireless network interfaces.

In one example, some of the networks may be wired (or otherwise conductive) while the other may be wireless (or otherwise using non-conductive propagation). Such example is shown in FIG. 22, where networks 211a and 211b are wired networks, using wiring 222a and 222b respectively, while network 211c is a wireless over-the-air network using radio waves. In such scenario device 220 is used, where the generic network interface 214a is implemented as interface 224a having a wired modem 225a and connector 221a for connecting to the mating connector 223a attached to the wiring 222a Similarly, the generic network interface 214b is implemented as interface 224b having a wired modem 225b and connector 221b for connecting to the mating connector 223b attached to the wiring 222b. The generic network interface 214c is implemented as interface 224c having a wireless modem 219 and an antenna 218f or transmitting to, and receiving from, the wireless network 211c Similarly, all the networks may be wired networks, using different types of medium, such that one or more networks uses a coaxial cable (where the interface includes a coaxial connector and coaxial cable modem), one or more of the other networks are using twisted-pair (where the interface includes a cable connector and twisted-pair modem), while one or more of the other networks are using powerlines, telephone lines or similar, and the interfaces are using the appropriate connectors and modems. Further, all the networks may be wireless networks, using different types of non-conductive medium or different types of propagation technologies. For example, one or more networks uses a Radio Frequency (RF) propagation (where the interface includes an antenna and wireless modem), one or more of the other networks are using light propagation such as over the air or fiber-optic cable (where the interface includes a light emitter and detector and an appropriate modem), while one or more of the other networks are using sound based propagation (where the interface includes a sound emitter such as a speaker and a microphone and an appropriate modem).

Similarly, all the networks may be the same type of geographical scale or coverage networks, such as NFC, PAN, LAN, MAN, or WAN types. Alternatively, multiple types of geographical scales or types may be used, such that one or more networks are PAN, one or more of the other networks are LAN, one or more of the other networks are WAN, and so forth. Similarly, the networks may all use the same type of modulation, such as Amplitude Modulation (AM), a Frequency Modulation (FM), or a Phase Modulation (PM). Alternatively, multiple types of modulations may be used, such that one or more networks use A M, one or more of the other networks use FM, one or more of the other networks use PM, and so forth. Similarly, the same of different line codes may be used among the networks. Further, the networks may all use the same type of duplexing, such as full-duplex, half-duplex or unidirectional. Alternatively, multiple types of modulations may be used, such that one or more networks use full-duplex communication, one or more of the other networks use half-duplex, one or more of the other networks are unidirectional, and so forth. Similarly, the same of different data rates may be used among the networks.

The networks may be circuit-switched based such as the PSTN, where typically two network nodes establish a dedicated communications channel (circuit) through the network before the nodes may communicate with each other. The circuit functions as if the nodes were physically connected as with an electrical circuit and guarantees the full bandwidth of the channel and remains connected for the duration of the communication session. In circuit switching, the bit delay is constant during a connection, as opposed to packet switching, where packet queues may cause varying and potentially indefinitely long packet transfer delays. Virtual circuit switching is a packet switching technology that emulates circuit switching, in the sense that the connection is established before any packets are transferred, and packets are delivered in order. The networks may be based on packet switching based where the data to be transmitted is divided into packets transmitted through the network independently. In packet switching, instead of being dedicated to one communication session at a time, the network links may be shared by packets from multiple competing communication sessions. Similarly, the networks may be a combination of circuit- and packet-based networks.

The networks may be private data networks where the medium or the equipment are owned by a private entity, or where the network is established, operated, or administered by a private administration, or may be public data networks, which were established or are operated for providing services to the public. Similarly, the networks may be a combination of private and public networks.

Figure 22A:
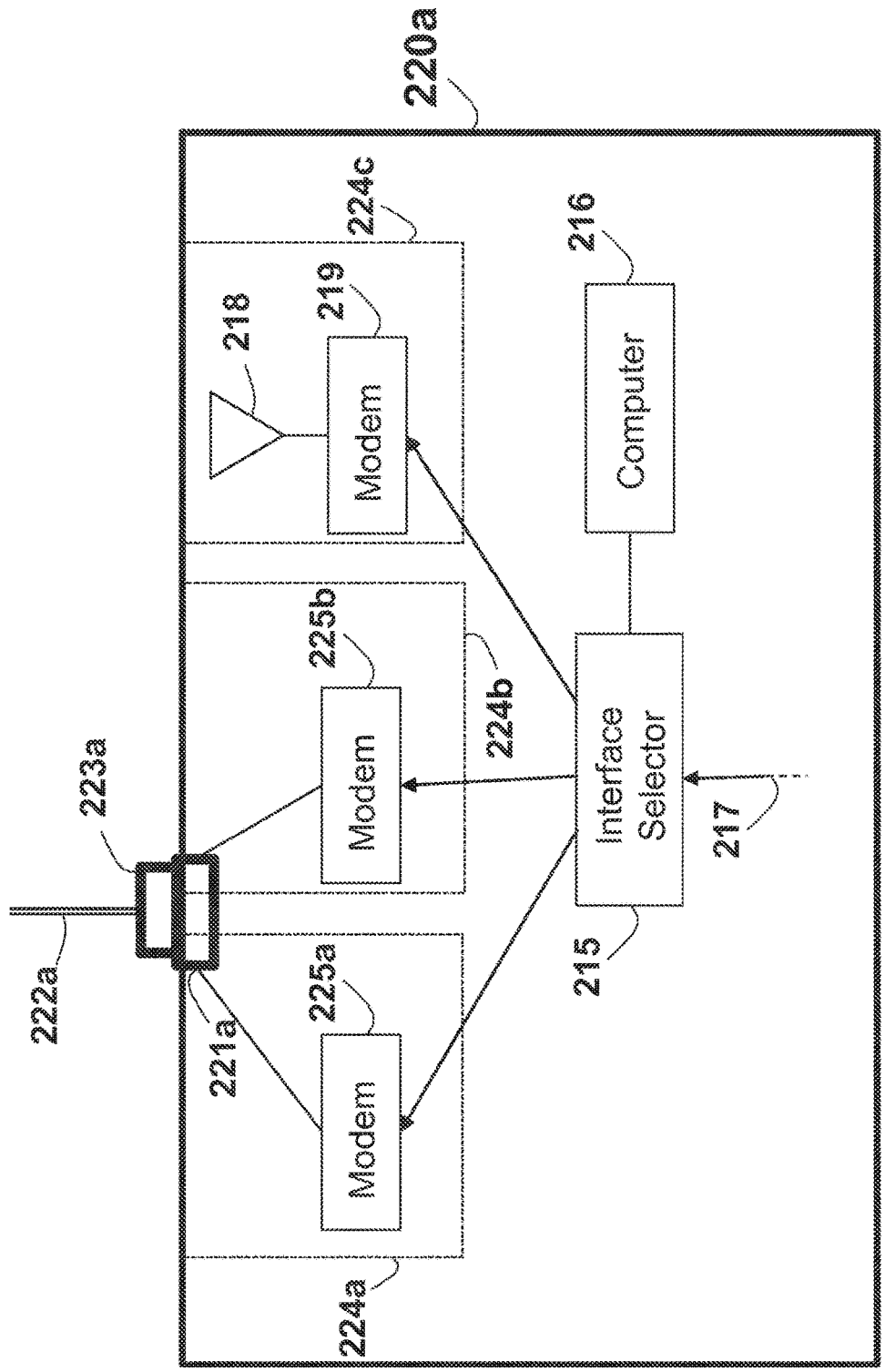
FIG. 22a illustrates a schematic electrical diagram of part of a device having a wireless network interfaces and two wired interfaces connected to the same network.
Figure 22B:
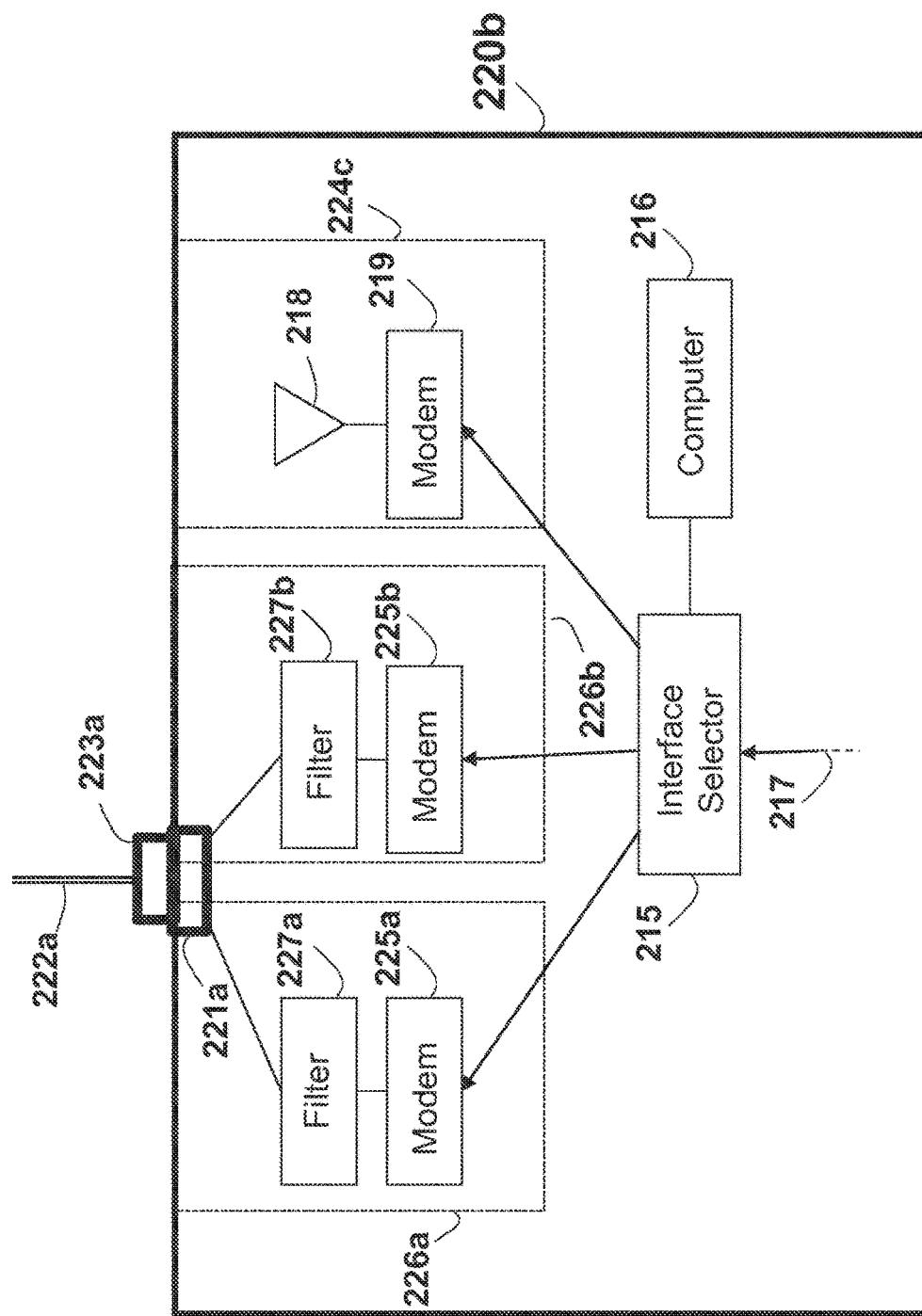
FIG. 22b illustrates a schematic electrical diagram of part of a device having a wireless network interfaces and two wired interfaces connected to the same network using FDM.

In one example, two or more network interfaces 214 communicate to the same network or to same network medium, providing redundancy by having multiple interfaces, which may function as redundant units. Such an example is shown in FIG. 22a as device 220a Both network interfaces 224a and 224b are communicating over the same medium 222a, sharing the connector 221a for connecting to the same medium 222a Both network interfaces may use the wiring 222a serving as the network medium simultaneously using the FDM technique (Frequency Division Multiplexing). In such configuration, the same network medium, such as the wiring 222a is used for carrying two or more distinct communication signals, each using a distinct frequency spectrum band. Such arrangement is shown as device 220b in FIG. 22b, based on device 220a in FIG. 22a. The network interfaces 224a and 224b are replaced with interfaces 226a and 226b, having filters 227a and 227b respectively connected between the respective modem and the shared connector 221a The filters substantially pass part of the available frequency spectrum of the wiring 222a, allowing for concurrent transmission of two communication signals over the same physical medium. Alternatively, distinct modulation or coding may be used in order to carry two or more signals over the same medium. Similarly, a single antenna may be used as a network connection and shared by two more wireless modems, working on the same frequency band, distinct frequency bands, or a combination thereof. An example of sharing two communication signals over the same medium is described in U.S. Patent Application No. 2004/0032902 to Koifman et al., entitled: "Modem Channel Sharing Based on Frequency Division".

Figure 23:
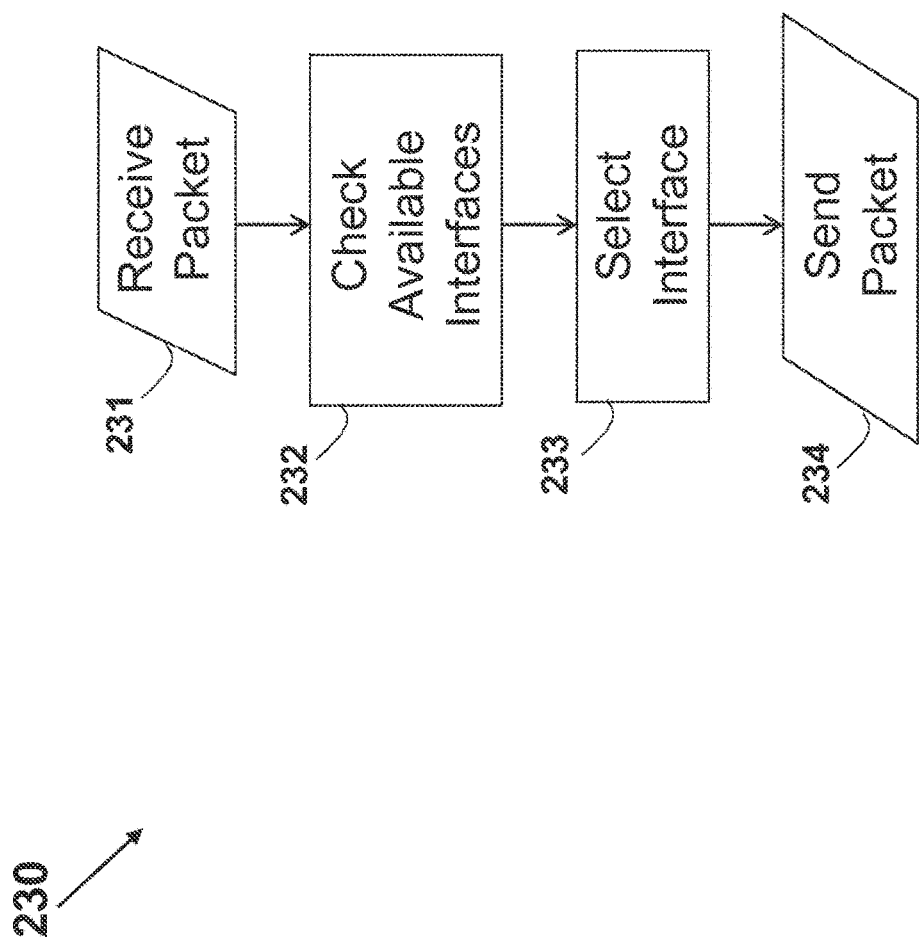
FIG. 23 illustrates a schematic flow-chart diagram of packet handling in a device having multiple network interfaces.

The flow chart 230 shown in FIG. 23 describes the packet handling in a multiple network connection device, such as device 210 shown in FIG. 21. A packet to be sent is received by the interface selector 215 in step 'Receive Packet' 231, for example via port 217. In step 'Check A vailable Interfaces' 232 the interfaces that are available for transmission of the received packet are identified. For example, interfaces may not be available due to network or interface malfunction, or the interface may be busy in transmitting former packet or data. Similarly, in half-duplex connection, an interface may be in the state of receiving information, hence not available for transmission at the time of reception. Next, in 'Select Interface' 233 step, an interface to be used (or multiple interfaces) is selected out of the available interfaces. In step 'Send Packet' 234 the packet is directed and sent to the selected interface for being transmitted over the associated network.

In one example, the device may use a broadcast mechanism, where the packet is sent via all available interfaces, hence obviating the need for the 'Select Interface' 233 step. Similarly, two, three, or any other number of the available interfaces may be used to transmit the same packet. Such mechanism allows for fault tolerant transmission, since even in the case of communication failure of any one of parallel transmitted packet routes, one of the transmitted packets will arrive to the destination, thus enhancing the system reliability. Further, such arrangement allows for lower delay in the transmission, since the fastest communication route among those routes that are used will determine the transfer time. This may prove beneficial especially over the Internet or any other packet-based network, typically where transfer time is not guaranteed and is practically random.

Alternatively or in addition, the packet may be directed to be transmitted over a single network using a single interface. The selection mechanism may be designed for optimizing load balancing over the networks, for providing higher reliability, for reducing costs associated with the networks usage, allowing for higher total throughput and so forth. The selection of the interface to be used in the 'Select Interface'

233 step may use the cyclic assigning mechanism, where all interfaces are treated equally. For example, assuming three interfaces designated as #1, #2, and #3, the first packet will be directed to interface #1, the second packet to interface #2, the third packet to interface #3, the fourth packet again to interface #1, the fifth packet to interface #2, and so forth in a cyclic pattern. In the case one of the interfaces is or becomes unavailable upon its turn, the 'next' interface is selected. In the case of two interfaces, the arriving packets to be sent are alternated between them. In the case when the interfaces have the same or similar data-rate capability, the selection mechanism is thus similar to, or the same as, common Time-Division Multiplexing (TDM) scheme, and the interface selector 215 effectively serves as a time-division multiplexer. The data-rate provided by the multiple network connections are thus aggregated to provide increased throughput.

In another alternative or in addition, the interface is randomly selected in the 'Select Interface' 233 step, allowing for "fair' and evenly distributed workload over the available network and interfaces. The randomness may be based on a random number generated by a random number generator. The random number generator may be based on a physical process (such as thermal noise, shot noise, nuclear decaying radiation, photoelectric effect or other quantum phenomena), or on an algorithm for generating pseudo-random numbers.

Further alternatively or in addition, a priority may be assigned to each network interface. During operation in 'Select Interface' 233 step, the highest priority interface is assigned to the outgoing packet. In case that this highest priority interface is busy or otherwise unavailable, the second highest priority is used. The third priority interface will be used only in the case where the highest priority and the second in line interfaces are busy or otherwise unavailable. The priorities may be pre-set, fixed or adaptive and changing in time.

The selection of the interface to be used, or the priorities assigned to the network interfaces, may be based on the available networks attributes or their history. For example, based on the costs associated with the usage of a network, the higher cost network may have lower priority and less used than lower cost or free network. In another example, a high quality network, such as having a higher available bandwidth or throughput, lower communication errors or packet loss, lower hops to destination, or lower transfer delay time, is having higher priority that a lower quality network. The system may use Bit Error Rate (BER), Received Signal Strength Indicator (RSSI), Packet Loss Ratio (PLR), Cyclic Redundancy Check (CRC) and other indicators or measures associated with the communication channel associated with a network interface, and may be based on, use, or include the methodology and schemes described in RFC 2544 entitled: "Benchmarking Methodology for Network Interconnect Devices", and ITU-T Y.1564 entitled: "Ethernet Service Activation Test Methodology", which are both incorporated in their entirety for all purposes as if fully set forth herein. The network quality grade may be affected by the history of using such a network, for example in a pre-set period before the network interface selection process. In one example, the network interface where the last proper packet was received from may be selected as the interface to be used for the next packet to be transmitted. The system may further use, or be based on, the schemes and technologies described in U.S. Pat. No. 7,027,418 to Gan et al. entitled: "Approach for Selecting Communications Channels Based on Performance", which is incorporated in its entirety for all purposes as if fully set forth herein.

The selection of the interface to be used, or the priorities assigned to the network interfaces, may be based on the attributes of the packet to be sent. In one example, the selection scheme is based on the packet destination address, where the device assigns an outgoing interface according the destination address in the packet, which may be a MAC or IP (such as IPv4 or IPV6) address, based on routing tables. The routing tables may be fixed, or may change in time. The routing tables may be dynamically updated based on the interface from which a packet from the destination arrived in an earlier communication, similar to a common LAN switching, as described for example in U.S. Pat. No. 5,274,631 to Bhardwaj, entitled: "Computer Network Switching System", which is incorporated in its entirety for all purposes as if fully set forth herein.

Alternatively or in addition, the selection of the interface to be used, or the priorities assigned to the network interfaces, may be based on the information source or on the source address. The device may hold fixed or dynamic routing tables associating the various sources of information to the available network interfaces, such that when a packet is received, the data source is analyzed, and upon the stored routing table information, the packet is routed to the associated network interface. For example, a field unit may include, or may be connected to, four sensors designated as sensors #1, #2, #3, and #4, and may include three network interfaces, designated as #1, #2, and #3. The routing table may associate sensors #1 and #3 to interface #2, sensor #2 to interface #3, and sensor #4 to interface #1. Alternatively or in addition, the selection of the interface to be used, or the priorities assigned to the network interfaces, may be based on the type of information carried in the packet. For example, few types of information may be defined in the system, designated as types #1, #2, #3, and #4. For example, information type #1 may be associated with general management data, information type #2 may be associated with real time or time-sensitive information, information type #4 may be associated with images, and information type #4 may be associated with all other information types. The device may hold fixed or dynamic routing tables associating the various types of information to the available network interfaces, such that when a packet is received, the data type is analyzed, and upon the stored routing table information, the packet is routed to the associated network interface.

Each of the devices in the system, such as the router (such as router 40 in FIG. 4 or router 21 in FIG. 5h), the field unit (such as any of field units 23), or the control server (such as server 24), may be addressed in a digital data network. The address may be a digital address (typically a number) for uniquely identifying the device in one of the in-building (or in-vehicle) networks such as one of the control networks 22 or one of the home networks 14, in the external network such as one of the WANs 46, or in the Internet 16 The address may be stored in a volatile or non-volatile memory in the addressable device. A device address may be global and recognized and used throughout the system, or may be used in a one or more networks, such as the networks coupled to the device and over which the device may communicate. In one example, the address may be used for identification in the network to which the device is coupled. Alternatively or in addition, the same address may be used for two or all the networks in the system. The address may be associated with the Media Access Control (MAC) layer of the OSI reference model (or layer 2), such as MAC-48, Extended Unique Identifier (EUI)-48, or EUI-64 addresses typically assigned by the Institute of Electrical and Electronics Engineers (IEEE) and described in the IEEE 802 standard, commonly used in Ethernet, 802.11 wireless networks, Bluetooth, IEEE 802.5 token ring, FDDI, and ITU-T G.hn. The address may be or locally administered addresses universally administered addresses, where the address is uniquely assigned to a device by its manufacturer. The MAC address may be a permanent and globally unique hardware-based identification, commonly stored in a non-volatile memory in the device and programmed during manufacturing, however it may be possible to change the MAC address on modern hardware. Changing MAC addresses (known as MAC spoofing) may be used in network virtualization or in the process of exploiting security vulnerabilities.

Alternatively or in addition, a device may be addressable using a layer 3 addressing, such as IP address, which may be an IPV4 or IPV6 address, commonly software-based and assigned by the Internet Assigned Numbers Authority (IANA). The IP address may be permanently by fixed configuration of its hardware or software such as static IP address, typically manually assigned to a device by a human administrator. Alternatively or in addition, dynamic IP address may be used, where new address may be assigned either autonomously by a software in the device, or by another device via a communication interface (at the time or power-up or booting), such as an address assigned by a server or other device using Dynamic Host Configuration Protocol (DHCP). For example, the addresses of the field units may be assigned by the router, the in-building (or in-vehicle) computer 18, or by the control server. Similarly, the address of the router may be assigned by the router or by the control server or by the in-building (or in-vehicle) computer 18.

A device may be associated with multiple addresses. For example, a device may be addressed using multiple addresses, each relating to a different layer of the OSI model, such as a device having both a MAC and IP addresses. Alternatively or in addition, a device that may communicate directly or indirectly via few networks, may have a different addresses, each related and used in one of the networks. For example, in the case a device may communicate over multiple networks via different interfaces, a distinct address may be associated with each network interface. For example, the router 21 is shown in FIG. 16 enabled for communicating over control network 22 via interface 146a, over the control network 22a via interface 146b, over the home network 14a via interface 146c, and over the Internet 16 In such a case, the router may be addressable by four different addresses, each associated with a distinct interface connected to a distinct network. Similarly, the device 210 is shown in FIG. 21 to communicate over networks 211a, 211b, and 211c via the respective network interfaces 214a, 214b, and 214c, and may thus be associated with three different addresses each relating to a respective network interface 214 The network addresses may be an alternative or an addition to the address or addresses associated with the device itself.

In one example, the sensors and actuators are individually addressed in the system. The field unit 60h shown in FIG. 6g includes two actuators 61a and 61b. An address may be associated by each actuator 61, and packets carrying commands to these actuators may be routed to the specific actuator identified by its address. These two actuator addresses may be in addition to two addresses associated with the network interfaces including the modems 54 and 64 of the field unit 60h Similarly, each sensor in the system may be individually addressed, such as individually assigned addresses to sensors 51a and 51b shown as part of the field unit 50g in FIG. 5g. Any packet transmitted from the field unit 50g carrying a sensor data, may include the specific sensor address as its identifier as the data source. These two sensor addresses may be in addition to two addresses associated with the network interfaces including the modems 54 and 64 of the field unit 50g In the case the sensor or the actuator is external to the field unit and connected thereto, the port or connection to the sensor or actuator will be associated with the individual address. Similarly, other components, interfaces, or ports of the devices in the system may be individually addressable, as an alternative or in addition to the other device address or addresses, and thus may serve as the destination or source addresses in the packets routed in the system. The sensors or actuators addresses, or the related connections or ports, may be uniquely assigned to during manufacturing, or may be assigned by the associated field unit, or a device communicating with the associated field unit.

Figure 24:
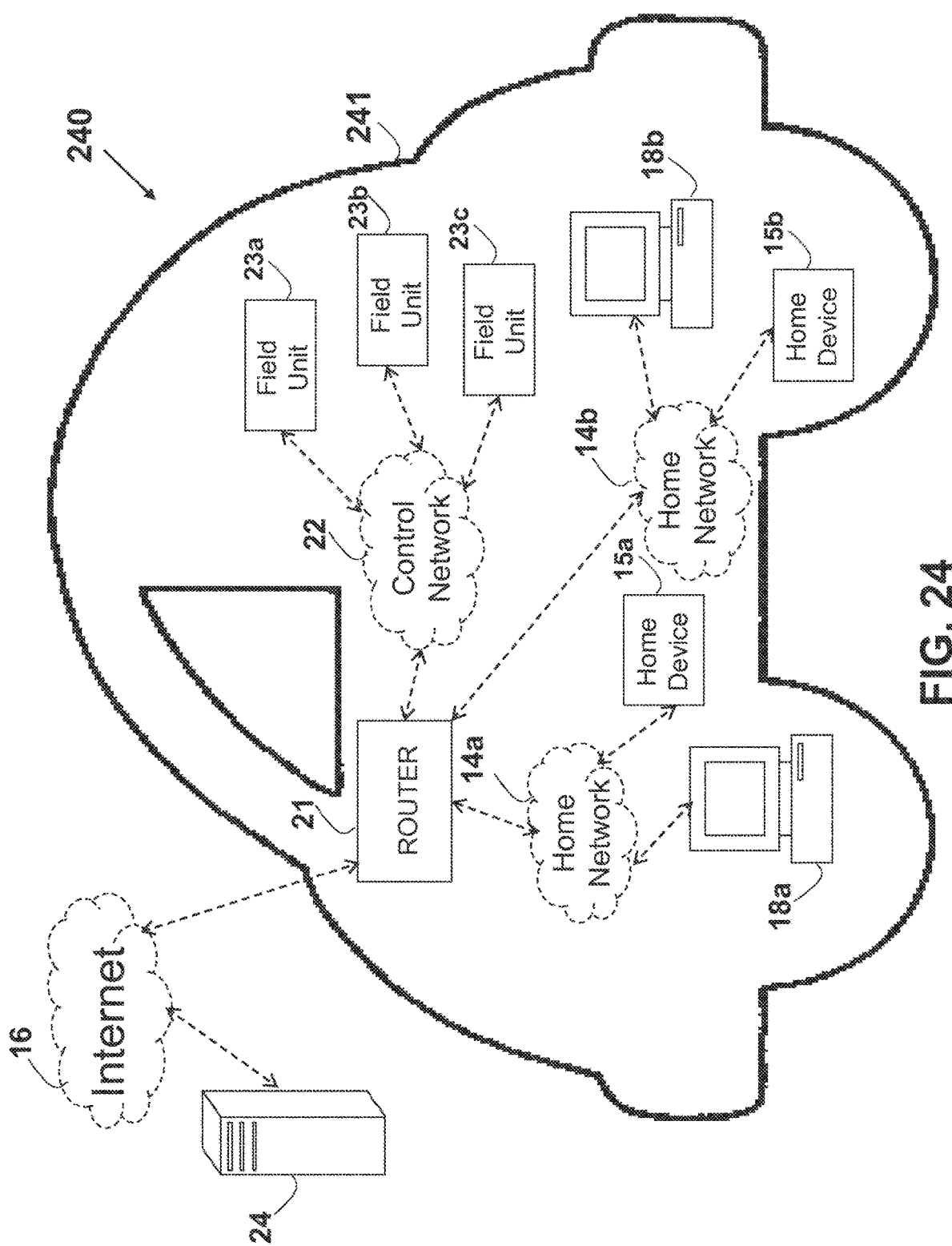
FIG. 24 illustrates a schematic electrical diagram of a vehicle-based system communicating with a cloud based gateway.

While exampled above regarding a residential environment, in-building networks, and communication between in-building devices to devices external to the building, the system may equally apply to vehicular environment, such as in-vehicle communication, vehicle-to-vehicle (sometimes referred to as V2V) designed for automobiles to communicate to each other, and communication between the vehicle to stationary devices external to the vehicle such as communication with or via roadside units. A vehicle is typically a mobile unit designed or used to transport passengers or cargo between locations, such as bicycles, cars, motorcycles, trains, ships, aircrafts, boats, and spacecrafts. In such environment, one (or more) of the buildings 19 above is substituted by a vehicle, as schematically shown as arrangement 240 shown in FIG. 24, where a car shape 241 is replacing the building 19 in the arrangement 20 of FIG. 2 above. Similarly, the building external computer or server 24 may be substituted with a roadside computer or server, or any intermediary device for connecting to a server or computer. The in-building networks 22 and 14 above may be substituted with in-vehicle networks, and the computers 18 may similarly be replaced with in-vehicle computers. The vehicle may be travelling on land, over or in liquid such as water, or may be airborne. The sensors may be used to sense a phenomenon in the vehicle, external to the vehicle, or in the surroundings around the vehicle. The actuators may affect the vehicle itself, such as the vehicle speed, path or direction, or may affect phenomenon external to the vehicle or in the surroundings around the vehicle.

The vehicle may be a land vehicle typically moving on the ground, using wheels, tracks, rails, or skies. The vehicle may be locomotion-based where the vehicle is towed by another vehicle or an animal. Propellers (as well as screws, fans, nozzles, or rotors) are used to move on or through a fluid or air, such as in watercrafts and aircrafts. The system described herein may be used to control, monitor or otherwise be part of, or communicate with, the vehicle motion system. Similarly, the system described herein may be used to control, monitor or otherwise be part of, or communicate with, the vehicle steering system. Commonly, wheeled vehicles steer by angling their front or rear (or both) wheels, while ships, boats, submarines, dirigibles, airplanes and other vehicles moving in or on fluid or air usually have a rudder for steering. The vehicle may be an automobile, defined as a wheeled passenger vehicle that carries its own motor, and primarily designed to run on roads, and have seating for one to six people. Typically automobiles have four wheels, and are constructed to principally transport of people.

Human power may be used as a source of energy for the vehicle, such as in non-motorized bicycles. Further, energy may be extracted from the surrounding environment, such as solar powered car or aircraft, a street car, as well as by sailboats and land yachts using the wind energy. Alternatively or in addition, the vehicle may include energy storage, and the energy is converted to generate the vehicle motion. A common type of energy source is a fuel, and external or internal combustion engines are used to burn the fuel (such as gasoline, diesel, or ethanol) and create a pressure that is converted to a motion. Another common medium for storing energy are batteries or fuel cells, which store chemical energy used to power an electric motor, such as in motor vehicles, electric bicycles, electric scooters, small boats, subways, trains, trolleybuses, and trams. The system described herein may be used to control, monitor or otherwise be part of, or communicate with, the vehicle energy storage and conversion system. In automobiles and other vehicles, the system may be used for control, monitoring, or be part of, the Engine Control Unit (ECU), Transmission Control Unit (TCU), Anti-Lock Braking System (ABS), or Body Control Modules (BCM).

The system may employ vehicular communication systems, where vehicles may communicate and exchange information with other vehicles and with roadside units may allow for cooperation and may be effective in increasing safety such as sharing safety information, safety warnings, as well as traffic information, such as to avoid traffic congestion. In safety applications, vehicles that discover an imminent danger or obstacle in the road may inform other vehicles directly, via other vehicles serving as repeaters, or via roadside units. Further, the system may help in deciding right to pass first at intersections, and may provide alerts or warning about entering intersections, departing highways, discovery of obstacles, and lane change warnings, as well as reporting accidents and other activities in the road. The system may be used for traffic management, allowing for easy and optimal traffic flow control, in particular in the case of specific situations such as hot pursuits and bad weather. The traffic management may be in the form of variable speed limits, adaptable traffic lights, traffic intersection control, and accommodating emergency vehicles such as ambulances, fire trucks and police cars.

The vehicular communication systems may further be used to assist the drivers, such as helping with parking a vehicle, cruise control, lane keeping, and road sign recognition. Similarly, better policing and enforcement may be obtained by using the system for surveillance, speed limit warning, restricted entries, and pull-over commands. The system may be integrated with pricing and payment systems such as toll collection, pricing management, and parking payments. The system may further be used for navigation and route optimization, as well as providing travel-related information such as maps, business location, gas stations, and car service locations. Similarly, the system may be used for emergency warning system for vehicles, cooperative adaptive cruise control, cooperative forward collision warning, intersection collision avoidance, approaching emergency vehicle warning (Blue Waves), vehicle safety inspection, transit or emergency vehicle signal priority, electronic parking payments, commercial vehicle clearance and safety inspections, in-vehicle signing, rollover warning, probe data collection, highway-rail intersection warning, and electronic toll collection.

The in-vehicle internal networks that interconnect the various devices and components inside the vehicle may use any of the technologies and protocols described herein. Alternatively or in addition, a vehicle specialized networking may be used, sometimes referred to as 'vehicle buses'. Common protocols used by vehicle buses include a Control Area Network (CAN) and Local Interconnect Network (LIN). The CAN is described in the Texas Instrument Application Report No. SLOA 101A entitled: "Introduction to the Controller Area Network (CAN)", and may be based on, or according to, ISO 11898 standards, ISO 11992-1 standard, SAE J 1939 or SAE J 2411 standards, which are all incorporated in their entirety for all purposes as if fully set forth herein. The LIN communication may be based on, or according to, ISO 9141, and is described in "LIN Specification Package-Revision 2.2A" by the LIN Consortium, which are all incorporated in their entirety for all purposes as if fully set forth herein. In one example, the DC power lines in the vehicle may also be used as the communication medium, as described for example in U.S. Pat. No. 7,010, 050 to Maryanka, entitled: "Signaling over Noisy Channels", which is incorporated in its entirety for all purposes as if fully set forth herein.

The system may be integrated or communicating with, or connected to, the vehicle self-diagnostics and reporting capability, commonly referred to as On-Board Diagnostics (OBD), to a Malfunction Indicator Light (MIL), or to any other vehicle network, sensors, or actuators that may provide the vehicle owner or a repair technician access to health or state information of the various vehicle sub-systems and to the various computers in the vehicle. Common OBD systems, such as the OBD-II and the EOBD (European On-Board Diagnostics), employ a diagnostic connector, allowing for access to a list of vehicle parameters, commonly including Diagnostic Trouble Codes (DTCs) and Parameters IDentification numbers (PIDs). The OBD-II is described in the presentation entitled: "Introduction to On Board Diagnostics (II)" downloaded on 11/2012 from: http://groups.engin.umd.umich.edu/vi/w2_workshops/ OBD_ganesan_w2.pdf, which is incorporated in its entirety for all purposes as if fully set forth herein. The diagnostic connector commonly includes pins that provide power for the scan tool from the vehicle battery, thus eliminating the need to connect a scan tool to a power source separately. The status and faults of the various sub-systems accessed via the diagnostic connector may include fuel and air metering, ignition system, misfire, auxiliary emission control, vehicle speed and idle control, transmission, and the on-board computer. The diagnostics system may provides access and information about the fuel level, relative throttle position, ambient air temperature, accelerator pedal position, air flow rate, fuel type, oxygen level, fuel rail pressure, engine oil temperature, fuel injection timing, engine torque, engine coolant temperature, intake air temperature, exhaust gas temperature, fuel pressure, injection pressure, turbocharger pressure, boost pressure, exhaust pressure, exhaust gas temperature, engine run time, NOx sensor, manifold surface temperature, and the Vehicle Identification Number (VIN). The OBD-II specifications defines the interface and the physical diagnostic connector to be according to the Society of Automotive Engineers (SA E) J 1962 standard, the protocol may use SAE J 1850 and may be based on SAE J 1939 Surface Vehicle Recommended Practice entitled: "Recommended Practice for a Serial Control and Communication Vehicle Network" or SAE J 1939-01 Surface Vehicle Standard entitled: "Recommended Practice for Control and Communication Network for On-Highway Equipment", and the PIDs are defined in SA E International Surface Vehicle Standard J 1979 entitled: "E/E Diagnostic Test M odes", which are all incorporated in their entirety for all purposes as if fully set forth herein. Vehicle diagnostics systems are also described in the International Organization for Standardization (ISO) 9141 standard entitled: "Road vehicles-Diagnostic systems.", and the ISO 15765 standard entitled: "Road vehicles-Diagnostics on Controller Area Networks (CAN)", which are all incorporated in their entirety for all purposes as if fully set forth herein.

The physical layer of the in-vehicle network may be based on, or according to, J 1939-11 Surface Vehicle Recommended Practice entitled: "Physical Layer, 250K bits/s, Twisted Shielded Pair" or J 1939-15 Surface Vehicle Recommended Practice entitled: "Reduced Physical Layer, 250K bits/s, Un-Shielded Twisted Pair (UTP)", the data link may be based on, or according to, J 1939-21 Surface Vehicle Recommended Practice entitled: "Data Link Layer", the network layer may be based on, or according to, J 1939-31 Surface Vehicle Recommended Practice entitled: "Network Layer", the network management may be based on, or according to, J 1939-81 Surface Vehicle Recommended Practice entitled: "Network Management", and the application layer may be based on, or according to, J 1939-71 Surface Vehicle Recommended Practice entitled: "Vehicle Application Layer (through December 2004)", J 1939-73 Surface Vehicle Recommended Practice entitled: "Application Layer-Diagnostics", J 1939-74 Surface Vehicle Recommended Practice entitled: "Application-Configurable Messaging", or J 1939-75 Surface Vehicle Recommended Practice entitled: "Application Layer-Generator Sets and Industrial", which are all incorporated in their entirety for all purposes as if fully set forth herein.

In one example, the router or a field unit is connected to, or communicating with, a diagnostic system (such as OB D-II) in a vehicle. Such communication may use OZEN Electronik EDBO/OBDII to RS-232 gateway P/N-OE 90C 4000, described in the data sheet "EDBO/OBDII to RS-232 gateway P/N-OE90C4000" by OZEN Electronik, which is incorporated in its entirety for all purposes as if fully set forth herein.

For example, the router or the field unit may connect to the diagnostic connector for accessing the various sensors or actuators coupled to the connector, or for accessing information available via the connector. Further, the router or the field unit may be powered in part or in whole from the power available at the diagnostics connector, and may communicate over (or be part of) the diagnostics network in the vehicle.

Figure 25:
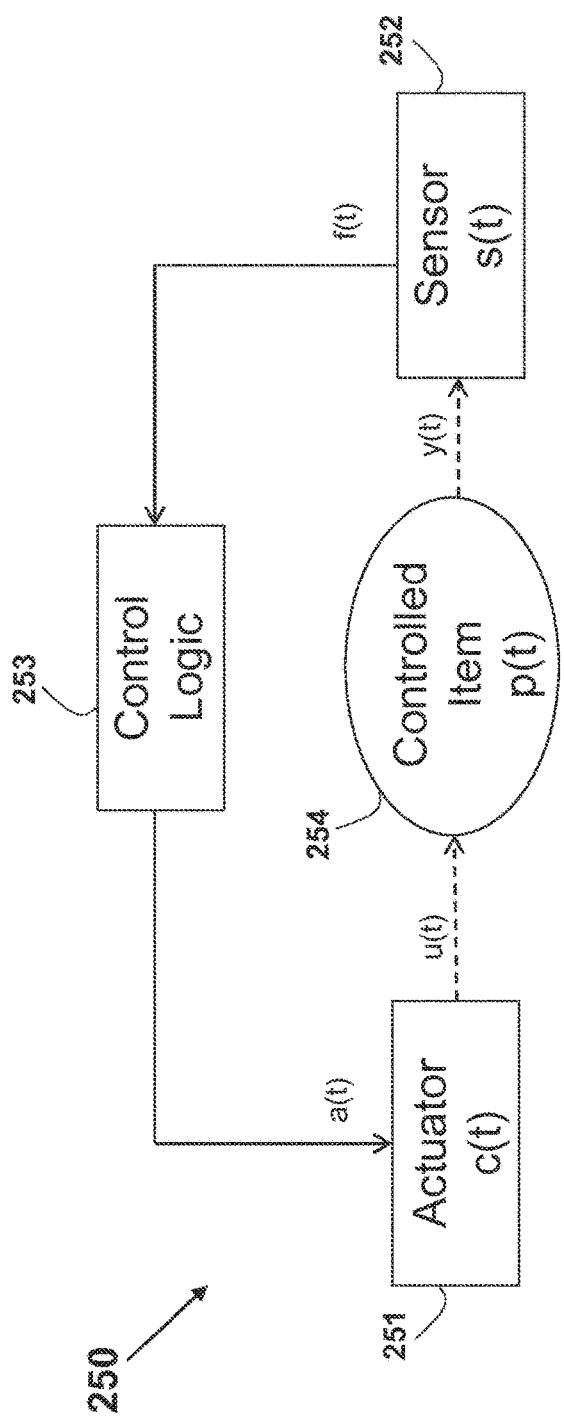
FIG. 25 illustrates a schematic block diagram of a control system.

The system may be used to measure, sense, or analyze the changes over time of a controlled item 254, and may use the arrangement 250 shown in FIG. 25. The controlled item may be an environment, a phenomenon, or any controlled item. The actuator 251, which corresponds to any actuator described herein, receives actuator command a (t) from the control logic 253 (preferably as an electrical signal), and in response to the actuator 251 characteristic c (t) impacts the controlled item 254 by an output u (t). The control logic 253 corresponds to, is based on, includes, or is part of, the logic 173 or any other control process described herein. The change in the controlled item 254 is measured by the sensor 252 as input y (t), which is impacted by the controlled item 254 transfer function p (t). The sensor 252 converts the sensed phenomenon y (t), and converts it to a signal f (t) using the sensor transfer function s (t). The signal (preferably an electrical signal) f (t) is sent to the control logic 253. Assuming the elements are linear and time-invariant, then the system can be analyzed using Laplace transform, where A(s), C(s), U(s), P(s), Y(s), S(s), and F(s) are the respective transformed representations of a (t), c (t), u (t), p (t), y (t), s (t), and f (t) respectively, and where $U(s)=A(s)*C(s)$, $Y(s)=U(s)*P(s)$, and $F(s)=Y(s)*S(s)$. In one example, the controlled item 254 is a temperature in a room, the actuator 251 is a heater for heating the room, and the sensor 252 is a temperature sensor measuring the temperature of the room, and the room temperature may be controlled in an open or closed loop by the control logic 253, for example in order to achieve a pre-set temperature in the room.

By generating or excitation of an actuator command and measuring the resulting sensor output, the control logic 253 or the system in general may measure, sense, estimate, or analyze the behavior or characteristic p(t) of the controlled item 254 Since $P(s)=Y(s)/U(s)=F(s)/[S(s)*A(s)*C(s)]$, and since C(s) and S(s) are known as the transfer function of the actuator 251 and the sensor 252 respectively, and since A(s) is the activation or excitation signal and F(s) is the signal received from the actuator, P(s) can be calculated. The value of, or any change in P(s) over time, or any conditioning or manipulating of the calculated P(s) may be used as a sensor data in the system, and thus may be part of the system control logic. Such calculation may be used to sense or measure a phenomenon that is not directly measured or sensed by using a corresponding sensor. For example, the calculation may be used as a sensor data for other control loops in the system, for setpoint adjustment of other control loop, or used for user notification. The control logic may initiate such measurement cycle periodically, upon power up, upon the user control (for example via a user device), or as part of a regular control.

Figure 26:
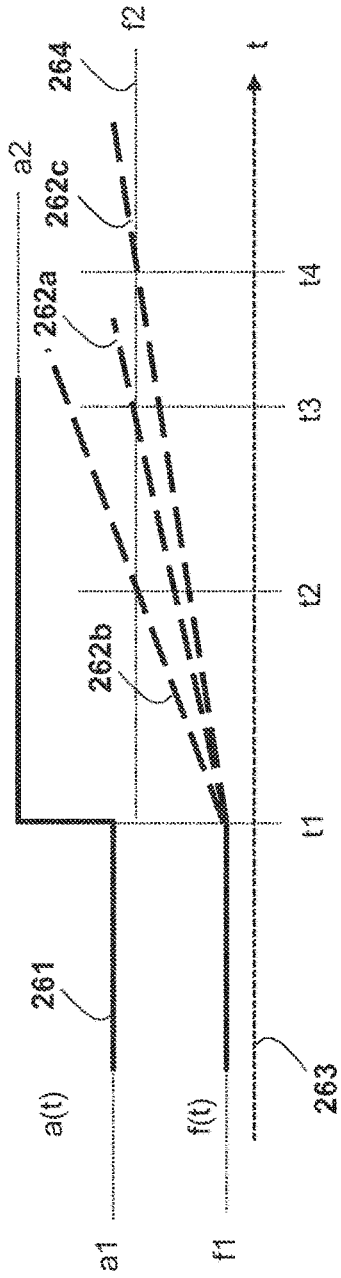
FIG. 26 illustrates a timing diagram of a closed loop control system.
Figure 25A:
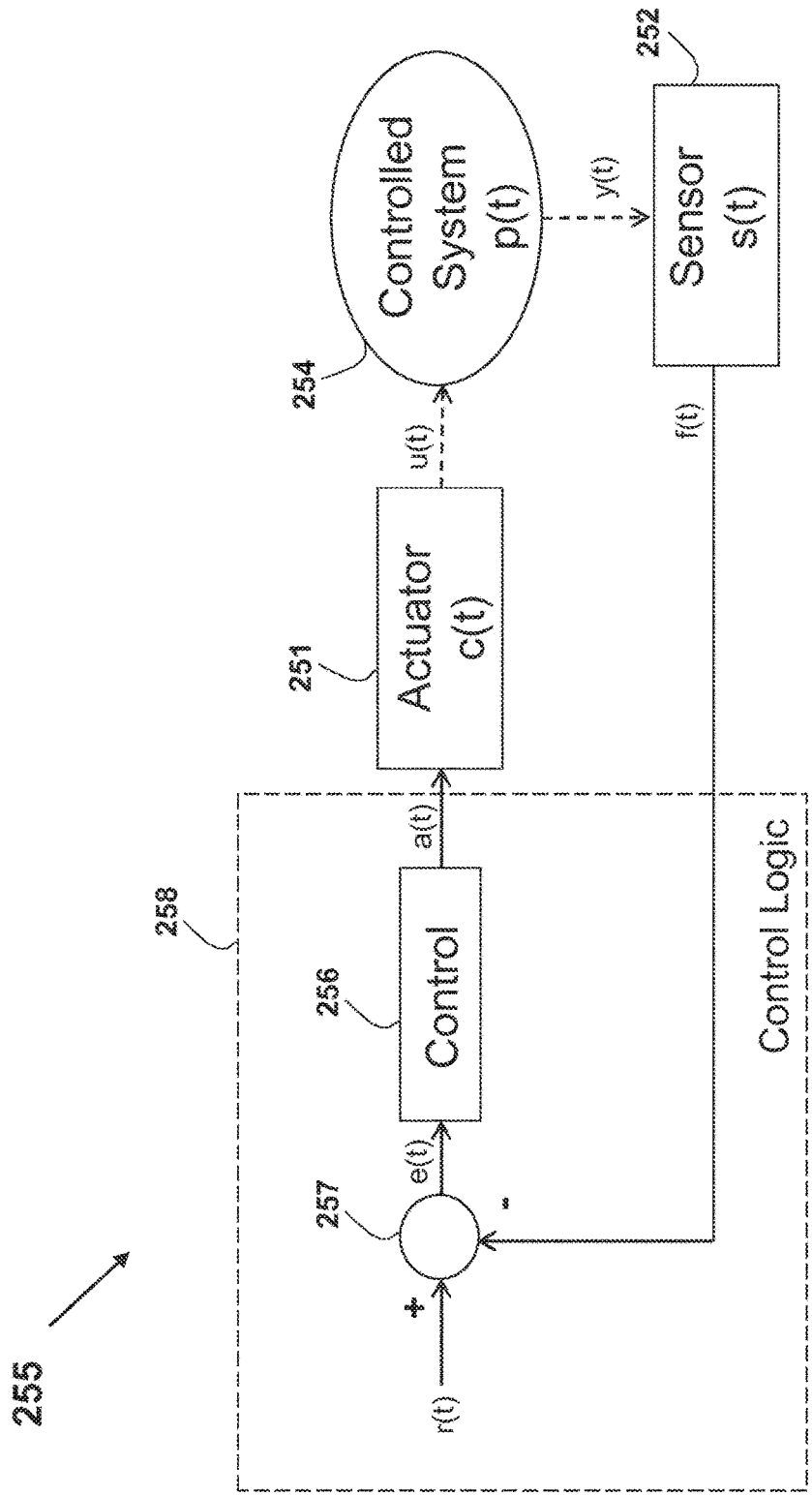
FIG. 25a illustrates a schematic block diagram of a closed loop control system.

In one example, the controlled item 254 is a temperature in a room, the actuator 251 is a heater for heating the room, and the sensor 252 is a temperature sensor measuring the temperature of the room. The chart 260 in FIG. 26 shows the heater command a(t) in graph 261, and graphs 262 shows the temperature sensor output f(t), along the time axis 263. Before time point t1, the system is in a steady state, where the heater level of heating is a1 and the temperature measured is f1. For example, a1 may be zero (no heating), and the temperature f1 is corresponding to 20° C., which may be the environment temperature. At time point t1, the heater is activated (or the heating level increases) to constant level a2. As a response, the room temperature, as measured by the temperature sensor, will start to rise, as shown in graph 262a The rate of rising is dependent upon the room isolation, other heat sources in the room, the room size and volume, and other parameters. For example, in the case the room isolation is affected by an open door or open window, the temperature rise may be at a lower rate, such as shown in graph 262c. Similarly, in the case a human enters the room (acting as a heat source), electrical equipment is turned on and dissipates heat, or the isolation is improved by closing a door, the rate of the temperature rise may be higher, such as in graph 262b. Hence, by analyzing the temperature change in the room versus the heater command, the room environment may be sensed, for example for sensing if the room door is open or closed, or serve as an occupancy sensor that a human is in the room, as a substitute (or in addition) to a direct and dedicated door or occupancy sensor. A simple analysis may include time measuring, such as checking the room measured temperature versus a threshold f2 264 In the case the door is half closed, the room temperature will rise according to graph 262a, crossing the threshold f2 occurs at time point t3. In the case the door is fully closed thus providing better isolation, the room temperature will rise according to graph 262b, crossing the threshold f2 occurs at time point t2, and in the case the door is open thus providing poor isolation, the room temperature will rise according to graph 262c, crossing the threshold f2 occurs at time point t4. The period measured from the heater excitation t1 to the various threshold f2 crossing points (such as t2-t1, t3-t1, and t4-t1) may serve as an indicator or sensor to the door status. The arrangement 255 shown in FIG. 25a is a common closed loop control, where the control logic 258 (corresponding to the control logic 253) includes a reference input r (t), a substractor 257, and a control block 256, which may for example be a PID unit for forming a PID closed loop. Similar to the above scenario, the p (t) may be estimated by measuring f (t) versus the excitation a (t). In one example, such a loop uses a bang-bang control, where the heater has a fixed single heating state, generating a set heat. Assuming that in order to keep a pre-set temperature in a room (e.g. 20° C.) the heater is operating, and the loop causes a duty cycle of the heater operation to be 50%. In the case the control loop raises the duty-cycle to 70% (with the same set point) it may indicate an open door or a human leaving the room. Similarly, in the case the control loop lowers the duty-cycle to 30% (with the same set point) it may indicate close door or a human entering the room.

To allow communications between devices, a computing or networking device preferably includes a network interface or an adapter, such as communication interface 141 or interface 214. While the preferred embodiment contemplates that communications will be exchanged primarily via Ethernet, Internet or a broadband network, other means of exchanging communications are also contemplated. For example, a wireless access interface that receives and processes information exchanged via a wireless communications medium, such as, cellular communication technology, satellite communication technology, Bluetooth technology, WAP (Wireless Access Point) technology, or similar means of wireless communication can be utilized by the general purpose computing devices. Such an interface commonly includes a connector for wired or conductive medium, an antenna for over-the-air radio-frequency based communication and fiber-optic connector for fiber-optic cable based medium. A transceiver (transmitter/receiver set) is coupled to the connector or antenna, for transmitting to, and receiving from, the communication medium. A transmitter may be capable of operating at serial bit rates above 1 Gigabit/second, and a wired transmitter commonly uses differential signaling and low voltages for faster switching, such as MOS Current Mode Logic (MCML) based technology. The transmitter may use pre-emphasis or de-emphasis to shape the transmitted signal to compensate for expected losses and distortion. The line-code may employ self-clocking and other encoding schemes, and control information is transmitted along with the data for error detection, alignment, clock correction, and channel bonding. Some popular encoding schemes are 8B/10B, 64B/66B, and 64B/67B. A receiver is commonly designed to mate with the corresponding transmitter and to recover the data and clock from the received signals, and commonly use equalization, and may further include impedance matching termination. Phase Locked Loops (PLLs) are commonly used for clock reconstruction and for achieving a serial clock that is an exact multiple of the parallel data. The receiver commonly decodes the received signal, and detects encoding-based errors. The byte boundaries and other alignment schemes may also be performed by the receivers. A transceiver may include a modem (Modulator-DEModulator), that modulates an analog carrier signal to encode digital information, and also demodulates such a carrier signal to decode the transmitted information, typically in order to produce a signal that can be transmitted easily over a communication medium and be decoded to reproduce the original digital data.

Any networking protocol may be utilized for exchanging information between the nodes in the network (e.g., field units, router or gateway, a PC) within the network (such as the Internet). For example, it is contemplated that communications can be performed using TCP/IP. Generally, HTTP and HTTPS are utilized on top of TCP/IP as the message transport envelope. These two protocols are able to deal with firewall technology better than other message management techniques. However, partners may choose to use a message-queuing system instead of HTTP and HTTPS if greater communications reliability is needed. A non-limiting example of a message queuing system is IBM 's M Q-Series or the Microsoft Message Queue (MSMQ). The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies.

The system may provide improved agility by allowing rapidly and inexpensively to provision infrastructure resources such as resources available at the remote control server, and may further provide easy accessibility to software in the control server, in the router, or in the field unit using Application Programming Interface (API). Using a cloud-based control server or using the system above may allow for reduced capital or operational expenditures. The users may further access the system using a web browser regardless of their location or what device they are using, and the virtualization technology allows servers and storage devices to be shared and utilization be increased.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

The control server 24 or 48 hardware, software, or functionality may be installed, operated, maintained, supported, or hosted by a business entity. The business entity may license or otherwise monetize the functionality as a service, similar to any SaaS business model. The service may be provided as a one-time, upfront fee paid license, or according to the usage of the control server. Further, the service may be charged per user, per time, per transaction or event, or per the communicated data amount. In one example, the business entity is the ISP that connects the building (or the vehicle) to the Internet (such as ISP server 47 operator), or the WAN provider, such as the telephone company ('Telco') or the CATV provider owning or operating the wiring of the external network such as WAN 46. Similarly, a cellular network operator may be the business entity in the case the WAN 46 is based on cellular communication. Such Added Revenue Per User (ARPU) is beneficial to most communication service providers, since the additional revenues do not require any additional infrastructure investment. In one example, the communication service provider (such as the WAN 46 operator) may provide the router 40 for a nominal cost or even lower than nominal (e.g. free), wherein the ARPU covers the initial cost after a time. The control server service may be billed 5 as a one-time fee, a flat-fee per period (e.g., monthly or annually), per a communication session, per length of the communication sessions, per the amount of information transferred in a session, per type of communication sessions (e.g., status, control, or alert) or any combination thereof. The business method and the system may be based on, or comprise, the structure and functionalities described in U.S. Patent Application No. 2005/0216302 to Raji et al., entitled: "Business Method for Premises Management".

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A first device for use with a Wireless Local Area Network (WLAN) in a building, the first device comprising:
   a WLAN transceiver for communicating over the WLAN;
   a microphone for capturing human voice data; and
   a sounder for converting an electrical energy to audible sound waves; and
   one or more processors programmed with computer program instructions that, when executed, cause the first device to:
   capture, using the microphone, first and second human voice data;
   send, over the Internet via the WLAN, to a server device, the captured first and second human voice data;
   receive, from the server device via the WLAN over the Internet, first and second messages, in response to the sending of the respectively captured first and second human voice data;
   sound, using the sounder, digital audio content in response to the received first message; and
   send, to a second device over the WLAN, a control message that comprises a control data for controlling a first actuator in the second device to directly or indirectly affect, change, or produce, a first physical phenomenon, in response to the received second message,
   wherein each of the first and second devices is addressable in the WLAN and in the Internet using a respective Internet Protocol (IP) address.

2. The first device according to claim 1, wherein the first device or the server device is configured for processing the first and second human voice data using a voice recognition algorithm for identifying a voice of a specific person.

3. The first device according to claim 1, further comprising a sensor that outputs sensor data that responds to a physical phenomenon, wherein the computer program instructions, when executed, further cause the first device to send to the server device, via the WLAN over the Internet, the sensor data, and wherein the first message is further responsive to the sent sensor data.

4. The first device according to claim 3, wherein the sensor is a thermoelectric sensor that responds to a temperature or to a temperature gradient of an object using conduction, convection, or radiation, or wherein the sensor is a photoelectric sensor that responds to a visible or an invisible light or gamma rays.

5. The first device according to claim 1, further comprising a second actuator that is configured for directly or indirectly affect, change, or produce, a second physical phenomenon.

6. The first device according to claim 5, wherein the second physical phenomenon comprises temperature, humidity, pressure, audio, vibration, light, motion, sound, proximity, flow rate, electrical voltage, or electrical current.

7. The first device according to claim 1, further comprising an additional microphone for capturing human voice data, and wherein the capturing comprises capturing, by the additional microphone, the first and second human voice data.

8. The first device according to claim 7, wherein the microphone and the additional microphone are arranged as a directional microphones array operative to estimate a number, magnitude, frequency, Direction-Of-Arrival (DOA), distance, or speed of a phenomenon impinging the microphones array.

9. The first device according to claim 1, wherein the microphone is an omnidirectional, unidirectional, or bidirectional microphone that is based on the sensing an incident sound-based motion of a diaphragm or a ribbon, or wherein the microphone comprises a condenser, an electret, a dynamic, a ribbon, a carbon, or a piezoelectric microphone.

10. The first device according to claim 1, wherein the IP address is stored in a volatile or non-volatile memory.

11. The first device according to claim 1, further addressed by a Media Access Control (MAC) layer address that is MAC-48, Extended Unique Identifier (EUI) EUI-48, or EUI-64 address type.

12. The first device according to claim 1, wherein the IP address is a static or dynamic Internet Protocol (IP) address that is IPv4 or IPv6 type address.

13. The first device according to claim 1, wherein the WLAN is according to, or is compatible with, an Institute of Electrical and Electronics Engineers (IEEE) 802.11-2012, IEEE 802.11a, IEEE 802.11b, IEEE 802.11g, IEEE 802.11n, or IEEE 802.11ac standard.

14. The first device according to claim 1, wherein the WLAN uses an unlicensed radio frequency band, that is an Industrial, Scientific and Medical (ISM) radio band.

15. The first device according to claim 1, further configured for communicating over a cellular telephone network that is a Third Generation (3G) network that uses, or is compatible with, Universal Mobile Telecommunications First device (UMTS), Wideband Code Division Multiple Access (W-CDMA) UMTS, High Speed Packet Access (HSPA), UMTS Time-Division Duplexing (TDD), CDMA2000 1×RTT, Evolution-Data Optimized (EV-DO), or Global First device for Mobile communications (GSM), Enhanced Data rates for GSM Evolution (EDGE) EDGE-Evolution.

16. The first device according to claim 1, further configured for communicating over a cellular telephone network that is a Fourth Generation (4G) network that uses, or is compatible with, Evolved High Speed Packet Access (HSPA+), Mobile Worldwide Interoperability for Microwave Access (WiMAX), Long-Term Evolution (LTE), LTE-Advanced, Mobile Broadband Wireless Access (MBWA), or is based on IEEE 802.20-2008 standard.

17. The first device according to claim 1, wherein the second device is integrated in, is part of, or is entirely included in, a household appliance having a primary function.

18. The first device according to claim 17, wherein the primary functionality of the appliance is associated with food storage, handling, or preparation.

19. The first device according to claim 18, wherein the primary function of the appliance is heating food, and wherein the appliance is a microwave oven, an electric mixer, a stove, an oven, or an induction cooker.

20. The first device according to claim 18, wherein the appliance is a refrigerator, a freezer, a food processor, a dishwasher, a food blender, a beverage maker, a coffee-maker, or an iced-tea maker.

21. The first device according to claim 17, wherein the primary function of the appliance is associated with environmental control, and the appliance is part of a Heating, Ventilation and Air Conditioning (HVAC) system.

22. The first device according to claim 21, wherein the primary function of the appliance is associated with temperature control, and wherein the appliance is an air conditioner or a heater.

23. The first device according to claim 17, wherein the primary function of the appliance is associated with cleaning, wherein the appliance primary function is associated with clothes cleaning and the appliance is a washing machine, or wherein the appliance is a vacuum cleaner.

24. The first device according to claim 17, wherein the appliance is an answering machine, a telephone set, a home cinema system, a High Fidelity (HiFi) system, a Compact Disc (CD) or Digital Video Disc (DVD) player, an electric furnace, a trash compactor, a smoke detector, a light fixture, or a dehumidifier.

25. The first device according to claim 1, further configured to operate within a building, and wherein the server device is external to the building.

26. The first device according to claim 1, further comprising an electric light source for converting electrical energy into light that emits visible or non-visible light for illumination or indication, and the non-visible light is infrared, ultraviolet, X-rays, or gamma rays.

27. The first device according to claim 26, wherein the electric light source comprises a lamp, an incandescent lamp, a gas discharge lamp, a fluorescent lamp, a Solid-State Lighting (SSL), a Light Emitting Diode (LED), an Organic LED (OLED), a polymer LED (PLED), or a laser diode.

28. The first device according to claim 27, wherein the sounding comprises playing digital audio content that is pre-recorded or synthesized, wherein the sounding comprises simulating the voice of a human being or generating music, or wherein the sounding comprises sounding a syllable, a word, a phrase, a sentence, a short story, or a long story, using male or female voice.

29. The first device according to claim 1, wherein the sounder comprises an electromagnetic loudspeaker, a piezoelectric speaker, an electrostatic loudspeaker (ESL), a ribbon or planar magnetic loudspeaker, or a bending wave loudspeaker.

30. The first device according to claim 1, wherein the sounder comprises an electric bell, a buzzer, a chime, a whistle, or a ringer.

31. The first device according to claim 1, further comprising an enclosure that houses the WLAN transceiver, the sounder, the microphone, and the one or more processors.

32. The first device according to claim 31, wherein the enclosure is a wearable enclosure configured to be wearable on a human body.

33. The first device according to claim 1, wherein the sounder is configured for converting an electrical energy to omnidirectional, unidirectional, or bidirectional pattern emitted, audible or inaudible, sound waves.

* * * * *